(12) United States Patent
Xu et al.

(10) Patent No.: US 10,470,188 B2
(45) Date of Patent: Nov. 5, 2019

(54) TRANSMISSION OF ONE OR MORE CODEBOOKS BETWEEN NETWORK AND TERMINAL DEVICES

(71) Applicant: Huawei Technologies Co., Ltd., Shenzhen (CN)

(72) Inventors: Xiuqiang Xu, Shanghai (CN); Yiqun Wu, Shanghai (CN); Lu Rong, Shanghai (CN); Shunqing Zhang, Shenzhen (CN); Yan Chen, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 141 days.

(21) Appl. No.: 15/630,706

(22) Filed: Jun. 22, 2017

(65) Prior Publication Data
US 2017/0353959 A1    Dec. 7, 2017

Related U.S. Application Data

(63) Continuation of application No. PCT/CN2015/077357, filed on Apr. 24, 2015.

(30) Foreign Application Priority Data

Dec. 22, 2014    (WO) .............. PCT/CN2014/094539

(51) Int. Cl.
*H04W 72/04* (2009.01)
*H04W 72/12* (2009.01)
(Continued)

(52) U.S. Cl.
CPC ...... *H04W 72/0466* (2013.01); *H04B 7/0456* (2013.01); *H04B 7/0639* (2013.01);
(Continued)

(58) Field of Classification Search
CPC . H04W 72/0466; H04W 76/27; H04W 72/06; H04W 72/042; H04W 72/12;
(Continued)

(56) References Cited

U.S. PATENT DOCUMENTS 7,933,238 B2    4/2011    Sartori et al.
8,160,595 B2    4/2012    Sawahashi et al.
(Continued)

FOREIGN PATENT DOCUMENTS

CN    101541011 A    9/2009
CN    101621490 A    1/2010
(Continued)

OTHER PUBLICATIONS

Taherzadeh et al., "SCMA Codebook Design," 2014 IEEE 80th Vehicular Technology Conference (VTC2014—Fall), XP32694934A, Institute of Electrical and Electronics Engineers, New York, New York, (Sep. 2014).

(Continued)

*Primary Examiner* — Walli Z Butt
(74) *Attorney, Agent, or Firm* — Leydig, Voit & Mayer, Ltd.

(57) ABSTRACT

The present invention discloses an indication information transmission method and apparatus. The method includes: determining, in one or more codebooks, a first codebook used to send a first downlink data stream to a terminal device; determining one or more second codebooks used to send a second downlink data stream; determining codebook indication information used to indicate the first codebook and the one or more second codebooks; and sending the codebook indication information to the terminal device.

20 Claims, 14 Drawing Sheets

(51) Int. Cl.
| | |
|---|---|
| *H04W 76/27* | (2018.01) |
| *H04B 7/06* | (2006.01) |
| *H04W 72/06* | (2009.01) |
| *H04B 7/0456* | (2017.01) |
| *H04J 11/00* | (2006.01) |
| *H04L 1/06* | (2006.01) |
| *H04L 5/00* | (2006.01) |
| *H04L 25/03* | (2006.01) |

(52) U.S. Cl.
CPC ....... *H04J 11/0023* (2013.01); *H04J 11/0053* (2013.01); *H04L 1/06* (2013.01); *H04L 5/0016* (2013.01); *H04L 25/03942* (2013.01); *H04W 72/042* (2013.01); *H04W 72/06* (2013.01); *H04W 72/12* (2013.01); *H04W 76/27* (2018.02); *H04L 5/0091* (2013.01)

(58) Field of Classification Search
CPC ... H04L 25/03942; H04L 5/0016; H04L 1/06; H04L 5/0091; H04J 11/0053; H04J 11/0023; H04B 7/0456; H04B 7/0639
See application file for complete search history.

(56) References Cited

U.S. PATENT DOCUMENTS

| | | | |
|---|---|---|---|
| 8,873,501 | B2 | 10/2014 | Kawamura et al. |
| 2005/0283715 | A1 | 12/2005 | Sutivong et al. |
| 2007/0054624 | A1 | 3/2007 | Kashiwagi |
| 2009/0245401 | A1* | 10/2009 | Chrabieh ............. H04L 1/0041 375/260 |
| 2010/0039928 | A1 | 2/2010 | Noh et al. |
| 2010/0215110 | A1 | 8/2010 | Onggosanusi et al. |
| 2010/0329369 | A1 | 12/2010 | Hou et al. |
| 2011/0128939 | A1 | 6/2011 | Lim et al. |
| 2011/0142147 | A1* | 6/2011 | Chen ................ H04L 25/03343 375/260 |
| 2011/0200125 | A1 | 8/2011 | Multrus et al. |
| 2012/0177011 | A1* | 7/2012 | Xi ....................... H04B 7/0404 370/335 |
| 2013/0315284 | A1 | 11/2013 | Nammi |
| 2014/0098901 | A1 | 4/2014 | Zhang et al. |
| 2014/0169408 | A1 | 6/2014 | Bayesteh et al. |
| 2014/0321313 | A1 | 10/2014 | Seo et al. |
| 2014/0369434 | A1* | 12/2014 | Taherzadehboroujeni ................. H04B 7/0456 375/261 |
| 2015/0215012 | A1 | 7/2015 | Yan et al. |
| 2015/0280800 | A1* | 10/2015 | Chen ................... H04B 7/0619 375/267 |
| 2017/0289979 | A1* | 10/2017 | Xu .......................... H04L 1/06 |
| 2017/0353959 | A1 | 12/2017 | Xu et al. |

FOREIGN PATENT DOCUMENTS

| | | |
|---|---|---|
| CN | 101640940 A | 2/2010 |
| CN | 101826943 A | 9/2010 |
| CN | 102124655 A | 7/2011 |
| CN | 102742311 A | 10/2012 |
| CN | 103209057 A | 7/2013 |
| CN | 103368698 A | 10/2013 |
| CN | 103731233 A | 4/2014 |
| CN | 103780289 A | 5/2014 |
| EP | 2247138 B1 | 7/2014 |
| EP | 3051923 A1 | 8/2016 |
| KR | 20100081898 A | 7/2010 |
| KR | 20120033340 A | 4/2012 |
| KR | 20130143106 A | 12/2013 |
| KR | 20140123486 A | 10/2014 |
| RU | 2348115 C2 | 2/2009 |
| RU | 2493651 C2 | 9/2013 |
| WO | 2006007317 A1 | 1/2006 |
| WO | 2007029745 A1 | 3/2007 |
| WO | 2008091348 A1 | 7/2008 |
| WO | 2009022871 A2 | 2/2009 |
| WO | 2011125025 A1 | 10/2011 |
| WO | 2014075637 A1 | 5/2014 |

OTHER PUBLICATIONS

Au et al., "Uplink Contention Based SCMA for 5G Radio Access," Globecom 2014 Workshop—Emerging Technologies for 5G Wireless Cellular Networks, pp. 900-905, XP32747733A Institute of Electrical and Electronics Engineers, New York, New York (Dec. 2014).

Nikopour et al., "Sparse Code Multiple Access," 2013 IEEE 24th International Symposium on Personal, Indoor and Mobile Radio Communications: Fundamentals and PHY Track, pp. 332-336, Institute of Electrical and Electronics Engineers, New York, New York (Sep. 2013).

Zhang et al.,"Sparse Code Multiple Access: An Energy Efficient Uplink Approach for 5G Wireless Systems," Globecom 2014—Wireless Networking Symposium, pp. 4782-4787 (Dec. 8-12, 2014).

Taherzadeh et al., "SCMA Codebook Design," pp. 1-5, Both IEEE Vehicular Technology Conference (VTC), Institute of Electrical and Electronics Engineers—New York, New York (Sep. 14, 2014).

Au et al, "Uplink Contention Based SCMA for 5G Radio Access," 2014 IEEE Globecom Workshops (GC Wkshps), pp. 900-905, Institute of Electrical and Electronics Engineers—New York, New York (Dec. 8-12, 2014).

Nikopour et al, "Sparse Code Multiple Access", 2013 IEEE 24th International Symposium on Personal, Indoor 1:tnd Mobile Radio Communications; Fundamentals and PHY Track, pp. 332-336, Institute of Electrical and Electronics Engineers—New York, New York (Sep. 8, 2013).

Nikopour et al.,"SCMA for Downlink Multiple Access of 5G Wireless Networks," pp. 3940-3945, Globecom 2014—Wireless Communications Symposium (2014).

* cited by examiner

200

```
┌─────────────────────────────────────────────────────────┐
│ Determine, in one or more codebooks, a first codebook   │
│ used to send a first downlink data stream to a terminal │
│ device, where the codebook consists of two or more      │
│ codewords, the codewords are multidimensional complex   │  ~ S210
│ vectors, and are used to indicate mapping relationships │
│ between data and at least two modulation symbols, and   │
│ the at least two modulation symbols include at least    │
│ one zero-modulation symbol and at least one non-zero-   │
│ modulation symbol                                       │
└─────────────────────────────────────────────────────────┘
                              │
┌─────────────────────────────────────────────────────────┐
│ Determine one or more second codebooks used to send a   │
│ second downlink data stream, where the second downlink  │
│ data stream is one or more downlink data streams, other │  ~ S220
│ than the first downlink data stream, carried on a       │
│ time-frequency resource used for the first downlink     │
│ data stream                                             │
└─────────────────────────────────────────────────────────┘
                              │
┌─────────────────────────────────────────────────────────┐
│ Determine codebook indication information used to       │  ~ S230
│ indicate the first codebook and the one or more second  │
│ codebooks                                               │
└─────────────────────────────────────────────────────────┘
                              │
┌─────────────────────────────────────────────────────────┐
│ Send the codebook indication information to the         │  ~ S240
│ terminal device                                         │
└─────────────────────────────────────────────────────────┘
```

Determine a first codebook set to which the first codebook belongs, one or more second codebook sets to which the one or more second codebooks belong, and a first codebook cluster to which the first codebook set and the one or more second codebook sets belong, where each codebook cluster includes at least one codebook set, each codebook set includes at least one codebook, the codebook cluster meets a condition that codewords in a same codebook cluster have a same total quantity of modulation symbols, and the codebook set meets a condition that for any two codebooks in a same codebook set, a location at which modulation symbols of all codewords in one codebook are zero-modulation symbols is the same as a location at which modulation symbols of all codewords in the other codebook are zero-modulation symbols ~ S231

Determine the codebook indication information, where the codebook indication information includes first codebook cluster information, first codebook set information, and first indication information, the first codebook cluster information is used to indicate the first codebook cluster, the first codebook set information is used to indicate the first codebook set in the first codebook cluster, the first indication information is used to indicate the first codebook in the first codebook set, and the first indication information is further used to indicate the one or more second codebook sets in the first codebook cluster and the one or more second codebooks in the one or more second codebook sets ~ S232

```
┌─────────────────────────────────────────────────┐
│ Determine a first feature sequence to which the first codebook
│ belongs, one or more second feature sequences to which the one
│ or more second codebooks belong, and a first feature matrix to
│   which the first feature sequence and the one or more second
│  feature sequences belong, where each feature matrix consists of
│         two or more feature sequences, each feature sequence
│      corresponds to one or more codebooks, the feature sequence
│      consists of a zero-element and a 1-element, the zero-element
│        means that modulation symbols of all codewords in a
│  corresponding codebook at a location corresponding to the zero-
│    element are all zero-modulation symbols, and the 1-element
│         means that modulation symbols of all codewords in a
│       corresponding codebook at a location corresponding to the 1-
│  element are not all zero-modulation symbols or are all non-zero-
│                        modulation symbols
└─────────────────────────────────────────────────┘
```
∼ S233

```
┌─────────────────────────────────────────────────┐
│  Determine the codebook indication information, where the
│ codebook indication information includes first feature matrix
│   information, first feature sequence information, and second
│    indication information, the first feature matrix information is
│ used to indicate the first feature matrix, the first feature sequence
│    information is used to indicate the first feature sequence in the
│   first feature matrix, the second indication information is used to
│           indicate the first codebook in one or more codebooks
│         corresponding to the first feature sequence, and the second
│ indication information is further used to indicate the one or more
│    second feature sequences in the first feature matrix, and the one
│            or more second codebooks in one or more codebooks
│       corresponding to the one or more second feature sequences
└─────────────────────────────────────────────────┘
```
∼ S234

```
Receive codebook indication information sent by a network
device, where the codebook indication information is used to
indicate a first codebook used by the network device to send a
first downlink data stream, and one or more second codebooks
used by the network device to send a second downlink data
stream, the second downlink data stream is one or more
downlink data streams, other than the first downlink data stream,
carried on a time-frequency resource used for the first downlink
data stream, the codebook consists of two or more codewords,
the codewords are multidimensional complex vectors, and are
used to indicate mapping relationships between data and at least
two modulation symbols, and the at least two modulation
symbols include at least one zero-modulation symbol and at least
one non-zero-modulation symbol
```
S310

Determine the first codebook and the one or more second codebooks according to the codebook indication information — S320

Decode, according to the first codebook and the one or more second codebooks, the first downlink data stream sent by the network device — S330

Receive codebook indication information sent by a network device, where the codebook indication information includes first codebook cluster information, first codebook set information, and first indication information, the first codebook cluster information is used to indicate a first codebook cluster, the first codebook set information is used to indicate a first codebook set in the first codebook cluster, the first indication information is used to indicate the first codebook in the first codebook set, and the first indication information is further used to indicate one or more second codebook sets in the first codebook cluster and the one or more second codebooks in the one or more second codebook sets ~ S310

Determine, according to the first codebook cluster information, the first codebook set information, and the first indication information, the first codebook in the first codebook set included in the first codebook cluster and the one or more second codebooks in the one or more second codebook sets included in the first codebook cluster, where each codebook cluster includes at least one codebook set, each codebook set includes at least one codebook, the codebook cluster meets a condition that codewords in a same codebook cluster have a same total quantity of modulation symbols, and the codebook set meets a condition that for any two codebooks in a same codebook set, a location at which modulation symbols of all codewords in one codebook are zero-modulation symbols is the same as a location at which modulation symbols of all codewords in the other codebook are zero-modulation symbols ~ S321

Receive codebook indication information sent by a network device, where the codebook indication information includes first feature matrix information, first feature sequence information, and second indication information, the first feature matrix information is used to indicate a first feature matrix, the first feature sequence information is used to indicate a first feature sequence in the first feature matrix, the second indication information is used to indicate the first codebook in one or more codebooks corresponding to the first feature sequence, and the second indication information is further used to indicate one or more second feature sequences in the first feature matrix, and the one or more second codebooks in one or more codebooks corresponding to the one or more second feature sequences ~ S310

Determine, according to the first feature matrix information, the first feature sequence information, and the second indication information, the first codebook in the one or more codebooks corresponding to the first feature sequence included in the first feature matrix, and the one or more second codebooks in the one or more second feature sequences included in the first feature matrix, where each feature matrix consists of two or more feature sequences, each feature sequence corresponds to one or more codebooks, the feature sequence consists of a zero-element and a 1-element, the zero-element means that modulation symbols of all codewords in a corresponding codebook at a location corresponding to the zero-element are all zero-modulation symbols, and the 1-element means that modulation symbols of all codewords in a corresponding codebook at a location corresponding to the 1-element are not all zero-modulation symbols or are all non-zero-modulation symbols ~ S322

FIG. 8

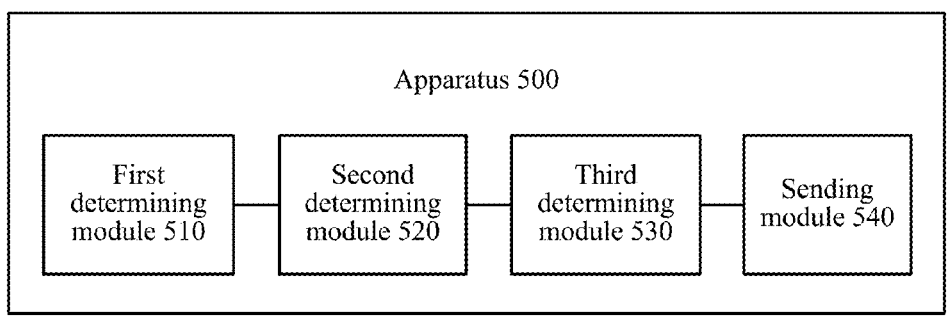

Determine a first mode and a rank of the terminal device in multiple terminal devices to which the first data stream and the second data stream belong, where the first mode is used to indicate a third codebook set to which the first codebook and the one or more second codebooks belong, and information about allocation of codebooks in the third codebook set to the multiple terminal devices, each codebook set includes at least one codebook, and the codebook set meets a condition that codewords in a same codebook set have a same total quantity of modulation symbols and codebooks in a same codebook set have a same total quantity of codewords ~ S235

Determine the codebook indication information, where the codebook indication information includes first mode information and first terminal device rank information, the first mode information is used to indicate the first mode, and the first terminal device rank information is used to indicate the rank of the terminal device in the multiple terminal devices ~ S236

Determine a second mode, a rank of the terminal device in multiple terminal devices to which the first data stream and the second data stream belong, and a codebook set used by each of the multiple terminal devices, where the second mode is used to indicate a second feature matrix to which the first codebook and the one or more second codebooks belong, and information about allocation of feature sequences in the second feature matrix to the multiple terminal devices, each feature matrix corresponds to one or more codebook sets, the feature matrix consists of two or more feature sequences, the feature sequence consists of a zero-element and a 1-element, the zero-element means that modulation symbols of all codewords in a corresponding codebook at a location corresponding to the zero-element are all zero-modulation symbols, the 1-element means that modulation symbols of all codewords in a corresponding codebook at a location corresponding to the 1-element are not all zero-modulation symbols or are all non-zero-modulation symbols, each codebook set includes at least one codebook, the codebook set meets a condition that codewords in a same codebook set have a same total quantity of modulation symbols and codebooks in a same codebook set have a same total quantity of codewords ~ S237

Determine the codebook indication information, where the codebook indication information includes second mode information, second terminal device rank information, and third codebook set information, the second mode information is used to indicate the second mode, the second terminal device rank information is used to indicate the rank of the terminal device in the multiple terminal devices, and the third codebook set information is used to indicate the codebook set that is respectively used by each terminal device and that corresponds to the second feature matrix ~ S238

Receive codebook indication information sent by a network device, where the codebook indication information includes first mode information and first terminal device rank information, the first mode information is used to indicate a first mode, the first mode is used to indicate a third codebook set to which the first codebook and the one or more second codebooks belong, and information about allocation of codebooks in the third codebook set to multiple terminal devices to which the first data stream and the second data stream belong, and the first terminal device rank information is used to indicate a rank of the terminal device in the multiple terminal devices ∼ S310

Determine, according to the first mode information and the first terminal device rank information and in the third codebook set indicated by the first mode, the first codebook corresponding to the first terminal device rank information and the one or more second codebooks, where each codebook set includes at least one codebook, and the codebook set meets a condition that codewords in a same codebook set have a same total quantity of modulation symbols and codebooks in a same codebook set have a same total quantity of codewords ∼ S323

Receive codebook indication information sent by a network device, where the codebook indication information includes second mode information, second terminal device rank information, and third codebook set information, the second mode information is used to indicate a second mode, the second mode is used to indicate a second feature matrix to which the first codebook and the one or more second codebooks belong, and information about allocation of feature sequences in the second feature matrix to multiple terminal devices to which the first data stream and the second data stream belong, the second terminal device rank information is used to indicate a rank of the terminal device in the multiple terminal devices, and the third codebook set information is used to indicate a codebook set that is used by each of the multiple terminal devices and that corresponds to the second feature matrix ~ S310

Determine, according to the second mode information, the second terminal device rank information, and the third codebook set information and in one or more codebook sets corresponding to the second feature matrix indicated by the second mode, the first codebook corresponding to the second terminal device rank information and the one or more second codebooks, where each feature matrix corresponds to one or more codebook sets, the feature matrix consists of two or more feature sequences, the feature sequence consists of a zero-element and a 1-element, the zero-element means that modulation symbols of all codewords in a corresponding codebook at a location corresponding to the zero-element are all zero-modulation symbols, the 1-element means that modulation symbols of all codewords in a corresponding codebook at a location corresponding to the 1-element are not all zero-modulation symbols or are all non-zero-modulation symbols, each codebook set includes at least one codebook, the codebook set meets a condition that codewords in a same codebook set have a same total quantity of modulation symbols and codebooks in a same codebook set have a same total quantity of codewords ~ S324

FIG. 19

TRANSMISSION OF ONE OR MORE CODEBOOKS BETWEEN NETWORK AND TERMINAL DEVICES

CROSS-REFERENCE TO RELATED APPLICATIONS

This application is a continuation of International Patent Application No. PCT/CN2015/077357, filed on Apr. 24, 2015, which claims priority to Patent Cooperation Treaty Patent Application No. PCT/CN2014/094539, filed on Dec. 22, 2014. The disclosures of the aforementioned applications are hereby incorporated by reference in their entireties.

TECHNICAL FIELD

The embodiments present invention relate to the field of communications, and in particular, to an indication information transmission method and apparatus in the field of communications.

BACKGROUND

With continuous evolution of wireless cellular networks, orthogonal multiple access technologies, such as a Code Division Multiple Access ("CDMA" for short) technology and an Orthogonal Frequency Division Multiple Access ("OFDMA" for short) technology, widely applied in third generation (3rd-Generation, "3G" for short) and fourth generation (4th-Generation, "4G" for short) mobile communications systems gradually cannot meet requirements of people for a larger cellular network capacity, for example, for massive access and continuous spectral efficiency improvements. Moreover, the industrial field and academic field gradually pay more attention to research and application of a non-orthogonal multiple access technology, and people expect that a capacity of a future wireless cellular network, such as a fifth generation (5th-Generation, "5G" for short) mobile communications system, can be effectively improved by using the non-orthogonal multiple access technology.

A sparse code multiple access ("SCMA" for short) technology is a typical non-orthogonal multiple access technology. Certainly, the SCMA technology may have another name in the field of communications. According to the technology, M (M is an integer not less than 1) data streams from one or more users are superimposed on N (N is an integer not less than 1) subcarriers for sending. Each piece of data of each data stream is extended on the N subcarriers by means of sparse spread spectrum. When M is greater than N, the technology may effectively improve a network capacity, including a quantity of users that can access a system, spectral efficiency, and the like. Therefore, as an important non-orthogonal access technology, the SCMA technology attracts more attention, and becomes an important candidate access technology during evolution of the future wireless cellular network.

In a non-orthogonal multiple access system such as an SCMA system, when a terminal device receives a downlink data stream that is sent by a network device by using a non-orthogonal multiple access technology, the terminal device needs to learn a codebook used for the downlink data stream. However, selection and allocation of the codebook are generally completed by the network device, and the terminal device does not participate in such a process directly. Therefore, how the network device notifies the terminal device of an allocated codebook after allocating the codebook for a data stream to be received by the terminal device is a technical problem that urgently needs to be resolved.

SUMMARY

In view of this, embodiments of the present invention provide an indication information transmission method and apparatus, to resolve a problem of how a network device sends a codebook to a terminal device in a non-orthogonal multiple access system.

According to a first aspect, an indication information transmission method is provided, where the method includes: determining, in one or more codebooks, a first codebook used to send a first downlink data stream to a terminal device, where the codebook consists of two or more codewords, the codewords are multidimensional complex vectors, and are used to indicate mapping relationships between data and at least two modulation symbols, and the at least two modulation symbols include at least one zero-modulation symbol and at least one non-zero-modulation symbol; determining one or more second codebooks used to send a second downlink data stream, where the second downlink data stream is one or more downlink data streams, other than the first downlink data stream, carried on a time-frequency resource used for the first downlink data stream; determining codebook indication information used to indicate the first codebook and the one or more second codebooks; and sending the codebook indication information to the terminal device.

With reference to the first aspect, in a first possible implementation of the first aspect, the determining codebook indication information used to indicate the first codebook and the one or more second codebooks includes: determining a first codebook set to which the first codebook belongs, one or more second codebook sets to which the one or more second codebooks belong, and a first codebook cluster to which the first codebook set and the one or more second codebook sets belong, where each codebook cluster includes at least one codebook set, each codebook set includes at least one codebook, the codebook cluster meets a condition that codewords in a same codebook cluster have a same total quantity of modulation symbols, and the codebook set meets a condition that for any two codebooks in a same codebook set, a location at which modulation symbols of all codewords in one codebook are zero-modulation symbols is the same as a location at which modulation symbols of all codewords in the other codebook are zero-modulation symbols, or the codebook set meets a condition that codewords in a same codebook set have a same total quantity of modulation symbols and codebooks in a same codebook set have a same total quantity of codewords; and determining the codebook indication information, where the codebook indication information includes first codebook cluster information, first codebook set information, and first indication information, the first codebook cluster information is used to indicate the first codebook cluster, the first codebook set information is used to indicate the first codebook set in the first codebook cluster, the first indication information is used to indicate the first codebook in the first codebook set, and the first indication information is further used to indicate the one or more second codebook sets in the first codebook cluster and the one or more second codebooks in the one or more second codebook sets.

With reference to the first possible implementation of the first aspect, in a second possible implementation of the first aspect, the first indication information includes: first codebook information, second codebook set information, and second codebook information, the first codebook information is used to indicate the first codebook in the first codebook set, the second codebook set information is used to indicate the one or more second codebook sets in the first codebook cluster, and the second codebook information is used to indicate the one or more second codebooks in the one or more second codebook sets.

With reference to the first possible implementation of the first aspect, in a third possible implementation of the first aspect, the first indication information includes M groups of bit string information in a one-to-one correspondence with all codebook sets in the first codebook cluster, each group of bit string information is used to indicate whether a corresponding codebook set belongs to the first codebook set or the one or more second codebook sets, when the codebook set corresponding to each group of bit string information belongs to the first codebook set or the one or more second codebook sets, each group of bit string information is further used to indicate the first codebook or the one or more second codebooks in the corresponding codebook set, and M is quantity of codebook sets included in the first codebook cluster.

With reference to the second or third possible implementation of the first aspect, in a fourth possible implementation of the first aspect, the first indication information includes modulation order information of the first codebook and the one or more second codebooks, and each codebook in each codebook set has a different modulation order.

With reference to the first aspect, in a fifth possible implementation of the first aspect, the determining codebook indication information used to indicate the first codebook and the one or more second codebooks includes: determining a first feature sequence to which the first codebook belongs, one or more second feature sequences to which the one or more second codebooks belong, and a first feature matrix to which the first feature sequence and the one or more second feature sequences belong, where each feature matrix consists of two or more feature sequences, each feature sequence corresponds to one or more codebooks, the feature sequence consists of a zero-element and a 1-element, the zero-element means that modulation symbols of all codewords in a corresponding codebook at a location corresponding to the zero-element are all zero-modulation symbols, and the 1-element means that modulation symbols of all codewords in a corresponding codebook at a location corresponding to the 1-element are not all zero-modulation symbols or are all non-zero-modulation symbols; and determining the codebook indication information, where the codebook indication information includes first feature matrix information, first feature sequence information, and second indication information, the first feature matrix information is used to indicate the first feature matrix, the first feature sequence information is used to indicate the first feature sequence in the first feature matrix, the second indication information is used to indicate the first codebook in one or more codebooks corresponding to the first feature sequence, and the second indication information is further used to indicate the one or more second feature sequences in the first feature matrix, and the one or more second codebooks in one or more codebooks corresponding to the one or more second feature sequences.

With reference to the fifth possible implementation of the first aspect, in a sixth possible implementation of the first aspect, the second indication information includes: third codebook information, second feature sequence information, and fourth codebook information, the third codebook information is used to indicate the first codebook in the one or more codebooks corresponding to the first feature sequence, the second feature sequence information is used to indicate the one or more second feature sequences in the first feature matrix, and the fourth codebook information is used to indicate the one or more second codebooks in the one or more codebooks corresponding to the one or more second feature sequences.

With reference to the fifth possible implementation of the first aspect, in a seventh possible implementation of the first aspect, the second indication information includes M groups of bit string information in a one-to-one correspondence with all feature sequences in the first feature matrix, each group of bit string information is used to indicate whether a corresponding feature sequence belongs to the first feature sequence or the one or more second feature sequences, when the feature sequence corresponding to each group of bit string information belongs to the first feature sequence or the one or more second feature sequences, each group of bit string information is further used to indicate the first codebook or the one or more second codebooks in one or more codebooks corresponding to the corresponding feature sequence, and M is quantity of feature sequences included in the first feature matrix.

With reference to the sixth or seventh possible implementation of the first aspect, in an eighth possible implementation of the first aspect, the second indication information includes modulation order information of the first codebook and the one or more second codebooks, and each of the one or more codebooks corresponding to each feature sequence has a different modulation order.

With reference to the first aspect, in a ninth possible implementation of the first aspect, the determining codebook indication information used to indicate the first codebook and the one or more second codebooks includes: determining a first mode and a rank of the terminal device in multiple terminal devices to which the first data stream and the second data stream belong, where the first mode is used to indicate a third codebook set to which the first codebook and the one or more second codebooks belong, and information about allocation of codebooks in the third codebook set to the multiple terminal devices, each codebook set includes at least one codebook, and the codebook set meets a condition that codewords in a same codebook set have a same total quantity of modulation symbols and codebooks in a same codebook set have a same total quantity of codewords; and determining the codebook indication information, where the codebook indication information includes first mode information and first terminal device rank information, the first mode information is used to indicate the first mode, and the first terminal device rank information is used to indicate the rank of the terminal device in the multiple terminal devices.

With reference to the first aspect, in a tenth possible implementation of the first aspect, the determining codebook indication information used to indicate the first codebook and the one or more second codebooks includes: determining a second mode, a rank of the terminal device in multiple terminal devices to which the first data stream and the second data stream belong, and a codebook set used by each of the multiple terminal devices, where the second mode is used to indicate a second feature matrix to which the first codebook and the one or more second codebooks belong, and information about allocation of feature sequences in the second feature matrix to the multiple terminal devices, each feature matrix corresponds to one or more codebook sets, the feature matrix consists of two or more feature sequences, the feature sequence consists of a zero-element and a 1-element, the zero-element means that modulation symbols of all codewords in a corresponding codebook at a location corresponding to the zero-element are all zero-modulation symbols, the 1-element means that modulation symbols of all codewords in a corresponding codebook at a location corresponding to the 1-element are not all zero-modulation symbols or are all non-zero-modulation symbols, each codebook set includes at least one codebook, the codebook set meets a condition that codewords in a same codebook set have a same total quantity of modulation symbols and codebooks in a same codebook set have a same total quantity of codewords, and each codebook in the codebook set respectively corresponds to each feature sequence in the feature matrix; and determining the codebook indication information, where the codebook indication information includes second mode information, second terminal device rank information, and third codebook set information, the second mode information is used to indicate the second mode, the second terminal device rank information is used to indicate the rank of the terminal device in the multiple terminal devices, and the third codebook set information is used to indicate the codebook set that is used by each terminal device and that corresponds to the second feature matrix.

With reference to any one of the first aspect, or the first to the tenth possible implementations of the first aspect, in an eleventh possible implementation of the first aspect, the sending the codebook indication information to the terminal device includes: sending a downlink scheduling message, dedicated higher layer control signaling, or a system broadcast message to the terminal device, where the downlink scheduling message, the dedicated higher layer control signaling, and the system broadcast message include the codebook indication information.

With reference to the eleventh possible implementation of the first aspect, in a twelfth possible implementation of the first aspect, the dedicated higher layer control signaling includes a radio resource control RRC connection establishment message and an RRC connection reconfiguration message.

With reference to any one of the first aspect, or the first to the twelfth possible implementations of the first aspect, in a thirteenth possible implementation of the first aspect, the codebook indication information is bit string information.

With reference to any one of the first aspect, or the first to the thirteenth possible implementations of the first aspect, in a fourteenth possible implementation of the first aspect, the codebook is a sparse code multiple access SCMA codebook.

With reference to the fourteenth possible implementation of the first aspect, in a fifteenth possible implementation of the first aspect, a quantity of zero-modulation symbols of a codeword included in the codebook is greater than or equal to a quantity of non-zero-modulation symbols.

According to a second aspect, an indication information transmission method is provided, where the method includes: receiving codebook indication information sent by a network device, where the codebook indication information is used to indicate a first codebook used by the network device to send a first downlink data stream, and one or more second codebooks used by the network device to send a second downlink data stream, the second downlink data stream is one or more downlink data streams, other than the first downlink data stream, carried on a time-frequency resource used for the first downlink data stream, the codebook consists of two or more codewords, the codewords are multidimensional complex vectors, and are used to indicate mapping relationships between data and at least two modulation symbols, and the at least two modulation symbols include at least one zero-modulation symbol and at least one non-zero-modulation symbol; determining the first codebook and the one or more second codebooks according to the codebook indication information; and decoding, according to the first codebook and the one or more second codebooks, the first downlink data stream sent by the network device.

With reference to the second aspect, in a first possible implementation of the second aspect, the codebook indication information includes first codebook cluster information, first codebook set information, and first indication information, the first codebook cluster information is used to indicate a first codebook cluster, the first codebook set information is used to indicate a first codebook set in the first codebook cluster, the first indication information is used to indicate the first codebook in the first codebook set, and the first indication information is further used to indicate one or more second codebook sets in the first codebook cluster and the one or more second codebooks in the one or more second codebook sets; and the determining the first codebook and the one or more second codebooks according to the codebook indication information includes: determining, according to the first codebook cluster information, the first codebook set information, and the first indication information, the first codebook in the first codebook set included in the first codebook cluster and the one or more second codebooks in the one or more second codebook sets included in the first codebook cluster, where each codebook cluster includes at least one codebook set, each codebook set includes at least one codebook, the codebook cluster meets a condition that codewords in a same codebook cluster have a same total quantity of modulation symbols, and the codebook set meets a condition that for any two codebooks in a same codebook set, a location at which modulation symbols of all codewords in one codebook are zero-modulation symbols is the same as a location at which modulation symbols of all codewords in the other codebook are zero-modulation symbols, or the codebook set meets a condition that codewords in a same codebook set have a same total quantity of modulation symbols and codebooks in a same codebook set have a same total quantity of codewords.

With reference to the first possible implementation of the second aspect, in a second possible implementation of the second aspect, the first indication information includes: first codebook information, second codebook set information, and second codebook information, the first codebook information is used to indicate the first codebook in the first codebook set, the second codebook set information is used to indicate the one or more second codebook sets in the first codebook cluster, and the second codebook information is used to indicate the one or more second codebooks in the one or more second codebook sets.

With reference to the first possible implementation of the second aspect, in a third possible implementation of the second aspect, the first indication information includes M groups of bit string information in a one-to-one correspondence with all codebook sets in the first codebook cluster, each group of bit string information is used to indicate whether a corresponding codebook set belongs to the first codebook set or the one or more second codebook sets, when the codebook set corresponding to each group of bit string information belongs to the first codebook set or the one or more second codebook sets, each group of bit string information is further used to indicate the first codebook or the one or more second codebooks in the corresponding codebook set, and M is quantity of codebook sets included in the first codebook cluster.

With reference to the second or third possible implementation of the second aspect, in a fourth possible implementation of the second aspect, the first indication information includes modulation order information of the first codebook and the one or more second codebooks, and each codebook in each codebook set has a different modulation order.

With reference to the second aspect, in a fifth possible implementation of the second aspect, the codebook indication information includes first feature matrix information, first feature sequence information, and second indication information, the first feature matrix information is used to indicate a first feature matrix, the first feature sequence information is used to indicate a first feature sequence in the first feature matrix, the second indication information is used to indicate the first codebook in one or more codebooks corresponding to the first feature sequence, and the second indication information is further used to indicate one or more second feature sequences in the first feature matrix, and the one or more second codebooks in one or more codebooks corresponding to the one or more second feature sequences; and the determining the first codebook and the one or more second codebooks according to the codebook indication information includes: determining, according to the first feature matrix information, the first feature sequence information, and the second indication information, the first codebook in the one or more codebooks corresponding to the first feature sequence included in the first feature matrix, and the one or more second codebooks in the one or more codebooks corresponding to the one or more second feature sequences included in the first feature matrix, where each feature matrix consists of two or more feature sequences, each feature sequence corresponds to one or more codebooks, the feature sequence consists of a zero-element and a 1-element, the zero-element means that modulation symbols of all codewords in a corresponding codebook at a location corresponding to the zero-element are all zero-modulation symbols, and the 1-element means that modulation symbols of all codewords in a corresponding codebook at a location corresponding to the 1-element are not all zero-modulation symbols or are all non-zero-modulation symbols.

With reference to the fifth possible implementation of the second aspect, in a sixth possible implementation of the second aspect, the second indication information includes: third codebook information, second feature sequence information, and fourth codebook information, the third codebook information is used to indicate the first codebook in the one or more codebooks corresponding to the first feature sequence, the second feature sequence information is used to indicate the one or more second feature sequences in the first feature matrix, and the fourth codebook information is used to indicate the one or more second codebooks in the one or more codebooks corresponding to the one or more second feature sequences.

With reference to the fifth possible implementation of the second aspect, in a seventh possible implementation of the second aspect, the second indication information includes M groups of bit string information in a one-to-one correspondence with all feature sequences in the first feature matrix, each group of bit string information is used to indicate whether a corresponding feature sequence belongs to the first feature sequence or the one or more second feature sequences, when the feature sequence corresponding to each group of bit string information belongs to the first feature sequence or the one or more second feature sequences, each group of bit string information is further used to indicate the first codebook or the one or more second codebooks in one or more codebooks corresponding to the corresponding feature sequence, and M is quantity of feature sequences included in the first feature matrix.

With reference to the sixth or seventh possible implementation of the second aspect, in an eighth possible implementation of the second aspect, the second indication information includes modulation order information of the first codebook and the one or more second codebooks, and each of the one or more codebooks corresponding to each feature sequence has a different modulation order.

With reference to the second aspect, in a ninth possible implementation of the second aspect, the codebook indication information includes first mode information and first terminal device rank information, the first mode information is used to indicate a first mode, the first mode is used to indicate a third codebook set to which the first codebook and the one or more second codebooks belong, and information about allocation of codebooks in the third codebook set to multiple terminal devices to which the first data stream and the second data stream belong, and the first terminal device rank information is used to indicate a rank of the terminal device in the multiple terminal devices; and the determining the first codebook and the one or more second codebooks according to the codebook indication information includes: determining, according to the first mode information and the first terminal device rank information and in the third codebook set indicated by the first mode, the first codebook corresponding to the first terminal device rank information and the one or more second codebooks, where each codebook set includes at least one codebook, and the codebook set meets a condition that codewords in a same codebook set have a same total quantity of modulation symbols and codebooks in a same codebook set have a same total quantity of codewords.

With reference to the second aspect, in a tenth possible implementation of the second aspect, the codebook indication information includes second mode information, second terminal device rank information, and third codebook set information, the second mode information is used to indicate a second mode, the second mode is used to indicate a second feature matrix to which the first codebook and the one or more second codebooks belong, and information about allocation of feature sequences in the second feature matrix to multiple terminal devices to which the first data stream and the second data stream belong, the second terminal device rank information is used to indicate a rank of the terminal device in the multiple terminal devices, and the third codebook set information is used to indicate a codebook set that is respectively used by each of the multiple terminal devices and that corresponds to the second feature matrix; and the determining the first codebook and the one or more second codebooks according to the codebook indication information includes: determining, according to the second mode information, the second terminal device rank information, and the third codebook set information and in one or more codebook sets corresponding to the second feature matrix indicated by the second mode, the first codebook corresponding to the second terminal device rank information and the one or more second codebooks, where each feature matrix corresponds to one or more codebook sets, the feature matrix consists of two or more feature sequences, the feature sequence consists of a zero-element and a 1-element, the zero-element means that modulation symbols of all codewords in a corresponding codebook at a location corresponding to the zero-element are all zero-modulation symbols, the 1-element means that modulation symbols of all codewords in a corresponding codebook at a location corresponding to the 1-element are not all zero-modulation symbols or are all non-zero-modulation symbols, each codebook set includes at least one codebook, the codebook set meets a condition that codewords in a same codebook set have a same total quantity of modulation symbols and codebooks in a same codebook set have a same total quantity of codewords, and each codebook in the codebook set respectively corresponds to each feature sequence in the feature matrix.

With reference to any one of the second aspect, or the first to the tenth possible implementations of the second aspect, in an eleventh possible implementation of the second aspect, the receiving codebook indication information sent by a network device includes: receiving a downlink scheduling message, dedicated higher layer control signaling, or a system broadcast message that is sent by the network device, where the downlink scheduling message, the dedicated higher layer control signaling, and the system broadcast message include the codebook indication information.

With reference to the eleventh possible implementation of the second aspect, in a twelfth possible implementation of the second aspect, the dedicated higher layer control signaling includes a radio resource control (RRC) connection establishment message and an RRC connection reconfiguration message.

With reference to any one of the second aspect, or the first to the twelfth possible implementations of the second aspect, in a thirteenth possible implementation of the second aspect, the codebook indication information is bit string information.

With reference to any one of the second aspect, or the first to the thirteenth possible implementations of the second aspect, in a fourteenth possible implementation of the second aspect, the codebook is a sparse code multiple access (SCMA) codebook.

With reference to the fourteenth possible implementation of the second aspect, in a fifteenth possible implementation of the second aspect, a quantity of zero-modulation symbols of a codeword included in the codebook is greater than or equal to a quantity of non-zero-modulation symbols.

According to a third aspect, an indication information transmission apparatus is provided, where the apparatus includes: a first determining module, configured to determine, in one or more codebooks, a first codebook used to send a first downlink data stream to a terminal device, where the codebook consists of two or more codewords, the codewords are multidimensional complex vectors, and are used to indicate mapping relationships between data and at least two modulation symbols, and the at least two modulation symbols include at least one zero-modulation symbol and at least one non-zero-modulation symbol; a second determining module, configured to determine one or more second codebooks used to send a second downlink data stream, where the second downlink data stream is one or more downlink data streams, other than the first downlink data stream, carried on a time-frequency resource used for the first downlink data stream; a third determining module, configured to determine codebook indication information used to indicate the first codebook determined by the first determining module and the one or more second codebooks determined by the second determining module; and a sending module, configured to send the codebook indication information determined by the third determining module to the terminal device.

With reference to the third aspect, in a first possible implementation of the third aspect, the third determining module includes: a first determining unit, configured to determine a first codebook set to which the first codebook belongs, one or more second codebook sets to which the one or more second codebooks belong, and a first codebook cluster to which the first codebook set and the one or more second codebook sets belong, where each codebook cluster includes at least one codebook set, each codebook set includes at least one codebook, the codebook cluster meets a condition that codewords in a same codebook cluster have a same total quantity of modulation symbols, and the codebook set meets a condition that for any two codebooks in a same codebook set, a location at which modulation symbols of all codewords in one codebook are zero-modulation symbols is the same as a location at which modulation symbols of all codewords in the other codebook are zero-modulation symbols, or the codebook set meets a condition that codewords in a same codebook set have a same total quantity of modulation symbols and codebooks in a same codebook set have a same total quantity of codewords; and a second determining unit, configured to determine the codebook indication information, where the codebook indication information includes first codebook cluster information, first codebook set information, and first indication information, the first codebook cluster information is used to indicate the first codebook cluster, the first codebook set information is used to indicate the first codebook set in the first codebook cluster, the first indication information is used to indicate the first codebook in the first codebook set, and the first indication information is further used to indicate the one or more second codebook sets in the first codebook cluster and the one or more second codebooks in the one or more second codebook sets.

With reference to the first possible implementation of the third aspect, in a second possible implementation of the third aspect, the first indication information determined by the second determining unit includes: first codebook information, second codebook set information, and second codebook information, the first codebook information is used to indicate the first codebook in the first codebook set, the second codebook set information is used to indicate the one or more second codebook sets in the first codebook cluster, and the second codebook information is used to indicate the one or more second codebooks in the one or more second codebook sets.

With reference to the first possible implementation of the third aspect, in a third possible implementation of the third aspect, the first indication information determined by the second determining unit includes M groups of bit string information in a one-to-one correspondence with all codebook sets in the first codebook cluster, each group of bit string information is used to indicate whether a corresponding codebook set belongs to the first codebook set or the one or more second codebook sets, when the codebook set corresponding to each group of bit string information belongs to the first codebook set or the one or more second codebook sets, each group of bit string information is further used to indicate the first codebook or the one or more second codebooks in the corresponding codebook set, and M is quantity of codebook sets included in the first codebook cluster.

With reference to the second or third possible implementation of the third aspect, in a fourth possible implementation of the third aspect, the first indication information determined by the second determining unit includes modulation order information of the first codebook and the one or more second codebooks, and each codebook in each codebook set has a different modulation order.

With reference to the third aspect, in a fifth possible implementation of the third aspect, the third determining module includes: a third determining unit, configured to determine a first feature sequence to which the first codebook belongs, one or more second feature sequences to which the one or more second codebooks belong, and a first feature matrix to which the first feature sequence and the one or more second feature sequences belong, where each feature matrix consists of two or more feature sequences, each feature sequence corresponds to one or more codebooks, the feature sequence consists of a zero-element and a 1-element, the zero-element means that modulation symbols of all codewords in a corresponding codebook at a location corresponding to the zero-element are all zero-modulation symbols, and the 1-element means that modulation symbols of all codewords in a corresponding codebook at a location corresponding to the 1-element are not all zero-modulation symbols or are all non-zero-modulation symbols; and a fourth determining unit, configured to determine the codebook indication information, where the codebook indication information includes first feature matrix information, first feature sequence information, and second indication information, the first feature matrix information is used to indicate the first feature matrix, the first feature sequence information is used to indicate the first feature sequence in the first feature matrix, the second indication information is used to indicate the first codebook in one or more codebooks corresponding to the first feature sequence, and the second indication information is further used to indicate the one or more second feature sequences in the first feature matrix, and the one or more second codebooks in one or more codebooks corresponding to the one or more second feature sequences.

With reference to the fifth possible implementation of the third aspect, in a sixth possible implementation of the third aspect, the second indication information determined by the fourth determining unit includes: third codebook information, second feature sequence information, and fourth codebook information, the third codebook information is used to indicate the first codebook in the one or more codebooks corresponding to the first feature sequence, the second feature sequence information is used to indicate the one or more second feature sequences in the first feature matrix, and the fourth codebook information is used to indicate the one or more second codebooks in the one or more codebooks corresponding to the one or more second feature sequences.

With reference to the fifth possible implementation of the third aspect, in a seventh possible implementation of the third aspect, the second indication information determined by the fourth determining unit includes M groups of bit string information in a one-to-one correspondence with all feature sequences in the first feature matrix, each group of bit string information is used to indicate whether a corresponding feature sequence belongs to the first feature sequence or the one or more second feature sequences, when the feature sequence corresponding to each group of bit string information belongs to the first feature sequence or the one or more second feature sequences, each group of bit string information is further used to indicate the first codebook or the one or more second codebooks in one or more codebooks corresponding to the corresponding feature sequence, and M is quantity of feature sequences included in the first feature matrix.

With reference to the sixth or seventh possible implementation of the third aspect, in an eighth possible implementation of the third aspect, the second indication information determined by the fourth determining unit includes modulation order information of the first codebook and the one or more second codebooks, and each of the one or more codebooks corresponding to each feature sequence has a different modulation order.

With reference to the third aspect, in a ninth possible implementation of the third aspect, the third determining module includes: a fifth determining unit, configured to determine a first mode and a rank of the terminal device in multiple terminal devices to which the first data stream and the second data stream belong, where the first mode is used to indicate a third codebook set to which the first codebook and the one or more second codebooks belong, and information about allocation of codebooks in the third codebook set to the multiple terminal devices, each codebook set includes at least one codebook, and the codebook set meets a condition that codewords in a same codebook set have a same total quantity of modulation symbols and codebooks in a same codebook set have a same total quantity of codewords; and a sixth determining unit, configured to determine the codebook indication information, where the codebook indication information includes first mode information and first terminal device rank information, the first mode information is used to indicate the first mode, and the first terminal device rank information is used to indicate the rank of the terminal device in the multiple terminal devices.

With reference to the third aspect, in a tenth possible implementation of the third aspect, the third determining module includes: a seventh determining unit, configured to determine a second mode, a rank of the terminal device in multiple terminal devices to which the first data stream and the second data stream belong, and a codebook set used by each of the multiple terminal devices, where the second mode is used to indicate a second feature matrix to which the first codebook and the one or more second codebooks belong, and information about allocation of feature sequences in the second feature matrix to the multiple terminal devices, each feature matrix corresponds to one or more codebook sets, the feature matrix consists of two or more feature sequences, the feature sequence consists of a zero-element and a 1-element, the zero-element means that modulation symbols of all codewords in a corresponding codebook at a location corresponding to the zero-element are all zero-modulation symbols, the 1-element means that modulation symbols of all codewords in a corresponding codebook at a location corresponding to the 1-element are not all zero-modulation symbols or are all non-zero-modulation symbols, each codebook set includes at least one codebook, the codebook set meets a condition that codewords in a same codebook set have a same total quantity of modulation symbols and codebooks in a same codebook set have a same total quantity of codewords, and each codebook in the codebook set respectively corresponds to each feature sequence in the feature matrix; and an eighth determining unit, configured to determine the codebook indication information, where the codebook indication information includes second mode information, second terminal device rank information, and third codebook set information, the second mode information is used to indicate the second mode, the second terminal device rank information is used to indicate the rank of the terminal device in the multiple terminal devices, and the third codebook set information is used to indicate the codebook set that is used by each terminal device and that corresponds to the second feature matrix.

With reference to any one of the third aspect, or the first to the tenth possible implementations of the third aspect, in an eleventh possible implementation of the third aspect, the sending module is specifically configured to send a downlink scheduling message, dedicated higher layer control signaling, or a system broadcast message to the terminal device, where the downlink scheduling message, the dedicated higher layer control signaling, and the system broadcast message include the codebook indication information.

With reference to the eleventh possible implementation of the third aspect, in a twelfth possible implementation of the third aspect, the dedicated higher layer control signaling includes a radio resource control RRC connection establishment message and an RRC connection reconfiguration message.

With reference to any one of the third aspect, or the first to the twelfth possible implementations of the third aspect, in a thirteenth possible implementation of the third aspect, the codebook indication information determined by the third determining module is bit string information.

With reference to any one of the third aspect, or the first to the thirteenth possible implementations of the third aspect, in a fourteenth possible implementation of the third aspect, the codebook is a sparse code multiple access SCMA codebook.

With reference to the fourteenth possible implementation of the third aspect, in a fifteenth possible implementation of the third aspect, a quantity of zero-modulation symbols of a codeword included in the codebook is greater than or equal to a quantity of non-zero-modulation symbols.

With reference to any one of the third aspect, or the first to the fifteenth possible implementations of the third aspect, in a sixteenth possible implementation of the third aspect, the apparatus is a network device.

According to a fourth aspect, an indication information transmission apparatus is provided, where the apparatus includes: a receiving module, configured to receive codebook indication information sent by a network device, where the codebook indication information is used to indicate a first codebook used by the network device to send a first downlink data stream, and one or more second codebooks used by the network device to send a second downlink data stream, the second downlink data stream is one or more downlink data streams, other than the first downlink data stream, carried on a time-frequency resource used for the first downlink data stream, the codebook consists of two or more codewords, the codewords are multidimensional complex vectors, and are used to indicate mapping relationships between data and at least two modulation symbols, and the at least two modulation symbols include at least one zero-modulation symbol and at least one non-zero-modulation symbol; a determining module, configured to determine the first codebook and the one or more second codebooks according to the codebook indication information received by the receiving module; and a decoding module, configured to decode, according to the first codebook and the one or more second codebooks that are determined by the determining module, the first downlink data stream sent by the network device.

With reference to the fourth aspect, in a first possible implementation of the fourth aspect, the codebook indication information received by the receiving module includes first codebook cluster information, first codebook set information, and first indication information, the first codebook cluster information is used to indicate a first codebook cluster, the first codebook set information is used to indicate a first codebook set in the first codebook cluster, the first indication information is used to indicate the first codebook in the first codebook set, and the first indication information is further used to indicate one or more second codebook sets in the first codebook cluster and the one or more second codebooks in the one or more second codebook sets; and the determining module includes: a first determining unit, configured to determine, according to the first codebook cluster information, the first codebook set information, and the first indication information, the first codebook in the first codebook set included in the first codebook cluster and the one or more second codebooks in the one or more second codebook sets included in the first codebook cluster, where each codebook cluster includes at least one codebook set, each codebook set includes at least one codebook, the codebook cluster meets a condition that codewords in a same codebook cluster have a same total quantity of modulation symbols, and the codebook set meets a condition that for any two codebooks in a same codebook set, a location at which modulation symbols of all codewords in one codebook are zero-modulation symbols is the same as a location at which modulation symbols of all codewords in the other codebook are zero-modulation symbols, or the codebook set meets a condition that codewords in a same codebook set have a same total quantity of modulation symbols and codebooks in a same codebook set have a same total quantity of codewords.

With reference to the first possible implementation of the fourth aspect, in a second possible implementation of the fourth aspect, the first indication information received by the receiving module includes: first codebook information, second codebook set information, and second codebook information, the first codebook information is used to indicate the first codebook in the first codebook set, the second codebook set information is used to indicate the one or more second codebook sets in the first codebook cluster, and the second codebook information is used to indicate the one or more second codebooks in the one or more second codebook sets.

With reference to the first possible implementation of the fourth aspect, in a third possible implementation of the fourth aspect, the first indication information received by the receiving module includes M groups of bit string information in a one-to-one correspondence with all codebook sets in the first codebook cluster, each group of bit string information is used to indicate whether a corresponding codebook set belongs to the first codebook set or the one or more second codebook sets, when the codebook set corresponding to each group of bit string information belongs to the first codebook set or the one or more second codebook sets, each group of bit string information is further used to indicate the first codebook or the one or more second codebooks in the corresponding codebook set, and M is quantity of codebook sets included in the first codebook cluster.

With reference to the second or third possible implementation of the fourth aspect, in a fourth possible implementation of the fourth aspect, the first indication information received by the receiving module includes modulation order information of the first codebook and the one or more second codebooks, and each codebook in each codebook set has a different modulation order.

With reference to the fourth aspect, in a fifth possible implementation of the fourth aspect, the codebook indication information received by the receiving module includes first feature matrix information, first feature sequence information, and second indication information, the first feature matrix information is used to indicate a first feature matrix, the first feature sequence information is used to indicate a first feature sequence in the first feature matrix, the second indication information is used to indicate the first codebook in one or more codebooks corresponding to the first feature sequence, and the second indication information is further used to indicate one or more second feature sequences in the first feature matrix, and the one or more second codebooks in one or more codebooks corresponding to the one or more second feature sequences; and the determining module includes: a second determining unit, configured to determine, according to the first feature matrix information, the first feature sequence information, and the second indication information, the first codebook in the one or more codebooks corresponding to the first feature sequence included in the first feature matrix, and the one or more second codebooks in the one or more codebooks corresponding to the one or more second feature sequences included in the first feature matrix, where each feature matrix consists of two or more feature sequences, each feature sequence corresponds to one or more codebooks, the feature sequence consists of a zero-element and a 1-element, the zero-element means that modulation symbols of all codewords in a corresponding codebook at a location corresponding to the zero-element are all zero-modulation symbols, and the 1-element means that modulation symbols of all codewords in a corresponding codebook at a location corresponding to the 1-element are not all zero-modulation symbols or are all non-zero-modulation symbols.

With reference to the fifth possible implementation of the fourth aspect, in a sixth possible implementation of the fourth aspect, the second indication information received by the receiving module includes: third codebook information, second feature sequence information, and fourth codebook information, the third codebook information is used to indicate the first codebook in the one or more codebooks corresponding to the first feature sequence, the second feature sequence information is used to indicate the one or more second feature sequences in the first feature matrix, and the fourth codebook information is used to indicate the one or more second codebooks in the one or more codebooks corresponding to the one or more second feature sequences.

With reference to the fifth possible implementation of the fourth aspect, in a seventh possible implementation of the fourth aspect, the second indication information received by the receiving module includes M groups of bit string information in a one-to-one correspondence with all feature sequences in the first feature matrix, each group of bit string information is used to indicate whether a corresponding feature sequence belongs to the first feature sequence or the one or more second feature sequences, when the feature sequence corresponding to each group of bit string information belongs to the first feature sequence or the one or more second feature sequences, each group of bit string information is further used to indicate the first codebook or the one or more second codebooks in one or more codebooks corresponding to the corresponding feature sequence, and M is quantity of feature sequences included in the first feature matrix.

With reference to the sixth or seventh possible implementation of the fourth aspect, in an eighth possible implementation of the fourth aspect, the second indication information received by the receiving module includes modulation order information of the first codebook and the one or more second codebooks, and each of the one or more codebooks corresponding to each feature sequence has a different modulation order.

With reference to the fourth aspect, in a ninth possible implementation of the fourth aspect, the codebook indication information received by the receiving module includes first mode information and first terminal device rank information, the first mode information is used to indicate a first mode, the first mode is used to indicate a third codebook set to which the first codebook and the one or more second codebooks belong, and information about allocation of codebooks in the third codebook set to multiple terminal devices to which the first data stream and the second data stream belong, and the first terminal device rank information is used to indicate a rank of the terminal device in the multiple terminal devices; and the determining module includes: a third determining unit, configured to determine, according to the first mode information and the first terminal device rank information and in the third codebook set indicated by the first mode, the first codebook corresponding to the first terminal device rank information and the one or more second codebooks, where each codebook set includes at least one codebook, and the codebook set meets a condition that codewords in a same codebook set have a same total quantity of modulation symbols and codebooks in a same codebook set have a same total quantity of codewords.

With reference to the fourth aspect, in a tenth possible implementation of the fourth aspect, the codebook indication information received by the receiving module includes second mode information, second terminal device rank information, and third codebook set information, the second mode information is used to indicate a second mode, the second mode is used to indicate a second feature matrix to which the first codebook and the one or more second codebooks belong, and information about allocation of feature sequences in the second feature matrix to multiple terminal devices to which the first data stream and the second data stream belong, the second terminal device rank information is used to indicate a rank of the terminal device in the multiple terminal devices, and the third codebook set information is used to indicate a codebook set that is respectively used by each of the multiple terminal devices and that corresponds to the second feature matrix; and the determining module includes: a fourth determining unit, configured to determine, according to the second mode information, the second terminal device rank information, and the third codebook set information and in one or more codebook sets corresponding to the second feature matrix indicated by the second mode, the first codebook corresponding to the second terminal device rank information and the one or more second codebooks, where each feature matrix corresponds to one or more codebook sets, the feature matrix consists of two or more feature sequences, the feature sequence consists of a zero-element and a 1-element, the zero-element means that modulation symbols of all codewords in a corresponding codebook at a location corresponding to the zero-element are all zero-modulation symbols, the 1-element means that modulation symbols of all codewords in a corresponding codebook at a location corresponding to the 1-element are not all zero-modulation symbols or are all non-zero-modulation symbols, each codebook set includes at least one codebook, the codebook set meets a condition that codewords in a same codebook set have a same total quantity of modulation symbols and codebooks in a same codebook set have a same total quantity of codewords, and each codebook in the codebook set respectively corresponds to each feature sequence in the feature matrix.

With reference to any one of the fourth aspect, or the first to the tenth possible implementations of the fourth aspect, in an eleventh possible implementation of the fourth aspect, the receiving module is specifically configured to receive a downlink scheduling message, dedicated higher layer control signaling, or a system broadcast message that is sent by the network device, where the downlink scheduling message, the dedicated higher layer control signaling, and the system broadcast message include the codebook indication information.

With reference to the eleventh possible implementation of the fourth aspect, in a twelfth possible implementation of the fourth aspect, the dedicated higher layer control signaling includes a radio resource control RRC connection establishment message and an RRC connection reconfiguration message.

With reference to any one of the fourth aspect, or the first to the twelfth possible implementations of the fourth aspect, in a thirteenth possible implementation of the fourth aspect, the codebook indication information received by the receiving module is bit string information.

With reference to any one of the fourth aspect, or the first to the thirteenth possible implementations of the fourth aspect, in a fourteenth possible implementation of the fourth aspect, the codebook is a sparse code multiple access SCMA codebook.

With reference to the fourteenth possible implementation of the fourth aspect, in a fifteenth possible implementation of the fourth aspect, a quantity of zero-modulation symbols of a codeword included in the codebook is greater than or equal to a quantity of non-zero-modulation symbols.

With reference to any one of the fourth aspect, or the first to the fifteenth possible implementations of the fourth aspect, in a sixteenth possible implementation of the fourth aspect, the apparatus is the terminal device.

According to a fifth aspect, an indication information transmission apparatus is provided, where the apparatus includes: a processor, a memory, a bus system, and a transmitter, where the processor, the memory, and the transmitter are connected by using the bus system, the memory is configured to store an instruction, and the processor is configured to execute the instruction stored in the memory, to control the transmitter to send a signal; the processor is configured to: determine, in one or more codebooks, a first codebook used to send a first downlink data stream to a terminal device, where the codebook consists of two or more codewords, the codewords are multidimensional complex vectors, and are used to indicate mapping relationships between data and at least two modulation symbols, and the at least two modulation symbols include at least one zero-modulation symbol and at least one non-zero-modulation symbol; determine one or more second codebooks used to send a second downlink data stream, where the second downlink data stream is one or more downlink data streams, other than the first downlink data stream, carried on a time-frequency resource used for the first downlink data stream; and determine codebook indication information used to indicate the first codebook and the one or more second codebooks; and the transmitter is configured to send the codebook indication information to the terminal device.

With reference to the fifth aspect, in a first possible implementation of the fifth aspect, the determining, by the processor, codebook indication information used to indicate the first codebook and the one or more second codebooks includes: determining a first codebook set to which the first codebook belongs, one or more second codebook sets to which the one or more second codebooks belong, and a first codebook cluster to which the first codebook set and the one or more second codebook sets belong, where each codebook cluster includes at least one codebook set, each codebook set includes at least one codebook, the codebook cluster meets a condition that codewords in a same codebook cluster have a same total quantity of modulation symbols, and the codebook set meets a condition that for any two codebooks in a same codebook set, a location at which modulation symbols of all codewords in one codebook are zero-modulation symbols is the same as a location at which modulation symbols of all codewords in the other codebook are zero-modulation symbols, or the codebook set meets a condition that codewords in a same codebook set have a same total quantity of modulation symbols and codebooks in a same codebook set have a same total quantity of codewords; and determining the codebook indication information, where the codebook indication information includes first codebook cluster information, first codebook set information, and first indication information, the first codebook cluster information is used to indicate the first codebook cluster, the first codebook set information is used to indicate the first codebook set in the first codebook cluster, the first indication information is used to indicate the first codebook in the first codebook set, and the first indication information is further used to indicate the one or more second codebook sets in the first codebook cluster and the one or more second codebooks in the one or more second codebook sets.

With reference to the first possible implementation of the fifth aspect, in a second possible implementation of the fifth aspect, the first indication information determined by the processor includes: first codebook information, second codebook set information, and second codebook information, the first codebook information is used to indicate the first codebook in the first codebook set, the second codebook set information is used to indicate the one or more second codebook sets in the first codebook cluster, and the second codebook information is used to indicate the one or more second codebooks in the one or more second codebook sets.

With reference to the first possible implementation of the fifth aspect, in a third possible implementation of the fifth aspect, the first indication information determined by the processor includes M groups of bit string information in a one-to-one correspondence with all codebook sets in the first codebook cluster, each group of bit string information is used to indicate whether a corresponding codebook set belongs to the first codebook set or the one or more second codebook sets, when the codebook set corresponding to each group of bit string information belongs to the first codebook set or the one or more second codebook sets, each group of bit string information is further used to indicate the first codebook or the one or more second codebooks in the corresponding codebook set, and M is quantity of codebook sets included in the first codebook cluster.

With reference to the second or third possible implementation of the fifth aspect, in a fourth possible implementation of the fifth aspect, the first indication information determined by the processor includes modulation order information of the first codebook and the one or more second codebooks, and each codebook in each codebook set has a different modulation order.

With reference to the fifth aspect, in a fifth possible implementation of the fifth aspect, the determining, by the processor, codebook indication information used to indicate the first codebook and the one or more second codebooks includes: determining a first feature sequence to which the first codebook belongs, one or more second feature sequences to which the one or more second codebooks belong, and a first feature matrix to which the first feature sequence and the one or more second feature sequences belong, where each feature matrix consists of two or more feature sequences, each feature sequence corresponds to one or more codebooks, the feature sequence consists of a zero-element and a 1-element, the zero-element means that modulation symbols of all codewords in a corresponding codebook at a location corresponding to the zero-element are all zero-modulation symbols, and the 1-element means that modulation symbols of all codewords in a corresponding codebook at a location corresponding to the 1-element are not all zero-modulation symbols or are all non-zero-modulation symbols; and determining the codebook indication information, where the codebook indication information includes first feature matrix information, first feature sequence information, and second indication information, the first feature matrix information is used to indicate the first feature matrix, the first feature sequence information is used to indicate the first feature sequence in the first feature matrix, the second indication information is used to indicate the first codebook in one or more codebooks corresponding to the first feature sequence, and the second indication information is further used to indicate the one or more second feature sequences in the first feature matrix, and the one or more second codebooks in one or more codebooks corresponding to the one or more second feature sequences.

With reference to the fifth possible implementation of the fifth aspect, in a sixth possible implementation of the fifth aspect, the second indication information determined by the processor includes: third codebook information, second feature sequence information, and fourth codebook information, the third codebook information is used to indicate the first codebook in the one or more codebooks corresponding to the first feature sequence, the second feature sequence information is used to indicate the one or more second feature sequences in the first feature matrix, and the fourth codebook information is used to indicate the one or more second codebooks in the one or more codebooks corresponding to the one or more second feature sequences.

With reference to the fifth possible implementation of the fifth aspect, in a seventh possible implementation of the fifth aspect, the second indication information determined by the processor includes M groups of bit string information in a one-to-one correspondence with all feature sequences in the first feature matrix, each group of bit string information is used to indicate whether a corresponding feature sequence belongs to the first feature sequence or the one or more second feature sequences, when the feature sequence corresponding to each group of bit string information belongs to the first feature sequence or the one or more second feature sequences, each group of bit string information is further used to indicate the first codebook or the one or more second codebooks in one or more codebooks corresponding to the corresponding feature sequence, and M is quantity of feature sequences included in the first feature matrix.

With reference to the sixth or seventh possible implementation of the fifth aspect, in an eighth possible implementation of the fifth aspect, the second indication information determined by the processor includes modulation order information of the first codebook and the one or more second codebooks, and each of the one or more codebooks corresponding to each feature sequence has a different modulation order.

With reference to the fifth aspect, in a ninth possible implementation of the fifth aspect, the determining, by the processor, codebook indication information used to indicate the first codebook and the one or more second codebooks includes: determining a first mode and a rank of the terminal device in multiple terminal devices to which the first data stream and the second data stream belong, where the first mode is used to indicate a third codebook set to which the first codebook and the one or more second codebooks belong, and information about allocation of codebooks in the third codebook set to the multiple terminal devices, each codebook set includes at least one codebook, and the codebook set meets a condition that codewords in a same codebook set have a same total quantity of modulation symbols and codebooks in a same codebook set have a same total quantity of codewords; and determining the codebook indication information, where the codebook indication information includes first mode information and first terminal device rank information, the first mode information is used to indicate the first mode, and the first terminal device rank information is used to indicate the rank of the terminal device in the multiple terminal devices.

With reference to the fifth aspect, in a tenth possible implementation of the fifth aspect, the determining, by the processor, codebook indication information used to indicate the first codebook and the one or more second codebooks includes: determining a second mode, a rank of the terminal device in multiple terminal devices to which the first data stream and the second data stream belong, and a codebook set used by each of the multiple terminal devices, where the second mode is used to indicate a second feature matrix to which the first codebook and the one or more second codebooks belong, and information about allocation of feature sequences in the second feature matrix to the multiple terminal devices, each feature matrix corresponds to one or more codebook sets, the feature matrix consists of two or more feature sequences, the feature sequence consists of a zero-element and a 1-element, the zero-element means that modulation symbols of all codewords in a corresponding codebook at a location corresponding to the zero-element are all zero-modulation symbols, the 1-element means that modulation symbols of all codewords in a corresponding codebook at a location corresponding to the 1-element are not all zero-modulation symbols or are all non-zero-modulation symbols, each codebook set includes at least one codebook, the codebook set meets a condition that codewords in a same codebook set have a same total quantity of modulation symbols and codebooks in a same codebook set have a same total quantity of codewords, and each codebook in the codebook set respectively corresponds to each feature sequence in the feature matrix; and determining the codebook indication information, where the codebook indication information includes second mode information, second terminal device rank information, and third codebook set information, the second mode information is used to indicate the second mode, the second terminal device rank information is used to indicate the rank of the terminal device in the multiple terminal devices, and the third codebook set information is used to indicate the codebook set that is used by each terminal device and that corresponds to the second feature matrix.

With reference to any one of the fifth aspect, or the first to the tenth possible implementations of the fifth aspect, in an eleventh possible implementation of the fifth aspect, the sending, by the transmitter, the codebook indication information to the terminal device includes: sending a downlink scheduling message, dedicated higher layer control signaling, or a system broadcast message to the terminal device, where the downlink scheduling message, the dedicated higher layer control signaling, and the system broadcast message include the codebook indication information.

With reference to the eleventh possible implementation of the fifth aspect, in a twelfth possible implementation of the fifth aspect, the dedicated higher layer control signaling includes a radio resource control (RRC) connection establishment message and an RRC connection reconfiguration message.

With reference to any one of the fifth aspect, or the first to the twelfth possible implementations of the fifth aspect, in a thirteenth possible implementation of the fifth aspect, the codebook indication information determined by the processor is bit string information.

With reference to any one of the fifth aspect, or the first to the thirteenth possible implementations of the fifth aspect, in a fourteenth possible implementation of the fifth aspect, the codebook is a sparse code multiple access (SCMA) codebook.

With reference to the fourteenth possible implementation of the fifth aspect, in a fifteenth possible implementation of the fifth aspect, a quantity of zero-modulation symbols of a codeword included in the codebook is greater than or equal to a quantity of non-zero-modulation symbols.

With reference to any one of the fifth aspect, or the first to the fifteenth possible implementations of the fifth aspect, in a sixteenth possible implementation of the fifth aspect, the apparatus is a network device.

According to a sixth aspect, an indication information transmission apparatus is provided, where the apparatus includes: a processor, a memory, a bus system, and a receiver, where the processor, the memory, and the receiver are connected by using the bus system, the memory is configured to store an instruction, and the processor is configured to execute the instruction stored in the memory, to control the receiver to receive a signal; the receiver is configured to receive codebook indication information sent by a network device, where the codebook indication information is used to indicate a first codebook used by the network device to send a first downlink data stream, and one or more second codebooks used by the network device to send a second downlink data stream, the second downlink data stream is one or more downlink data streams, other than the first downlink data stream, carried on a time-frequency resource used for the first downlink data stream, the codebook consists of two or more codewords, the codewords are multidimensional complex vectors, and are used to indicate mapping relationships between data and at least two modulation symbols, and the at least two modulation symbols include at least one zero-modulation symbol and at least one non-zero-modulation symbol; and the processor is configured to: determine the first codebook and the one or more second codebooks according to the codebook indication information; and decode, according to the first codebook and the one or more second codebooks, the first downlink data stream sent by the network device.

With reference to the sixth aspect, in a first possible implementation of the sixth aspect, the codebook indication information received by the receiver includes first codebook cluster information, first codebook set information, and first indication information, the first codebook cluster information is used to indicate a first codebook cluster, the first codebook set information is used to indicate a first codebook set in the first codebook cluster, the first indication information is used to indicate the first codebook in the first codebook set, and the first indication information is further used to indicate one or more second codebook sets in the first codebook cluster and the one or more second codebooks in the one or more second codebook sets; and the determining, by the processor, the first codebook and the one or more second codebooks according to the codebook indication information includes: determining, according to the first codebook cluster information, the first codebook set information, and the first indication information, the first codebook in the first codebook set included in the first codebook cluster and the one or more second codebooks in the one or more second codebook sets included in the first codebook cluster, where each codebook cluster includes at least one codebook set, each codebook set includes at least one codebook, the codebook cluster meets a condition that codewords in a same codebook cluster have a same total quantity of modulation symbols, and the codebook set meets a condition that for any two codebooks in a same codebook set, a location at which modulation symbols of all codewords in one codebook are zero-modulation symbols is the same as a location at which modulation symbols of all codewords in the other codebook are zero-modulation symbols, or the codebook set meets a condition that codewords in a same codebook set have a same total quantity of modulation symbols and codebooks in a same codebook set have a same total quantity of codewords.

With reference to the first possible implementation of the sixth aspect, in a second possible implementation of the sixth aspect, the first indication information received by the receiver includes: first codebook information, second codebook set information, and second codebook information, the first codebook information is used to indicate the first codebook in the first codebook set, the second codebook set information is used to indicate the one or more second codebook sets in the first codebook cluster, and the second codebook information is used to indicate the one or more second codebooks in the one or more second codebook sets.

With reference to the first possible implementation of the sixth aspect, in a third possible implementation of the sixth aspect, the first indication information received by the receiver includes M groups of bit string information in a one-to-one correspondence with all codebook sets in the first codebook cluster, each group of bit string information is used to indicate whether a corresponding codebook set belongs to the first codebook set or the one or more second codebook sets, when the codebook set corresponding to each group of bit string information belongs to the first codebook set or the one or more second codebook sets, each group of bit string information is further used to indicate the first codebook or the one or more second codebooks in the corresponding codebook set, and M is quantity of codebook sets included in the first codebook cluster.

With reference to the second or third possible implementation of the sixth aspect, in a fourth possible implementation of the sixth aspect, the first indication information received by the receiver includes modulation order information of the first codebook and the one or more second codebooks, and each codebook in each codebook set has a different modulation order.

With reference to the sixth aspect, in a fifth possible implementation of the sixth aspect, the codebook indication information received by the receiver includes first feature matrix information, first feature sequence information, and second indication information, the first feature matrix information is used to indicate a first feature matrix, the first feature sequence information is used to indicate a first feature sequence in the first feature matrix, the second indication information is used to indicate the first codebook in one or more codebooks corresponding to the first feature sequence, and the second indication information is further used to indicate one or more second feature sequences in the first feature matrix, and the one or more second codebooks in one or more codebooks corresponding to the one or more second feature sequences; and the determining, by the processor, the first codebook and the one or more second codebooks according to the codebook indication information includes: determining, according to the first feature matrix information, the first feature sequence information, and the second indication information, the first codebook in the one or more codebooks corresponding to the first feature sequence included in the first feature matrix, and the one or more second codebooks in the one or more codebooks corresponding to the one or more second feature sequences included in the first feature matrix, where each feature matrix consists of two or more feature sequences, each feature sequence corresponds to one or more codebooks, the feature sequence consists of a zero-element and a 1-element, the zero-element means that modulation symbols of all codewords in a corresponding codebook at a location corresponding to the zero-element are all zero-modulation symbols, and the 1-element means that modulation symbols of all codewords in a corresponding codebook at a location corresponding to the 1-element are not all zero-modulation symbols or are all non-zero-modulation symbols.

With reference to the fifth possible implementation of the sixth aspect, in a sixth possible implementation of the sixth aspect, the second indication information received by the receiver includes: third codebook information, second feature sequence information, and fourth codebook information, the third codebook information is used to indicate the first codebook in the one or more codebooks corresponding to the first feature sequence, the second feature sequence information is used to indicate the one or more second feature sequences in the first feature matrix, and the fourth codebook information is used to indicate the one or more second codebooks in the one or more codebooks corresponding to the one or more second feature sequences.

With reference to the fifth possible implementation of the sixth aspect, in a seventh possible implementation of the sixth aspect, the second indication information received by the receiver includes M groups of bit string information in a one-to-one correspondence with all feature sequences in the first feature matrix, each group of bit string information is used to indicate whether a corresponding feature sequence belongs to the first feature sequence or the one or more second feature sequences, when the feature sequence corresponding to each group of bit string information belongs to the first feature sequence or the one or more second feature sequences, each group of bit string information is further used to indicate the first codebook or the one or more second codebooks in one or more codebooks corresponding to the corresponding feature sequence, and M is quantity of feature sequences included in the first feature matrix.

With reference to the sixth or seventh possible implementation of the sixth aspect, in an eighth possible implementation of the sixth aspect, the second indication information received by the receiver includes modulation order information of the first codebook and the one or more second codebooks, and each of the one or more codebooks corresponding to each feature sequence has a different modulation order.

With reference to the sixth aspect, in a ninth possible implementation of the sixth aspect, the codebook indication information received by the receiver includes first mode information and first terminal device rank information, the first mode information is used to indicate a first mode, the first mode is used to indicate a third codebook set to which the first codebook and the one or more second codebooks belong, and information about allocation of codebooks in the third codebook set to multiple terminal devices to which the first data stream and the second data stream belong, and the first terminal device rank information is used to indicate a rank of the terminal device in the multiple terminal devices; and the determining, by the processor, the first codebook and the one or more second codebooks according to the codebook indication information includes: determining, according to the first mode information and the first terminal device rank information and in the third codebook set indicated by the first mode, the first codebook corresponding to the first terminal device rank information and the one or more second codebooks, where each codebook set includes at least one codebook, and the codebook set meets a condition that codewords in a same codebook set have a same total quantity of modulation symbols and codebooks in a same codebook set have a same total quantity of codewords.

With reference to the sixth aspect, in a tenth possible implementation of the sixth aspect, the codebook indication information received by the receiver includes second mode information, second terminal device rank information, and third codebook set information, the second mode information is used to indicate a second mode, the second mode is used to indicate a second feature matrix to which the first codebook and the one or more second codebooks belong, and information about allocation of feature sequences in the second feature matrix to multiple terminal devices to which the first data stream and the second data stream belong, the second terminal device rank information is used to indicate a rank of the terminal device in the multiple terminal devices, and the third codebook set information is used to indicate a codebook set that is respectively used by each of the multiple terminal devices and that corresponds to the second feature matrix; and the determining, by the processor, the first codebook and the one or more second codebooks according to the codebook indication information includes: determining, according to the second mode information, the second terminal device rank information, and the third codebook set information and in one or more codebook sets corresponding to the second feature matrix indicated by the second mode, the first codebook corresponding to the second terminal device rank information and the one or more second codebooks, where each feature matrix corresponds to one or more codebook sets, the feature matrix consists of two or more feature sequences, the feature sequence consists of a zero-element and a 1-element, the zero-element means that modulation symbols of all codewords in a corresponding codebook at a location corresponding to the zero-element are all zero-modulation symbols, the 1-element means that modulation symbols of all codewords in a corresponding codebook at a location corresponding to the 1-element are not all zero-modulation symbols or are all non-zero-modulation symbols, each codebook set includes at least one codebook, the codebook set meets a condition that codewords in a same codebook set have a same total quantity of modulation symbols and codebooks in a same codebook set have a same total quantity of codewords, and each codebook in the codebook set respectively corresponds to each feature sequence in the feature matrix.

With reference to any one of the sixth aspect, or the first to the tenth possible implementations of the sixth aspect, in an eleventh possible implementation of the sixth aspect, the receiving, by the receiver, codebook indication information sent by a network device includes: receiving a downlink scheduling message, dedicated higher layer control signaling, or a system broadcast message that is sent by the network device, where the downlink scheduling message, the dedicated higher layer control signaling, and the system broadcast message include the codebook indication information.

With reference to the eleventh possible implementation of the sixth aspect, in a twelfth possible implementation of the sixth aspect, the dedicated higher layer control signaling includes a radio resource control (RRC) connection establishment message and an RRC connection reconfiguration message.

With reference to any one of the sixth aspect, or the first to the twelfth possible implementations of the sixth aspect, in a thirteenth possible implementation of the sixth aspect, the codebook indication information received by the receiver is bit string information.

With reference to any one of the sixth aspect, or the first to the thirteenth possible implementations of the sixth aspect, in a fourteenth possible implementation of the sixth aspect, the codebook is a sparse code multiple access (SCMA) codebook.

With reference to the fourteenth possible implementation of the sixth aspect, in a fifteenth possible implementation of the sixth aspect, a quantity of zero-modulation symbols of a codeword included in the codebook is greater than or equal to a quantity of non-zero-modulation symbols.

With reference to any one of the sixth aspect, or the first to the fifteenth possible implementations of the sixth aspect, in a sixteenth possible implementation of the sixth aspect, the apparatus is the terminal device.

Based on the foregoing technical solutions, according to the indication information transmission method and apparatus in the embodiments of the present invention, a network device determines, in one or more codebooks, a first codebook used to send a first downlink data stream to a terminal device; determines one or more second codebooks used to send a second downlink data stream, where the second downlink data stream is one or more downlink data streams, other than the first downlink data stream, carried on a time-frequency resource used for the first downlink data stream; determines codebook indication information used to indicate the first codebook and the one or more second codebooks; and sends the codebook indication information to the terminal device, so that the terminal device can determine codebooks used for all data streams carried on the same time-frequency resource, and can decode, according to the codebooks, the first data stream sent by the network device to the terminal device. In this way, the network device and the terminal device can perform downlink data transmission based on the codebooks, and a network capacity of a system can be effectively improved.

BRIEF DESCRIPTION OF DRAWINGS

To describe the technical solutions in the embodiments of the present invention more clearly, the following briefly describes the accompanying drawings required for describing the embodiments of the present invention. Apparently, the accompanying drawings in the following description show merely some embodiments of the present invention, and a person of ordinary skill in the art may still derive other drawings from these accompanying drawings without creative efforts.

FIG. 3 is a schematic flowchart of an indication information transmission method according to an embodiment of the present invention;

FIG. 4 is a schematic flowchart of a method for determining codebook indication information according to an embodiment of the present invention;

FIG. 5 is another schematic flowchart of a method for determining codebook indication information according to an embodiment of the present invention;

FIG. 6 is a schematic flowchart of an indication information transmission method according to another embodiment of the present invention;

FIG. 7 is another schematic flowchart of an indication information transmission method according to another embodiment of the present invention;

FIG. 8 is still another schematic flowchart of an indication information transmission method according to another embodiment of the present invention;

FIG. 9 is a schematic block diagram of an indication information transmission apparatus according to an embodiment of the present invention;

FIG. 16 is still another schematic flowchart of a method for determining codebook indication information according to an embodiment of the present invention;

FIG. 17 is still another schematic flowchart of a method for determining codebook indication information according to an embodiment of the present invention;

FIG. 18 is still another schematic flowchart of an indication information transmission method according to another embodiment of the present invention;

FIG. 19 is still another schematic flowchart of an indication information transmission method according to another embodiment of the present invention;

DESCRIPTION OF EMBODIMENTS

Figure 1:
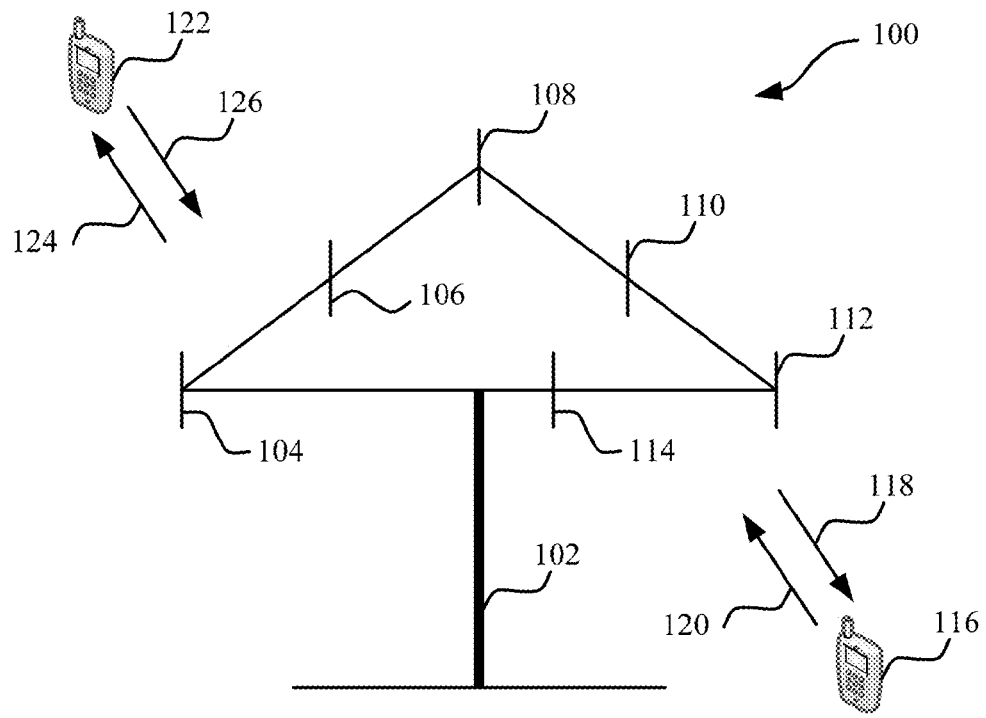
FIG. 1 is a schematic architectural diagram of a communications system to which an embodiment of the present invention is applied.

The following clearly describes the technical solutions in the embodiments of the present invention with reference to the accompanying drawings in the embodiments of the present invention. Apparently, the described embodiments are a part rather than all of the embodiments of the present invention. All other embodiments obtained by a person of ordinary skill in the art based on the embodiments of the present invention without creative efforts shall fall within the protection scope of the present invention.

It should be understood that, the technical solutions in the embodiments of the present invention may be applied to various communications systems based on a non-orthogonal multiple access technology, for example, an SCMA system. Certainly, SCMA may have another name in the field of communications. Further, the technical solutions in the embodiments of the present invention may be applied to a multi-carrier transmission system using the non-orthogonal multiple access technology, for example, an orthogonal frequency division multiplexing ("OFDM" for short) system, a filter bank multi-carrier ("FBMC" for short) system, a generalized frequency division multiplexing ("GFDM" for short) system, or a filtered-orthogonal frequency division multiplexing ("F-OFDM" for short) system using the non-orthogonal multiple access technology. It should be further understood that, the embodiments of the present invention are described by using only a communications system using an SCMA technology as an example, but the embodiments of the present invention are not limited thereto.

It should be further understood that, in the embodiments of the present invention, a terminal device may communicate with one or more core networks by using a radio access network ("RAN" for short). The terminal device may be referred to as an access terminal, user equipment ("UE" for short), a user unit, a user station, a mobile station, a mobile terminal, a remote station, a remote terminal, a mobile device, a user terminal, a terminal, a wireless communications device, a user agent, or a user apparatus. The access terminal may be a cellular phone, a cordless phone, a Session Initiation Protocol ("SIP" for short) phone, a wireless local loop ("WLL" for short) station, a personal digital assistant (PDA for short), a handheld device having a wireless communication function, a computing device, another processing device connected to a wireless modem, an in-vehicle device, a wearable device, and a terminal device in a future 5G network.

It should be further understood that, in the embodiments of the present invention, a network device may be configured to communicate with the terminal device. The network device may be a base transceiver station ("BTS" for short) in a Global System for Mobile Communications ("GSM" for short) system or a Code Division Multiple Access ("CDMA" for short) system, a NodeB ("NB" for short) in a Wideband Code Division Multiple Access ("WCDMA" for short) system, or an evolved Node B ("eNB" or "eNodeB" for short) in a Long Term Evolution ("LTE" for short) system. Alternatively, the network device may be a relay station, an access point, an in-vehicle device, a wearable device, a base station device in the future 5G network, or the like.

FIG. 1 is a schematic architectural diagram of a communications system to which an embodiment of the present invention is applied. As shown in FIG. 1, the communications system 100 may include a network device 102. The network device 102 may include one or more antenna groups, and each antenna group may include one or more antennas. For example, one antenna group may include antennas 104 and 106, another antenna group may include antennas 108 and 110, and an additional group may include antennas 112 and 114. Although FIG. 1 shows two antennas for each antenna group, it should be understood that each antenna group may have more or fewer antennas. The network device 102 may additionally include a transmitter chain and a receiver chain. A person of ordinary skill in the art may understand that both the transmitter chain and the receiver chain may include multiple components related to signal sending and receiving (for example, a processor, a modulator, a multiplexer, a demodulator, a demultiplexer, or an antenna).

The network device 102 may communicate with multiple terminal devices (for example, a terminal device 116 and a terminal device 122). However, it may be understood that, the network device 102 may communicate with any quantity of terminal devices similar to the terminal device 116 or 122. The terminal devices 116 and 122 may be, for example, a cellular phone, a smartphone, a portable computer, a handheld communications device, a handheld computing device, a satellite radio apparatus, a global positioning system, a PDA, and/or any other suitable devices used for communication in the wireless communications system 100.

As shown in FIG. 1, the terminal device 116 communicates with the antennas 112 and 114. The antennas 112 and 114 send information to the terminal device 116 by using a forward link 118, and receive information from the terminal device 116 by using a reverse link 120. In addition, the terminal device 122 communicates with the antennas 104 and 106. The antennas 104 and 106 send information to the terminal device 122 by using a forward link 124, and receive information from the terminal device 122 by using a reverse link 126.

For example, in a frequency division duplex ("FDD" for short) system, a frequency band different from that used for the reverse link 120 may be used for the forward link 118, and a frequency band different from that used for the reverse link 126 may be used for the forward link 124. For another example, in a time division duplex ("TDD" for short) system and a full duplex system, a same frequency band may be used for the forward link 118 and the reverse link 120, and a same frequency band may be used for the forward link 124 and the reverse link 126.

Each antenna group and/or area that is designed for communication is referred to as a sector of the network device 102. For example, an antenna group may be designed to communicate with a terminal device in a sector of a coverage area of the network device 102. When the network device 102 communicates with the terminal devices 116 and 122 by respectively using the forward links 118 and 124, transmit antennas of the network device 102 may improve signal-to-noise ratios of the forward links 118 and 124 by means of beamforming. In addition, compared with sending, by a network device by using a single antenna, signals to all terminal devices of the network device, sending, by the network device 102 by means of beamforming, signals to the terminal devices 116 and 122 that are dispersed randomly in a related coverage area causes less interference to a mobile device in a neighboring cell.

Within a given time, the network device 102, the terminal device 116, or the terminal device 122 may be a sending wireless communications apparatus and/or a receiving wireless communications apparatus. During data transmission, the sending wireless communications apparatus may encode data for transmission. Specifically, the sending wireless communications apparatus may obtain (for example, generate, receive from another communications apparatus or save in a memory) a particular quantity of data bits that need to be sent to the receiving wireless communications apparatus by using a channel. The data bits may be included in a transport block (or multiple transport blocks) of data, and the transport block may be segmented to generate multiple code blocks.

It should be understood that, the communications system is a non-orthogonal multiple access system. For example, the system is an SCMA system. The network device is, for example, a base station. The terminal device is, for example, user equipment. The embodiments of the present invention are described by using only the SCMA system, the base station, and the user equipment as an example, but the present invention is not limited thereto.

FIG. 1 shows a communications system to which an embodiment of the present invention is applied. The communications system is, for example, an SCMA system. The following briefly describes, with reference to FIG. 2, a coding principle of a transmit end of a non-orthogonal multiple access system such as the SCMA system.

Figure 2:
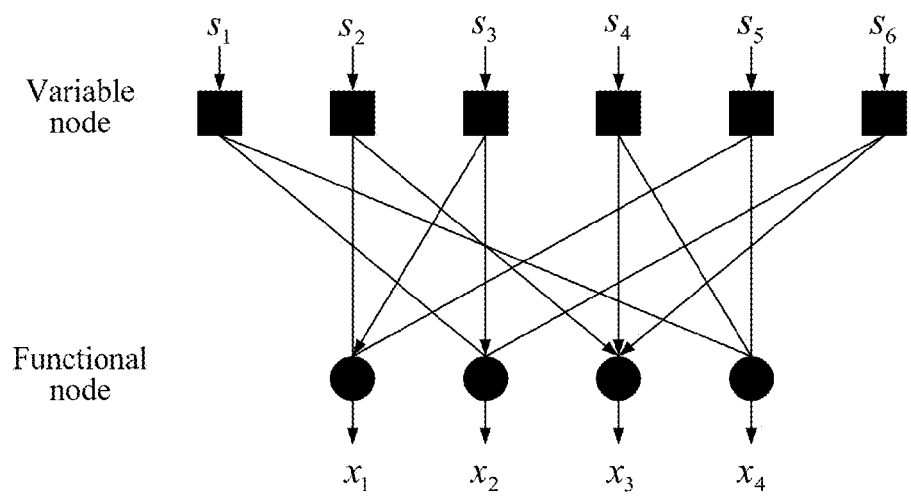
FIG. 2 is a schematic diagram of a coding principle of a non-orthogonal multiple access system.

As shown in FIG. 2, description is provided by using an example in which six data streams are multiplexed on four resource units. That is, M=6 and N=4. M is a positive integer, and represents a quantity of data streams. N is a positive integer, and represents a quantity of resource units. A resource unit may be a subcarrier, a resource element ("RE" for short), or an antenna port. The six data streams constitute a group, and the four resource units constitute a coding unit.

In a bipartite graph shown in FIG. 2, if there is a line between a data stream and a resource unit, it indicates that a non-zero-modulation symbol is sent on the resource unit for at least one data combination of the data stream after codeword mapping. If there is no line between a data stream and a resource unit, it indicates that modulation symbols sent on the resource unit for all possible data combinations of the data stream after codeword mapping are zero-modulation symbols. A data combination of a data stream may be understood according to a description as follow: For example, for a binary bit data stream, 00, 01, 10, and 11 are all possible data combinations of two-bit data. For ease of description, s1 to s6 are used to respectively represent to-be-sent data combinations of the six data streams in the bipartite graph, and x1 to x4 are used to respectively represent modulation symbols sent on the four resource units in the bipartite graph.

It can be seen from the bipartite graph that, modulation symbols are sent on two or more resource units for a data combination of each data stream after codeword mapping, and a modulation symbol sent by each resource unit is obtained by superimposing modulation symbols respectively obtained after codeword mapping on data combinations of two or more data streams. For example, non-zero-modulation symbols are sent on a resource unit 1 and a resource unit 2 for a to-be-sent data combination s3 of a data stream 3 after codeword mapping, and a modulation symbol x3 sent by a resource unit 3 is obtained by superimposing non-zero-modulation symbols respectively obtained after codeword mapping on to-be-sent data combination s2, s4, and s6 of a data stream 2, a data stream 4, and a data stream 6. Because the quantity of data streams may be greater than the quantity of resource units, the non-orthogonal multiple access system may effectively improve a network capacity, including a quantity of users that can access the system, spectral efficiency, and the like.

The foregoing describes an application scenario and a coding principle in the embodiments of the present invention with reference to FIG. 1 and FIG. 2. The following describes an indication information transmission method according to an embodiment of the present invention with reference to FIG. 3 to FIG. 5 from a network device side.

FIG. 3 shows an indication information transmission method 200 according to an embodiment of the present invention. The method 200 may be executed by, for example, a network device in a non-orthogonal multiple access system. The network device is, for example, a base station. As shown in FIG. 3, the method 200 includes the following steps:

S210: Determine, in one or more codebooks, a first codebook used to send a first downlink data stream to a terminal device, where the codebook consists of two or more codewords, the codewords are multidimensional complex vectors, and are used to indicate mapping relationships between data and at least two modulation symbols, and the at least two modulation symbols include at least one zero-modulation symbol and at least one non-zero-modulation symbol.

S220: Determine one or more second codebooks used to send a second downlink data stream, where the second downlink data stream is one or more downlink data streams, other than the first downlink data stream, carried on a time-frequency resource used for the first downlink data stream.

S230: Determine codebook indication information used to indicate the first codebook and the one or more second codebooks.

S240: Send the codebook indication information to the terminal device.

Specifically, in a non-orthogonal multiple access system such as an SCMA system, a network device allocates or specifies a codebook for one or more downlink data streams to be received by each terminal device. To correctly receive or decode a downlink data stream sent by the network device to the terminal device, the terminal device needs to learn a codebook used by the network device to send the downlink data stream, and one or more codebooks used by the network device to send another downlink data stream on a time-frequency resource used by the network device to send the downlink data stream.

Therefore, the network device may determine a first codebook and one or more second codebooks, and determine codebook indication information used to indicate the first codebook and the one or more second codebooks. The first codebook is a codebook used by the network device to send a first downlink data stream to a terminal device. The one or more second codebooks are one or more codebooks used by the network device to send a second downlink data stream to another terminal device. The second downlink data stream is one or more downlink data streams, other than the first downlink data stream, carried on a time-frequency resource used for the first downlink data stream. Moreover, the network device may send the codebook indication information to the terminal device. The codebook indication information is used to indicate the first codebook used by the terminal device to receive the first downlink data stream and the one or more second codebooks.

After receiving the codebook indication information sent by the network device, the terminal device may determine, according to the codebook indication information, the first codebook used by the network device to send the first downlink data stream and the one or more second codebooks used by the network device to send another downlink data stream on the same time-frequency resource used by the network device to send the downlink data stream. In this way, the terminal device can receive or decode, according to the first codebook and the one or more second codebooks, the first downlink data stream sent by the network device. Therefore, by means of information exchange between the network device and the terminal device, the terminal device can determine codebooks used for all data streams carried on the same time-frequency resource. In this way, the network device and the terminal device can perform downlink data transmission based on the codebooks, and a network capacity of the system can be effectively improved.

Therefore, according to the indication information transmission method in this embodiment of the present invention, a network device determines, in one or more codebooks, a first codebook used to send a first downlink data stream to a terminal device; determines one or more second codebooks used to send a second downlink data stream, where the second downlink data stream is one or more downlink data streams, other than the first downlink data stream, carried on a time-frequency resource used for the first downlink data stream; determines codebook indication information used to indicate the first codebook and the one or more second codebooks; and sends the codebook indication information to the terminal device, so that the terminal device can determine codebooks used for all data streams carried on the same time-frequency resource, and can decode, according to the codebooks, the first data stream sent by the network device to the terminal device. In this way, the network device and the terminal device can perform downlink data transmission based on the codebooks, and a network capacity of a system, including a quantity of users that can access the system, spectral efficiency, and the like, can be effectively improved.

In this embodiment of the present invention, according to a non-orthogonal multiple access technology, multiple different data streams are transmitted on a same resource unit by using codebooks, that is, multiple different data streams are multiplexed on a same resource unit. Different codebooks are used for different data streams. Therefore, resource utilization is improved. The data streams may be from a same terminal device or different terminal devices.

A codeword may be represented by a multidimensional complex vector. The complex vector may have two or more dimensions, and is used to indicate mapping relationships between data and two or more modulation symbols. The modulation symbols include at least one zero-modulation symbol and at least one non-zero-modulation symbol. The data may be binary bit data or multivariate data. A codebook may consist of two or more codewords. The codebook may indicate mapping relationships between possible data combinations of data of a particular length and the codewords in the codebook.

Therefore, according to the non-orthogonal multiple access technology, data in a data stream is directly mapped to a codeword, that is, a multidimensional complex vector, in a codebook according to a particular mapping relationship, so that the data is extended and sent on multiple resource units. The data may be binary bit data or multivariate data. The resource units may be time domain, frequency domain, space domain, time-frequency domain, time-space domain, or time-frequency-space domain resource units.

With reference to the foregoing descriptions of the codeword, the codebook, and the bipartite graph shown in FIG. 2, a codeword in a codebook is generally in a form as follows:

$$\begin{pmatrix} c_{1,q} \\ c_{2,q} \\ \vdots \\ c_{N,q} \end{pmatrix}, \text{ where } 1 \leq q \leq Q_m.$$

A codebook consisting of two or more codewords is generally in a form as follows:

$$\left\{ \begin{pmatrix} c_{1,1} \\ c_{2,1} \\ \vdots \\ c_{N,1} \end{pmatrix}, \begin{pmatrix} c_{1,2} \\ c_{2,2} \\ \vdots \\ c_{N,2} \end{pmatrix}, \cdots, \begin{pmatrix} c_{1,Q_m} \\ c_{2,Q_m} \\ \vdots \\ c_{N,Q_m} \end{pmatrix} \right\}.$$

N is a positive integer greater than 1, and may represent a quantity of resource units included in a coding unit, or may be understood as a codeword length. $Q_m$ is a positive integer greater than 1, represents a quantity of the codewords included in the codebook, and corresponds to a modulation order. For example, during quadrature phase shift keying ("QPSK" for short) or 4-order modulation, a value of Qm is 4. q is a positive integer, and $1 \leq q \leq Q_m$.

An element $c_{n,q}$ included in the codebook and the codeword is a complex number, and may be mathematically expressed as: $c_{n,q} = \alpha * \exp(j*\beta)$, $1 \leq n \leq N$, $1 \leq q \leq Q_m$. $\alpha$ and $\beta$ may be any real number. A particular mapping relationship may exist between a codeword in the codebook and a data combination of a data stream. For example, the following mapping relationships may exist between codewords in the codebook and two-bit data combinations of a binary data stream: "00" may be mapped to a codeword 1, "01" may be mapped to a codeword 2, "10" may be mapped to a codeword 3, and "11" may be mapped to a codeword 4. The codeword 1, the codeword 2, the codeword 3, and the codeword 4 may be respectively expressed as follows:

the codeword 1:

$$\begin{pmatrix} c_{1,1} \\ c_{2,1} \\ \vdots \\ c_{N,1} \end{pmatrix},$$

the codeword 2:

$$\begin{pmatrix} c_{1,2} \\ c_{2,2} \\ \vdots \\ c_{N,2} \end{pmatrix},$$

the codeword 3:

$$\begin{pmatrix} c_{1,3} \\ c_{2,3} \\ \vdots \\ c_{N,3} \end{pmatrix},$$

and the codeword 4:

$$\begin{pmatrix} c_{1,4} \\ c_{2,4} \\ \vdots \\ c_{N,4} \end{pmatrix}.$$

With reference to the foregoing bipartite graph, when there is a line between a data stream and a resource unit, a codebook corresponding to the data stream and codewords in the codebook have a feature as follows: A non-zero-modulation symbol is sent on the corresponding resource unit for at least one codeword in the codebook. For example, there is a line between the data stream 3 and the resource unit 1, at least one codeword in a codebook corresponding to the data stream 3 meets a condition that $c_{1,q} \neq 0$, and $1 \leq q \leq Qm$. When there is no line between a data stream and a resource unit, a codebook corresponding to the data stream and codewords in the codebook have a feature as follows: Zero-modulation symbols are sent on the corresponding resource unit for all codewords in the codebook. For example, there is no line between the data stream 3 and the resource unit 3, and any codeword in the codebook corresponding to the data stream 3 meets a condition that $c_{3,q}=0$, and $1 \leq q \leq Qm$.

In conclusion, when a modulation order is QPSK or 4-order modulation, the codebook corresponding to the data stream 3 in the foregoing bipartite graph may have the following form and feature:

$$\left\{ \begin{pmatrix} c_{1,1} \\ c_{2,1} \\ 0 \\ 0 \end{pmatrix}, \begin{pmatrix} c_{1,2} \\ c_{2,2} \\ 0 \\ 0 \end{pmatrix}, \begin{pmatrix} c_{1,3} \\ c_{2,3} \\ 0 \\ 0 \end{pmatrix}, \begin{pmatrix} c_{1,4} \\ c_{2,4} \\ 0 \\ 0 \end{pmatrix} \right\}.$$

$c_{n,q} = \alpha * \exp(j*\beta)$, $1 \leq n \leq 2$, $1 \leq q \leq 4$, $\alpha$ and $\beta$ may be any real number, and for any q, $1 \leq q \leq 4$, $c_{1,q}$ and $c_{2,q}$ are not zero at the same time, and there are at least q1 and q2 that meet a condition that $c_{1,q_1} \neq 0$ and $c_{2,q_2} \neq 0$, $1 \leq q1 \leq 4$ and $1 \leq q2 \leq 4$. For example, if the data combination s3 of the data stream 3 shown in FIG. 2 is "10", according to a mapping rule described above, a codeword to which the data combination s3 is mapped is a four-dimensional complex vector:

$$\begin{pmatrix} c_{1,3} \\ c_{2,3} \\ 0 \\ 0 \end{pmatrix}.$$

In the non-orthogonal multiple access system, the bipartite graph shown in FIG. 2 may alternatively be expressed by using a feature matrix. The feature matrix may be in a form as follows:

$$\begin{pmatrix} r_{1,1} & r_{1,2} & \cdots & r_{1,M} \\ r_{2,1} & r_{2,2} & \cdots & r_{2,M} \\ \vdots & \vdots & \cdots & \vdots \\ r_{N,1} & r_{N,2} & \cdots & r_{N,M} \end{pmatrix}_{N \times M}.$$

$r_{n,m}$ represents an element in the feature matrix, m and n are natural numbers, $1 \leq n \leq N$, $1 \leq m \leq M$, N rows respectively represent N resource units in a coding unit, and M columns represent a quantity of multiplexed data streams in a group. Although the feature matrix may be expressed in a general form, the feature matrix may have the following features:

(1) The element in the feature matrix meets a condition that $r_{n,m} \in \{0,1\}$, $1 \leq n \leq N$, $1 \leq m \leq M$. When $r_{n,m}=1$, according to a corresponding bipartite graph, it may be explained as follows: There is a line between an $m^{th}$ data stream and an $n^{th}$ resource unit. Certainly, $r_{n,m}=1$ may alternatively be understood as follows: A non-zero-modulation symbol is sent on the $n^{th}$ resource unit for at least one data combination of the $m^{th}$ data stream after codeword mapping. When $r_{n,m}=0$, according to a corresponding bipartite graph, it may be explained as follows: There is no line between an $m^{th}$ data stream and an $n^{th}$ resource unit. Certainly, $r_{n,m}=0$ may alternatively be understood as follows: Zero-modulation symbols are sent on the $n^{th}$ resource unit for all possible data combinations of the $m^{th}$ data stream after codeword mapping.

(2) Further, optionally, a quantity of 0-elements in the feature matrix is not less than a quantity of 1-elements, to show a feature of sparse coding.

In addition, a column in the feature matrix may be referred to as a feature sequence. The feature sequence may be expressed in a form as follows:

$$\begin{pmatrix} r_{1,m} \\ r_{2,m} \\ \vdots \\ r_{N,m} \end{pmatrix}, 1 \leq m \leq M.$$

Therefore, the feature matrix may be considered as a matrix consisting of a series of feature sequences.

With reference to the foregoing feature descriptions of the feature matrix, for the example given in FIG. 2, a corresponding feature matrix may be expressed as follows:

$$\begin{pmatrix} 0 & 1 & 1 & 0 & 1 & 0 \\ 1 & 0 & 1 & 0 & 0 & 1 \\ 0 & 1 & 0 & 1 & 0 & 1 \\ 1 & 0 & 0 & 1 & 1 & 0 \end{pmatrix}.$$

A feature sequence corresponding to the codebook $$\left\{ \begin{pmatrix} c_{1,1} \\ c_{2,1} \\ 0 \\ 0 \end{pmatrix}, \begin{pmatrix} c_{1,2} \\ c_{2,2} \\ 0 \\ 0 \end{pmatrix}, \begin{pmatrix} c_{1,3} \\ c_{2,3} \\ 0 \\ 0 \end{pmatrix}, \begin{pmatrix} c_{1,4} \\ c_{2,4} \\ 0 \\ 0 \end{pmatrix} \right\}$$

used for the data stream 3 in FIG. 2 may be expressed as follows:

$$\begin{pmatrix} 1 \\ 1 \\ 0 \\ 0 \end{pmatrix}.$$

In this way, it may be considered that, a codebook is in a one-to-one correspondence with a feature sequence, that is, one codebook uniquely corresponds to one feature sequence. A feature sequence may be in a one-to-multiple correspondence with a codebook, that is, one feature sequence may correspond to one or more codebooks. Therefore, a feature sequence may be understood as follows: One feature sequence corresponds to one or more codebooks, each feature sequence consists of a zero-element and a 1-element, the zero-element means that modulation symbols of all codewords in a corresponding codebook at a location corresponding to the zero-element are all zero-modulation symbols, and the 1-element means that modulation symbols of all codewords in a corresponding codebook at a location corresponding to the 1-element are not all zero-modulation symbols or are all non-zero-modulation symbols.

A correspondence between a feature sequence and a codebook may be determined by the following two conditions:

(1) A total quantity of modulation symbols of codewords in the codebook is the same as a total quantity of elements in the corresponding feature sequence.

(2) For any 1-element in the feature sequence, at least one codeword may be found in the corresponding codebook, so that a modulation symbol of the codeword at a location of the 1-element is not a zero-modulation symbol. For any zero-element in the feature sequence, modulation symbols of all codewords in the corresponding codebook at a location corresponding to the zero-element are all zero-modulation symbols.

Therefore, in this embodiment of the present invention, a codebook consists of two or more codewords, the codewords are multidimensional complex vectors, and are used to indicate mapping relationships between data and at least two modulation symbols, and the at least two modulation symbols include at least one zero-modulation symbol and at least one non-zero-modulation symbol. Each feature matrix consists of two or more feature sequences, each feature matrix corresponds to one or more codebooks, each feature sequence also corresponds to one or more codebooks, the feature sequence consists of a zero-element and a 1-element, the zero-element means that modulation symbols of all codewords in a corresponding codebook at a location corresponding to the zero-element are all zero-modulation symbols, and the 1-element means that modulation symbols of all codewords in a corresponding codebook at a location corresponding to the 1-element are not all zero-modulation symbols or are all non-zero-modulation symbols.

In this embodiment of the present invention, multiple codebooks may be divided into one or more codebook clusters, each codebook cluster may include one or more codebooks, and any two codebooks, for example, a codebook a and a codebook b, in a same codebook cluster has a feature as follows: A codeword in the codebook a and a codeword in the codebook b have a same total quantity of modulation symbols. Therefore, a codebook in a codebook cluster meets a condition that all codewords have a same total quantity of modulation symbols, that is, lengths of all codewords are the same, and quantities of resource units on which data streams are multiplexed are the same.

In this embodiment of the present invention, multiple codebooks may alternatively be divided into one or more codebook sets, each codebook set may include one or more codebooks, and any two codebooks, for example, a codebook c and a codebook d, in a same codebook set have features as follows: (1) A codeword in the codebook c and a codeword in the codebook d have a same total quantity of modulation symbols. (2) At a location at which modulation symbols of all codewords in the codebook c are all zero-modulation symbols, modulation symbols of all codewords in the codebook d are also all zero-modulation symbols.

Still using FIG. 2 as an example for description, it is assumed that a modulation order is QPSK or 4-order modulation. Then a codebook used for a data stream 1 in FIG. 2 may be expressed as a codebook 1, the codebook used for the data stream 3 may be expressed as a codebook 3, and the codebook 1 and the codebook 3 may be respectively expressed as follows:

the codebook 1:

$$\left\{ \begin{pmatrix} 0 \\ e_{2,1} \\ 0 \\ e_{4,1} \end{pmatrix}, \begin{pmatrix} 0 \\ e_{2,2} \\ 0 \\ e_{4,2} \end{pmatrix}, \begin{pmatrix} 0 \\ e_{2,3} \\ 0 \\ e_{4,3} \end{pmatrix}, \begin{pmatrix} 0 \\ e_{2,4} \\ 0 \\ e_{4,4} \end{pmatrix} \right\},$$

and the codebook 3:

$$\left\{ \begin{pmatrix} c_{1,1} \\ c_{2,1} \\ 0 \\ 0 \end{pmatrix}, \begin{pmatrix} c_{1,2} \\ c_{2,2} \\ 0 \\ 0 \end{pmatrix}, \begin{pmatrix} c_{1,3} \\ c_{2,3} \\ 0 \\ 0 \end{pmatrix}, \begin{pmatrix} c_{1,4} \\ c_{2,4} \\ 0 \\ 0 \end{pmatrix} \right\}.$$

$e_{n,q}=\alpha*\exp(j*\beta)$, $n\in\{2,4\}$, $1\leq q\leq 4$, $\alpha$ and $\beta$ may be any real number, and for any q, $1\leq q\leq 4$, $e_{2,q}$ and $e_{4,q}$ are not zero at the same time, and there are at least q1 and q2 that meet a condition that $e_{2,q_1}\neq 0$ and $e_{4,q_2}\neq 0$, $1\leq q1\leq 4$ and $1\leq q2\leq 4$.

Modulation symbols of all codewords in the codebook 1 at a location 3 (corresponding to the third resource unit, n=3) are all zero-modulation symbols, and modulation symbols of all codewords in the codebook 3 at the location 3 are also all zero-modulation symbols. Modulation symbols of all codewords in the codebook 1 at a location 1 (corresponding to the first resource unit, n=1) are all zero-modulation symbols, but modulation symbols of all codewords in the codebook 3 at the location 1 are not all zero-modulation symbols. Therefore, the codebook 1 and the codebook 3 do not belong to a same codebook set.

For another example, a codebook 2 having the following feature may be expressed as follows:

the codebook 2:

$$\left\{ \begin{pmatrix} d_{1,1} \\ d_{2,1} \\ 0 \\ 0 \end{pmatrix}, \begin{pmatrix} d_{1,2} \\ d_{2,2} \\ 0 \\ 0 \end{pmatrix}, \begin{pmatrix} d_{1,3} \\ d_{2,3} \\ 0 \\ 0 \end{pmatrix}, \begin{pmatrix} d_{1,4} \\ d_{2,4} \\ 0 \\ 0 \end{pmatrix} \right\}.$$

$d_{n,q}=\alpha*\exp(j*\beta)$, $1\leq n\leq 2$, $1\leq q\leq 4$, $\alpha$ and $\beta$ may be any real number, and for any q, $1\leq q\leq 4$, $d_{1,q}$ and $d_{2,q}$ are not zero at the same time, and there are at least q1 and q2 that meet a condition that $d_{1,q_1}\neq 0$ and $d_{2,q_2}\neq 0$, $1\leq q1\leq 4$ and $1\leq q2\leq 4$.

Modulation symbols of all codewords in the codebook 2 at locations 1 and 2 (corresponding to the first and second resource units, n=1, 2) are all zero-modulation symbols, and modulation symbols of all codewords in the codebook 3 at the locations 1 and 2 are also all zero-modulation symbols. Moreover, modulation symbols of all codewords in the codebook 2 are all zero-modulation symbols only at the locations 1 and 2, and modulation symbols of all codewords in the codebook 3 are all zero-modulation symbols only at the locations 1 and 2 too, that is, locations at which modulation symbols of all codewords in the codebook 2 are all zero-modulation symbols are the same as locations at which modulation symbols of all codewords in the codebook 3 are all zero-modulation symbols, and the locations are the location 1 and the location 2. Therefore, the codebook 2 and the codebook 3 belong to a same codebook set.

In conclusion, in this embodiment of the present invention, each codebook cluster includes one or more codebook sets, each codebook set includes one or more codebooks, each codebook consists of two or more codewords, each codebook cluster meets a condition that codewords in a same codebook cluster have a same total quantity of modulation symbols, and each codebook set meets a condition that codewords in a same codebook set have a same total quantity of modulation symbols and for any two codebooks in a same codebook set, a location at which modulation symbols of all codewords in one codebook are zero-modulation symbols is the same as a location at which modulation symbols of all codewords in the other codebook are zero-modulation symbols.

It should be further understood that, in the non-orthogonal multiple access system, a codebook may be directly stored. For example, the foregoing codebooks or codewords in the codebooks are directly stored, or only a modulation symbol at a location, in a codeword, at which a corresponding feature sequence element is a 1-element is stored, or the like. Therefore, when the present invention is applied, it is necessarily assumed that the network device and the terminal device in the non-orthogonal multiple access system both may store a part or all of the following pre-designed content:

(1) One or more feature matrices:

$$\begin{pmatrix} r_{1,1} & r_{1,2} & \cdots & r_{1,M} \\ r_{2,1} & r_{2,2} & \cdots & r_{2,M} \\ \vdots & \vdots & \cdots & \vdots \\ r_{N,1} & r_{N,2} & \cdots & r_{N,M} \end{pmatrix}_{N \times M}.$$

$r_{n,m} \in \{0,1\}$, $1 \leq n \leq N$, $1 \leq m \leq M$, M and N are both positive integers greater than 1, M may represent a quantity of multiplexed data streams, and N may represent a quantity of resource units included in a coding unit, or may be understood as a codeword length.

(2) One or more feature sequences:

$$\begin{pmatrix} r_{1,m} \\ r_{2,m} \\ \vdots \\ r_{N,m} \end{pmatrix}, 1 \leq m \leq M.$$

$1 \leq m \leq M$.

(3) One or more codebooks:

$$\left\{ \begin{pmatrix} c_{1,1} \\ c_{2,1} \\ \vdots \\ c_{N,1} \end{pmatrix}, \begin{pmatrix} c_{1,2} \\ c_{2,2} \\ \vdots \\ c_{N,2} \end{pmatrix}, \cdots, \begin{pmatrix} c_{1,Q_m} \\ c_{2,Q_m} \\ \vdots \\ c_{N,Q_m} \end{pmatrix} \right\}.$$

$Q_m \geq 2$, may represent a modulation order corresponding to the codebook, each codebook may correspond to one modulation order, and N is a positive integer greater than 1, may represent a quantity of resource units included in a coding unit, or may be understood as a codeword length.

The following describes in detail a method 230 for determining the codebook indication information according to this embodiment of the present invention with reference to FIG. 4 and FIG. 5.

As shown in FIG. 4, in this embodiment of the present invention, optionally, the determining codebook indication information used to indicate the first codebook and the one or more second codebooks includes the following steps:

S231: Determine a first codebook set to which the first codebook belongs, one or more second codebook sets to which the one or more second codebooks belong, and a first codebook cluster to which the first codebook set and the one or more second codebook sets belong, where each codebook cluster includes at least one codebook set, each codebook set includes at least one codebook, the codebook cluster meets a condition that codewords in a same codebook cluster have a same total quantity of modulation symbols, and the codebook set meets a condition that for any two codebooks in a same codebook set, a location at which modulation symbols of all codewords in one codebook are zero-modulation symbols is the same as a location at which modulation symbols of all codewords in the other codebook are zero-modulation symbols.

S232: Determine the codebook indication information, where the codebook indication information includes first codebook cluster information, first codebook set information, and first indication information, the first codebook cluster information is used to indicate the first codebook cluster, the first codebook set information is used to indicate the first codebook set in the first codebook cluster, the first indication information is used to indicate the first codebook in the first codebook set, and the first indication information is further used to indicate the one or more second codebook sets in the first codebook cluster and the one or more second codebooks in the one or more second codebook sets.

Specifically, in this embodiment of the present invention, the network device and the terminal device may store pre-designed codebooks. The codebooks may be divided into one or more codebook sets, each codebook set consists of one or more codebooks, each codebook corresponds to one modulation order, and any two codebooks, for example, a codebook a and a codebook b, in a same codebook set have features as follows: A codeword in the codebook a and a codeword in the codebook b have a same total quantity of modulation symbols. At a location at which modulation symbols of all codewords in the codebook a are all zero-modulation symbols, modulation symbols of all codewords in the codebook b are also all zero-modulation symbols. That is, the codebook set meets a condition that codewords in a same codebook set have a same total quantity of modulation symbols and for any two codebooks in a same codebook set, a location at which modulation symbols of all codewords in one codebook are zero-modulation symbols is the same as a location at which modulation symbols of all codewords in the other codebook are zero-modulation symbols.

The one or more codebook sets obtained through division in the foregoing manner may be further divided into one or more codebook clusters, each codebook cluster consists of one or more codebook sets, and any two codebook sets, for example, a codebook set A and a codebook set B, in a same codebook cluster has a feature as follows: A codeword in the codebook set A and a codeword in the codebook set B have a same total quantity of modulation symbols, that is, lengths of all codewords are the same, and quantities of resource units on which data streams are multiplexed are the same. That is, the codebook cluster meets a condition that codewords in a same codebook cluster have a same total quantity of modulation symbols.

In this embodiment of the present invention, the network device allocates, in a same codebook cluster, the first codebook used to send the first downlink data stream and the one or more second codebooks used to send the second downlink data stream. To indicate the first codebook and the one or more second codebooks to the user equipment, the network device determines the first codebook set to which the first codebook belongs, the one or more second codebook sets to which the one or more second codebooks belong, and the first codebook cluster to which the first codebook set and the one or more second codebook sets belong. In this way, the network device determines that the codebook indication information used to indicate the first codebook and the one or more second codebooks may include the first codebook cluster information, the first codebook set information, and the first indication information. For example, the codebook indication information may consist of three logical information segments. A logical information segment 1 may carry the first codebook cluster information, to indicate, to the terminal device, the first codebook cluster used to send the first downlink data stream and the second downlink data stream. A logical information segment 2 may carry the first codebook set information, to indicate, to the terminal device, the first codebook set used to send the first downlink data stream in the first codebook cluster. A logical information segment 3 may carry the first indication information. The first indication information is used to indicate the first codebook in the first codebook set, and the first indication information is further used to indicate the one or more second codebook sets in the first codebook cluster and the one or more second codebooks in the one or more second codebook sets.

It should be understood that, in this embodiment of the present invention, the logical information segments of the codebook indication information may be continuously or discontinuously carried in any order in an instruction in which the codebook indication information is located, which is not limited in this embodiment of the present invention.

Accordingly, after the terminal device receives the instruction or a message carrying the codebook indication information, for example, according to the logical information segment 1, the terminal device may learn the network device uses a codebook in which codebook cluster to send the first downlink data stream and the second downlink data stream. According to the logical information segment 2, the terminal device may learn the network device uses a codebook in which codebook set in the codebook cluster indicated by the logical information segment 1 to send the first downlink data stream. According to the logical information segment 3, the terminal device may learn the network device uses which codebook in the codebook set indicated by the logical information segment 2 to send the first downlink data stream. In addition, the terminal device may further learn the network device uses which codebook sets in the codebook cluster indicated by the logical information segment 1 and which codebooks in the codebook sets to send the second downlink data stream.

Therefore, by means of information exchange between a network device and a terminal device, the terminal device can determine codebooks used for all data streams carried on a same time-frequency resource. In this way, the network device and the terminal device can perform downlink data transmission based on the codebooks, and a network capacity of a system, including a quantity of users that can access the system, spectral efficiency, and the like, can be effectively improved.

In this embodiment of the present invention, the network device may use multiple manners to indicate the first codebook in the first codebook set to the terminal device, and indicate the one or more second codebook sets in the first codebook cluster and the one or more second codebooks in the one or more second codebook sets to the terminal device. The following provides separate descriptions.

Optionally, in this embodiment of the present invention, the first indication information includes: first codebook information, second codebook set information, and second codebook information, the first codebook information is used to indicate the first codebook in the first codebook set, the second codebook set information is used to indicate the one or more second codebook sets in the first codebook cluster, and the second codebook information is used to indicate the one or more second codebooks in the one or more second codebook sets.

Specifically, in this embodiment of the present invention, for example, the logical information segment 3 carrying the first indication information may further include three logical information subsegments: a logical information subsegment 1, a logical information subsegment 2, and a logical information subsegment 3. The logical information subsegment 1 may carry the first codebook information, to indicate the first codebook in the first codebook set. The logical information subsegment 2 may carry the second codebook set information, to indicate the one or more second codebook sets in the first codebook cluster. The logical information subsegment 3 may carry the second codebook information, to indicate the one or more second codebooks in the one or more second codebook sets.

In this embodiment of the present invention, when any two different codebooks in a codebook set correspond to different modulation orders, the logical information subsegment 1 and the logical information subsegment 3 may alternatively indicate modulation orders to indicate the codebooks used for the downlink data streams in the codebook sets. Accordingly, the terminal device may learn, according to the logical information subsegment 1 and the logical information subsegment 3, the modulation orders corresponding to the downlink data streams sent by the network device, and then can determine the codebooks in a one-to-one correspondence with the modulation orders in the codebook sets. That is, the first codebook information includes modulation order information of the first codebook, and each codebook in the first codebook set has a different modulation order; the second codebook information includes modulation order information of each second codebook, and each codebook in the one or more second codebook sets has a different modulation order.

It should be understood that, this embodiment of the present invention is described by using only an example in which the first indication information includes the first codebook information, the second codebook set information, and the second codebook information, but the present invention it not limited thereto. For example, when modulation orders of the first codebook and the one or more second codebooks used by the network device are the same, the first codebook information and the second codebook information may include only modulation order information of the codebooks. For another example, when the network device and the terminal device both use a same fixed modulation order by default, the first indication information may include only the second codebook set information. For still another example, when the first codebook and the one or more second codebooks used by the network device belong to a same codebook set, the first indication information may include only the first codebook information and the second codebook information. For still another example, when the network device and the terminal device both use codebooks having a same fixed number in codebook sets by default, the first indication information may include only the second codebook set information and information that is used to indicate the fixed number of the codebooks.

Therefore, by means of information exchange between a network device and a terminal device, the terminal device can determine codebooks used for all data streams carried on a same time-frequency resource. In this way, the network device and the terminal device can perform downlink data transmission based on the codebooks, and a network capacity of a system, including a quantity of users that can access the system, spectral efficiency, and the like, can be effectively improved.

Optionally, in this embodiment of the present invention, the first indication information includes M groups of bit string information in a one-to-one correspondence with all codebook sets in the first codebook cluster, each group of bit string information is used to indicate whether a corresponding codebook set belongs to the first codebook set or the one or more second codebook sets, when the codebook set corresponding to each group of bit string information belongs to the first codebook set or the one or more second codebook sets, each group of bit string information is further used to indicate the first codebook or the one or more second codebooks in the corresponding codebook set, and M is quantity of codebook sets included in the first codebook cluster.

In this embodiment of the present invention, when any two different codebooks in a codebook set correspond to different modulation orders, the logical information segment 3 may alternatively indicate modulation orders to indicate the codebooks used for the downlink data streams in the codebook sets. Accordingly, the terminal device may learn, according to the logical information segment 3, the modulation orders corresponding to the downlink data streams sent by the network device, and then can determine the codebooks in a one-to-one correspondence with the modulation orders in the codebook sets. That is, the first indication information includes modulation order information of the first codebook and the one or more second codebooks, and each codebook in each codebook set has a different modulation order.

Specifically, in this embodiment of the present invention, for example, description is provided by using an example in which the codebook indication information includes the first codebook cluster information, the first codebook set information, and the first indication information. Assuming that $K_1 \geq 1$ codebook clusters are obtained through division, the logical information segment 1 may be represented by a bitmap $$\overline{\underset{b_1, b_2, \ldots, b_{L_1}}{L_1}}$$

consisting of $L_1 = \mathrm{ceil}(\log_2(K_1))$ bits, and is used to indicate the first codebook cluster used by the network device to send the first downlink data stream and the second downlink data stream; the logical information segment 2 may be represented by a bitmap $$\overline{\underset{b_1, b_2, \ldots, b_{L_2}}{L_2}}$$

consisting of $L_2 = \mathrm{ceil}(\log_2(K_2))$ bits, and is used to indicate the first codebook set used by the network device to send the first downlink data stream to the terminal device.

It is assumed that the first codebook cluster indicated by the logical information segment 1 includes $K_2 \geq 1$ codebook sets, each codebook in each codebook set has a different modulation order, and each codebook set may use $K_3 \geq 1$ modulation orders. Then, when the network device may use different modulation orders to send different downlink data streams, the logical information segment 3 may include $K_2$ groups of bit string information, each group of bit string information may include $L_3$ bits, and indicates whether a codebook set corresponding to the group of bit string information belongs to the first codebook set or the one or more second codebook sets, and when the codebook set corresponding to the group of bit string information belongs to the first codebook set or the one or more second codebook sets, the group of bit string information is further used to indicate the first codebook or the one or more second codebooks in the corresponding codebook set. That is, the logical information segment 3 may be represented by a bitmap $$\overline{\underset{b_{1,1}, b_{2,1}, \ldots, b_{L_3,1}, b_{1,2}, b_{2,2}, \ldots, b_{L_3,2}, \ldots, b_{1,K_3}, b_{2,K_3}, \ldots, b_{L_3,K_2}}{\overline{\underset{L_3}{}} \quad \overline{\underset{L_3}{}} \quad \overline{\underset{L_3}{}}}}^{K_2 * L_3}$$

consisting of $K_2 * L_3$ ($L_3 = \mathrm{ceil}(\log_2(K_3))$) bits. A $k^{th}$ bit segment $$\overline{\underset{b_{1,k}, b_{2,k}, \ldots, b_{L_3,k}}{L_3}}$$

indicates whether the network device uses a codebook in a codebook set corresponding to the $k^{th}$ bit segment to send a downlink data stream. For example, the network device may use all-0 bits to indicate that the codebook in the codebook set corresponding to the $k^{th}$ bit segment is not used. Accordingly, the network device may use non-all-0 bits to indicate that the codebook in the codebook set corresponding to the $k^{th}$ bit segment is used. For another example, the network device may use all-1 bits to indicate that the codebook in the codebook set corresponding to the $k^{th}$ bit segment is not used, and use non-all-1 bits to indicate that the codebook in the codebook set corresponding to the $k^{th}$ bit segment is used. When the network device uses the codebook in the codebook set corresponding to the $k^{th}$ bit segment to send a downlink data stream, the $k^{th}$ bit segment may further indicate the network device uses which codebook in the corresponding codebook set. For example, the $k^{th}$ bit segment may include modulation order information of the used codebook.

It should be understood that, in this embodiment of the present invention, when the network device uses a codebook in each codebook set included in the first codebook cluster to send a downlink data stream, that is, each used codebook set belongs to the first codebook set or the one or more second codebook sets, the first indication information may include M groups of bit string information in a one-to-one correspondence with all codebook sets in the first codebook cluster. Each group of bit string information may be used only to indicate the first codebook or the one or more second codebooks in a corresponding codebook set. M is quantity of codebook sets included in the first codebook cluster. That is, each group of bit string information may be used only to indicate which codebook in the corresponding codebook set is used to send a downlink data stream. Further, when the network device uses a same modulation order to send different downlink data streams by default, the logical information segment 3 may be represented by a bitmap $$\frac{L_3}{b_1, b_1, \ldots, b_{L_3}}$$

consisting of $L_3$ bits, and is used to indicate a modulation order used by the network device to send downlink data streams.

That is, in this embodiment of the present invention, optionally, the first indication information includes modulation order information of the first codebook and the one or more second codebooks, and each codebook in each codebook set has a different modulation order.

It should be understood that, in this embodiment of the present invention, if the logical information segments indicate index values, consistent index relationships between related information, for example, an index relationship between a codebook cluster index value and a codebook cluster, an index relationship between a codebook set index value and a codebook set in each codebook cluster, and an index relationship between a codebook index value and a codebook in each codebook set, need to be pre-established on a network device side and a terminal device side, so that the network device and the terminal device can uniquely determine a corresponding codebook cluster, codebook set, and codebook from the pre-established related index relationships according to the index values indicated by the logical information segments.

It should be further understood that, in this embodiment of the present invention, the network device and the terminal device may pre-store a codebook by using multiple methods, but the following two conditions need to be met: First, the network device and the terminal device may learn, according to the stored codebook, a quantity of resource units or subcarriers or resource elements included in a coding unit. Second, the network device and the terminal device may learn, according to the stored codebook, the terminal device sends which non-zero-modulation symbols on which resource units or subcarriers or resource elements of a coding unit.

A simple and direct method that meets the foregoing storage conditions is to store a codebook in the foregoing form, including storing all zero-modulation symbols and non-zero-modulation symbols of codewords:

$$\left\{ \begin{pmatrix} c_{1,1} \\ c_{2,1} \\ \vdots \\ c_{N,1} \end{pmatrix}, \begin{pmatrix} c_{1,2} \\ c_{2,2} \\ \vdots \\ c_{N,2} \end{pmatrix}, \ldots, \begin{pmatrix} c_{1,Q_m} \\ c_{2,Q_m} \\ \vdots \\ c_{N,Q_m} \end{pmatrix} \right\}.$$

For example, when a modulation order is QPSK or 4-order modulation, a codebook used by a variable node 3 in FIG. 2 may be stored as follows:

$$\left\{ \begin{pmatrix} c_{1,1} \\ c_{2,1} \\ 0 \\ 0 \end{pmatrix}, \begin{pmatrix} c_{1,2} \\ c_{2,2} \\ 0 \\ 0 \end{pmatrix}, \begin{pmatrix} c_{1,3} \\ c_{2,3} \\ 0 \\ 0 \end{pmatrix}, \begin{pmatrix} c_{1,4} \\ c_{2,4} \\ 0 \\ 0 \end{pmatrix} \right\}.$$

After the codebook is stored in the foregoing manner, a total quantity of zero-modulation symbols and non-zero-modulation symbols in a codeword is a quantity of resource units or subcarriers or resource elements included in a coding unit, and a location and value of a non-zero-modulation symbol indicate that the terminal device sends a non-zero-modulation symbol having the corresponding value on a resource unit or subcarrier or resource element at the corresponding location of a coding unit. For example, when the codebook for the variable node 3 in FIG. 2 is used, the terminal device sends a modulation symbol $c_{1,q}$ on the first resource unit or subcarrier or resource element of a coding unit, the terminal device sends a modulation symbol $c_{2,q}$ on the second resource unit or subcarrier or resource element, and the terminal device sends zero-modulation symbols on the third and fourth resource units or subcarriers or resource elements. $c_{n,q}=\alpha*\exp(j*\beta)$, $1\le n\le 2$, $1\le q\le 4$, $\alpha$ and $\beta$ may be any real number, and for any q, $1\le q\le 4$, $c_{1,q}$ and $c_{2,q}$ are not zero at the same time, and there are at least q1 and q2 that meet a condition that $c_{1,q_1}\ne 0$ and $c_{2,q_2}\ne 0$, $1\le q1\le 4$ and $1\le q2\le 4$.

It should be further understood that, this embodiment of the present invention is described by using only the foregoing solution as an example, but the present invention is not limited thereto. Based on this embodiment of the present invention, another method may be used to indicate the first codebook in the first codebook set, the one or more second codebook sets, and the one or more second codebooks. In addition, based on this embodiment of the present invention, another method may be used to indicate the first codebook and the one or more second codebooks.

Therefore, according to the indication information transmission method in this embodiment of the present invention, a network device determines, in one or more codebooks, a first codebook used to send a first downlink data stream to a terminal device; determines one or more second codebooks used to send a second downlink data stream, where the second downlink data stream is one or more downlink data streams, other than the first downlink data stream, carried on a time-frequency resource used for the first downlink data stream; determines codebook indication information used to indicate the first codebook and the one or more second codebooks; and sends the codebook indication information to the terminal device, so that the terminal device can determine codebooks used for all data streams carried on the same time-frequency resource, and can decode, according to the codebooks, the first data stream sent by the network device to the terminal device. In this way, the network device and the terminal device can perform downlink data transmission based on the codebooks, and a network capacity of a system, including a quantity of users that can access the system, spectral efficiency, and the like, can be effectively improved.

It should be understood that, in this embodiment of the present invention, because a correspondence exists between a feature sequence or feature matrix and a codebook, the feature sequence or feature matrix may be used to indicate a codebook set or codebook cluster including one or more codebooks. Therefore, in this embodiment of the present invention, the codebook indication information sent to the terminal device may alternatively be determined by using a feature sequence or feature matrix. The following describes, in detail with reference to FIG. 5, a method for determining the codebook indication information by using a feature sequence or feature matrix.

FIG. 5 shows another embodiment of the method 230 for determining the codebook indication information according to this embodiment of the present invention. As shown in FIG. 5, in this embodiment of the present invention, optionally, the determining codebook indication information used to indicate the first codebook and the one or more second codebooks includes the following steps:

S233: Determine a first feature sequence to which the first codebook belongs, one or more second feature sequences to which the one or more second codebooks belong, and a first feature matrix to which the first feature sequence and the one or more second feature sequences belong, where each feature matrix consists of two or more feature sequences, each feature sequence corresponds to one or more codebooks, the feature sequence consists of a zero-element and a 1-element, the zero-element means that modulation symbols of all codewords in a corresponding codebook at a location corresponding to the zero-element are all zero-modulation symbols, and the 1-element means that modulation symbols of all codewords in a corresponding codebook at a location corresponding to the 1-element are not all zero-modulation symbols or are all non-zero-modulation symbols.

S234: Determine the codebook indication information, where the codebook indication information includes first feature matrix information, first feature sequence information, and second indication information, the first feature matrix information is used to indicate the first feature matrix, the first feature sequence information is used to indicate the first feature sequence in the first feature matrix, the second indication information is used to indicate the first codebook in one or more codebooks corresponding to the first feature sequence, and the second indication information is further used to indicate the one or more second feature sequences in the first feature matrix, and the one or more second codebooks in one or more codebooks corresponding to the one or more second feature sequences.

Specifically, in this embodiment of the present invention, the network device and the terminal device may store pre-designed codebooks. The codebooks may be divided into one or more codebook sets, each codebook set consists of one or more codebooks, each codebook corresponds to one modulation order, and any two codebooks, for example, a codebook a and a codebook b, in a same codebook set have features as follows: A codeword in the codebook a and a codeword in the codebook b have a same total quantity of modulation symbols. At a location at which modulation symbols of all codewords in the codebook a are all zero-modulation symbols, modulation symbols of all codewords in the codebook b are also all zero-modulation symbols. That is, the codebook set meets a condition that codewords in a same codebook set have a same total quantity of modulation symbols and for any two codebooks in a same codebook set, a location at which modulation symbols of all codewords in one codebook are zero-modulation symbols is the same as a location at which modulation symbols of all codewords in the other codebook are zero-modulation symbols.

After the codebook set is obtained through division in the foregoing manner, as described above, each codebook set is in a one-to-one correspondence with a feature sequence of a feature matrix. The correspondence is determined in the following manner: If a codebook in a codebook set corresponds to a feature sequence of a feature matrix, that is, the foregoing two conditions are met, the codebook set to which the codebook belongs is in a one-to-one correspondence with the feature sequence of the feature matrix. That is, a correspondence between a feature sequence and a codebook may be determined by the following two conditions:

(1) A total quantity of modulation symbols of codewords in the codebook is the same as a total quantity of elements in the corresponding feature sequence.

(2) For any 1-element in the feature sequence, at least one codeword may be found in the corresponding codebook, so that a modulation symbol of the codeword at a location of the 1-element is not a zero-modulation symbol. For any zero-element in the feature sequence, modulation symbols of all codewords in the corresponding codebook at a location corresponding to the zero-element are all zero-modulation symbols.

Therefore, in this embodiment of the present invention, the network device and the terminal device may store a pre-designed feature matrix corresponding to a codebook cluster and a pre-designed feature sequence corresponding to a codebook set.

In this embodiment of the present invention, the network device allocates, in a codebook cluster corresponding to a same feature matrix, the first codebook used to send the first downlink data stream and the one or more second codebooks used to send the second downlink data stream. To indicate the first codebook and the one or more second codebooks to the user equipment, the network device determines the first feature sequence to which the first codebook belongs, the one or more second feature sequences to which the one or more second codebooks belong, and the first feature matrix to which the first feature sequence and the one or more second feature sequences belong.

In this way, the network device may determine that the codebook indication information used to indicate the first codebook and the one or more second codebooks includes the first feature matrix information, the first feature sequence information, and the second indication information. For example, the codebook indication information may consist of three logical information segments. A logical information segment 1 may carry the first feature matrix information, to indicate, to the terminal device, the first feature matrix used to send the first downlink data stream and the second downlink data stream. A logical information segment 2 may carry the first feature sequence information, to indicate, to the terminal device, the first feature sequence used to send the first downlink data stream in the first feature matrix. A logical information segment 3 may carry the second indication information. The second indication information is used to indicate the first codebook in the one or more codebooks corresponding to the first feature sequence, and the second indication information is further used to indicate the one or more second feature sequences in the first feature matrix, and the one or more second codebooks in the one or more codebooks corresponding to the one or more second feature sequences.

It should be understood that, in this embodiment of the present invention, the logical information segments of the codebook indication information may be continuously or discontinuously carried in any order in an instruction in which the codebook indication information is located, which is not limited in this embodiment of the present invention.

Accordingly, after the terminal device receives the instruction or a message carrying the codebook indication information, for example, according to the logical information segment 1, the terminal device may learn the network device uses a codebook in one or more codebooks corresponding to which feature matrix to send the first downlink data stream and the second downlink data stream. That is, because a codebook cluster including one or more codebooks is in a one-to-one correspondence with a feature matrix, the terminal device may learn, according to the one-to-one correspondence, the network device uses a codebook in which codebook cluster to send the first downlink data stream and the second downlink data stream. According to the logical information segment 2, the terminal device may learn the network device uses a codebook in one or more codebooks corresponding to which feature sequence in the feature matrix indicated by the logical information segment 1 to send the first downlink data stream. That is, because a codebook set including one or more codebooks is in a one-to-one correspondence with a feature sequence, the terminal device may learn, according to the one-to-one correspondence by using the feature sequence indicated by the logical information segment 2, the network device uses a codebook in which codebook set to send the first downlink data stream. Further, similarly, according to the logical information segment 3, the terminal device may learn the network device uses which codebook in the one or more codebooks corresponding to the feature sequence indicated by the logical information segment 2 to send the first downlink data stream. In addition, the terminal device may further learn the network device uses which feature sequences in the feature matrix indicated by the logical information segment 1 and which codebooks in one or more codebooks corresponding to the feature sequences to send the second downlink data stream.

Therefore, by means of information exchange between a network device and a terminal device, the terminal device can determine codebooks used for all data streams carried on a same time-frequency resource. In this way, the network device and the terminal device can perform downlink data transmission based on the codebooks, and a network capacity of a system, including a quantity of users that can access the system, spectral efficiency, and the like, can be effectively improved.

In this embodiment of the present invention, the network device may use multiple manners to indicate, to the terminal device, the first codebook in the one or more codebooks corresponding to the first feature sequence, and indicate, to the terminal device, the one or more second feature sequences in the first feature matrix and the one or more second codebooks in the one or more codebooks corresponding to the one or more second feature sequences. The following provides separate descriptions.

Optionally, in this embodiment of the present invention, the second indication information includes: third codebook information, second feature sequence information, and fourth codebook information, the third codebook information is used to indicate the first codebook in the one or more codebooks corresponding to the first feature sequence, the second feature sequence information is used to indicate the one or more second feature sequences in the first feature matrix, and the fourth codebook information is used to indicate the one or more second codebooks in the one or more codebooks corresponding to the one or more second feature sequences.

Specifically, in this embodiment of the present invention, for example, the logical information segment 3 carrying the second indication information may further include three logical information subsegments: a logical information subsegment 1, a logical information subsegment 2, and a logical information subsegment 3. The logical information subsegment 1 may carry the third codebook information, to indicate the first codebook in the one or more codebooks corresponding to the first feature sequence. The logical information subsegment 2 may carry the second feature sequence information, to indicate the one or more second feature sequences in the first feature matrix. The logical information subsegment 3 may carry the fourth codebook information, to indicate the one or more second codebooks in the one or more codebooks corresponding to the one or more second feature sequences.

In this embodiment of the present invention, when any two different codebooks in the one or more codebooks corresponding to each feature sequence correspond to different modulation orders, the logical information subsegment 1 and the logical information subsegment 3 may alternatively indicate modulation orders to indicate the codebooks used for the downlink data streams in the one or more codebooks corresponding to the feature sequences. Accordingly, the terminal device may learn, according to the logical information subsegment 1 and the logical information subsegment 3, the modulation orders corresponding to the downlink data streams sent by the network device, and then can determine the codebooks in a one-to-one correspondence with the modulation orders in the one or more codebooks corresponding to the feature sequences.

That is, in this embodiment of the present invention, the third codebook information includes modulation order information of the first codebook, and each of the one or more codebooks corresponding to the first feature sequence has a different modulation order; the fourth codebook information includes modulation order information of each second codebook, and each of one or more codebooks corresponding to each second feature sequence has a different modulation order.

It should be understood that, this embodiment of the present invention is described by using only an example in which the second indication information includes the third codebook information, the second feature sequence information, and the fourth codebook information, but the present invention it not limited thereto. For example, when modulation orders of the first codebook and the one or more second codebooks used by the network device are the same, the third codebook information and the fourth codebook information may include only modulation order information of the codebooks. For another example, when the network device and the terminal device both use a same fixed modulation order by default, the second indication information may include only the second feature sequence information. For still another example, when the first codebook and the one or more second codebooks used by the network device correspond to a same feature sequence, the first indication information may include only the third codebook information and the fourth codebook information.

Therefore, by means of information exchange between a network device and a terminal device, the terminal device can determine codebooks used for all data streams carried on a same time-frequency resource. In this way, the network device and the terminal device can perform downlink data transmission based on the codebooks, and a network capacity of a system, including a quantity of users that can access the system, spectral efficiency, and the like, can be effectively improved.

Optionally, in this embodiment of the present invention, the second indication information includes M groups of bit string information in a one-to-one correspondence with all feature sequences in the first feature matrix, each group of bit string information is used to indicate whether a corresponding feature sequence belongs to the first feature sequence or the one or more second feature sequences, when the feature sequence corresponding to each group of bit string information belongs to the first feature sequence or the one or more second feature sequences, each group of bit string information is further used to indicate the first codebook or the one or more second codebooks in one or more codebooks corresponding to the corresponding feature sequence, and M is quantity of feature sequences included in the first feature matrix.

In this embodiment of the present invention, when any two different codebooks in the one or more codebooks corresponding to each feature sequence correspond to different modulation orders, the logical information segment 3 may alternatively indicate modulation orders to indicate the codebooks used for the downlink data streams. Accordingly, the terminal device may learn, according to the logical information segment 3, the modulation orders corresponding to the downlink data streams sent by the network device, and then can determine the codebooks in a one-to-one correspondence with the modulation orders in the one or more codebooks corresponding to the feature sequences. That is, the second indication information includes modulation order information of the first codebook and the one or more second codebooks, and each of the one or more codebooks corresponding to each feature sequence has a different modulation order.

Specifically, in this embodiment of the present invention, for example, description is provided by using an example in which the codebook indication information includes the first feature matrix information, the first feature sequence information, and the second indication information. Assuming that $K_1 \geq 1$ feature matrices are obtained through division, the logical information segment 1 may be represented by a bitmap $$\overline{b_1, b_2, \ldots, b_{L_1}}^{L_1}$$

consisting of $L_1 = \text{ceil}(\log_2(K_1))$ bits, and is used to indicate the first feature matrix used by the network device to send the first downlink data stream and the second downlink data stream; the logical information segment 2 may be represented by a bitmap $$\overline{b_1, b_2, \ldots, b_{L_2}}^{L_2}$$

consisting of $L_2 = \text{ceil}(\log_2(K_2))$ bits, and is used to indicate the first feature sequence used by the network device to send the first downlink data stream to the terminal device.

It is assumed that the first feature matrix indicated by the logical information segment 1 includes $K_2 \geq 1$ feature sequences, and $K_3 \geq 1$ modulation orders may be used. Then, when the network device may use different modulation orders to send different downlink data streams, the logical information segment 3 may include $K_2$ groups of bit string information, each group of bit string information may include $L_3$ bits, and indicates whether a feature sequence corresponding to the group of bit string information belongs to the first feature sequence or the one or more second feature sequences, and when the feature sequence corresponding to the group of bit string information belongs to the first feature sequence or the one or more second feature sequences, the group of bit string information is further used to indicate the first codebook or the one or more second codebooks in one or more codebooks corresponding to the corresponding feature sequence. That is, the logical information segment 3 may be represented by a bitmap $$\overline{b_{1,1}, b_{2,1}, \ldots, b_{L_3,1}}^{L_3}, \overline{b_{1,2}, b_{2,2}, \ldots, b_{L_3,2}}^{L_3}, \ldots, \overline{b_{1,K_3}, b_{2,K_3}, \ldots, b_{L_3,K_2}}^{L_3}$$

consisting of $K_2 * L_3$ ($L_3 = \text{ceil}(\log_2(K_3))$) bits. A $k^{th}$ bit segment $$\overline{b_{1,k}, b_{2,k}, \ldots, b_{L_3,k}}^{L_3}$$

indicates whether the network device uses a codebook in one or more codebooks corresponding to a feature sequence corresponding to the $k^{th}$ bit segment to send a downlink data stream. For example, the network device may use all-0 bits to indicate that the feature sequence corresponding to the $k^{th}$ bit segment is not used. Accordingly, the network device may use non-all-0 bits to indicate that the feature sequence corresponding to the $k^{th}$ bit segment is used. For another example, the network device may use all-1 bits to indicate that the feature sequence corresponding to the $k^{th}$ bit segment is not used. Accordingly, the network device may use non-all-1 bits to indicate that the feature sequence corresponding to the $k^{th}$ bit segment is used. When the network device uses the codebook in the one or more codebooks corresponding to the feature sequence corresponding to the $k^{th}$ bit segment to send a downlink data stream, the $k^{th}$ bit segment may further indicate the network device uses which codebook corresponding to the corresponding feature sequence. For example, the $k^{th}$ bit segment may include modulation order information of the used codebook.

It should be understood that, in this embodiment of the present invention, when the network device uses a codebook in one or more codebooks corresponding to each feature sequence included in the first feature matrix to send a downlink data stream, that is, each used feature sequence belongs to the first feature sequence or the one or more second feature sequences, the first indication information may include M groups of bit string information in a one-to-one correspondence with all feature sequences in the first feature matrix. Each group of bit string information may be used only to indicate the first codebook or the one or more second codebooks in one or more codebooks corresponding to a corresponding feature sequence. M is quantity of feature sequences included in the first feature matrix. That is, each group of bit string information may be used only to indicate which codebook corresponding to the corresponding feature sequence is used to send a downlink data stream. Further, when the network device uses a same modulation order to send different downlink data streams by default, the logical information segment 3 may be represented by a bitmap $$\overline{b_1, b_2, \ldots, b_{L_3}}^{L_3}$$

consisting of $L_3$ bits, and is used to indicate a modulation order used by the network device to send downlink data streams.

That is, in this embodiment of the present invention, optionally, the second indication information includes modulation order information of the first codebook and the one or more second codebooks, and each of the one or more codebooks corresponding to each feature sequence has a different modulation order.

It should be understood that, in this embodiment of the present invention, if the logical information segments indicate index values, consistent index relationships between related information, for example, an index relationship between a feature matrix index value and a feature matrix, an index relationship between a feature sequence index value and a feature sequence in each feature matrix, and an index relationship between a codebook index value and a codebook in one or more codebooks, need to be pre-established on a network device side and a terminal device side, so that the network device and the terminal device can uniquely determine a corresponding feature matrix, feature sequence, and codebook from the pre-established related index relationships according to the index values indicated by the logical information segments.

It should be further understood that, in this embodiment of the present invention, the network device and the terminal device may pre-store a feature matrix and a codebook by using multiple methods, but the following two conditions need to be met: First, the network device and the terminal device may learn, according to the stored feature matrix and codebook, a quantity of resource units or subcarriers or resource elements included in a coding unit. Second, the network device and the terminal device may learn, according to the stored feature matrix and codebook, the terminal device sends which non-zero-modulation symbols on which resource units or subcarriers or resource elements of a coding unit.

A simple and direct method that meets the foregoing storage conditions is as follows:

(1) Store the feature matrix in the foregoing form:

$$\begin{pmatrix} r_{1,1} & r_{1,2} & \cdots & r_{1,M} \\ r_{2,1} & r_{2,2} & \cdots & r_{2,M} \\ \vdots & \vdots & \cdots & \vdots \\ r_{N,1} & r_{N,2} & \cdots & r_{N,M} \end{pmatrix}.$$

For example, for the example shown in FIG. 2, a corresponding feature matrix may be expressed as follows:

$$\begin{pmatrix} 0 & 1 & 1 & 0 & 1 & 0 \\ 1 & 0 & 1 & 0 & 0 & 1 \\ 0 & 1 & 0 & 1 & 0 & 1 \\ 1 & 0 & 0 & 1 & 1 & 0 \end{pmatrix}.$$

(2) Store modulation symbols of corresponding codewords in an order of 1-elements in the foregoing feature sequence. For example, when a modulation order is QPSK or 4-order modulation, the codebook used by the variable node 3 in FIG. 2 may be stored as follows:

$$\left\{ \begin{pmatrix} c_{1,1} \\ c_{2,1} \end{pmatrix}, \begin{pmatrix} c_{1,2} \\ c_{2,2} \end{pmatrix}, \begin{pmatrix} c_{1,3} \\ c_{2,3} \end{pmatrix}, \begin{pmatrix} c_{1,4} \\ c_{2,4} \end{pmatrix} \right\}.$$

After the feature matrix and codebook are stored in the foregoing manner, the network device and the terminal device may learn, according to the feature matrix, a quantity of resource units or subcarriers or resource elements included in a coding unit, that is, a quantity of rows of the feature matrix; and learn, according to a feature sequence in the feature matrix and a codebook in one or more codebooks corresponding to the feature sequence, the terminal device sends a zero-modulation symbol and a non-zero-modulation symbol on which resource units or subcarriers or resource elements of a coding unit when using the feature sequence. For example, when the codebook for the variable node 3 in FIG. 2 is used, the terminal device sends a modulation symbol $c_{1,q}$ on the first resource unit or subcarrier or resource element of a coding unit, the terminal device sends a modulation symbol $c_{2,q}$ on the second resource unit or subcarrier or resource element, and the terminal device sends zero-modulation symbols on the third and fourth resource units or subcarriers or resource elements. $c_{n,q} = \alpha * \exp(j * \beta)$, $1 \le n \le 2$, $1 \le q \le 4$, $\alpha$ and $\beta$ may be any real number, and for any q, $1 \le q \le 4$, $c_{1,q}$ and $c_{2,q}$ are not zero at the same time, and there are at least q1 and q2 that meet a condition that $c_{1,q_1} \ne 0$ and $c_{2,q_2} \ne 0$, $1 \le q1 \le 4$ and $1 \le q2 \le 4$.

It should be further understood that, this embodiment of the present invention is described by using only the foregoing solution as an example, but the present invention is not limited thereto. Based on this embodiment of the present invention, another method may be used to indicate the first codebook in the one or more codebooks corresponding to the first feature sequence, the one or more second feature sequences, and the one or more second codebooks. In addition, based on this embodiment of the present invention, another method may be used to indicate the first codebook and the one or more second codebooks.

Therefore, according to the indication information transmission method in this embodiment of the present invention, a network device determines, in one or more codebooks, a first codebook used to send a first downlink data stream to a terminal device; determines one or more second codebooks used to send a second downlink data stream, where the second downlink data stream is one or more downlink data streams, other than the first downlink data stream, carried on a time-frequency resource used for the first downlink data stream; determines codebook indication information used to indicate the first codebook and the one or more second codebooks; and sends the codebook indication information to the terminal device, so that the terminal device can determine codebooks used for all data streams carried on the same time-frequency resource, and can decode, according to the codebooks, the first data stream sent by the network device to the terminal device. In this way, the network device and the terminal device can perform downlink data transmission based on the codebooks, and a network capacity of a system, including a quantity of users that can access the system, spectral efficiency, and the like, can be effectively improved.

In this embodiment of the present invention, the network device may send the codebook indication information to the terminal device in multiple manners. For example, the network device may perform indication to the terminal device in a dynamic or semi-persistent manner by using a downlink control channel, or in a semi-persistent manner by using a data channel, or in a persistent manner by using a broadcast channel or data channel.

Optionally, in this embodiment of the present invention, the sending the codebook indication information to the terminal device includes: sending a downlink scheduling message, dedicated higher layer control signaling, or a system broadcast message to the terminal device, where the downlink scheduling message, the dedicated higher layer control signaling, and the system broadcast message include the codebook indication information.

Specifically, in this embodiment of the present invention, for example, the network device may allocate or specify a codebook and another system resource and parameter, for example, a frequency resource, a transmit power, and a modulation and coding scheme, for the downlink data stream of the terminal device according to channel state information periodically or non-periodically reported by the terminal device, add the allocated or specified codebook and another system resource and parameter to a downlink scheduling message as downlink control information ("DCI" for short), and deliver the downlink scheduling message to the terminal device.

After receiving the downlink scheduling message delivered by the network device, the terminal device may receive, by using a non-orthogonal multiple access technology, the first downlink data stream according to the codebook and another system resource and parameter that are indicated by the downlink scheduling message.

In the foregoing process, the codebook indication information used to indicate the first codebook may be carried in the downlink scheduling message as a part of the downlink control information ("DCI" for short), and delivered to the terminal device in a dynamic or semi-persistent manner by using a downlink physical control channel, for example, a physical downlink control channel ("PDCCH" for short) in a Long Term Evolution ("LTE" for short) system.

For another example, the codebook indication information used to indicate the first codebook may be carried in a radio resource control ("RRC" for short) connection establishment message or an RRC connection reconfiguration message, and delivered to the terminal device in a semi-persistent manner by using a downlink physical data channel, for example, a physical downlink shared channel ("PDSCH" for short) in an LTE system.

Optionally, the dedicated higher layer control signaling includes a radio resource control RRC connection establishment message and an RRC connection reconfiguration message. It should be understood that, this embodiment of the present invention is described by using only an example in which the dedicated higher layer control signaling includes the RRC connection establishment message and the RRC connection reconfiguration message, but the present invention is not limited thereto, and other dedicated higher layer control signaling may be used to send the codebook indication information to the terminal device.

For still another example, the codebook indication information used to indicate the first codebook may be carried in a system broadcast message, for example, a master information block ("MIB" for short) or a system information block ("SIB" for short) in an LTE system, and delivered to the terminal device in a persistent manner by using a downlink physical broadcast channel or physical data channel, for example, a physical broadcast channel ("PBCH" for short) or a physical downlink shared channel PDSCH in the LTE system.

In this embodiment of the present invention, the network device sends the codebook indication information to the terminal device by using at least one of a bit string or a table. Optionally, the codebook indication information is bit string information.

Specifically, in this embodiment of the present invention, the logical information segments in the codebook indication information may be implemented by using multiple methods, including but not limited to the following several methods:

Manner 1: The logical information segments use independent bit strings or bitmaps to implement information indication functions.

Assuming that in the foregoing embodiment, information indicated by a logical information segment (for example, the logical information segment is used to indicate a codebook cluster) in the codebook indication information has a maximum of K possibilities (for example, there are K codebook clusters in total), the logical information segment may be represented by a bitmap $$\overline{\underset{b_1, b_2, \ldots, b_L}{L}}$$

consisting of $L=\text{ceil}(\log_2(K))$ bits. $\text{ceil}(\bullet)$ means rounding up. A value of the bitmap represents an index value of the indicated information. The terminal device may determine, from a pre-established index relationship according to the index value indicated by the bitmap, a possibility uniquely corresponding to the index value.

For example, description is provided by using an example in which the codebook indication information includes the feature matrix information, the feature sequence information, and the codebook information. Assuming that $K_1 \geq 1$ SCMA feature matrices are obtained in total through division, the logical information segment 1 may be represented by a bitmap $$\overline{\underset{b_1, b_2, \ldots, b_{L_1}}{L_1}}$$

consisting of $L_1=\text{ceil}(\log_2(K_1))$ bits, and is used to indicate the first feature matrix used by the network device to send the first downlink data stream and the second downlink data stream. Assuming that the first feature matrix indicated by the logical information segment 1 includes $K_2 \geq 1$ feature sequences, and $K_3 \geq 1$ modulation orders may be used, when the network device may use different modulation orders to send different downlink data streams, the logical information segment 3 may be represented by a bitmap $$\overline{\underset{\underset{b_{1,1}, b_{2,1}, \ldots, b_{L_3,1}}{L_3}, \underset{b_{1,2}, b_{2,2}, \ldots, b_{L_3,2}}{L_3}, \ldots, \underset{b_{1,K_3}, b_{2,K_3}, \ldots, b_{L_3,K_2}}{L_3}}{K_2 * L_3}}$$

consisting of $K_2 * L_3$ ($L_3=\text{ceil}(\log_2(K_3))$) bits. If a $k^{th}$ bit segment is a bit combination in a particular agreed form, for example, all-0 or all-1, it indicates that the network device does not use a $k^{th}$ feature sequence in the first feature matrix indicated by the logical information segment 1 to send a data stream. Otherwise, the $k^{th}$ bit segment $$\overline{\underset{b_{1,k}, b_{2,k}, \ldots, b_{L_3,k}}{L_3}}$$

indicates a modulation order used by the network device to send a data stream by using the $k^{th}$ feature sequence (a $k^{th}$ column) in the first feature matrix indicated by the logical information segment 1. When the network device uses a same modulation order to send different data streams by default, the logical information segment 3 may be represented by a bitmap $$\overline{b_1, b_2, \ldots, b_{L_3}}^{L_3}$$

consisting of $L_3$ bits, and is used to indicate a modulation order used by the network device to send data streams. The logical information segment 2 may be represented by a bitmap $$\overline{b_1, b_2, \ldots, b_{L_2}}^{L_2}$$

consisting of $L_2$=ceil($\log_2(K_2)$)) bits, and is used to indicate the first feature sequence used by the base station to send the first downlink data stream to the user equipment.

It should be understood that, in the foregoing example, the three logical information segments in the codebook indication information all use independent bit strings or bitmaps to implement the information indication functions, but actually, the logical information segments are not required to all use a same implementation. Therefore, in an actual application, some logical information segments may use independent bitmaps to implement information indication functions, and the other logical information segments use another manner. This embodiment of the present invention is not limited thereto.

It should be further understood that, description is provided above by using only one specific embodiment of the present invention as an example. It should be noted that, the method may also be applied to logical information segments in codebook indication information in another embodiment of the present invention.

Manner 2: The multiple logical information segments perform joint indication.

The logical information segments generally may perform joint indication based on a table. The table may be in a form as follows: The table includes multiple columns. One of the columns is a comprehensive index column. Each index value corresponds to a combination of information indicated by the multiple logical information segments. Each column in the table except the comprehensive index column may correspond to one logical information segment, and is used to indicate a possibility of information indicated by the corresponding logical information segment. A value of the logical information segment may be an index value, or may be specific indicated content, for example, a codebook cluster, a codebook set, a codebook, a feature matrix, or a feature sequence.

By means of the table, the network device and the terminal device may establish correspondences between comprehensive index values and all possible combinations of the information indicated by the multiple logical information segments. The network device sends a comprehensive index value to the terminal device by using the codebook indication information. The terminal device may learn, according to the comprehensive index value by querying the table, a possibility uniquely corresponding to information indicated by each logical information segment.

Description is provided by still using an example in which the codebook indication information includes the first codebook cluster information, the first codebook set information, and the first indication information. A form of the table used to implement the codebook indication information is shown in Table 1:

TABLE 1

| Index | Codebook cluster or codebook cluster index | Codebook set or codebook set index | Codebook, codebook index, modulation order, or modulation order index |
|---|---|---|---|
| ... | ... | ... | ... |
| m | i | j | k |
| ... | ... | ... | ... |

As shown in Table 1, a joint indication table of the multiple logical information segments may consist of four columns, the first column is a comprehensive index column (referred to as an index column in the example), and the other three columns respectively correspond to the three logical information segments in the codebook indication information. m is an index value, and i, j, and k may be index values of information indicated by the logical information segments, or may be specific content of corresponding information, for example, a codebook stored in the foregoing form, and a codebook set and a codebook cluster that are obtained through division.

It should be understood that, in the foregoing example, all the logical information segments in the codebook indication information perform joint indication, but actually, the logical information segments are not required to all use a same implementation. Therefore, in an actual application, some logical information segments may use a joint indication manner to implement information indication functions, and the other logical information segments use another implementation. This embodiment of the present invention is not limited thereto.

It should be further understood that, description is provided above by using only one specific embodiment of the present invention as an example. It should be noted that, the method may also be applied to logical information segments in codebook indication information in another embodiment of the present invention.

Manner 3: The logical information segments and an information segment that is in the message or instruction in which the codebook indication information is located and that has another indication function perform joint indication.

Generally, this manner is also implemented based on a table. The table may be in a form as follows: The table includes multiple columns. One of the columns is a comprehensive index column. Each index value represents a combination of content indicated by the other columns. At least one column in the table other than the comprehensive index column corresponds to a logical information segment in the codebook indication information in this embodiment of the present invention, and represents a possibility of content indicated by the corresponding logical information segment. A value of the logical information segment may be an index value, or may be specific indicated content, for example, a feature matrix, a feature sequence, a codebook, or a modulation order.

At least one of the other columns in the table corresponds to an information segment having a function of indicating other information (different from the information indicated by the logical information segments in the codebook indication information in this embodiment of the present invention), for example, an information segment indicating a size of a transport block, or an information segment indicating a redundancy version.

By means of the table, the network device and the terminal device may establish correspondences between comprehensive index values, all possible combinations of the information indicated by the logical information segments in the codebook indication information in this embodiment of the present invention, and all possible combinations of information indicated by the information segment having the function of indicating other information. The network device sends a comprehensive index value to the terminal device by using the codebook indication information. The terminal device may learn, according to the comprehensive index value by querying the table, a possibility uniquely corresponding to information indicated by a logical information segment in the codebook indication information in this embodiment of the present invention, and a possibility uniquely corresponding to the information indicated by the information segment having the function of indicating other information.

Description is provided by still using an example in which the codebook indication information includes the first codebook cluster information, the first codebook set information, and the first indication information. When the network device uses a same modulation order to send different downlink data streams by default, a form of the table used to implement the codebook indication information is shown in Table 2:

TABLE 2

| Index | Transport block index | Codebook, codebook index, modulation order, or modulation order index |
|---|---|---|
| ... | ... | ... |
| m | i | j |
| ... | ... | ... |

As shown in Table 2, a joint indication table includes three columns in total. The first column is a comprehensive index column. The second column is a transport block index column, and is used to indicate a size of a transport block. The third column may be used to indicate the logical information segment 3 in the codebook indication information.

It should be understood that, description is provided above by using only one specific embodiment of the present invention as an example. It should be noted that, the method may also be applied to logical information segments in codebook indication information in another embodiment of the present invention.

It should be further understood that, in this embodiment of the present invention, the logical information segments in the codebook indication information are all logical concepts. If an information segment or bit string in the message or instruction in which the codebook indication information is located, for example, a downlink scheduling message, an RRC connection establishment message, an RRC connection reconfiguration message, or a broadcast message, implements an information indication function of a logical information segment in the foregoing embodiment, it should be understood or considered as follows: The information segment or bit string is an implementation of the corresponding logical information segment in the foregoing embodiment. The information segment or bit string herein may be any portion in all bits constituting the message or instruction in which the codebook indication information is located, and includes an information bit and a check bit, for example, a cyclic redundancy check ("CRC" for short) bit scrambled by using a radio network temporary identifier ("RNTI" for short) of the terminal device.

The foregoing describes in detail various implementations of the codebook indication information. Using an LTE system using a non-orthogonal multiple access technology as an example, the following describes in detail a specific application of this embodiment of the present invention in the LTE system.

In the LTE system, the network device uses a downlink scheduling message to send the following information segments for each downlink transport block (the transport block is equivalent to data or a data stream in this embodiment of the present invention) to be received by the terminal device, to indicate corresponding information:

for a transport block i, where i=1 or 2:

a modulation and coding scheme indication information segment: five bits, used to indicate a size of the transport block and a modulation order;

a new data indication information segment: one bit, used to indicate whether the transport block is retransmitted data or new data; and a redundancy version indication information segment: two bits, used to indicate a redundancy version number.

When the non-orthogonal multiple access technology is introduced into the LTE system, when the foregoing information segments are delivered for each transport block of the terminal device, the one or more logical information segments in this embodiment of the present invention further need to be delivered, to indicate the codebook indication information. The following provides applications of several embodiments of the present invention in the LTE system using the non-orthogonal multiple access technology.

For an embodiment in which the codebook indication information includes the first codebook cluster information, the first codebook set information, and the first codebook information, the network device may use a downlink scheduling message to send the following information segments for a transport block of the terminal device, to indicate corresponding information:

for a transport block i, where i=1 or 2:

a codebook cluster indication information segment: L bits, used to indicate a codebook cluster used to send the transport block;

a codebook set indication information segment: $L_2$ bits, used to indicate a codebook set used to send the transport block;

a modulation and coding scheme and redundancy version information segment: five bits, used to indicate a size of the transport block, a modulation order, and a redundancy version number; and a new data indication information segment: one bit, used to indicate whether the transport block is retransmitted data or new data.

After the terminal device receives and decodes the downlink scheduling message, for each transport block, the terminal device may learn, according to the corresponding codebook cluster indication information segment, a codebook in which codebook cluster is used to send the transport block; learn, according to the corresponding codebook set indication information segment, a codebook in which codebook set in the codebook cluster is used to send the transport block; learn, according to the modulation and coding scheme and redundancy version information segment, a modulation order used to send the transport block; and determine, according to a correspondence between the modulation order and a codebook in the codebook set, the codebook corresponding to the modulation order, and send the transport block by using the codebook.

For an embodiment in which the codebook indication information includes the first feature matrix information, the first feature sequence information, and the second indication information, assuming that the network device uses a same modulation order to send different data streams to one or more user equipments by default, the network device may use a downlink scheduling message to send the following information segments for a transport block of the terminal device, to indicate corresponding information:

for a transport block i, where i=1 or 2;

a feature matrix indication information segment: $L_1$ bits, used to indicate a feature matrix used by the terminal device to receive the transport block;

a feature sequence indication information segment: $L_2$ bits, used to indicate a first feature sequence used by the terminal device to receive the transport block;

a modulation and coding scheme indication information segment: five bits, used to indicate a size of the transport block and a modulation order;

a new data indication information segment: one bit, used to indicate whether the transport block is retransmitted data or new data; and a redundancy version indication information segment: two bits, used to indicate a redundancy version number.

After the terminal device receives and decodes the downlink scheduling message, for each transport block, the terminal device may learn, according to the corresponding feature matrix indication information segment, a first feature matrix used to receive the transport block; learn, according to the modulation and coding scheme information segment, a modulation order used by the network device to send all transport blocks including the transport block of the terminal device; and determine, according to a one-to-one correspondence between a feature sequence and a codebook set and a one-to-one correspondence between a modulation order and a codebook set, codebooks respectively used by the network device to send all the transport blocks including the transport block of the terminal device, that is, a first codebook and one or more second codebooks. Further, the terminal device learns, according to the corresponding feature sequence indication information segment, a first feature sequence corresponding to the transport block of the terminal device, and learns the corresponding first codebook. In this way, the terminal device can correctly receive the transport block of the terminal device according to the first codebook and the one or more second codebooks.

In this embodiment of the present invention, optionally, the codebook is a sparse code multiple access (SCMA) codebook. Optionally, a quantity of zero-modulation symbols of a codeword included in the codebook is greater than or equal to a quantity of non-zero-modulation symbols.

It should be understood that, the foregoing describes only one possible specific application of this embodiment of the present invention in the LTE system, but the present invention is not limited thereto. In the LTE system using the non-orthogonal multiple access technology, the network device may alternatively send another information segment to indicate the codebook indication information.

It should be further understood that sequence numbers of the foregoing processes do not mean execution sequences in various embodiments of the present invention. The execution sequences of the processes should be determined according to functions and internal logic of the processes, and should not be construed as any limitation on the implementation processes of the embodiments of the present invention.

Therefore, according to the indication information transmission method in this embodiment of the present invention, a network device determines, in one or more codebooks, a first codebook used to send a first downlink data stream to a terminal device; determines one or more second codebooks used to send a second downlink data stream, where the second downlink data stream is one or more downlink data streams, other than the first downlink data stream, carried on a time-frequency resource used for the first downlink data stream; determines codebook indication information used to indicate the first codebook and the one or more second codebooks; and sends the codebook indication information to the terminal device, so that the terminal device can determine codebooks used for all data streams carried on the same time-frequency resource, and can decode, according to the codebooks, the first data stream sent by the network device to the terminal device. In this way, the network device and the terminal device can perform downlink data transmission based on the codebooks, and a network capacity of a system can be effectively improved.

The foregoing describes in detail an indication information transmission method according to an embodiment of the present invention with reference to FIG. 3 to FIG. 5 from a perspective of a network device. The following describes an indication information transmission method according to an embodiment of the present invention with reference to FIG. 6 to FIG. 8 from a perspective of a terminal device.

As shown in FIG. 6, an indication information transmission method 300 according to an embodiment of the present invention may be executed by, for example, a terminal device in a communications system. The terminal device is, for example, user equipment. As shown in FIG. 6, the method 300 includes the following steps:

S310: Receive codebook indication information sent by a network device, where the codebook indication information is used to indicate a first codebook used by the network device to send a first downlink data stream, and one or more second codebooks used by the network device to send a second downlink data stream, the second downlink data stream is one or more downlink data streams, other than the first downlink data stream, carried on a time-frequency resource used for the first downlink data stream, the codebook consists of two or more codewords, the codewords are multidimensional complex vectors, and are used to indicate mapping relationships between data and at least two modulation symbols, and the at least two modulation symbols include at least one zero-modulation symbol and at least one non-zero-modulation symbol.

S320: Determine the first codebook and the one or more second codebooks according to the codebook indication information.

S330: Decode, according to the first codebook and the one or more second codebooks, the first downlink data stream sent by the network device.

Specifically, in a non-orthogonal multiple access system such as an SCMA system, a network device allocates or specifies a codebook for one or more downlink data streams to be received by each terminal device. To correctly receive or decode a downlink data stream sent by the network device to the terminal device, the terminal device needs to learn a codebook used by the network device to send the downlink data stream, and one or more codebooks used by the network device to send another downlink data stream on a time-frequency resource used by the network device to send the downlink data stream.

Therefore, the network device may determine a first codebook and one or more second codebooks, and determine codebook indication information used to indicate the first codebook and the one or more second codebooks. The first codebook is a codebook used by the network device to send a first downlink data stream to a terminal device. The one or more second codebooks are one or more codebooks used by the network device to send a second downlink data stream to another terminal device. The second downlink data stream is one or more downlink data streams, other than the first downlink data stream, carried on a time-frequency resource used for the first downlink data stream. Moreover, the network device may send the codebook indication information to the terminal device. The codebook indication information is used to indicate the first codebook used by the terminal device to receive the first downlink data stream and the one or more second codebooks.

After receiving the codebook indication information sent by the network device, the terminal device may determine, according to the codebook indication information, the first codebook used by the network device to send the first downlink data stream and the one or more second codebooks used by the network device to send another downlink data stream on the same time-frequency resource used by the network device to send the downlink data stream. In this way, the terminal device can receive or decode, according to the first codebook and the one or more second codebooks, the first downlink data stream sent by the network device. Therefore, by means of information exchange between the network device and the terminal device, the terminal device can determine codebooks used for all data streams carried on the same time-frequency resource. In this way, the network device and the terminal device can perform downlink data transmission based on the codebooks, and a network capacity of the system can be effectively improved.

Therefore, according to the indication information transmission method in this embodiment of the present invention, a network device determines, in one or more codebooks, a first codebook used to send a first downlink data stream to a terminal device; determines one or more second codebooks used to send a second downlink data stream, where the second downlink data stream is one or more downlink data streams, other than the first downlink data stream, carried on a time-frequency resource used for the first downlink data stream; determines codebook indication information used to indicate the first codebook and the one or more second codebooks; and sends the codebook indication information to the terminal device, so that the terminal device can determine codebooks used for all data streams carried on the same time-frequency resource, and can decode, according to the codebooks, the first data stream sent by the network device to the terminal device. In this way, the network device and the terminal device can perform downlink data transmission based on the codebooks, and a network capacity of a system, including a quantity of users that can access the system, spectral efficiency, and the like, can be effectively improved.

In this embodiment of the present invention, according to a non-orthogonal multiple access technology, multiple different data streams are transmitted on a same resource unit by using codebooks, that is, multiple different data streams are multiplexed on a same resource unit. Different codebooks are used for different data streams. Therefore, resource utilization is improved. The data streams may be from a same terminal device or different terminal devices.

Therefore, according to the non-orthogonal multiple access technology, data in a data stream is directly mapped to a codeword, that is, a multidimensional complex vector, in a codebook according to a particular mapping relationship, so that the data is extended and sent on multiple resource units. The data may be binary bit data or multivariate data. The resource units may be time domain, frequency domain, space domain, time-frequency domain, time-space domain, or time-frequency-space domain resource units.

In this embodiment of the present invention, a codebook consists of two or more codewords, the codewords are multidimensional complex vectors, and are used to indicate mapping relationships between data and at least two modulation symbols, and the at least two modulation symbols include at least one zero-modulation symbol and at least one non-zero-modulation symbol. Each feature matrix consists of two or more feature sequences, each feature matrix corresponds to one or more codebooks, each feature sequence also corresponds to one or more codebooks, the feature sequence consists of a zero-element and a 1-element, the zero-element means that modulation symbols of all codewords in a corresponding codebook at a location corresponding to the zero-element are all zero-modulation symbols, and the 1-element means that modulation symbols of all codewords in a corresponding codebook at a location corresponding to the 1-element are not all zero-modulation symbols or are all non-zero-modulation symbols.

In this embodiment of the present invention, multiple codebooks may be divided into one or more codebook clusters, each codebook cluster may include one or more codebooks, and any two codebooks, for example, a codebook a and a codebook b, in a same codebook cluster has a feature as follows: A codeword in the codebook a and a codeword in the codebook b have a same total quantity of modulation symbols. Therefore, a codebook in a codebook cluster meets a condition that all codewords have a same total quantity of modulation symbols, that is, lengths of all codewords are the same, and quantities of resource units on which data streams are multiplexed are the same.

In this embodiment of the present invention, multiple codebooks may alternatively be divided into one or more codebook sets, each codebook set may include one or more codebooks, and any two codebooks, for example, a codebook c and a codebook d, in a same codebook set have features as follows: (1) A codeword in the codebook c and a codeword in the codebook d have a same total quantity of modulation symbols. (2) At a location at which modulation symbols of all codewords in the codebook c are all zero-modulation symbols, modulation symbols of all codewords in the codebook d are also all zero-modulation symbols.

In this embodiment of the present invention, each codebook cluster includes one or more codebook sets, each codebook set includes one or more codebooks, each codebook consists of two or more codewords, each codebook cluster meets a condition that codewords in a same codebook cluster have a same total quantity of modulation symbols, and each codebook set meets a condition that codewords in a same codebook set have a same total quantity of modulation symbols and for any two codebooks in a same codebook set, a location at which modulation symbols of all codewords in one codebook are zero-modulation symbols is the same as a location at which modulation symbols of all codewords in the other codebook are zero-modulation symbols.

It should be understood that, in the non-orthogonal multiple access system, a codebook may be directly stored. For example, the foregoing codebooks or codewords in the codebooks are directly stored, or only a modulation symbol at a location, in a codeword, at which a corresponding feature sequence element is a 1-element is stored, or the like. Therefore, when the embodiments of the present invention are applied, it is necessarily assumed that the network device and the terminal device in the non-orthogonal multiple access system both may store a part or all of the following pre-designed content:

(1) One or more feature matrices:

$$\begin{pmatrix} r_{1,1} & r_{1,2} & \cdots & r_{1,M} \\ r_{2,1} & r_{2,2} & \cdots & r_{2,M} \\ \vdots & \vdots & \cdots & \vdots \\ r_{N,1} & r_{N,2} & \cdots & r_{N,M} \end{pmatrix}_{N \times M}.$$

$1 \leq n \leq N$, $1 \leq m \leq M$, M and N are both positive integers greater than 1, M may represent a quantity of multiplexed data streams, and N may represent a quantity of resource units included in a coding unit, or may be understood as a codeword length.

(2) One or more feature sequences:

$$\begin{pmatrix} r_{1,m} \\ r_{2,m} \\ \vdots \\ r_{N,m} \end{pmatrix}, 0 \leq m \leq M.$$

$1 \leq m \leq M$.

(3) One or more codebooks:

$$\left\{ \begin{pmatrix} c_{1,1} \\ c_{2,1} \\ \vdots \\ c_{N,1} \end{pmatrix}, \begin{pmatrix} c_{1,2} \\ c_{2,2} \\ \vdots \\ c_{N,2} \end{pmatrix}, \cdots, \begin{pmatrix} c_{1,Q_m} \\ c_{2,Q_m} \\ \vdots \\ c_{N,Q_m} \end{pmatrix} \right\}.$$

$Q_m \geq 2$, $Q_m$ may represent a modulation order corresponding to the codebook, each codebook may correspond to one modulation order, and N is a positive integer greater than 1, may represent a quantity of resource units included in a coding unit, or may be understood as a codeword length.

The following describes in detail a method for determining the first codebook and the one or more second codebooks according to this embodiment of the present invention with reference to FIG. 7 and FIG. 8.

As shown in FIG. 7, in this embodiment of the present invention, optionally, the codebook indication information includes first codebook cluster information, first codebook set information, and first indication information, the first codebook cluster information is used to indicate a first codebook cluster, the first codebook set information is used to indicate a first codebook set in the first codebook cluster, the first indication information is used to indicate the first codebook in the first codebook set, and the first indication information is further used to indicate one or more second codebooks in the first codebook cluster and the one or more second codebooks in the one or more second codebook sets.

The determining the first codebook and the one or more second codebooks according to the codebook indication information includes the following step:

S321: Determine, according to the first codebook cluster information, the first codebook set information, and the first indication information, the first codebook in the first codebook set included in the first codebook cluster and the one or more second codebooks in the one or more second codebook sets included in the first codebook cluster, where each codebook cluster includes at least one codebook set, each codebook set includes at least one codebook, the codebook cluster meets a condition that codewords in a same codebook cluster have a same total quantity of modulation symbols, and the codebook set meets a condition that for any two codebooks in a same codebook set, a location at which modulation symbols of all codewords in one codebook are zero-modulation symbols is the same as a location at which modulation symbols of all codewords in the other codebook are zero-modulation symbols.

Specifically, in this embodiment of the present invention, the network device and the terminal device may store pre-designed codebooks. The codebooks may be divided into one or more codebook sets, each codebook set consists of one or more codebooks, each codebook corresponds to one modulation order, and any two codebooks, for example, a codebook a and a codebook b, in a same codebook set have features as follows: A codeword in the codebook a and a codeword in the codebook b have a same total quantity of modulation symbols. At a location at which modulation symbols of all codewords in the codebook a are all zero-modulation symbols, modulation symbols of all codewords in the codebook b are also all zero-modulation symbols. That is, the codebook set meets a condition that codewords in a same codebook set have a same total quantity of modulation symbols and for any two codebooks in a same codebook set, a location at which modulation symbols of all codewords in one codebook are zero-modulation symbols is the same as a location at which modulation symbols of all codewords in the other codebook are zero-modulation symbols.

The one or more codebook sets obtained through division in the foregoing manner may be further divided into one or more codebook clusters, each codebook cluster consists of one or more codebook sets, and any two codebook sets, for example, a codebook set A and a codebook set B, in a same codebook cluster has a feature as follows: A codeword in the codebook set A and a codeword in the codebook set B have a same total quantity of modulation symbols, that is, lengths of all codewords are the same, and quantities of resource units on which data streams are multiplexed are the same. That is, the codebook cluster meets a condition that codewords in a same codebook cluster have a same total quantity of modulation symbols.

In this embodiment of the present invention, the codebook indication information sent by the network device and received by the terminal device may include the first codebook cluster information, the first codebook set information, and the first indication information. For example, the codebook indication information may consist of three logical information segments. A logical information segment 1 may carry the first codebook cluster information, to indicate, to the terminal device, the first codebook cluster used to send the first downlink data stream and the second downlink data stream. A logical information segment 2 may carry the first codebook set information, to indicate, to the terminal device, the first codebook set used to send the first downlink data stream in the first codebook cluster. A logical information segment 3 may carry the first indication information. The first indication information is used to indicate the first codebook in the first codebook set, and the first indication information is further used to indicate the one or more second codebook sets in the first codebook cluster and the one or more second codebooks in the one or more second codebook sets.

It should be understood that, in this embodiment of the present invention, the logical information segments of the codebook indication information may be continuously or discontinuously carried in any order in an instruction in which the codebook indication information is located, which is not limited in this embodiment of the present invention.

After the terminal device receives the instruction or a message carrying the codebook indication information, for example, according to the logical information segment 1, the terminal device may learn the network device uses a codebook in which codebook cluster to send the first downlink data stream and the second downlink data stream. According to the logical information segment 2, the terminal device may learn the network device uses a codebook in which codebook set in the codebook cluster indicated by the logical information segment 1 to send the first downlink data stream. According to the logical information segment 3, the terminal device may learn the network device uses which codebook in the codebook set indicated by the logical information segment 2 to send the first downlink data stream. In addition, the terminal device may further learn the network device uses which codebook sets in the codebook cluster indicated by the logical information segment 1 and which codebooks in the codebook sets to send the second downlink data stream.

Therefore, by means of information exchange between a network device and a terminal device, the terminal device can determine codebooks used for all data streams carried on a same time-frequency resource. In this way, the network device and the terminal device can perform downlink data transmission based on the codebooks, and a network capacity of a system, including a quantity of users that can access the system, spectral efficiency, and the like, can be effectively improved.

In this embodiment of the present invention, the terminal device may receive the first codebook in the first codebook set, the one or more second codebook sets in the first codebook cluster, and the one or more second codebooks in the one or more second codebook sets that are indicated by the network device in multiple manners. The following provides separate descriptions.

Optionally, in this embodiment of the present invention, the first indication information includes: first codebook information, second codebook set information, and second codebook information, the first codebook information is used to indicate the first codebook in the first codebook set, the second codebook set information is used to indicate the one or more second codebook sets in the first codebook cluster, and the second codebook information is used to indicate the one or more second codebooks in the one or more second codebook sets.

Specifically, in this embodiment of the present invention, for example, the logical information segment 3 carrying the first indication information may further include three logical information subsegments: a logical information subsegment 1, a logical information subsegment 2, and a logical information subsegment 3. The logical information subsegment 1 may carry the first codebook information, to indicate the first codebook in the first codebook set. The logical information subsegment 2 may carry the second codebook set information, to indicate the one or more second codebook sets in the first codebook cluster. The logical information subsegment 3 may carry the second codebook information, to indicate the one or more second codebooks in the one or more second codebook sets.

In this embodiment of the present invention, when any two different codebooks in a codebook set correspond to different modulation orders, the logical information subsegment 1 and the logical information subsegment 3 may alternatively indicate modulation orders to indicate the codebooks used for the downlink data streams in the codebook sets. Accordingly, the terminal device may learn, according to the logical information subsegment 1 and the logical information subsegment 3, the modulation orders corresponding to the downlink data streams sent by the network device, and then can determine the codebooks in a one-to-one correspondence with the modulation orders in the codebook sets. That is, the first codebook information includes modulation order information of the first codebook, and each codebook in the first codebook set has a different modulation order; the second codebook information includes modulation order information of each second codebook, and each codebook in the one or more second codebook sets has a different modulation order.

It should be understood that, this embodiment of the present invention is described by using only an example in which the first indication information includes the first codebook information, the second codebook set information, and the second codebook information, but the present invention it not limited thereto. For example, when modulation orders of the first codebook and the one or more second codebooks used by the network device are the same, the first codebook information and the second codebook information may include only modulation order information of the codebooks. For another example, when the network device and the terminal device both use a same fixed modulation order by default, the first indication information may include only the second codebook set information. For still another example, when the first codebook and the one or more second codebooks used by the network device belong to a same codebook set, the first indication information may include only the first codebook information and the second codebook information. For still another example, when the network device and the terminal device both use codebooks having a same fixed number in codebook sets by default, the first indication information may include only the second codebook set information and information that is used to indicate the fixed number of the codebooks.

Therefore, by means of information exchange between a network device and a terminal device, the terminal device can determine codebooks used for all data streams carried on a same time-frequency resource. In this way, the network device and the terminal device can perform downlink data transmission based on the codebooks, and a network capacity of a system, including a quantity of users that can access the system, spectral efficiency, and the like, can be effectively improved.

Optionally, in this embodiment of the present invention, the first indication information includes M groups of bit string information in a one-to-one correspondence with all codebook sets in the first codebook cluster, each group of bit string information is used to indicate whether a corresponding codebook set belongs to the first codebook set or the one or more second codebook sets, when the codebook set corresponding to each group of bit string information belongs to the first codebook set or the one or more second codebook sets, each group of bit string information is further used to indicate the first codebook or the one or more second codebooks in the corresponding codebook set, and M is quantity of codebook sets included in the first codebook cluster.

In this embodiment of the present invention, when any two different codebooks in a codebook set correspond to different modulation orders, the logical information segment 3 may alternatively indicate modulation orders to indicate the codebooks used for the downlink data streams in the codebook sets. Accordingly, the terminal device may learn, according to the logical information segment 3, the modulation orders corresponding to the downlink data streams sent by the network device, and then can determine the codebooks in a one-to-one correspondence with the modulation orders in the codebook sets. That is, the first indication information includes modulation order information of the first codebook and the one or more second codebooks, and each codebook in each codebook set has a different modulation order.

That is, in this embodiment of the present invention, optionally, the first indication information includes modulation order information of the first codebook and the one or more second codebooks, and each codebook in each codebook set has a different modulation order.

It should be understood that, in this embodiment of the present invention, if the logical information segments indicate index values, consistent index relationships between related information, for example, an index relationship between a codebook cluster index value and a codebook cluster, an index relationship between a codebook set index value and a codebook set in each codebook cluster, and an index relationship between a codebook index value and a codebook in each codebook set, need to be pre-established on a network device side and a terminal device side, so that the network device and the terminal device can uniquely determine a corresponding codebook cluster, codebook set, and codebook from the pre-established related index relationships according to the index values indicated by the logical information segments.

It should be further understood that, in this embodiment of the present invention, the network device and the terminal device may pre-store a codebook by using multiple methods, but the following two conditions need to be met: First, the network device and the terminal device may learn, according to the stored codebook, a quantity of resource units or subcarriers or resource elements included in a coding unit. Second, the network device and the terminal device may learn, according to the stored codebook, the terminal device sends which non-zero-modulation symbols on which resource units or subcarriers or resource elements of a coding unit.

A simple and direct method that meets the foregoing storage conditions is to store a codebook in the foregoing form, including storing all zero-modulation symbols and non-zero-modulation symbols of codewords:

$$\left\{ \begin{pmatrix} c_{1,1} \\ c_{2,1} \\ \vdots \\ c_{N,1} \end{pmatrix}, \begin{pmatrix} c_{1,2} \\ c_{2,2} \\ \vdots \\ c_{N,2} \end{pmatrix}, \cdots, \begin{pmatrix} c_{1,Q_m} \\ c_{2,Q_m} \\ \vdots \\ c_{N,Q_m} \end{pmatrix} \right\}.$$

For example, when a modulation order is QPSK or 4-order modulation, a codebook used by a variable node 3 in FIG. 2 may be stored as follows:

$$\left\{ \begin{pmatrix} c_{1,1} \\ c_{2,1} \\ 0 \\ 0 \end{pmatrix}, \begin{pmatrix} c_{1,2} \\ c_{2,2} \\ 0 \\ 0 \end{pmatrix}, \begin{pmatrix} c_{1,3} \\ c_{2,3} \\ 0 \\ 0 \end{pmatrix}, \begin{pmatrix} c_{1,4} \\ c_{2,4} \\ 0 \\ 0 \end{pmatrix} \right\}.$$

After the codebook is stored in the foregoing manner, a total quantity of zero-modulation symbols and non-zero-modulation symbols in a codeword is a quantity of resource units or subcarriers or resource elements included in a coding unit, and a location and value of a non-zero-modulation symbol indicate that the terminal device sends a non-zero-modulation symbol having the corresponding value on a resource unit or subcarrier or resource element at the corresponding location of a coding unit. For example, when the codebook for the variable node 3 in FIG. 2 is used, the terminal device sends a modulation symbol $c_{1,q}$ on the first resource unit or subcarrier or resource element of a coding unit, the terminal device sends a modulation symbol $c_{2,q}$ on the second resource unit or subcarrier or resource element, and the terminal device sends zero-modulation symbols on the third and fourth resource units or subcarriers or resource elements. $c_{n,q}=\alpha^*\exp(j^*\beta)$, $1 \le n \le 2$, $1 \le q \le 4$, $\alpha$ and $\beta$ may be any real number, and for any q, $1 \le q \le 4$, $c_{1,q}$ and $c_{2,q}$ are not zero at the same time, and there are at least q1 and q2 that meet a condition that $c_{1,q_1} \ne 0$ and $c_{2,q_2} \ne 0$, $1 \le q1 \le 4$ and $1 \le q2 \le 4$.

It should be further understood that, this embodiment of the present invention is described by using only the foregoing solution as an example, but the present invention is not limited thereto. Based on this embodiment of the present invention, another method may be used to indicate the first codebook in the first codebook set, the one or more second codebook sets, and the one or more second codebooks. In addition, based on this embodiment of the present invention, another method may be used to indicate the first codebook and the one or more second codebooks.

Therefore, according to the indication information transmission method in this embodiment of the present invention, a network device determines, in one or more codebooks, a first codebook used to send a first downlink data stream to a terminal device; determines one or more second codebooks used to send a second downlink data stream, where the second downlink data stream is one or more downlink data streams, other than the first downlink data stream, carried on a time-frequency resource used for the first downlink data stream; determines codebook indication information used to indicate the first codebook and the one or more second codebooks; and sends the codebook indication information to the terminal device, so that the terminal device can determine codebooks used for all data streams carried on the same time-frequency resource, and can decode, according to the codebooks, the first data stream sent by the network device to the terminal device. In this way, the network device and the terminal device can perform downlink data transmission based on the codebooks, and a network capacity of a system, including a quantity of users that can access the system, spectral efficiency, and the like, can be effectively improved.

It should be understood that, in this embodiment of the present invention, because a correspondence exists between a feature sequence or feature matrix and a codebook, the feature sequence or feature matrix may be used to indicate a codebook set or codebook cluster including one or more codebooks. Therefore, in this embodiment of the present invention, the codebook indication information sent to the terminal device may alternatively be determined by using a feature sequence or feature matrix. The following describes, in detail with reference to FIG. 8, a method for determining the codebook indication information by using a feature sequence or feature matrix.

As shown in FIG. 8, in this embodiment of the present invention, optionally, the codebook indication information includes first feature matrix information, first feature sequence information, and second indication information, the first feature matrix information is used to indicate a first feature matrix, the first feature sequence information is used to indicate a first feature sequence in the first feature matrix, the second indication information is used to indicate the first codebook in one or more codebooks corresponding to the first feature sequence, and the second indication information is further used to indicate one or more second feature sequences in the first feature matrix, and the one or more second codebooks in one or more codebooks corresponding to the one or more second feature sequences.

The determining the first codebook and the one or more second codebooks according to the codebook indication information includes the following step:

S322: Determine, according to the first feature matrix information, the first feature sequence information, and the second indication information, the first codebook in the one or more codebooks corresponding to the first feature sequence included in the first feature matrix, and the one or more second codebooks in the one or more codebooks corresponding to the one or more second feature sequences included in the first feature matrix, where each feature matrix consists of two or more feature sequences, each feature sequence corresponds to one or more codebooks, the feature sequence consists of a zero-element and a 1-element, the zero-element means that modulation symbols of all codewords in a corresponding codebook at a location corresponding to the zero-element are all zero-modulation symbols, and the 1-element means that modulation symbols of all codewords in a corresponding codebook at a location corresponding to the 1-element are not all zero-modulation symbols or are all non-zero-modulation symbols.

Specifically, in this embodiment of the present invention, the network device and the terminal device may store pre-designed codebooks. The codebooks may be divided into one or more codebook sets, each codebook set consists of one or more codebooks, each codebook corresponds to one modulation order, and any two codebooks, for example, a codebook a and a codebook b, in a same codebook set have features as follows: A codeword in the codebook a and a codeword in the codebook b have a same total quantity of modulation symbols. At a location at which modulation symbols of all codewords in the codebook a are all zero-modulation symbols, modulation symbols of all codewords in the codebook b are also all zero-modulation symbols. That is, the codebook set meets a condition that codewords in a same codebook set have a same total quantity of modulation symbols and for any two codebooks in a same codebook set, a location at which modulation symbols of all codewords in one codebook are zero-modulation symbols is the same as a location at which modulation symbols of all codewords in the other codebook are zero-modulation symbols.

After the codebook set is obtained through division in the foregoing manner, as described above, each codebook set is in a one-to-one correspondence with a feature sequence of a feature matrix. The correspondence is determined in the following manner: If a codebook in a codebook set corresponds to a feature sequence of a feature matrix, that is, the foregoing two conditions are met, the codebook set to which the codebook belongs is in a one-to-one correspondence with the feature sequence of the feature matrix. That is, a correspondence between a feature sequence and a codebook may be determined by the following two conditions:

(1) A total quantity of modulation symbols of codewords in the codebook is the same as a total quantity of elements in the corresponding feature sequence.

(2) For any 1-element in the feature sequence, at least one codeword may be found in the corresponding codebook, so that a modulation symbol of the codeword at a location of the 1-element is not a zero-modulation symbol. For any zero-element in the feature sequence, modulation symbols of all codewords in the corresponding codebook at a location corresponding to the zero-element are all zero-modulation symbols.

Therefore, in this embodiment of the present invention, the network device and the terminal device may store a pre-designed feature matrix corresponding to a codebook cluster and a pre-designed feature sequence corresponding to a codebook set.

In this embodiment of the present invention, the codebook indication information sent by the network device, received by the terminal device, and used to indicate the first codebook and the one or more second codebooks includes the first feature matrix information, the first feature sequence information, and the second indication information. For example, the codebook indication information may consist of three logical information segments. A logical information segment 1 may carry the first feature matrix information, to indicate, to the terminal device, the first feature matrix used to send the first downlink data stream and the second downlink data stream. A logical information segment 2 may carry the first feature sequence information, to indicate, to the terminal device, the first feature sequence used to send the first downlink data stream in the first feature matrix. A logical information segment 3 may carry the second indication information. The second indication information is used to indicate the first codebook in the one or more codebooks corresponding to the first feature sequence, and the second indication information is further used to indicate the one or more second feature sequences in the first feature matrix, and the one or more second codebooks in the one or more codebooks corresponding to the one or more second feature sequences.

It should be understood that, in this embodiment of the present invention, the logical information segments of the codebook indication information may be continuously or discontinuously carried in any order in an instruction in which the codebook indication information is located, which is not limited in this embodiment of the present invention.

After the terminal device receives the instruction or a message carrying the codebook indication information, for example, according to the logical information segment 1, the terminal device may learn the network device uses a codebook in one or more codebooks corresponding to which feature matrix to send the first downlink data stream and the second downlink data stream. That is, because a codebook cluster including one or more codebooks is in a one-to-one correspondence with a feature matrix, the terminal device may learn, according to the one-to-one correspondence, the network device uses a codebook in which codebook cluster to send the first downlink data stream and the second downlink data stream. According to the logical information segment 2, the terminal device may learn the network device uses a codebook in one or more codebooks corresponding to which feature sequence in the feature matrix indicated by the logical information segment 1 to send the first downlink data stream. That is, because a codebook set including one or more codebooks is in a one-to-one correspondence with a feature sequence, the terminal device may learn, according to the one-to-one correspondence by using the feature sequence indicated by the logical information segment 2, the network device uses a codebook in which codebook set to send the first downlink data stream. Further, similarly, according to the logical information segment 3, the terminal device may learn the network device uses which codebook in the one or more codebooks corresponding to the feature sequence indicated by the logical information segment 2 to send the first downlink data stream. In addition, the terminal device may further learn the network device uses which feature sequences in the feature matrix indicated by the logical information segment 1 and which codebooks in one or more codebooks corresponding to the feature sequences to send the second downlink data stream.

Therefore, by means of information exchange between a network device and a terminal device, the terminal device can determine codebooks used for all data streams carried on a same time-frequency resource. In this way, the network device and the terminal device can perform downlink data transmission based on the codebooks, and a network capacity of a system, including a quantity of users that can access the system, spectral efficiency, and the like, can be effectively improved.

In this embodiment of the present invention, the terminal device may receive the first codebook in the first codebook set, the one or more second codebook sets in the first codebook cluster, and the one or more second codebooks in the one or more second codebook sets that are indicated by the network device in multiple manners. The following provides separate descriptions.

Optionally, in this embodiment of the present invention, the second indication information includes: third codebook information, second feature sequence information, and fourth codebook information, the third codebook information is used to indicate the first codebook in the one or more codebooks corresponding to the first feature sequence, the second feature sequence information is used to indicate the one or more second feature sequences in the first feature matrix, and the fourth codebook information is used to indicate the one or more second codebooks in the one or more codebooks corresponding to the one or more second feature sequences.

Specifically, in this embodiment of the present invention, for example, the logical information segment 3 carrying the second indication information may further include three logical information subsegments: a logical information subsegment 1, a logical information subsegment 2, and a logical information subsegment 3. The logical information subsegment 1 may carry the third codebook information, to indicate the first codebook in the one or more codebooks corresponding to the first feature sequence. The logical information subsegment 2 may carry the second feature sequence information, to indicate the one or more second feature sequences in the first feature matrix. The logical information subsegment 3 may carry the fourth codebook information, to indicate the one or more second codebooks in the one or more codebooks corresponding to the one or more second feature sequences.

In this embodiment of the present invention, when any two different codebooks in the one or more codebooks corresponding to each feature sequence correspond to different modulation orders, the logical information subsegment 1 and the logical information subsegment 3 may alternatively indicate modulation orders to indicate the codebooks used for the downlink data streams in the one or more codebooks corresponding to the feature sequences. Accordingly, the terminal device may learn, according to the logical information subsegment 1 and the logical information subsegment 3, the modulation orders corresponding to the downlink data streams sent by the network device, and then can determine the codebooks in a one-to-one correspondence with the modulation orders in the one or more codebooks corresponding to the feature sequences.

That is, in this embodiment of the present invention, the third codebook information includes modulation order information of the first codebook, and each of the one or more codebooks corresponding to the first feature sequence has a different modulation order; the fourth codebook information includes modulation order information of each second codebook, and each of one or more codebooks corresponding to each second feature sequence has a different modulation order.

It should be understood that, this embodiment of the present invention is described by using only an example in which the second indication information includes the third codebook information, the second feature sequence information, and the fourth codebook information, but the present invention it not limited thereto. For example, when modulation orders of the first codebook and the one or more second codebooks used by the network device are the same, the third codebook information and the fourth codebook information may include only modulation order information of the codebooks. For another example, when the network device and the terminal device both use a same fixed modulation order by default, the second indication information may include only the second feature sequence information. For still another example, when the first codebook and the one or more second codebooks used by the network device correspond to a same feature sequence, the first indication information may include only the third codebook information and the fourth codebook information.

Therefore, by means of information exchange between a network device and a terminal device, the terminal device can determine codebooks used for all data streams carried on a same time-frequency resource. In this way, the network device and the terminal device can perform downlink data transmission based on the codebooks, and a network capacity of a system, including a quantity of users that can access the system, spectral efficiency, and the like, can be effectively improved.

Optionally, in this embodiment of the present invention, the second indication information includes M groups of bit string information in a one-to-one correspondence with all feature sequences in the first feature matrix, each group of bit string information is used to indicate whether a corresponding feature sequence belongs to the first feature sequence or the one or more second feature sequences, when the feature sequence corresponding to each group of bit string information belongs to the first feature sequence or the one or more second feature sequences, each group of bit string information is further used to indicate the first codebook or the one or more second codebooks in one or more codebooks corresponding to the corresponding feature sequence, and M is quantity of feature sequences included in the first feature matrix.

In this embodiment of the present invention, when any two different codebooks in the one or more codebooks corresponding to each feature sequence correspond to different modulation orders, the logical information segment 3 may alternatively indicate modulation orders to indicate the codebooks used for the downlink data streams. Accordingly, the terminal device may learn, according to the logical information segment 3, the modulation orders corresponding to the downlink data streams sent by the network device, and then can determine the codebooks in a one-to-one correspondence with the modulation orders in the one or more codebooks corresponding to the feature sequences. That is, the second indication information includes modulation order information of the first codebook and the one or more second codebooks, and each of the one or more codebooks corresponding to each feature sequence has a different modulation order.

In this embodiment of the present invention, optionally, the second indication information includes modulation order information of the first codebook and the one or more second codebooks, and each of the one or more codebooks corresponding to each feature sequence has a different modulation order.

It should be understood that, in this embodiment of the present invention, if the logical information segments indicate index values, consistent index relationships between related information, for example, an index relationship between a feature matrix index value and a feature matrix, an index relationship between a feature sequence index value and a feature sequence in each feature matrix, and an index relationship between a codebook index value and a codebook in one or more codebooks, need to be pre-established on a network device side and a terminal device side, so that the network device and the terminal device can uniquely determine a corresponding feature matrix, feature sequence, and codebook from the pre-established related index relationships according to the index values indicated by the logical information segments.

It should be further understood that, in this embodiment of the present invention, the network device and the terminal device may pre-store a feature matrix and a codebook by using multiple methods, but the following two conditions need to be met: First, the network device and the terminal device may learn, according to the stored feature matrix and codebook, a quantity of resource units or subcarriers or resource elements included in a coding unit. Second, the network device and the terminal device may learn, according to the stored feature matrix and codebook, the terminal device sends which non-zero-modulation symbols on which resource units or subcarriers or resource elements of a coding unit.

A simple and direct method that meets the foregoing storage conditions is as follows:

(1) Store the feature matrix in the foregoing form:

$$\begin{pmatrix} r_{1,1} & r_{1,2} & \cdots & r_{1,M} \\ r_{2,1} & r_{2,2} & \cdots & r_{2,M} \\ \vdots & \vdots & \cdots & \vdots \\ r_{N,1} & r_{N,2} & \cdots & r_{N,M} \end{pmatrix}.$$

For example, for the example shown in FIG. 2, a corresponding feature matrix may be expressed as follows:

$$\begin{pmatrix} 0 & 1 & 1 & 0 & 1 & 0 \\ 1 & 0 & 1 & 0 & 0 & 1 \\ 0 & 1 & 0 & 1 & 0 & 1 \\ 1 & 0 & 0 & 1 & 1 & 0 \end{pmatrix}.$$

(2) Store modulation symbols of corresponding codewords in an order of 1-elements in the foregoing feature sequence. For example, when a modulation order is QPSK or 4-order modulation, the codebook used by the variable node 3 in FIG. 2 may be stored as follows:

$$\left\{ \begin{pmatrix} c_{1,1} \\ c_{2,1} \end{pmatrix}, \begin{pmatrix} c_{1,2} \\ c_{2,2} \end{pmatrix}, \begin{pmatrix} c_{1,3} \\ c_{2,3} \end{pmatrix}, \begin{pmatrix} c_{1,4} \\ c_{2,4} \end{pmatrix} \right\}.$$

After the feature matrix and codebook are stored in the foregoing manner, the network device and the terminal device may learn, according to the feature matrix, a quantity of resource units or subcarriers or resource elements included in a coding unit, that is, a quantity of rows of the feature matrix; and learn, according to a feature sequence in the feature matrix and a codebook in one or more codebooks corresponding to the feature sequence, the terminal device sends a zero-modulation symbol and a non-zero-modulation symbol on which resource units or subcarriers or resource elements of a coding unit when using the feature sequence. For example, when the codebook for the variable node 3 in FIG. 2 is used, the terminal device sends a modulation symbol $c_{1,q}$ on the first resource unit or subcarrier or resource element of a coding unit, the terminal device sends a modulation symbol $c_{2,q}$ on the second resource unit or subcarrier or resource element, and the terminal device sends zero-modulation symbols on the third and fourth resource units or subcarriers or resource elements. $c_{n,q} = \alpha * \exp(j*\beta)$, $1 \le n \le 2$, $1 \le q \le 4$, $\alpha$ and $\beta$ may be any real number, and for any q, $1 \le q \le 4$, $c_{1,q}$ and $c_{2,q}$ are not zero at the same time, and there are at least q1 and q2 that meet a condition that $c_{1,q_1} \ne 0$ and $c_{2,q_2} \ne 0$, $1 \le q1 \le 4$ and $1 \le q2 \le 4$.

It should be further understood that, this embodiment of the present invention is described by using only the foregoing solution as an example, but the present invention is not limited thereto. Based on this embodiment of the present invention, another method may be used to indicate the first codebook in the one or more codebooks corresponding to the first feature sequence, the one or more second feature sequences, and the one or more second codebooks. In addition, based on this embodiment of the present invention, another method may be used to indicate the first codebook and the one or more second codebooks.

Therefore, according to the indication information transmission method in this embodiment of the present invention, a network device determines, in one or more codebooks, a first codebook used to send a first downlink data stream to a terminal device; determines one or more second codebooks used to send a second downlink data stream, where the second downlink data stream is one or more downlink data streams, other than the first downlink data stream, carried on a time-frequency resource used for the first downlink data stream; determines codebook indication information used to indicate the first codebook and the one or more second codebooks; and sends the codebook indication information to the terminal device, so that the terminal device can determine codebooks used for all data streams carried on the same time-frequency resource, and can decode, according to the codebooks, the first data stream sent by the network device to the terminal device. In this way, the network device and the terminal device can perform downlink data transmission based on the codebooks, and a network capacity of a system, including a quantity of users that can access the system, spectral efficiency, and the like, can be effectively improved.

Optionally, in this embodiment of the present invention, the receiving the codebook indication information sent by the network device includes: receiving a downlink scheduling message, dedicated higher layer control signaling, or a system broadcast message that is sent by the network device, where the downlink scheduling message, the dedicated higher layer control signaling, and the system broadcast message include the codebook indication information.

Optionally, in this embodiment of the present invention, the dedicated higher layer control signaling includes a radio resource control (RRC) connection establishment message and an RRC connection reconfiguration message.

In this embodiment of the present invention, the terminal device may receive the codebook indication information that is sent by the network device by using at least one of a bit string or a table. Optionally, the codebook indication information is bit string information.

In this embodiment of the present invention, optionally, the codebook is a sparse code multiple access (SCMA) codebook. Further, optionally, a quantity of zero-modulation symbols of a codeword included in the codebook is greater than or equal to a quantity of non-zero-modulation symbols.

It should be understood that, exchange between a network device and a terminal device, related features and functions, and the like described from a network device side correspond to related features and functions described from a terminal device side. For brevity, details are not described again herein.

It should be further understood that sequence numbers of the foregoing processes do not mean execution sequences in various embodiments of the present invention. The execution sequences of the processes should be determined according to functions and internal logic of the processes, and should not be construed as any limitation on the implementation processes of the embodiments of the present invention.

Therefore, according to the indication information transmission method in this embodiment of the present invention, a network device determines, in one or more codebooks, a first codebook used to send a first downlink data stream to a terminal device; determines one or more second codebooks used to send a second downlink data stream, where the second downlink data stream is one or more downlink data streams, other than the first downlink data stream, carried on a time-frequency resource used for the first downlink data stream; determines codebook indication information used to indicate the first codebook and the one or more second codebooks; and sends the codebook indication information to the terminal device, so that the terminal device can determine codebooks used for all data streams carried on the same time-frequency resource, and can decode, according to the codebooks, the first data stream sent by the network device to the terminal device. In this way, the network device and the terminal device can perform downlink data transmission based on the codebooks, and a network capacity of a system can be effectively improved.

The foregoing describes in detail an indication information transmission method according to an embodiment of the present invention with reference to FIG. 3 to FIG. 8. The following describes an indication information transmission apparatus according to an embodiment of the present invention with reference to FIG. 9 to FIG. 15.

FIG. 9 shows an indication information transmission apparatus 500 according to an embodiment of the present invention information. As shown in FIG. 9, the apparatus 500 includes:

a first determining module 510, configured to determine, in one or more codebooks, a first codebook used to send a first downlink data stream to a terminal device, where the codebook consists of two or more codewords, the codewords are multidimensional complex vectors, and are used to indicate mapping relationships between data and at least two modulation symbols, and the at least two modulation symbols include at least one zero-modulation symbol and at least one non-zero-modulation symbol;

a second determining module 520, configured to determine one or more second codebooks used to send a second downlink data stream, where the second downlink data stream is one or more downlink data streams, other than the first downlink data stream, carried on a time-frequency resource used for the first downlink data stream;

a third determining module 530, configured to determine codebook indication information used to indicate the first codebook determined by the first determining module 510 and the one or more second codebooks determined by the second determining module 520; and a sending module 540, configured to send the codebook indication information determined by the third determining module 530 to the terminal device.

Therefore, according to the indication information transmission apparatus in this embodiment of the present invention, a network device determines, in one or more codebooks, a first codebook used to send a first downlink data stream to a terminal device; determines one or more second codebooks used to send a second downlink data stream, where the second downlink data stream is one or more downlink data streams, other than the first downlink data stream, carried on a time-frequency resource used for the first downlink data stream; determines codebook indication information used to indicate the first codebook and the one or more second codebooks; and sends the codebook indication information to the terminal device, so that the terminal device can determine codebooks used for all data streams carried on the same time-frequency resource, and can decode, according to the codebooks, the first data stream sent by the network device to the terminal device. In this way, the network device and the terminal device can perform downlink data transmission based on the codebooks, and a network capacity of a system can be effectively improved.

Figure 10:
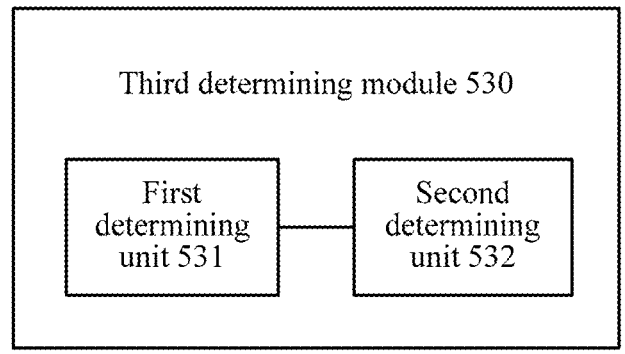
FIG. 10 is a schematic block diagram of a third determining module of an apparatus according to an embodiment of the present invention.

In this embodiment of the present invention, optionally, as shown in FIG. 10, the third determining module 530 includes:

a first determining unit 531, configured to determine a first codebook set to which the first codebook belongs, one or more second codebook sets to which the one or more second codebooks belong, and a first codebook cluster to which the first codebook set and the one or more second codebook sets belong, where each codebook cluster includes at least one codebook set, each codebook set includes at least one codebook, the codebook cluster meets a condition that codewords in a same codebook cluster have a same total quantity of modulation symbols, and the codebook set meets a condition that for any two codebooks in a same codebook set, a location at which modulation symbols of all codewords in one codebook are zero-modulation symbols is the same as a location at which modulation symbols of all codewords in the other codebook are zero-modulation symbols; and a second determining unit 532, configured to determine the codebook indication information, where the codebook indication information includes first codebook cluster information, first codebook set information, and first indication information, the first codebook cluster information is used to indicate the first codebook cluster, the first codebook set information is used to indicate the first codebook set in the first codebook cluster, the first indication information is used to indicate the first codebook in the first codebook set, and the first indication information is further used to indicate the one or more second codebook sets in the first codebook cluster and the one or more second codebooks in the one or more second codebook sets.

In this embodiment of the present invention, optionally, the first indication information determined by the second determining unit 532 includes: first codebook information, second codebook set information, and second codebook information, the first codebook information is used to indicate the first codebook in the first codebook set, the second codebook set information is used to indicate the one or more second codebook sets in the first codebook cluster, and the second codebook information is used to indicate the one or more second codebooks in the one or more second codebook sets.

In this embodiment of the present invention, optionally, the first indication information determined by the second determining unit 532 includes M groups of bit string information in a one-to-one correspondence with all codebook sets in the first codebook cluster, each group of bit string information is used to indicate whether a corresponding codebook set belongs to the first codebook set or the one or more second codebook sets, when the codebook set corresponding to each group of bit string information belongs to the first codebook set or the one or more second codebook sets, each group of bit string information is further used to indicate the first codebook or the one or more second codebooks in the corresponding codebook set, and M is quantity of codebook sets included in the first codebook cluster.

In this embodiment of the present invention, optionally, the first indication information determined by the second determining unit 532 includes modulation order information of the first codebook and the one or more second codebooks, and each codebook in each codebook set has a different modulation order.

Figure 11:
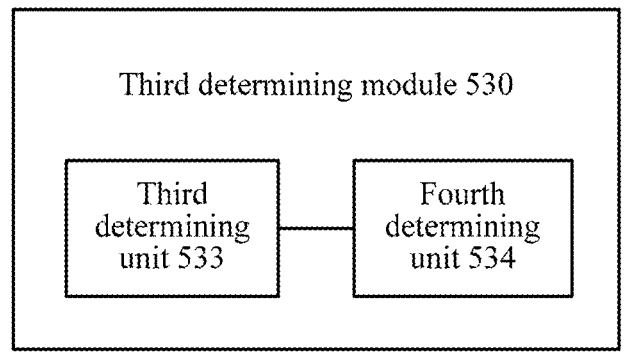
FIG. 11 is another schematic block diagram of a third determining module of an apparatus according to an embodiment of the present invention.

As shown in FIG. 11, in this embodiment of the present invention, optionally, the third determining module 530 includes:

a third determining unit 533, configured to determine a first feature sequence to which the first codebook belongs, one or more second feature sequences to which the one or more second codebooks belong, and a first feature matrix to which the first feature sequence and the one or more second feature sequences belong, where each feature matrix consists of two or more feature sequences, each feature sequence corresponds to one or more codebooks, the feature sequence consists of a zero-element and a 1-element, the zero-element means that modulation symbols of all codewords in a corresponding codebook at a location corresponding to the zero-element are all zero-modulation symbols, and the 1-element means that modulation symbols of all codewords in a corresponding codebook at a location corresponding to the 1-element are not all zero-modulation symbols or are all non-zero-modulation symbols; and a fourth determining unit 534, configured to determine the codebook indication information, where the codebook indication information includes first feature matrix information, first feature sequence information, and second indication information, the first feature matrix information is used to indicate the first feature matrix, the first feature sequence information is used to indicate the first feature sequence in the first feature matrix, the second indication information is used to indicate the first codebook in one or more codebooks corresponding to the first feature sequence, and the second indication information is further used to indicate the one or more second feature sequences in the first feature matrix, and the one or more second codebooks in one or more codebooks corresponding to the one or more second feature sequences.

In this embodiment of the present invention, optionally, the second indication information determined by the fourth determining unit 534 includes: third codebook information, second feature sequence information, and fourth codebook information, the third codebook information is used to indicate the first codebook in the one or more codebooks corresponding to the first feature sequence, the second feature sequence information is used to indicate the one or more second feature sequences in the first feature matrix, and the fourth codebook information is used to indicate the one or more second codebooks in the one or more codebooks corresponding to the one or more second feature sequences.

In this embodiment of the present invention, optionally, the second indication information determined by the fourth determining unit 534 includes M groups of bit string information in a one-to-one correspondence with all feature sequences in the first feature matrix, each group of bit string information is used to indicate whether a corresponding feature sequence belongs to the first feature sequence or the one or more second feature sequences, when the feature sequence corresponding to each group of bit string information belongs to the first feature sequence or the one or more second feature sequences, each group of bit string information is further used to indicate the first codebook or the one or more second codebooks in one or more codebooks corresponding to the corresponding feature sequence, and M is quantity of feature sequences included in the first feature matrix.

In this embodiment of the present invention, optionally, the second indication information determined by the fourth determining unit 534 includes modulation order information of the first codebook and the one or more second codebooks, and each of the one or more codebooks corresponding to each feature sequence has a different modulation order.

Optionally, in this embodiment of the present invention, the sending module 540 is specifically configured to send a downlink scheduling message, dedicated higher layer control signaling, or a system broadcast message to the terminal device, where the downlink scheduling message, the dedicated higher layer control signaling, and the system broadcast message include the codebook indication information.

Optionally, in this embodiment of the present invention, the dedicated higher layer control signaling includes a radio resource control RRC connection establishment message and an RRC connection reconfiguration message.

In this embodiment of the present invention, optionally, the codebook indication information determined by the third determining module 530 is bit string information.

In this embodiment of the present invention, optionally, the codebook is a sparse code multiple access SCMA codebook.

In this embodiment of the present invention, optionally, a quantity of zero-modulation symbols of a codeword included in the codebook is greater than or equal to a quantity of non-zero-modulation symbols.

In this embodiment of the present invention, optionally, the apparatus 500 is a network device.

It should be understood that the apparatus 500 according to this embodiment of the present invention may correspond to the network device in the method embodiment of the present invention, and the foregoing and other operations and/or functions of the modules in the apparatus 500 are separately used to implement corresponding procedures in the methods 200 in FIG. 3 to FIG. 5, and are not described in detail herein for brevity.

Therefore, according to the indication information transmission apparatus in this embodiment of the present invention, a network device determines, in one or more codebooks, a first codebook used to send a first downlink data stream to a terminal device; determines one or more second codebooks used to send a second downlink data stream, where the second downlink data stream is one or more downlink data streams, other than the first downlink data stream, carried on a time-frequency resource used for the first downlink data stream; determines codebook indication information used to indicate the first codebook and the one or more second codebooks; and sends the codebook indication information to the terminal device, so that the terminal device can determine codebooks used for all data streams carried on the same time-frequency resource, and can decode, according to the codebooks, the first data stream sent by the network device to the terminal device. In this way, the network device and the terminal device can perform downlink data transmission based on the codebooks, and a network capacity of a system can be effectively improved.

The foregoing describes in detail an indication information transmission apparatus according to an embodiment of the present invention with reference to FIG. 9 to FIG. 11 from a network device side. The following describes in detail an indication information transmission apparatus according to an embodiment of the present invention with reference to FIG. 12 and FIG. 13 from a terminal device side.

Figure 12:
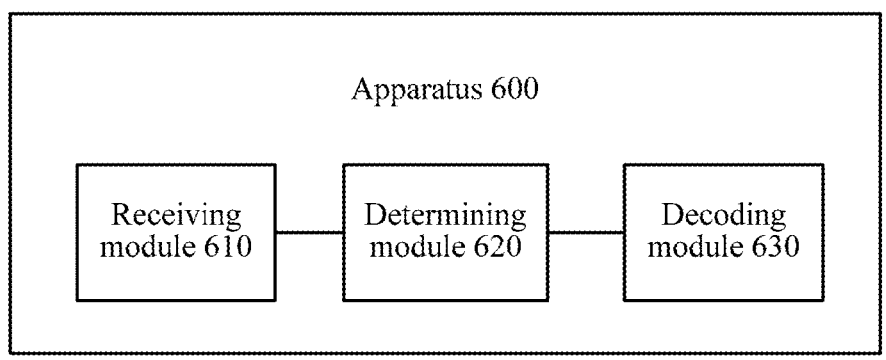
FIG. 12 is a schematic block diagram of an indication information transmission apparatus according to another embodiment of the present invention.

FIG. 12 shows an indication information transmission apparatus 600 according to an embodiment of the present invention information. As shown in FIG. 12, the apparatus 600 includes:

a receiving module 610, configured to receive codebook indication information sent by a network device, where the codebook indication information is used to indicate a first codebook used by the network device to send a first downlink data stream, and one or more second codebooks used by the network device to send a second downlink data stream, the second downlink data stream is one or more downlink data streams, other than the first downlink data stream, carried on a time-frequency resource used for the first downlink data stream, the codebook consists of two or more codewords, the codewords are multidimensional complex vectors, and are used to indicate mapping relationships between data and at least two modulation symbols, and the at least two modulation symbols include at least one zero-modulation symbol and at least one non-zero-modulation symbol;

a determining module 620, configured to determine the first codebook and the one or more second codebooks according to the codebook indication information received by the receiving module 610; and a decoding module 630, configured to decode, according to the first codebook and the one or more second codebooks that are determined by the determining module 620, the first downlink data stream sent by the network device.

Therefore, according to the indication information transmission apparatus in this embodiment of the present invention, a network device determines, in one or more codebooks, a first codebook used to send a first downlink data stream to a terminal device; determines one or more second codebooks used to send a second downlink data stream, where the second downlink data stream is one or more downlink data streams, other than the first downlink data stream, carried on a time-frequency resource used for the first downlink data stream; determines codebook indication information used to indicate the first codebook and the one or more second codebooks; and sends the codebook indication information to the terminal device, so that the terminal device can determine codebooks used for all data streams carried on the same time-frequency resource, and can decode, according to the codebooks, the first data stream sent by the network device to the terminal device. In this way, the network device and the terminal device can perform downlink data transmission based on the codebooks, and a network capacity of a system can be effectively improved.

Figure 13:
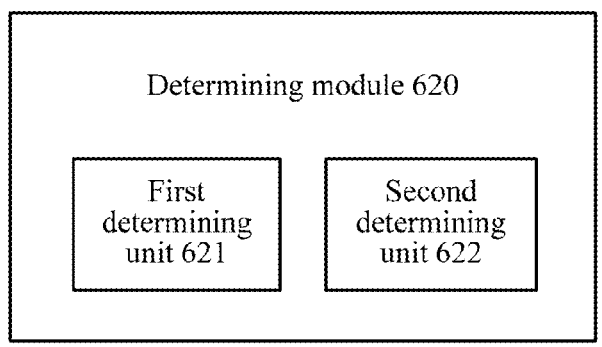
FIG. 13 is schematic block diagram of a determining module of an apparatus according to another embodiment of the present invention.

In this embodiment of the present invention, optionally, as shown in FIG. 13, the codebook indication information received by the receiving module 610 includes first codebook cluster information, first codebook set information, and first indication information, the first codebook cluster information is used to indicate a first codebook cluster, the first codebook set information is used to indicate a first codebook set in the first codebook cluster, the first indication information is used to indicate the first codebook in the first codebook set, and the first indication information is further used to indicate one or more second codebook sets in the first codebook cluster and the one or more second codebooks in the one or more second codebook sets; and the determining module 620 includes: a first determining unit 621, configured to determine, according to the first codebook cluster information, the first codebook set information, and the first indication information, the first codebook in the first codebook set included in the first codebook cluster and the one or more second codebooks in the one or more second codebook sets included in the first codebook cluster, where each codebook cluster includes at least one codebook set, each codebook set includes at least one codebook, the codebook cluster meets a condition that codewords in a same codebook cluster have a same total quantity of modulation symbols, and the codebook set meets a condition that for any two codebooks in a same codebook set, a location at which modulation symbols of all codewords in one codebook are zero-modulation symbols is the same as a location at which modulation symbols of all codewords in the other codebook are zero-modulation symbols.

Optionally, in this embodiment of the present invention, the first indication information received by the receiving module 610 includes: first codebook information, second codebook set information, and second codebook information, the first codebook information is used to indicate the first codebook in the first codebook set, the second codebook set information is used to indicate the one or more second codebook sets in the first codebook cluster, and the second codebook information is used to indicate the one or more second codebooks in the one or more second codebook sets.

Optionally, in this embodiment of the present invention, the first indication information received by the receiving module 610 includes M groups of bit string information in a one-to-one correspondence with all codebook sets in the first codebook cluster, each group of bit string information is used to indicate whether a corresponding codebook set belongs to the first codebook set or the one or more second codebook sets, when the codebook set corresponding to each group of bit string information belongs to the first codebook set or the one or more second codebook sets, each group of bit string information is further used to indicate the first codebook or the one or more second codebooks in the corresponding codebook set, and M is quantity of codebook sets included in the first codebook cluster.

Optionally, in this embodiment of the present invention, the first indication information received by the receiving module 610 includes modulation order information of the first codebook and the one or more second codebooks, and each codebook in each codebook set has a different modulation order.

As shown in FIG. 13, optionally, in this embodiment of the present invention, the codebook indication information received by the receiving module 610 includes first feature matrix information, first feature sequence information, and second indication information, the first feature matrix information is used to indicate a first feature matrix, the first feature sequence information is used to indicate a first feature sequence in the first feature matrix, the second indication information is used to indicate the first codebook in one or more codebooks corresponding to the first feature sequence, and the second indication information is further used to indicate one or more second feature sequences in the first feature matrix, and the one or more second codebooks in one or more codebooks corresponding to the one or more second feature sequences; and the determining module 620 includes: a second determining unit 622, configured to determine, according to the first feature matrix information, the first feature sequence information, and the second indication information, the first codebook in the one or more codebooks corresponding to the first feature sequence included in the first feature matrix, and the one or more second codebooks in the one or more codebooks corresponding to the one or more second feature sequences included in the first feature matrix, where each feature matrix consists of two or more feature sequences, each feature sequence corresponds to one or more codebooks, the feature sequence consists of a zero-element and a 1-element, the zero-element means that modulation symbols of all codewords in a corresponding codebook at a location corresponding to the zero-element are all zero-modulation symbols, and the 1-element means that modulation symbols of all codewords in a corresponding codebook at a location corresponding to the 1-element are not all zero-modulation symbols or are all non-zero-modulation symbols.

In this embodiment of the present invention, optionally, the second indication information received by the receiving module 610 includes: third codebook information, second feature sequence information, and fourth codebook information, the third codebook information is used to indicate the first codebook in the one or more codebooks corresponding to the first feature sequence, the second feature sequence information is used to indicate the one or more second feature sequences in the first feature matrix, and the fourth codebook information is used to indicate the one or more second codebooks in the one or more codebooks corresponding to the one or more second feature sequences.

In this embodiment of the present invention, optionally, the second indication information received by the receiving module 610 includes M groups of bit string information in a one-to-one correspondence with all feature sequences in the first feature matrix, each group of bit string information is used to indicate whether a corresponding feature sequence belongs to the first feature sequence or the one or more second feature sequences, when the feature sequence corresponding to each group of bit string information belongs to the first feature sequence or the one or more second feature sequences, each group of bit string information is further used to indicate the first codebook or the one or more second codebooks in one or more codebooks corresponding to the corresponding feature sequence, and M is quantity of feature sequences included in the first feature matrix.

In this embodiment of the present invention, optionally, the second indication information received by the receiving module 610 includes modulation order information of the first codebook and the one or more second codebooks, and each of the one or more codebooks corresponding to each feature sequence has a different modulation order.

Optionally, in this embodiment of the present invention, the receiving module 610 is specifically configured to receive a downlink scheduling message, dedicated higher layer control signaling, or a system broadcast message that is sent by the network device, where the downlink scheduling message, the dedicated higher layer control signaling, and the system broadcast message include the codebook indication information.

Optionally, in this embodiment of the present invention, the dedicated higher layer control signaling includes a radio resource control RRC connection establishment message and an RRC connection reconfiguration message.

Optionally, in this embodiment of the present invention, the codebook indication information received by the receiving module 610 is bit string information.

In this embodiment of the present invention, optionally, the codebook is a sparse code multiple access SCMA codebook.

In this embodiment of the present invention, optionally, a quantity of zero-modulation symbols of a codeword included in the codebook is greater than or equal to a quantity of non-zero-modulation symbols.

In this embodiment of the present invention, optionally, the apparatus 600 is a terminal device.

It should be understood that the indication information transmission apparatus 600 according to this embodiment of the present invention may correspond to the terminal device in the method embodiment of the present invention, and the foregoing and other operations and/or functions of the modules in the apparatus 600 are separately used to implement corresponding procedures in the methods 300 in FIG. 6 to FIG. 8, and are not described in detail herein for brevity.

Therefore, according to the indication information transmission apparatus in this embodiment of the present invention, a network device determines, in one or more codebooks, a first codebook used to send a first downlink data stream to a terminal device; determines one or more second codebooks used to send a second downlink data stream, where the second downlink data stream is one or more downlink data streams, other than the first downlink data stream, carried on a time-frequency resource used for the first downlink data stream; determines codebook indication information used to indicate the first codebook and the one or more second codebooks; and sends the codebook indication information to the terminal device, so that the terminal device can determine codebooks used for all data streams carried on the same time-frequency resource, and can decode, according to the codebooks, the first data stream sent by the network device to the terminal device. In this way, the network device and the terminal device can perform downlink data transmission based on the codebooks, and a network capacity of a system can be effectively improved.

Figure 14:
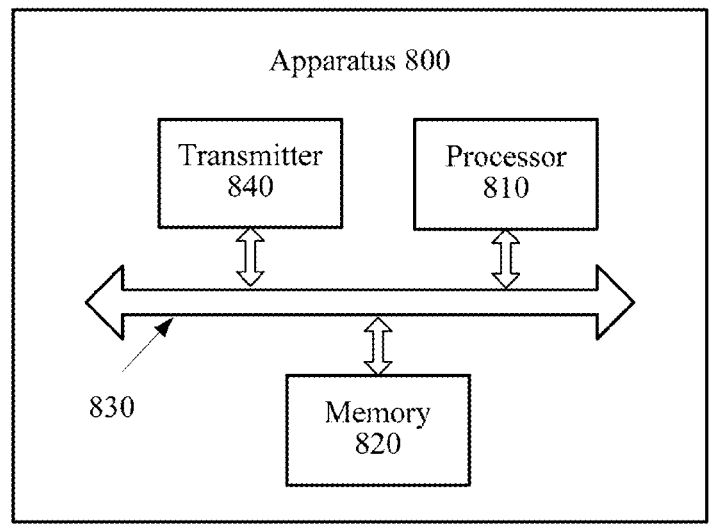
FIG. 14 is a schematic block diagram of an indication information transmission apparatus according to still another embodiment of the present invention.

As shown in FIG. 14, an embodiment of the present invention further provides an indication information transmission apparatus 800. The apparatus 800 includes: a processor 810, a memory 820, a bus system 830, and a transmitter 840. The processor 810, the memory 820, and the transmitter 840 are connected by using the bus system 830.

The memory 820 is configured to store an instruction. The processor 810 is configured to execute the instruction stored in the memory 820, to control the transmitter 840 to send a signal.

The processor 810 is configured to:

determine, in one or more codebooks, a first codebook used to send a first downlink data stream to a terminal device, where the codebook consists of two or more codewords, the codewords are multidimensional complex vectors, and are used to indicate mapping relationships between data and at least two modulation symbols, and the at least two modulation symbols include at least one zero-modulation symbol and at least one non-zero-modulation symbol;

determine one or more second codebooks used to send a second downlink data stream, where the second downlink data stream is one or more downlink data streams, other than the first downlink data stream, carried on a time-frequency resource used for the first downlink data stream; and determine codebook indication information used to indicate the first codebook and the one or more second codebooks.

The transmitter 840 is configured to send the codebook indication information to the terminal device.

Therefore, according to the indication information transmission apparatus in this embodiment of the present invention, a network device determines, in one or more codebooks, a first codebook used to send a first downlink data stream to a terminal device; determines one or more second codebooks used to send a second downlink data stream, where the second downlink data stream is one or more downlink data streams, other than the first downlink data stream, carried on a time-frequency resource used for the first downlink data stream; determines codebook indication information used to indicate the first codebook and the one or more second codebooks; and sends the codebook indication information to the terminal device, so that the terminal device can determine codebooks used for all data streams carried on the same time-frequency resource, and can decode, according to the codebooks, the first data stream sent by the network device to the terminal device. In this way, the network device and the terminal device can perform downlink data transmission based on the codebooks, and a network capacity of a system can be effectively improved.

It should be understood that in this embodiment of the present invention, the processor 810 may be a central processing unit (Central Processing Unit, "CPU" for short), or the processor 810 may be another general purpose processor, a digital signal processor (DSP), an application-specific integrated circuit (ASIC), a field programmable gate array (FPGA) or another programmable logical device, a discrete gate or a transistor logical device, a discrete hardware component, or the like. The general purpose processor may be a microprocessor or the processor may be any conventional processor or the like.

The memory 820 may include a read-only memory and a random access memory, and provides an instruction and data for the processor 810. A part of the memory 820 may further include a non-volatile random access memory. For example, the memory 820 may further store device type information.

The bus system 830 may include a power bus, a control bus, a status signal bus, and the like in addition to a data bus. However, for clear description, various types of buses in the figure are all marked as the bus system 830.

In an implementation process, the steps of the foregoing method may be completed by using an integrated logical circuit of hardware in the processor 810 or an instruction in a form of software. Steps of the method disclosed with reference to the embodiments of the present invention may be directly performed and completed by means of a hardware processor, or may be performed and completed by using a combination of hardware and software modules in the processor. The software module may be located in a mature storage medium in the field, such as a random access memory, a flash memory, a read-only memory, a programmable read-only memory, an electrically-erasable programmable memory, or a register. The storage medium is located in the memory 820, and the processor 810 reads information in the memory 820 and completes the steps of the foregoing method in combination with hardware of the processor 810. To avoid repetition, details are not described again herein.

Optionally, in an embodiment, the determining, by the processor 810, codebook indication information used to indicate the first codebook and the one or more second codebooks includes:

determining a first codebook set to which the first codebook belongs, one or more second codebook sets to which the one or more second codebooks belong, and a first codebook cluster to which the first codebook set and the one or more second codebook sets belong, where each codebook cluster includes at least one codebook set, each codebook set includes at least one codebook, the codebook cluster meets a condition that codewords in a same codebook cluster have a same total quantity of modulation symbols, and the codebook set meets a condition that for any two codebooks in a same codebook set, a location at which modulation symbols of all codewords in one codebook are zero-modulation symbols is the same as a location at which modulation symbols of all codewords in the other codebook are zero-modulation symbols; and determining the codebook indication information, where the codebook indication information includes first codebook cluster information, first codebook set information, and first indication information, the first codebook cluster information is used to indicate the first codebook cluster, the first codebook set information is used to indicate the first codebook set in the first codebook cluster, the first indication information is used to indicate the first codebook in the first codebook set, and the first indication information is further used to indicate the one or more second codebook sets in the first codebook cluster and the one or more second codebooks in the one or more second codebook sets.

Optionally, in an embodiment, the first indication information determined by the processor 810 includes: first codebook information, second codebook set information, and second codebook information, the first codebook information is used to indicate the first codebook in the first codebook set, the second codebook set information is used to indicate the one or more second codebook sets in the first codebook cluster, and the second codebook information is used to indicate the one or more second codebooks in the one or more second codebook sets.

Optionally, in an embodiment, the first indication information determined by the processor 810 includes M groups of bit string information in a one-to-one correspondence with all codebook sets in the first codebook cluster, each group of bit string information is used to indicate whether a corresponding codebook set belongs to the first codebook set or the one or more second codebook sets, when the codebook set corresponding to each group of bit string information belongs to the first codebook set or the one or more second codebook sets, each group of bit string information is further used to indicate the first codebook or the one or more second codebooks in the corresponding codebook set, and M is quantity of codebook sets included in the first codebook cluster.

Optionally, in an embodiment, the first indication information determined by the processor 810 includes modulation order information of the first codebook and the one or more second codebooks, and each codebook in each codebook set has a different modulation order.

Optionally, in an embodiment, the determining, by the processor 810, codebook indication information used to indicate the first codebook and the one or more second codebooks includes:

determining a first feature sequence to which the first codebook belongs, one or more second feature sequences to which the one or more second codebooks belong, and a first feature matrix to which the first feature sequence and the one or more second feature sequences belong, where each feature matrix consists of two or more feature sequences, each feature sequence corresponds to one or more codebooks, the feature sequence consists of a zero-element and a 1-element, the zero-element means that modulation symbols of all codewords in a corresponding codebook at a location corresponding to the zero-element are all zero-modulation symbols, and the 1-element means that modulation symbols of all codewords in a corresponding codebook at a location corresponding to the 1-element are not all zero-modulation symbols or are all non-zero-modulation symbols; and determining the codebook indication information, where the codebook indication information includes first feature matrix information, first feature sequence information, and second indication information, the first feature matrix information is used to indicate the first feature matrix, the first feature sequence information is used to indicate the first feature sequence in the first feature matrix, the second indication information is used to indicate the first codebook in one or more codebooks corresponding to the first feature sequence, and the second indication information is further used to indicate the one or more second feature sequences in the first feature matrix, and the one or more second codebooks in one or more codebooks corresponding to the one or more second feature sequences.

Optionally, in an embodiment, the second indication information determined by the processor 810 includes: third codebook information, second feature sequence information, and fourth codebook information, the third codebook information is used to indicate the first codebook in the one or more codebooks corresponding to the first feature sequence, the second feature sequence information is used to indicate the one or more second feature sequences in the first feature matrix, and the fourth codebook information is used to indicate the one or more second codebooks in the one or more codebooks corresponding to the one or more second feature sequences.

Optionally, in an embodiment, the second indication information determined by the processor 810 includes M groups of bit string information in a one-to-one correspondence with all feature sequences in the first feature matrix, each group of bit string information is used to indicate whether a corresponding feature sequence belongs to the first feature sequence or the one or more second feature sequences, when the feature sequence corresponding to each group of bit string information belongs to the first feature sequence or the one or more second feature sequences, each group of bit string information is further used to indicate the first codebook or the one or more second codebooks in one or more codebooks corresponding to the corresponding feature sequence, and M is quantity of feature sequences included in the first feature matrix.

Optionally, in an embodiment, the second indication information determined by the processor 810 includes modulation order information of the first codebook and the one or more second codebooks, and each of the one or more codebooks corresponding to each feature sequence has a different modulation order.

Optionally, in an embodiment, the sending, by the transmitter 840, the codebook indication information to the terminal device includes:

sending a downlink scheduling message, dedicated higher layer control signaling, or a system broadcast message to the terminal device, where the downlink scheduling message, the dedicated higher layer control signaling, and the system broadcast message include the codebook indication information.

Optionally, in an embodiment, the dedicated higher layer control signaling includes a radio resource control (RRC) connection establishment message and an RRC connection reconfiguration message.

Optionally, in an embodiment, the codebook indication information determined by the processor 810 is bit string information.

Optionally, in an embodiment, the codebook is a sparse code multiple access SCMA codebook.

Optionally, in an embodiment, a quantity of zero-elements of a codeword included in the codebook is greater than or equal to a quantity of modulation symbols.

Optionally, in an embodiment, the apparatus 800 is a network device.

It should be understood that the indication information transmission apparatus 800 according to this embodiment of the present invention may correspond to the network device and the apparatus 500 in the embodiments of the present invention, and may correspond to a corresponding entity for executing the methods according to the embodiments of the present invention, and the foregoing and other operations and/or functions of the modules in the apparatus 800 are separately used to implement corresponding procedures in the methods in FIG. 3 to FIG. 5, and are not described in detail herein for brevity.

Therefore, according to the indication information transmission apparatus in this embodiment of the present invention, a network device determines, in one or more codebooks, a first codebook used to send a first downlink data stream to a terminal device; determines one or more second codebooks used to send a second downlink data stream, where the second downlink data stream is one or more downlink data streams, other than the first downlink data stream, carried on a time-frequency resource used for the first downlink data stream; determines codebook indication information used to indicate the first codebook and the one or more second codebooks; and sends the codebook indication information to the terminal device, so that the terminal device can determine codebooks used for all data streams carried on the same time-frequency resource, and can decode, according to the codebooks, the first data stream sent by the network device to the terminal device. In this way, the network device and the terminal device can perform downlink data transmission based on the codebooks, and a network capacity of a system can be effectively improved.

Figure 15:
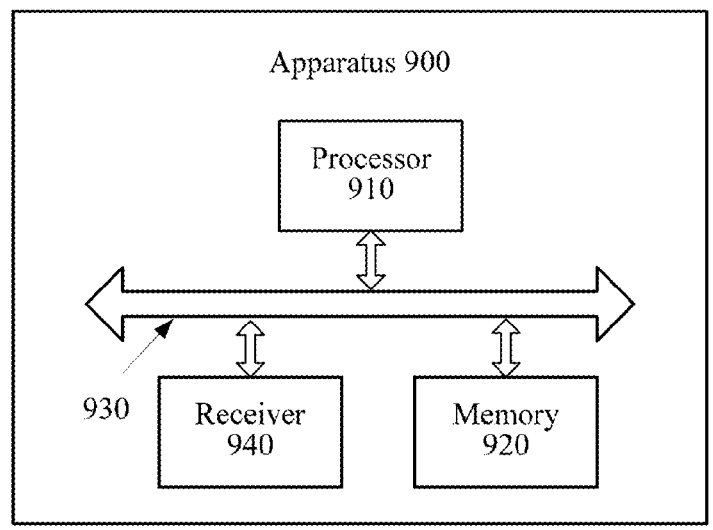
FIG. 15 is a schematic block diagram of an indication information transmission apparatus according to still another embodiment of the present invention.

As shown in FIG. 15, an embodiment of the present invention further provides an indication information transmission apparatus 900. The apparatus 900 includes: a processor 910, a memory 920, a bus system 930, and a receiver 940. The processor 910, the memory 920, and the receiver

940 are connected by using the bus system 930. The memory 920 is configured to store an instruction. The processor 910 is configured to execute the instruction stored in the memory 920, to control the receiver 940 to receive a signal.

The receiver 940 is configured to receive codebook indication information sent by a network device, where the codebook indication information is used to indicate a first codebook used by the network device to send a first downlink data stream, and one or more second codebooks used by the network device to send a second downlink data stream, the second downlink data stream is one or more downlink data streams, other than the first downlink data stream, carried on a time-frequency resource used for the first downlink data stream, the codebook consists of two or more codewords, the codewords are multidimensional complex vectors, and are used to indicate mapping relationships between data and at least two modulation symbols, and the at least two modulation symbols include at least one zero-modulation symbol and at least one non-zero-modulation symbol.

The processor 910 is configured to: determine the first codebook and the one or more second codebooks according to the codebook indication information; and decode, according to the first codebook and the one or more second codebooks, the first downlink data stream sent by the network device.

Therefore, according to the indication information transmission apparatus in this embodiment of the present invention, a network device determines, in one or more codebooks, a first codebook used to send a first downlink data stream to a terminal device; determines one or more second codebooks used to send a second downlink data stream, where the second downlink data stream is one or more downlink data streams, other than the first downlink data stream, carried on a time-frequency resource used for the first downlink data stream; determines codebook indication information used to indicate the first codebook and the one or more second codebooks; and sends the codebook indication information to the terminal device, so that the terminal device can determine codebooks used for all data streams carried on the same time-frequency resource, and can decode, according to the codebooks, the first data stream sent by the network device to the terminal device. In this way, the network device and the terminal device can perform downlink data transmission based on the codebooks, and a network capacity of a system can be effectively improved.

It should be understood that in this embodiment of the present invention, the processor 910 may be a central processing unit ("CPU" for short), or the processor 910 may be another general purpose processor, a digital signal processor (DSP), an application-specific integrated circuit (ASIC), a field programmable gate array (FPGA) or another programmable logical device, a discrete gate or a transistor logical device, a discrete hardware component, or the like. The general purpose processor may be a microprocessor or the processor may be any conventional processor or the like.

The memory 920 may include a read-only memory and a random access memory, and provides an instruction and data for the processor 910. A part of the memory 920 may further include a non-volatile random access memory. For example, the memory 920 may further store device type information.

The bus system 930 may include a power bus, a control bus, a status signal bus, and the like in addition to a data bus. However, for clear description, various types of buses in the figure are all marked as the bus system 930.

In an implementation process, the steps of the foregoing method may be completed by using an integrated logical circuit of hardware in the processor 910 or an instruction in a form of software. Steps of the method disclosed with reference to the embodiments of the present invention may be directly performed and completed by means of a hardware processor, or may be performed and completed by using a combination of hardware and software modules in the processor. The software module may be located in a mature storage medium in the field, such as a random access memory, a flash memory, a read-only memory, a programmable read-only memory, an electrically-erasable programmable memory, or a register. The storage medium is located in the memory 920, and the processor 910 reads information in the memory 920 and completes the steps of the foregoing method in combination with hardware of the processor 910. To avoid repetition, details are not described again herein.

Optionally, in an embodiment, the codebook indication information received by the receiver 940 includes first codebook cluster information, first codebook set information, and first indication information, the first codebook cluster information is used to indicate a first codebook cluster, the first codebook set information is used to indicate a first codebook set in the first codebook cluster, the first indication information is used to indicate the first codebook in the first codebook set, and the first indication information is further used to indicate one or more second codebook sets in the first codebook cluster and the one or more second codebooks in the one or more second codebook sets; and the determining, by the processor 910, the first codebook and the one or more second codebooks according to the codebook indication information includes:

determining, according to the first codebook cluster information, the first codebook set information, and the first indication information, the first codebook in the first codebook set included in the first codebook cluster and the one or more second codebooks in the one or more second codebook sets included in the first codebook cluster, where each codebook cluster includes at least one codebook set, each codebook set includes at least one codebook, the codebook cluster meets a condition that codewords in a same codebook cluster have a same total quantity of modulation symbols, and the codebook set meets a condition that for any two codebooks in a same codebook set, a location at which modulation symbols of all codewords in one codebook are zero-modulation symbols is the same as a location at which modulation symbols of all codewords in the other codebook are zero-modulation symbols.

Optionally, in an embodiment, the first indication information received by the receiver 940 includes: first codebook information, second codebook set information, and second codebook information, the first codebook information is used to indicate the first codebook in the first codebook set, the second codebook set information is used to indicate the one or more second codebook sets in the first codebook cluster, and the second codebook information is used to indicate the one or more second codebooks in the one or more second codebook sets.

Optionally, in an embodiment, the first indication information received by the receiver 940 includes M groups of bit string information in a one-to-one correspondence with all codebook sets in the first codebook cluster, each group of bit string information is used to indicate whether a corresponding codebook set belongs to the first codebook set or the one or more second codebook sets, when the codebook set corresponding to each group of bit string information belongs to the first codebook set or the one or more second codebook sets, each group of bit string information is further used to indicate the first codebook or the one or more second codebooks in the corresponding codebook set, and M is quantity of codebook sets included in the first codebook cluster.

Optionally, in an embodiment, the first indication information received by the receiver 940 includes modulation order information of the first codebook and the one or more second codebooks, and each codebook in each codebook set has a different modulation order.

Optionally, in an embodiment, the codebook indication information received by the receiver 940 includes first feature matrix information, first feature sequence information, and second indication information, the first feature matrix information is used to indicate a first feature matrix, the first feature sequence information is used to indicate a first feature sequence in the first feature matrix, the second indication information is used to indicate the first codebook in one or more codebooks corresponding to the first feature sequence, and the second indication information is further used to indicate one or more second feature sequences in the first feature matrix, and the one or more second codebooks in one or more codebooks corresponding to the one or more second feature sequences; and the determining, by the processor 910, the first codebook and the one or more second codebooks according to the codebook indication information includes:

determining, according to the first feature matrix information, the first feature sequence information, and the second indication information, the first codebook in the one or more codebooks corresponding to the first feature sequence included in the first feature matrix, and the one or more second codebooks in the one or more codebooks corresponding to the one or more second feature sequences included in the first feature matrix, where each feature matrix consists of two or more feature sequences, each feature sequence corresponds to one or more codebooks, the feature sequence consists of a zero-element and a 1-element, the zero-element means that modulation symbols of all codewords in a corresponding codebook at a location corresponding to the zero-element are all zero-modulation symbols, and the 1-element means that modulation symbols of all codewords in a corresponding codebook at a location corresponding to the 1-element are not all zero-modulation symbols or are all non-zero-modulation symbols.

Optionally, in an embodiment, the second indication information received by the receiver 940 includes: third codebook information, second feature sequence information, and fourth codebook information, the third codebook information is used to indicate the first codebook in the one or more codebooks corresponding to the first feature sequence, the second feature sequence information is used to indicate the one or more second feature sequences in the first feature matrix, and the fourth codebook information is used to indicate the one or more second codebooks in the one or more codebooks corresponding to the one or more second feature sequences.

Optionally, in an embodiment, the second indication information received by the receiver 940 includes M groups of bit string information in a one-to-one correspondence with all feature sequences in the first feature matrix, each group of bit string information is used to indicate whether a corresponding feature sequence belongs to the first feature sequence or the one or more second feature sequences, when the feature sequence corresponding to each group of bit string information belongs to the first feature sequence or the one or more second feature sequences, each group of bit string information is further used to indicate the first codebook or the one or more second codebooks in one or more codebooks corresponding to the corresponding feature sequence, and M is quantity of feature sequences included in the first feature matrix.

Optionally, in an embodiment, the second indication information received by the receiver 940 includes modulation order information of the first codebook and the one or more second codebooks, and each of the one or more codebooks corresponding to each feature sequence has a different modulation order.

Optionally, in an embodiment, the receiving, by the receiver 940, codebook indication information sent by a network device includes:

receiving a downlink scheduling message, dedicated higher layer control signaling, or a system broadcast message that is sent by the network device, where the downlink scheduling message, the dedicated higher layer control signaling, and the system broadcast message include the codebook indication information.

Optionally, in an embodiment, the dedicated higher layer control signaling includes a radio resource control RRC connection establishment message and an RRC connection reconfiguration message.

Optionally, in an embodiment, the codebook indication information received by the receiver 940 is bit string information.

Optionally, in an embodiment, the codebook is a sparse code multiple access SCMA codebook.

Optionally, in an embodiment, a quantity of zero-modulation symbols of a codeword included in the codebook is greater than or equal to a quantity of non-zero-modulation symbols.

Optionally, in an embodiment, the apparatus 900 is a terminal device.

It should be understood that the indication information transmission apparatus 900 according to this embodiment of the present invention may correspond to the terminal device and the apparatus 600 in the embodiments of the present invention, and may correspond to a corresponding entity for executing the methods according to the embodiments of the present invention, and the foregoing and other operations and/or functions of the modules in the apparatus 900 are separately used to implement corresponding procedures in the methods in FIG. 6 to FIG. 8, and are not described in detail herein for brevity.

Therefore, according to the indication information transmission apparatus in this embodiment of the present invention, a network device determines, in one or more codebooks, a first codebook used to send a first downlink data stream to a terminal device; determines one or more second codebooks used to send a second downlink data stream, where the second downlink data stream is one or more downlink data streams, other than the first downlink data stream, carried on a time-frequency resource used for the first downlink data stream; determines codebook indication information used to indicate the first codebook and the one or more second codebooks; and sends the codebook indication information to the terminal device, so that the terminal device can determine codebooks used for all data streams carried on the same time-frequency resource, and can decode, according to the codebooks, the first data stream sent by the network device to the terminal device. In this way, the network device and the terminal device can perform downlink data transmission based on the codebooks, and a network capacity of a system can be effectively improved.

To comprehensively describe a codebook set, herein, the codebook set in the foregoing embodiment is further described as follows: The foregoing describes, with reference to FIG. 1 to FIG. 15, an indication information transmission method and apparatus in a case in which a codebook set has features as follows: The codebook set meets a condition that codewords in a same codebook set have a same total quantity of modulation symbols and for any two codebooks in a same codebook set, a location at which modulation symbols of all codewords in one codebook are zero-modulation symbols is the same as a location at which modulation symbols of all codewords in the other codebook are zero-modulation symbols. This paragraph of description can claim priority to Patent Application No. PCT/CN2014/094539.

In an embodiment of the present invention, multiple codebooks may alternatively be divided into one or more codebook sets having another feature, and each codebook set may also include one or more codebooks. For example, the codebook set may have features as follows: The codebook set meets a condition that codewords in a same codebook set have a same total quantity of modulation symbols and codebooks in a same codebook set have a same total quantity of codewords. Alternatively, it may be understood as follows: Each codeword in the codebook set has a same length, and each codebook in the codebook set has a same quantity of codewords. Therefore, the following further describes, in detail with reference to FIG. 16 to FIG. 22, an indication information transmission method and apparatus in a case in which a codebook set has the foregoing feature.

In an embodiment of the present invention, an indication information transmission method 200 shown in FIG. 3 may be executed by, for example, a network device in a non-orthogonal multiple access system. The network device is, for example, a base station. The method 200 may include the following steps:

S210: Determine, in one or more codebooks, a first codebook used to send a first downlink data stream to a terminal device, where the codebook consists of two or more codewords, the codewords are multidimensional complex vectors, and are used to indicate mapping relationships between data and at least two modulation symbols, the mapping relationships may be direct mapping relationships, the direct mapping relationships may be understood as no need to obtain intermediate modulation symbols, and the at least two modulation symbols include at least one zero-modulation symbol and at least one non-zero-modulation symbol.

S220: Determine one or more second codebooks used to send a second downlink data stream, where the second downlink data stream is one or more downlink data streams, other than the first downlink data stream, carried on a time-frequency resource used for the first downlink data stream.

S230: Determine codebook indication information used to indicate the first codebook and the one or more second codebooks.

S240: Send the codebook indication information to the terminal device.

Specifically, in a non-orthogonal multiple access system such as an SCMA system, a network device allocates or specifies a codebook for one or more downlink data streams to be received by each terminal device. To correctly receive or decode a downlink data stream sent by the network device to the terminal device, the terminal device needs to learn a codebook used by the network device to send the downlink data stream, and one or more codebooks used by the network device to send another downlink data stream on a time-frequency resource used by the network device to send the downlink data stream.

Therefore, the network device may determine a first codebook and one or more second codebooks, and determine codebook indication information used to indicate the first codebook and the one or more second codebooks. The first codebook is a codebook used by the network device to send a first downlink data stream to a terminal device. The one or more second codebooks are one or more codebooks used by the network device to send a second downlink data stream to another terminal device. The second downlink data stream is one or more downlink data streams, other than the first downlink data stream, carried on a time-frequency resource used for the first downlink data stream. Moreover, the network device may send the codebook indication information to the terminal device. The codebook indication information is used to indicate the first codebook used by the terminal device to receive the first downlink data stream and the one or more second codebooks.

After receiving the codebook indication information sent by the network device, the terminal device may determine, according to the codebook indication information, the first codebook used by the network device to send the first downlink data stream and the one or more second codebooks used by the network device to send another downlink data stream on the same time-frequency resource used by the network device to send the downlink data stream. In this way, the terminal device can receive or decode, according to the first codebook and the one or more second codebooks, the first downlink data stream sent by the network device. Therefore, by means of information exchange between the network device and the terminal device, the terminal device can determine codebooks used for all data streams carried on the same time-frequency resource. In this way, the network device and the terminal device can perform downlink data transmission based on the codebooks, and a network capacity of the system can be effectively improved.

Therefore, according to the indication information transmission method in this embodiment of the present invention, a network device determines, in one or more codebooks, a first codebook used to send a first downlink data stream to a terminal device; determines one or more second codebooks used to send a second downlink data stream, where the second downlink data stream is one or more downlink data streams, other than the first downlink data stream, carried on a time-frequency resource used for the first downlink data stream; determines codebook indication information used to indicate the first codebook and the one or more second codebooks; and sends the codebook indication information to the terminal device, so that the terminal device can determine codebooks used for all data streams carried on the same time-frequency resource, and can decode, according to the codebooks, the first data stream sent by the network device to the terminal device. In this way, the network device and the terminal device can perform downlink data transmission based on the codebooks, and a network capacity of a system, including a quantity of users that can access the system, spectral efficiency, and the like, can be effectively improved.

In this embodiment of the present invention, according to a non-orthogonal multiple access technology, multiple different data streams are transmitted on a same resource unit by using codebooks, that is, multiple different data streams are multiplexed on a same resource unit. Different codebooks are used for different data streams. Therefore, resource utilization is improved. The data streams may be from a same terminal device or different terminal devices.

A codeword may be represented by a multidimensional complex vector. The complex vector may have two or more dimensions, and is used to indicate mapping relationships between data and two or more modulation symbols. The modulation symbols include at least one zero-modulation symbol and at least one non-zero-modulation symbol. The data may be binary bit data or multivariate data. A codebook may consist of two or more codewords. The codebook may indicate mapping relationships between possible data combinations of data of a particular length and the codewords in the codebook.

Therefore, according to the non-orthogonal multiple access technology, data in a data stream is directly mapped to a codeword, that is, a multidimensional complex vector, in a codebook according to a particular mapping relationship, so that the data is extended and sent on multiple resource units. The data may be binary bit data or multivariate data. The resource units may be time domain, frequency domain, space domain, time-frequency domain, time-space domain, or time-frequency-space domain resource units.

In this embodiment of the present invention, a codebook consists of two or more codewords, the codewords are multidimensional complex vectors, and are used to indicate mapping relationships between data and at least two modulation symbols, the mapping relationships may be may be direct mapping relationships, and the at least two modulation symbols include at least one zero-modulation symbol and at least one non-zero-modulation symbol. Each feature matrix consists of two or more feature sequences, each feature matrix corresponds to one or more codebooks, each feature sequence also corresponds to one or more codebooks, the feature sequence consists of a zero-element and a 1-element, the zero-element means that modulation symbols of all codewords in a corresponding codebook at a location corresponding to the zero-element are all zero-modulation symbols, and the 1-element means that modulation symbols of all codewords in a corresponding codebook at a location corresponding to the 1-element are not all zero-modulation symbols or are all non-zero-modulation symbols.

In this embodiment of the present invention, multiple codebooks may be divided into one or more codebook clusters, each codebook cluster may include one or more codebooks, and any two codebooks, for example, a codebook a and a codebook b, in a same codebook cluster has a feature as follows: A codeword in the codebook a and a codeword in the codebook b have a same total quantity of modulation symbols. Therefore, a codebook in a codebook cluster meets a condition that all codewords have a same total quantity of modulation symbols, that is, lengths of all codewords are the same, and quantities of resource units on which data streams are multiplexed are the same.

In an embodiment of the present invention, multiple codebooks may alternatively be divided into one or more codebook sets having another feature, and each codebook set may also include one or more codebooks. For example, the codebook set may have features as follows: The codebook set meets a condition that codewords in a same codebook set have a same total quantity of modulation symbols and codebooks in a same codebook set have a same total quantity of codewords. Alternatively, it may be understood as follows: Each codeword in the codebook set has a same length, and each codebook in the codebook set has a same quantity of codewords.

Still using FIG. 2 as an example for description, it is assumed that a modulation order is QPSK or 4-order modulation. Then a codebook used for a data stream 1 in FIG. 2 may be expressed as a codebook 1, the codebook used for the data stream 3 may be expressed as a codebook 3, and the codebook 1 and the codebook 3 may be respectively expressed as follows:

the codebook 1:

$$\left\{ \begin{pmatrix} 0 \\ e_{2,1} \\ 0 \\ e_{4,1} \end{pmatrix}, \begin{pmatrix} 0 \\ e_{2,2} \\ 0 \\ e_{4,2} \end{pmatrix}, \begin{pmatrix} 0 \\ e_{2,3} \\ 0 \\ e_{4,3} \end{pmatrix}, \begin{pmatrix} 0 \\ e_{2,4} \\ 0 \\ e_{4,4} \end{pmatrix} \right\},$$

and the codebook 3:

$$\left\{ \begin{pmatrix} c_{1,1} \\ c_{2,1} \\ 0 \\ 0 \end{pmatrix}, \begin{pmatrix} c_{1,2} \\ c_{2,2} \\ 0 \\ 0 \end{pmatrix}, \begin{pmatrix} c_{1,3} \\ c_{2,3} \\ 0 \\ 0 \end{pmatrix}, \begin{pmatrix} c_{1,4} \\ c_{2,4} \\ 0 \\ 0 \end{pmatrix} \right\}.$$

$e_{n,q} = \alpha * \exp(j*\beta)$, $n \in \{2,4\}$, $1 \leq q \leq 4$, $\alpha$ and $\beta$ may be any real number, and for any q, $1 \leq q \leq 4$, $e_{2,q}$ and $e_{4,q}$ are not zero at the same time, and there are at least q1 and q2 that meet a condition that $e_{2,q_1} \neq 0$ and $e_{4,q_2} \neq 0$, $1 \leq q1 \leq 4$ and $1 \leq q2 \leq 4$.

The codebook 1 has four codewords, and each codeword has four modulation symbols. That is, a total quantity of codewords of the codebook 1 is 4, and a total quantity of modulation symbols of each codeword of in the codebook 1 is 4. Similarly, a total quantity of codewords of the codebook 3 is 4, and a total quantity of modulation symbols of each codeword of in the codebook 3 is 4. Therefore, if a codebook set is obtained through division according to the foregoing feature, the codebook 1 and the codebook 3 may belong to a same codebook set.

Therefore, in this embodiment of the present invention, multiple codebooks may alternatively be divided into one or more codebook sets, each codebook set may include one or more codebooks, and any two codebooks, for example, a codebook c and a codebook d, in a same codebook set have features as follows: (1) A codeword in the codebook c and a codeword in the codebook d have a same total quantity of modulation symbols. (2) A quantity of codewords in the codebook c is the same as a quantity of codewords in the codebook d, that is, codebooks in the codebook set has a same total quantity of codewords.

It should be understood that, in this embodiment of the present invention, "a total quantity of modulation symbols of a codeword" means a quantity of modulation symbols included in the codeword. Accordingly, in this embodiment of the present invention, "a total quantity of codewords of a codebook" means a quantity of codewords included in the codebook. For example, the foregoing codebook 2 has four codewords, and a codeword 1 has four modulation symbols. Therefore, a total quantity of codewords of the codebook 2 is 4, and a total quantity of modulation symbols of the codeword 1 in the codebook 2 is 4. The codebook 2 and the codeword 1 may be respectively expressed as follows:

the codebook 2:

$$\left\{ \begin{pmatrix} d_{1,1} \\ d_{2,1} \\ 0 \\ 0 \end{pmatrix}, \begin{pmatrix} d_{1,2} \\ d_{2,2} \\ 0 \\ 0 \end{pmatrix}, \begin{pmatrix} d_{1,3} \\ d_{2,3} \\ 0 \\ 0 \end{pmatrix}, \begin{pmatrix} d_{1,4} \\ d_{2,4} \\ 0 \\ 0 \end{pmatrix} \right\}.$$

and the codeword 1:

$$\left\{ \begin{pmatrix} d_{1,1} \\ d_{2,1} \\ 0 \\ 0 \end{pmatrix} \right\}.$$

In this embodiment of the present invention, each codebook cluster includes one or more codebook sets, each codebook set includes one or more codebooks, each codebook consists of two or more codewords, each codebook cluster meets a condition that codewords in a same codebook cluster have a same total quantity of modulation symbols, and each codebook set meets a condition that codewords in a same codebook set have a same total quantity of modulation symbols and codebooks in a same codebook set have a same total quantity of codewords.

In this embodiment of the present invention, optionally, the determining codebook indication information used to indicate the first codebook and the one or more second codebooks includes:

determining a first codebook set to which the first codebook belongs, one or more second codebook sets to which the one or more second codebooks belong, and a first codebook cluster to which the first codebook set and the one or more second codebook sets belong, where each codebook cluster includes at least one codebook set, each codebook set includes at least one codebook, the codebook cluster meets a condition that codewords in a same codebook cluster have a same total quantity of modulation symbols, and the codebook set meets a condition that codewords in a same codebook set have a same total quantity of modulation symbols and codebooks in a same codebook set have a same total quantity of codewords; and determining the codebook indication information, where the codebook indication information includes first codebook cluster information, first codebook set information, and first indication information, the first codebook cluster information is used to indicate the first codebook cluster, the first codebook set information is used to indicate the first codebook set in the first codebook cluster, the first indication information is used to indicate the first codebook in the first codebook set, and the first indication information is further used to indicate the one or more second codebook sets in the first codebook cluster and the one or more second codebooks in the one or more second codebook sets.

Specifically, in this embodiment of the present invention, the network device and the terminal device may store pre-designed codebooks. The codebooks may be divided into one or more codebook sets, each codebook set consists of one or more codebooks, each codebook set may correspond to one modulation order, and any two codebooks, for example, a codebook a and a codebook b, in a same codebook set have features as follows: A codeword in the codebook a and a codeword in the codebook b have a same total quantity of modulation symbols. A quantity of codewords in the codebook a is the same as a quantity of codewords in the codebook b, that is, codebooks in the codebook set has a same total quantity of codewords. That is, the codebook set meets a condition that codewords in a same codebook set have a same total quantity of modulation symbols and codebooks in a same codebook set have a same total quantity of codewords.

The one or more codebook sets obtained through division in the foregoing manner may be further divided into one or more codebook clusters, each codebook cluster consists of one or more codebook sets, and any two codebook sets, for example, a codebook set A and a codebook set B, in a same codebook cluster has a feature as follows: A codeword in the codebook set A and a codeword in the codebook set B have a same total quantity of modulation symbols, that is, lengths of all codewords are the same, and quantities of resource units on which data streams are multiplexed are the same. That is, the codebook cluster meets a condition that codewords in a same codebook cluster have a same total quantity of modulation symbols.

In this embodiment of the present invention, the network device allocates, in a same codebook cluster, the first codebook used to send the first downlink data stream and the one or more second codebooks used to send the second downlink data stream. To indicate the first codebook and the one or more second codebooks to the user equipment, the network device determines the first codebook set to which the first codebook belongs, the one or more second codebook sets to which the one or more second codebooks belong, and the first codebook cluster to which the first codebook set and the one or more second codebook sets belong. In this way, the network device determines that the codebook indication information used to indicate the first codebook and the one or more second codebooks may include the first codebook cluster information, the first codebook set information, and the first indication information. For example, the codebook indication information may consist of three logical information segments. A logical information segment 1 may carry the first codebook cluster information, to indicate, to the terminal device, the first codebook cluster used to send the first downlink data stream and the second downlink data stream. A logical information segment 2 may carry the first codebook set information, to indicate, to the terminal device, the first codebook set used to send the first downlink data stream in the first codebook cluster. A logical information segment 3 may carry the first indication information. The first indication information is used to indicate the first codebook in the first codebook set, and the first indication information is further used to indicate the one or more second codebook sets in the first codebook cluster and the one or more second codebooks in the one or more second codebook sets.

It should be understood that, in this embodiment of the present invention, the logical information segments of the codebook indication information may be continuously or discontinuously carried in any order in an instruction in which the codebook indication information is located, which is not limited in this embodiment of the present invention.

Accordingly, after the terminal device receives the instruction or a message carrying the codebook indication information, for example, according to the logical information segment 1, the terminal device may learn the network device uses a codebook in which codebook cluster to send the first downlink data stream and the second downlink data stream. According to the logical information segment 2, the terminal device may learn the network device uses a codebook in which codebook set in the codebook cluster indicated by the logical information segment 1 to send the first downlink data stream. According to the logical information segment 3, the terminal device may learn the network device uses which codebook in the codebook set indicated by the logical information segment 2 to send the first downlink data stream. In addition, the terminal device may further learn the network device uses which codebook sets in the codebook cluster indicated by the logical information segment 1 and which codebooks in the codebook sets to send the second downlink data stream.

Therefore, by means of information exchange between a network device and a terminal device, the terminal device can determine codebooks used for all data streams carried on a same time-frequency resource. In this way, the network device and the terminal device can perform downlink data transmission based on the codebooks, and a network capacity of a system, including a quantity of users that can access the system, spectral efficiency, and the like, can be effectively improved.

In this embodiment of the present invention, the network device may use multiple manners to indicate the first codebook in the first codebook set to the terminal device, and indicate the one or more second codebook sets in the first codebook cluster and the one or more second codebooks in the one or more second codebook sets to the terminal device. The following provides separate descriptions.

Optionally, in this embodiment of the present invention, the first indication information includes: first codebook information, second codebook set information, and second codebook information, the first codebook information is used to indicate the first codebook in the first codebook set, the second codebook set information is used to indicate the one or more second codebook sets in the first codebook cluster, and the second codebook information is used to indicate the one or more second codebooks in the one or more second codebook sets.

Specifically, in this embodiment of the present invention, for example, the logical information segment 3 carrying the first indication information may further include three logical information subsegments: a logical information subsegment 1, a logical information subsegment 2, and a logical information subsegment 3. The logical information subsegment 1 may carry the first codebook information, to indicate the first codebook in the first codebook set. The logical information subsegment 2 may carry the second codebook set information, to indicate the one or more second codebook sets in the first codebook cluster. The logical information subsegment 3 may carry the second codebook information, to indicate the one or more second codebooks in the one or more second codebook sets.

It should be understood that, this embodiment of the present invention is described by using only an example in which the first indication information includes the first codebook information, the second codebook set information, and the second codebook information, but the present invention it not limited thereto.

Optionally, in this embodiment of the present invention, the first indication information includes M groups of bit string information in a one-to-one correspondence with all codebook sets in the first codebook cluster, each group of bit string information is used to indicate whether a corresponding codebook set belongs to the first codebook set or the one or more second codebook sets, when the codebook set corresponding to each group of bit string information belongs to the first codebook set or the one or more second codebook sets, each group of bit string information is further used to indicate the first codebook or the one or more second codebooks in the corresponding codebook set, and M is quantity of codebook sets included in the first codebook cluster.

It should be understood that, in this embodiment of the present invention, if the logical information segments indicate index values, consistent index relationships between related information, for example, an index relationship between a codebook cluster index value and a codebook cluster, an index relationship between a codebook set index value and a codebook set in each codebook cluster, and an index relationship between a codebook index value and a codebook in each codebook set, need to be pre-established on a network device side and a terminal device side, so that the network device and the terminal device can uniquely determine a corresponding codebook cluster, codebook set, and codebook from the pre-established related index relationships according to the index values indicated by the logical information segments.

It should be further understood that, this embodiment of the present invention is described by using only the foregoing solution as an example, but the present invention is not limited thereto. Based on this embodiment of the present invention, another method may be used to indicate the first codebook in the first codebook set, the one or more second codebook sets, and the one or more second codebooks. In addition, based on this embodiment of the present invention, another method may be used to indicate the first codebook and the one or more second codebooks.

Therefore, according to the indication information transmission method in this embodiment of the present invention, a network device determines, in one or more codebooks, a first codebook used to send a first downlink data stream to a terminal device; determines one or more second codebooks used to send a second downlink data stream, where the second downlink data stream is one or more downlink data streams, other than the first downlink data stream, carried on a time-frequency resource used for the first downlink data stream; determines codebook indication information used to indicate the first codebook and the one or more second codebooks; and sends the codebook indication information to the terminal device, so that the terminal device can determine codebooks used for all data streams carried on the same time-frequency resource, and can decode, according to the codebooks, the first data stream sent by the network device to the terminal device. In this way, the network device and the terminal device can perform downlink data transmission based on the codebooks, and a network capacity of a system, including a quantity of users that can access the system, spectral efficiency, and the like, can be effectively improved.

The following describes in detail a method 220 for determining the codebook indication information according to this embodiment of the present invention with reference to FIG. 16 and FIG. 17.

As shown in FIG. 16, in this embodiment of the present invention, optionally, the determining codebook indication information used to indicate the first codebook and the one or more second codebooks includes the following steps:

S235: Determine a first mode and a rank of the terminal device in multiple terminal devices to which the first data stream and the second data stream belong, where the first mode is used to indicate a third codebook set to which the first codebook and the one or more second codebooks belong, and information about allocation of codebooks in the third codebook set to the multiple terminal devices, each codebook set includes at least one codebook, and the codebook set meets a condition that codewords in a same codebook set have a same total quantity of modulation symbols and codebooks in a same codebook set have a same total quantity of codewords.

S236: Determine the codebook indication information, where the codebook indication information includes first mode information and first terminal device rank information, the first mode information is used to indicate the first mode, and the first terminal device rank information is used to indicate the rank of the terminal device in the multiple terminal devices.

Specifically, in this embodiment of the present invention, the network device and the terminal device may store pre-designed codebooks. The codebooks may be divided into one or more codebook sets, each codebook set consists of one or more codebooks, and any two codebooks, for example, a codebook a and a codebook b, in a same codebook set have features as follows: A codeword in the codebook a and a codeword in the codebook b have a same total quantity of modulation symbols, that is, a codeword in the codebook a and a codeword in the codebook b have a same length, and quantities of resource units on which data streams are multiplexed are the same. Moreover, a quantity of codewords in the codebook a is the same as a quantity of codewords in the codebook b, that is, codebooks in the codebook set has a same total quantity of codewords. Therefore, in this embodiment of the present invention, codebooks in a codebook set have a same quantity of codewords. A quantity of codewords may be referred to as a modulation order. Certainly, a person skilled in the art may give another name to the modulation order. Therefore, it may be understood that the codebook set in this embodiment of the present invention consists of a codebook having a modulation order. Further, codewords of the codebook have a same length.

In this embodiment of the present invention, the network device and the terminal device may further store various pre-designed modes. In one aspect, each mode indicates a same codebook set used by the network device to send the first downlink data stream and the second downlink data stream to the terminal devices. That is, in this embodiment of the present invention, the first codebook and the one or more second codebooks belong to a same codebook set. In another aspect, each mode further indicates information about allocation of codebooks in the codebook set to the multiple terminal devices. That is, each mode may further indicate information about a codebook respectively used to send a downlink data stream to each terminal device that is arranged according to a rank. The codebook information, may be, for example, number information of the codebook in the codebook set.

It should be understood that, a correspondence exists between the first terminal device rank information and an arrangement order of the information that is indicated by each mode and that is about allocation of the codebooks to the multiple terminal devices. For example, the first piece of codebook information in the codebook allocation information corresponds to the first terminal device, that is, the first piece of codebook information is codebook information used by the first terminal device.

For example, assuming that a codebook set used by the network device to send downlink data streams includes six codebooks, a form stored by the network device and the terminal device and used to indicate a mode is shown in Table 3.

TABLE 3

| Mode | Codebook set | Codebook allocation information |
|---|---|---|
| 0 | 0 | {{0, 2}, {3}, {1, 4, 5}} |
| 1 | 0 | {{1, 2}, {0, 4}, {3}, {5}} |
| ... | ... | ... |

As shown in Table 3, a mode 0 may indicate that the network device sends downlink data streams to three terminal devices, and uses a codebook set 0. The first terminal device uses codebooks whose numbers are 0 and 2 in the codebook set 0. The second terminal device uses a codebook whose number is 3 in the codebook set 0. The third terminal device uses codebooks whose numbers are 1, 4, and 5 in the codebook set 0. A mode 1 may indicate that the network device sends downlink data streams to four terminal devices, and uses the codebook set 0. The first terminal device uses codebooks whose numbers are 1 and 2 in the codebook set 0. The second terminal device uses codebooks whose numbers are 0 and 4 in the codebook set 0. The third terminal device uses a codebook whose number is 3 in the codebook set 0. The fourth terminal device uses a codebook whose number is 5 in the codebook set 0.

It should be understood that, in this embodiment of the present invention, the codebook allocation information may be further used to indicate a quantity of terminal devices. The quantity of terminal devices may be an actual quantity of terminal devices during data transmission, or may be a maximum quantity, which can be supported by a system, of terminal devices.

Therefore, in this embodiment of the present invention, the codebook indication information determined by the network device and used to indicate the first codebook and the one or more second codebooks may include the first mode information and the first terminal device rank information. A logical information segment 1 may carry the first mode information, to indicate the first mode. A logical information segment 2 may carry the first terminal device rank information, to indicate the rank of the terminal device in the multiple terminal devices.

It should be understood that, in this embodiment of the present invention, the logical information segments of the codebook indication information may be continuously or discontinuously carried in any order in an instruction in which the codebook indication information is located, which is not limited in this embodiment of the present invention.

Accordingly, after the terminal device receives the instruction or a message carrying the codebook indication information, for example, the terminal device may learn, according to the logical information segment 1, the network device uses which mode to send the downlink data streams. In this way, the terminal device may learn a codebook set used by the network device to send the downlink data streams and information about allocation of codebooks in the codebook set to the multiple terminal devices. Further, the terminal device may learn rank information of the terminal device according to the logical information segment 2. Therefore, the terminal device can determine the first codebook used by the network device to send the first downlink data stream to the terminal device, and the terminal device can also determine the one or more second codebooks used by the network device to send the second downlink data stream to another terminal device, so that the terminal device can determine codebooks used for all data streams carried on a same time-frequency resource, and can decode, according to the codebooks, the first data stream sent by the network device to the terminal device. In this way, the network device and the terminal device can perform downlink data transmission based on the codebooks, and a network capacity of a system, including a quantity of users that can access the system, spectral efficiency, and the like, can be effectively improved.

Still using the mode shown in Table 3 as an example, it is assumed that the network device uses the mode 0 to transmit downlink data streams, and determines that a rank of the terminal device receiving the first downlink data stream in three terminal devices is second. Then the network device needs to indicate only the mode 0 and rank information of the terminal device to the terminal device. The terminal device may learn, according to the received codebook indication information, that the network device uses the codebook set 0 to send the downlink data stream, and the terminal device may learn that the codebook whose number is 3 in the codebook set 0 is the first codebook, and the other codebooks are second codebooks. In this way, the terminal device can decode the first downlink data stream sent by the network device to the terminal device.

Therefore, by means of information exchange between a network device and a terminal device, the terminal device can determine codebooks used for all data streams carried on a same time-frequency resource. In this way, the network device and the terminal device can perform downlink data transmission based on the codebooks, and a network capacity of a system, including a quantity of users that can access the system, spectral efficiency, and the like, can be effectively improved.

It should be understood that, in this embodiment of the present invention, the terminal device needs to learn only the first codebook used by the network device to send the first downlink data stream to the terminal device and the one or more second codebooks that are on a same time-frequency resource carrying the first data stream and that are used to send other downlink data streams, and may not need to specifically learn the one or more second codebooks respectively correspond to which terminal devices, that is, not need to learn a codebook used by the network device to send a downlink data stream to each of the other terminal devices.

It should be further understood that, in this embodiment of the present invention, if the logical information segments indicate index values, consistent index relationships between related information, for example, an index relationship between a mode index value and a mode, an index relationship between a codebook set index value and a codebook set in each codebook cluster, and an index relationship between a codebook index value and a codebook in each codebook set, need to be pre-established on a network device side and a terminal device side, so that the network device and the terminal device can uniquely determine a corresponding mode, codebook set, and codebook from the pre-established related index relationships according to the index values indicated by the logical information segments.

It should be further understood that, in this embodiment of the present invention, the network device and the terminal device may pre-store a codebook by using multiple methods, but the following two conditions need to be met: First, the network device and the terminal device may learn, according to the stored codebook, a quantity of resource units or subcarriers or resource elements included in a coding unit. Second, the network device and the terminal device may learn, according to the stored codebook, the terminal device sends which non-zero-modulation symbols on which resource units or subcarriers or resource elements of a coding unit.

A simple and direct method that meets the foregoing storage conditions is to store a codebook in the foregoing form, including storing all zero-modulation symbols and non-zero-modulation symbols of codewords:

$$\left\{ \begin{pmatrix} c_{1,1} \\ c_{2,1} \\ \vdots \\ c_{N,1} \end{pmatrix}, \begin{pmatrix} c_{1,2} \\ c_{2,2} \\ \vdots \\ c_{N,2} \end{pmatrix}, \ldots, \begin{pmatrix} c_{1,Q_m} \\ c_{2,Q_m} \\ \vdots \\ c_{N,Q_m} \end{pmatrix} \right\}.$$

For example, when a modulation order is 4-order modulation, a codebook used by a variable node 3 in FIG. 2 may be stored as follows:

$$\left\{ \begin{pmatrix} c_{1,1} \\ c_{2,1} \\ 0 \\ 0 \end{pmatrix}, \begin{pmatrix} c_{1,2} \\ c_{2,2} \\ 0 \\ 0 \end{pmatrix}, \begin{pmatrix} c_{1,3} \\ c_{2,3} \\ 0 \\ 0 \end{pmatrix}, \begin{pmatrix} c_{1,4} \\ c_{2,4} \\ 0 \\ 0 \end{pmatrix} \right\}.$$

After the codebook is stored in the foregoing manner, a total quantity of zero-modulation symbols and non-zero-modulation symbols in a codeword is a quantity of resource units or subcarriers or resource elements included in a coding unit, and a location and value of a non-zero-modulation symbol indicate that the terminal device sends a non-zero-modulation symbol having the corresponding value on a resource unit or subcarrier or resource element at the corresponding location of a coding unit. For example, when the codebook for the variable node 3 in FIG. 2 is used, the terminal device sends a modulation symbol $c_{1,q}$ on the first resource unit or subcarrier or resource element of a coding unit, the terminal device sends a modulation symbol $c_{2,q}$ on the second resource unit or subcarrier or resource element, and the terminal device sends zero-modulation symbols on the third and fourth resource units or subcarriers or resource elements. $c_{n,q}=\alpha^*\exp(j^*\beta)$, $1 \le n \le 2$, $1 \le q \le 4$, $\alpha$ and $\beta$ may be any real number, and for any q, $1 \le q \le 4$, $c_{1,q}$ and $c_{2,q}$ are not zero at the same time, and there are at least q1 and q2 that meet a condition that $c_{1,q_1} \ne 0$ and $c_{2,q_2} \ne 0$, $1 \le q1 \le 4$ and $1 \le q2 \le 4$.

It should be understood that, this embodiment of the present invention is described by using only the foregoing mode as an example. The mode is used to indicate a same codebook set used by the network device to send downlink data streams to multiple terminal devices, and information about allocation of codebooks in the codebook set to the multiple terminal devices. However, the present invention is not limited thereto. For example, the mode may be further used to indicate a codebook cluster to which the codebook set belongs.

It should be understood that, this embodiment of the present invention is described by using only an example in which the codebook indication information includes the first mode information and the first terminal device rank information, but the present invention it not limited thereto. For example, when the network device and the terminal device both use a fixed mode to transmit data by default, the codebook indication information may include only the first terminal device rank information.

Therefore, by means of information exchange between a network device and a terminal device, the terminal device can determine codebooks used for all data streams carried on a same time-frequency resource. In this way, the network device and the terminal device can perform downlink data transmission based on the codebooks, and a network capacity of a system, including a quantity of users that can access the system, spectral efficiency, and the like, can be effectively improved.

The foregoing describes, with reference to FIG. 16, a case in which a network device uses codebooks in a same codebook set to send downlink data streams to terminal devices. In this embodiment of the present invention, the network device may alternatively use codebooks in different codebook sets to send downlink data streams to terminal devices. The following provides a description with reference to FIG. 17.

FIG. 17 is still another schematic flowchart of the method 230 for determining the codebook indication information according to this embodiment of the present invention. As shown in FIG. 17, in this embodiment of the present invention, optionally, the determining codebook indication information used to indicate the first codebook and the one or more second codebooks includes the following steps:

S237: Determine a second mode, a rank of the terminal device in multiple terminal devices to which the first data stream and the second data stream belong, and a codebook set used by each of the multiple terminal devices, where the second mode is used to indicate a second feature matrix to which the first codebook and the one or more second codebooks belong, and information about allocation of feature sequences in the second feature matrix to the multiple terminal devices, each feature matrix corresponds to one or more codebook sets, the feature matrix consists of two or more feature sequences, the feature sequence consists of a zero-element and a 1-element, the zero-element means that modulation symbols of all codewords in a corresponding codebook at a location corresponding to the zero-element are all zero-modulation symbols, the 1-element means that modulation symbols of all codewords in a corresponding codebook at a location corresponding to the 1-element are not all zero-modulation symbols or are all non-zero-modulation symbols, each codebook set includes at least one codebook, the codebook set meets a condition that codewords in a same codebook set have a same total quantity of modulation symbols and codebooks in a same codebook set have a same total quantity of codewords, and each codebook in the codebook set respectively corresponds to each feature sequence in the feature matrix.

S238: Determine the codebook indication information, where the codebook indication information includes second mode information, second terminal device rank information, and third codebook set information, the second mode information is used to indicate the second mode, the second terminal device rank information is used to indicate the rank of the terminal device in the multiple terminal devices, and the third codebook set information is used to indicate the codebook set that is used by each terminal device and that corresponds to the second feature matrix.

Specifically, in this embodiment of the present invention, the network device and the terminal device may store pre-designed codebooks. The codebooks may be divided into one or more codebook sets, each codebook set consists of one or more codebooks, and any two codebooks, for example, a codebook a and a codebook b, in a same codebook set have features as follows: A codeword in the codebook a and a codeword in the codebook b have a same total quantity of modulation symbols, that is, a codeword in the codebook a and a codeword in the codebook b have a same length, and quantities of resource units on which data streams are multiplexed are the same. Moreover, a quantity of codewords in the codebook a is the same as a quantity of codewords in the codebook b, that is, codebooks in the codebook set has a same total quantity of codewords. Therefore, in this embodiment of the present invention, a codebook set consists of a codebook having a modulation order, and codewords of the codebook have a same length.

After the codebook set is obtained through division in the foregoing manner, one codebook set may uniquely correspond to one feature matrix. One feature matrix may correspond to one or more codebook sets, and each codebook set may correspond to one modulation order.

In this embodiment of the present invention, the network device and the terminal device may further store various pre-designed modes. In one aspect, each mode indicates a same feature matrix used by the network device to send the first downlink data stream and the second downlink data stream to the multiple terminal devices. That is, in this embodiment of the present invention, the first codebook and the one or more second codebooks correspond to a same feature matrix. Therefore, the first codebook and the one or more second codebooks may have different modulation orders. In another aspect, each mode further indicates information about allocation of feature sequences in the feature matrix to the multiple terminal devices. In this embodiment of the present invention, each codebook in the codebook set corresponding to the feature matrix respectively corresponds to each feature sequence in the feature matrix. Therefore, the allocation information may be used to indicate information about a codebook used by the terminal device in a codebook set that is used by the terminal device and that corresponds to the feature matrix. In still another aspect, in addition to indicating the information about allocation of the feature sequences to the multiple terminal devices, each mode may further indicate a quantity of the multiple terminal devices.

It should be understood that, in this embodiment of the present invention, "each codebook in the codebook set respectively corresponds to each feature sequence in the feature matrix" may mean that a quantity of codebooks in the codebook set is the same as a quantity of feature sequences in the feature matrix, and a total quantity of modulation symbols of a codeword in a codebook is the same as a total quantity of elements of a corresponding feature sequence; and may also mean that for any 1-element in a feature sequence, at least one codeword can be found in a corresponding codebook, so that modulation symbols of the codeword at a location of the 1-element are not zero-modulation symbols, and for any zero-element in the feature sequence, modulation symbols of all codewords in the corresponding codebook at a location of the zero-element are all zero-modulation symbols.

In this embodiment of the present invention, preferably, each codebook in a codebook set is in a one-to-one correspondence with each feature sequence in a feature matrix, that is, an $i^{th}$ codebook in the codebook set corresponds to an $i^{th}$ feature sequence in the feature matrix, where i is a natural number and is less than or equal to a quantity of feature sequences.

For example, assuming that a quantity of feature sequences included in the feature matrix used by the network device to send downlink data streams is the same as a quantity of codebooks included in a corresponding codebook set, a form stored by the network device and the terminal device and used to indicate a mode is shown in Table 4.

TABLE 4

| Mode | Feature matrix | Feature sequence allocation information |
|---|---|---|
| 0 | 4 × 6 | {{0, 1}, {3, 5}, {2, 4}} |
| 1 | 4 × 6 | {{1, 2}, {0}, {4}, {3, 5}} |
| ... | ... | ... |

As shown in Table 4, a mode 0 may indicate that the network device sends downlink data streams to three terminal devices, and uses a feature matrix with four rows and six columns. The feature matrix with four rows and six columns may correspond to one or more codebook sets. The first terminal device uses codebooks corresponding to feature sequences 0 and 1 in the feature matrix to transmit data. That is, codebooks 0 and 1 in a codebook set that is used by the first terminal and that corresponds to the feature matrix with four rows and six columns are used to transmit data. The second terminal device uses codebooks corresponding to feature sequences 3 and 5 in the feature matrix to transmit data. That is, codebooks 3 and 5 in a codebook set that is used by the second terminal and that corresponds to the feature matrix with four rows and six columns are used to transmit data. The third terminal device uses codebooks corresponding to feature sequences 2 and 4 in the feature matrix to transmit data. That is, codebooks 2 and 4 in a codebook set that is used by the third terminal and that corresponds to the feature matrix with four rows and six columns are used to transmit data. A mode 1 may indicate that the network device sends downlink data streams to four terminal devices, and uses a feature matrix with four rows and six columns. The first terminal device uses codebooks corresponding to feature sequences 1 and 2 in the feature matrix to transmit data. The second terminal device uses a codebook corresponding to a feature sequence 0 in the feature matrix to transmit data. The third terminal device uses a codebook corresponding to a feature sequence 4 in the feature matrix to transmit data. The fourth terminal device uses codebooks corresponding to feature sequences 3 and 5 in the feature matrix to transmit data. Another mode may be understood with reference to the mode 1. Certainly, if the feature matrix with four rows and six columns corresponds to only one codebook set, codebook sets allocated to the terminals are a same codebook set.

It should be understood that, in this embodiment of the present invention, the feature sequence allocation information may be further used to indicate a quantity of terminal devices. The quantity of terminal devices may be an actual quantity of terminal devices during data transmission, or may be a maximum quantity, which can be supported by a system, of terminal devices.

Therefore, in this embodiment of the present invention, the codebook indication information determined by the network device may include the second mode information, the second terminal device rank information and the third codebook set information. A logical information segment 1 may carry the second mode information, to indicate the second mode. A logical information segment 2 may carry the second terminal device rank information, to indicate the rank of the terminal device in the multiple terminal devices. A logical information segment 3 may carry the third codebook set information, to indicate the codebook set that is used by each terminal device and that corresponds to the second feature matrix. If the feature matrix indicated by the second mode corresponds to only one codebook set, codebook sets allocated to the terminals are a same codebook set, and the codebook set that is respectively used by each terminal and that corresponds to the second feature matrix does not need to be indicated. Therefore, it may be understood that the logical information segment 3 may be optional.

It should be understood that, in this embodiment of the present invention, the logical information segments of the codebook indication information may be continuously or discontinuously carried in any order in an instruction in which the codebook indication information is located, which is not limited in this embodiment of the present invention.

Accordingly, after the terminal device receives the instruction or a message carrying the codebook indication information, for example, the terminal device may learn, according to the logical information segment 1, the network device uses which mode to send the downlink data streams. In this way, the terminal device may learn the feature matrix used by the network device to send the downlink data streams and the information about allocation of the feature sequences in the feature matrix to the multiple terminal devices. Further, the terminal device may learn, according to the logical information segment 2, the rank of the terminal device in the multiple terminal devices. In this way, the terminal device may learn the terminal device uses which feature sequence or feature sequences in the feature matrix. Further, the terminal device may learn, according to the logical information segment 3, the codebook set that is used by each terminal device and that corresponds to the second feature matrix. Certainly, the logical information segment 3 may be optional, as explained above. Therefore, according to the information about allocation of the feature sequences in the feature matrix to the multiple terminal devices and the correspondence between each codebook in the codebook set and each feature sequence in the feature matrix, the terminal device can further determine the first codebook used by the network device to send the first downlink data stream to the terminal device, and the terminal device can also determine the one or more second codebooks used by the network device to send the second downlink data stream to another terminal device, so that the terminal device can determine codebooks used for all data streams carried on a same time-frequency resource, and can decode, according to the codebooks, the first data stream sent by the network device to the terminal device. In this way, the network device and the terminal device can perform downlink data transmission based on the codebooks, and a network capacity of a system, including a quantity of users that can access the system, spectral efficiency, and the like, can be effectively improved.

Still using the mode shown in Table 4 as an example, it is assumed that the network device determines that the mode 0 is used to transmit downlink data streams, determines that a rank of the terminal device receiving the first downlink data stream in three terminal devices is second, and determines a codebook set that is respectively used by each terminal device and that corresponds to a feature matrix. Then the network device needs to indicate, to the terminal device, only the mode 0, rank information of the terminal device, and codebook sets used by the terminal devices. The terminal device may learn, according to the received codebook indication information, the feature matrix used by the network device to send the downlink data streams, codebook sets that are in one or more codebook sets corresponding to the feature matrix and that are used by the terminal devices, and the codebook set that is used by each terminal device and that corresponds to the feature matrix. In this way, the second terminal device can further determine, according to information about allocation of feature sequences in the feature matrix to the multiple terminal devices and a correspondence between each codebook in the codebook set and each feature sequence in the feature matrix, that codebooks 3 and 5 in a codebook set used by the second terminal device are first codebooks, codebooks 0 and 1 in a codebook set used by the first terminal device are second codebooks, and codebooks 2 and 4 in a codebook set used by the third terminal device are second codebooks. In this way, the terminal device can decode the first downlink data stream sent by the network device to the terminal device. Certainly, if the feature matrix corresponds to only one codebook set, because each terminal uses a same codebook set, the terminal device may not need to determine codebook sets respectively used by the terminal devices.

Therefore, by means of information exchange between a network device and a terminal device, the terminal device can determine codebooks used for all data streams carried on a same time-frequency resource. In this way, the network device and the terminal device can perform downlink data transmission based on the codebooks, and a network capacity of a system, including a quantity of users that can access the system, spectral efficiency, and the like, can be effectively improved.

It should be further understood that, in this embodiment of the present invention, if the logical information segments indicate index values, consistent index relationships between related information, for example, an index relationship between a mode index value and a mode, an index relationship between a feature matrix index value and each feature matrix, an index relationship between a codebook set index value and a codebook set in each codebook cluster, and an index relationship between a codebook index value and a codebook in each codebook set, need to be pre-established on a network device side and a terminal device side, so that the network device and the terminal device can uniquely determine a corresponding mode, feature matrix, codebook set, and codebook from the pre-established related index relationships according to the index values indicated by the logical information segments.

It should be further understood that, in this embodiment of the present invention, the network device and the terminal device may pre-store a codebook by using multiple methods, but the following two conditions need to be met: First, the network device and the terminal device may learn, according to the stored codebook, a quantity of resource units or subcarriers or resource elements included in a coding unit. Second, the network device and the terminal device may learn, according to the stored codebook, the terminal device sends which non-zero-modulation symbols on which resource units or subcarriers or resource elements of a coding unit.

A simple and direct method that meets the foregoing storage conditions is to store a codebook in the foregoing form, including storing all zero-modulation symbols and non-zero-modulation symbols of codewords. For brevity, details are not described again herein.

It should be understood that, this embodiment of the present invention is described by using only an example in which the codebook indication information includes the second mode information, the second terminal device rank information, and the third codebook set information, but the present invention is not limited thereto, and the codebook indication information may further include other information.

It should be understood that, in this embodiment of the present invention, an $i^{th}$ codebook in a codebook set corresponds to an $i^{th}$ feature sequence in a corresponding feature matrix, where i is a natural number and is less than or equal to a quantity of feature sequences. It should be further understood that, in this embodiment of the present invention, a quantity of codebooks in a codebook set may be the same as or different from a quantity of feature sequences in a feature matrix corresponding to the codebook set. For example, the quantity of the codebooks in the codebook set is less than the quantity of the feature sequences in the feature matrix corresponding to the codebook set. Preferably, the quantity of the codebooks in the codebook set is the same as the quantity of the feature sequences in the feature matrix corresponding to the codebook set.

Therefore, according to the indication information transmission method in this embodiment of the present invention, a network device determines, in one or more codebooks, a first codebook used to send a first downlink data stream to a terminal device; determines one or more second codebooks used to send a second downlink data stream, where the second downlink data stream is one or more downlink data streams, other than the first downlink data stream, carried on a time-frequency resource used for the first downlink data stream; determines codebook indication information used to indicate the first codebook and the one or more second codebooks; and sends the codebook indication information to the terminal device, so that the terminal device can determine codebooks used for all data streams carried on the same time-frequency resource, and can decode, according to the codebooks, the first data stream sent by the network device to the terminal device. In this way, the network device and the terminal device can perform downlink data transmission based on the codebooks, and a network capacity of a system, including a quantity of users that can access the system, spectral efficiency, and the like, can be effectively improved.

In this embodiment of the present invention, the network device may send the codebook indication information to the terminal device in multiple manners. For example, the network device may perform indication to the terminal device in a dynamic or semi-persistent manner by using a downlink control channel, or in a semi-persistent manner by using a data channel, or in a persistent manner by using a broadcast channel or data channel.

Optionally, in this embodiment of the present invention, the sending the codebook indication information to the terminal device includes: sending a downlink scheduling message, dedicated higher layer control signaling, or a system broadcast message to the terminal device, where the downlink scheduling message, the dedicated higher layer control signaling, and the system broadcast message include the codebook indication information.

Optionally, the dedicated higher layer control signaling includes a radio resource control RRC connection establishment message and an RRC connection reconfiguration message. It should be understood that, this embodiment of the present invention is described by using only an example in which the dedicated higher layer control signaling includes the RRC connection establishment message and the RRC connection reconfiguration message, but the present invention is not limited thereto, and other dedicated higher layer control signaling may be used to send the codebook indication information to the terminal device.

In this embodiment of the present invention, optionally, the codebook is a sparse code multiple access (SCMA) codebook. Further, optionally, a quantity of zero-modulation symbols of a codeword included in the codebook is greater than or equal to a quantity of non-zero-modulation symbols.

In this embodiment of the present invention, the network device sends the codebook indication information to the terminal device by using at least one of a bit string or a table. Optionally, the codebook indication information is bit string information.

Specifically, in this embodiment of the present invention, the logical information segments in the codebook indication information may be implemented by using multiple methods, including but not limited to the following several methods:

Manner 1: The logical information segments use independent bit strings or bitmaps to implement information indication functions.

Manner 2: The multiple logical information segments perform joint indication.

Manner 3: The logical information segments and an information segment that is in the message or instruction in which the codebook indication information is located and that has another indication function perform joint indication.

For specific examples in which the logical information segments in the codebook indication information are implemented in the foregoing several manners, refer to the foregoing descriptions. For brevity, details are not described again herein.

It should be further understood that sequence numbers of the foregoing processes do not mean execution sequences in various embodiments of the present invention. The execution sequences of the processes should be determined according to functions and internal logic of the processes, and should not be construed as any limitation on the implementation processes of the embodiments of the present invention.

Therefore, according to the indication information transmission method in this embodiment of the present invention, a network device determines, in one or more codebooks, a first codebook used to send a first downlink data stream to a terminal device; determines one or more second codebooks used to send a second downlink data stream, where the second downlink data stream is one or more downlink data streams, other than the first downlink data stream, carried on a time-frequency resource used for the first downlink data stream; determines codebook indication information used to indicate the first codebook and the one or more second codebooks; and sends the codebook indication information to the terminal device, so that the terminal device can determine codebooks used for all data streams carried on the same time-frequency resource, and can decode, according to the codebooks, the first data stream sent by the network device to the terminal device. In this way, the network device and the terminal device can perform downlink data transmission based on the codebooks, and a network capacity of a system can be effectively improved.

The foregoing describes in detail an indication information transmission method according to an embodiment of the present invention with reference to FIG. 16 and FIG. 17 from a perspective of a network device. A codebook set meets a condition that codewords in a same codebook set have a same total quantity of modulation symbols and codebooks in a same codebook set have a same total quantity of codewords. The following describes an indication information transmission method according to an embodiment of the present invention with reference to FIG. 18 and FIG. 19 from a perspective of a terminal device.

In an embodiment of the present invention, an indication information transmission method 300 shown in FIG. 6 may be executed by, for example, a terminal device in a communications system. The terminal device is, for example, user equipment. The method 300 includes the following steps:

S310: Receive codebook indication information sent by a network device, where the codebook indication information is used to indicate a first codebook used by the network device to send a first downlink data stream, and one or more second codebooks used by the network device to send a second downlink data stream, the second downlink data stream is one or more downlink data streams, other than the first downlink data stream, carried on a time-frequency resource used for the first downlink data stream, the codebook consists of two or more codewords, the codewords are multidimensional complex vectors, and are used to indicate mapping relationships between data and at least two modulation symbols, the mapping relationships may be direct mapping relationships, and the at least two modulation symbols include at least one zero-modulation symbol and at least one non-zero-modulation symbol.

S320: Determine the first codebook and the one or more second codebooks according to the codebook indication information.

S330: Decode the received data stream according to the first codebook and the one or more second codebooks.

It should be understood that, in this embodiment of the present invention, the data stream may be a downlink data stream, or may be a data stream sent by one network device to another network device.

Specifically, in a non-orthogonal multiple access system such as an SCMA system, a network device allocates or specifies a codebook for one or more downlink data streams to be received by each terminal device. To correctly receive or decode a downlink data stream sent by the network device to the terminal device, the terminal device needs to learn a codebook used by the network device to send the downlink data stream, and one or more codebooks used by the network device to send another downlink data stream on a time-frequency resource used by the network device to send the downlink data stream.

Therefore, the network device may determine a first codebook and one or more second codebooks, and determine codebook indication information used to indicate the first codebook and the one or more second codebooks. The first codebook is a codebook used by the network device to send a first downlink data stream to a terminal device. The one or more second codebooks are one or more codebooks used by the network device to send a second downlink data stream to another terminal device. The second downlink data stream is one or more downlink data streams, other than the first downlink data stream, carried on a time-frequency resource used for the first downlink data stream. Moreover, the network device may send the codebook indication information to the terminal device. The codebook indication information is used to indicate the first codebook used by the terminal device to receive the first downlink data stream and the one or more second codebooks.

After receiving the codebook indication information sent by the network device, the terminal device may determine, according to the codebook indication information, the first codebook used by the network device to send the first downlink data stream and the one or more second codebooks used by the network device to send another downlink data stream on the same time-frequency resource used by the network device to send the downlink data stream. In this way, the terminal device can receive or decode, according to the first codebook and the one or more second codebooks, the first downlink data stream sent by the network device. Therefore, by means of information exchange between the network device and the terminal device, the terminal device can determine codebooks used for all data streams carried on the same time-frequency resource. In this way, the network device and the terminal device can perform downlink data transmission based on the codebooks, and a network capacity of the system can be effectively improved.

Therefore, according to the indication information transmission method in this embodiment of the present invention, a network device determines, in one or more codebooks, a first codebook used to send a first downlink data stream to a terminal device; determines one or more second codebooks used to send a second downlink data stream, where the second downlink data stream is one or more downlink data streams, other than the first downlink data stream, carried on a time-frequency resource used for the first downlink data stream; determines codebook indication information used to indicate the first codebook and the one or more second codebooks; and sends the codebook indication information to the terminal device, so that the terminal device can determine codebooks used for all data streams carried on the same time-frequency resource, and can decode, according to the codebooks, the first data stream sent by the network device to the terminal device. In this way, the network device and the terminal device can perform downlink data transmission based on the codebooks, and a network capacity of a system, including a quantity of users that can access the system, spectral efficiency, and the like, can be effectively improved.

In this embodiment of the present invention, according to a non-orthogonal multiple access technology, multiple different data streams are transmitted on a same resource unit by using codebooks, that is, multiple different data streams are multiplexed on a same resource unit. Different codebooks are used for different data streams. Therefore, resource utilization is improved. The data streams may be from a same terminal device or different terminal devices.

Therefore, according to the non-orthogonal multiple access technology, data in a data stream is directly mapped to a codeword, that is, a multidimensional complex vector, in a codebook according to a particular mapping relationship, so that the data is extended and sent on multiple resource units. The data may be binary bit data or multivariate data. The resource units may be time domain, frequency domain, space domain, time-frequency domain, time-space domain, or time-frequency-space domain resource units.

In this embodiment of the present invention, a codebook consists of two or more codewords, the codewords are multidimensional complex vectors, and are used to indicate mapping relationships between data and at least two modulation symbols, the mapping relationships may be may be direct mapping relationships, and the at least two modulation symbols include at least one zero-modulation symbol and at least one non-zero-modulation symbol. Each feature matrix consists of two or more feature sequences, each feature matrix corresponds to one or more codebooks, each feature sequence also corresponds to one or more codebooks, the feature sequence consists of a zero-element and a 1-element, the zero-element means that modulation symbols of all codewords in a corresponding codebook at a location corresponding to the zero-element are all zero-modulation symbols, and the 1-element means that modulation symbols of all codewords in a corresponding codebook at a location corresponding to the 1-element are not all zero-modulation symbols or are all non-zero-modulation symbols.

In this embodiment of the present invention, multiple codebooks may be divided into one or more codebook clusters, each codebook cluster may include one or more codebooks, and any two codebooks, for example, a codebook a and a codebook b, in a same codebook cluster has a feature as follows: A codeword in the codebook a and a codeword in the codebook b have a same total quantity of modulation symbols. Therefore, a codebook in a codebook cluster meets a condition that all codewords have a same total quantity of modulation symbols, that is, lengths of all codewords are the same, and quantities of resource units on which data streams are multiplexed are the same.

In this embodiment of the present invention, multiple codebooks may alternatively be divided into one or more codebook sets, each codebook set may include one or more codebooks, and any two codebooks, for example, a codebook c and a codebook d, in a same codebook set have features as follows: (1) A codeword in the codebook c and a codeword in the codebook d have a same total quantity of modulation symbols. (2) A quantity of codewords in the codebook c is the same as a quantity of codewords in the codebook d, that is, codebooks in the codebook set has a same total quantity of codewords.

In this embodiment of the present invention, each codebook cluster includes one or more codebook sets, each codebook set includes one or more codebooks, each codebook consists of two or more codewords, each codebook cluster meets a condition that codewords in a same codebook cluster have a same total quantity of modulation symbols, and each codebook set meets a condition that codewords in a same codebook set have a same total quantity of modulation symbols and codebooks in a same codebook set have a same total quantity of codewords.

In this embodiment of the present invention, optionally, the codebook indication information includes first codebook cluster information, first codebook set information, and first indication information, the first codebook cluster information is used to indicate a first codebook cluster, the first codebook set information is used to indicate a first codebook set in the first codebook cluster, the first indication information is used to indicate the first codebook in the first codebook set, and the first indication information is further used to indicate one or more second codebook sets in the first codebook cluster and the one or more second codebooks in the one or more second codebook sets; and the determining the first codebook and the one or more second codebooks according to the codebook indication information includes:

determining, according to the first codebook cluster information, the first codebook set information, and the first indication information, the first codebook in the first codebook set included in the first codebook cluster and the one or more second codebooks in the one or more second codebook sets included in the first codebook cluster, where each codebook cluster includes at least one codebook set, each codebook set includes at least one codebook, the codebook cluster meets a condition that codewords in a same codebook cluster have a same total quantity of modulation symbols, and the codebook set meets a condition that codewords in a same codebook set have a same total quantity of modulation symbols and codebooks in a same codebook set have a same total quantity of codewords.

Specifically, in this embodiment of the present invention, the network device and the terminal device may store pre-designed codebooks. The codebooks may be divided into one or more codebook sets, each codebook set consists of one or more codebooks, each codebook corresponds to one modulation order, and any two codebooks in a same codebook set have features as follows: Codewords in a same codebook set have a same total quantity of modulation symbols. Codebooks in a same codebook set have a same total quantity of codewords.

The one or more codebook sets obtained through division in the foregoing manner may be further divided into one or more codebook clusters, each codebook cluster consists of one or more codebook sets, and any two codebook sets, for example, a codebook set A and a codebook set B, in a same codebook cluster has a feature as follows: A codeword in the codebook set A and a codeword in the codebook set B have a same total quantity of modulation symbols, that is, lengths of all codewords are the same, and quantities of resource units on which data streams are multiplexed are the same. That is, the codebook cluster meets a condition that codewords in a same codebook cluster have a same total quantity of modulation symbols.

In this embodiment of the present invention, the codebook indication information sent by the network device and received by the terminal device may include the first codebook cluster information, the first codebook set information, and the first indication information. For example, the codebook indication information may consist of three logical information segments. A logical information segment 1 may carry the first codebook cluster information, to indicate, to the terminal device, the first codebook cluster used to send the first downlink data stream and the second downlink data stream. A logical information segment 2 may carry the first codebook set information, to indicate, to the terminal device, the first codebook set used to send the first downlink data stream in the first codebook cluster. A logical information segment 3 may carry the first indication information. The first indication information is used to indicate the first codebook in the first codebook set, and the first indication information is further used to indicate the one or more second codebook sets in the first codebook cluster and the one or more second codebooks in the one or more second codebook sets.

It should be understood that, in this embodiment of the present invention, the logical information segments of the codebook indication information may be continuously or discontinuously carried in any order in an instruction in which the codebook indication information is located, which is not limited in this embodiment of the present invention.

After the terminal device receives the instruction or a message carrying the codebook indication information, for example, according to the logical information segment 1, the terminal device may learn the network device uses a codebook in which codebook cluster to send the first downlink data stream and the second downlink data stream. According to the logical information segment 2, the terminal device may learn the network device uses a codebook in which codebook set in the codebook cluster indicated by the logical information segment 1 to send the first downlink data stream. According to the logical information segment 3, the terminal device may learn the network device uses which codebook in the codebook set indicated by the logical information segment 2 to send the first downlink data stream. In addition, the terminal device may further learn the network device uses which codebook sets in the codebook cluster indicated by the logical information segment 1 and which codebooks in the codebook sets to send the second downlink data stream.

Therefore, by means of information exchange between a network device and a terminal device, the terminal device can determine codebooks used for all data streams carried on a same time-frequency resource. In this way, the network device and the terminal device can perform downlink data transmission based on the codebooks, and a network capacity of a system, including a quantity of users that can access the system, spectral efficiency, and the like, can be effectively improved.

In this embodiment of the present invention, the terminal device may receive the first codebook in the first codebook set, the one or more second codebook sets in the first codebook cluster, and the one or more second codebooks in the one or more second codebook sets that are indicated by the network device in multiple manners. The following provides separate descriptions.

Optionally, in this embodiment of the present invention, the first indication information includes: first codebook information, second codebook set information, and second codebook information, the first codebook information is used to indicate the first codebook in the first codebook set, the second codebook set information is used to indicate the one or more second codebook sets in the first codebook cluster, and the second codebook information is used to indicate the one or more second codebooks in the one or more second codebook sets.

Specifically, in this embodiment of the present invention, for example, the logical information segment 3 carrying the first indication information may further include three logical information subsegments: a logical information subsegment 1, a logical information subsegment 2, and a logical information subsegment 3. The logical information subsegment 1 may carry the first codebook information, to indicate the first codebook in the first codebook set. The logical information subsegment 2 may carry the second codebook set information, to indicate the one or more second codebook sets in the first codebook cluster. The logical information subsegment 3 may carry the second codebook information, to indicate the one or more second codebooks in the one or more second codebook sets.

It should be understood that, this embodiment of the present invention is described by using only an example in which the first indication information includes the first codebook information, the second codebook set information, and the second codebook information, but the present invention it not limited thereto.

Therefore, by means of information exchange between a network device and a terminal device, the terminal device can determine codebooks used for all data streams carried on a same time-frequency resource. In this way, the network device and the terminal device can perform downlink data transmission based on the codebooks, and a network capacity of a system, including a quantity of users that can access the system, spectral efficiency, and the like, can be effectively improved.

Optionally, in this embodiment of the present invention, the first indication information includes M groups of bit string information in a one-to-one correspondence with all codebook sets in the first codebook cluster, each group of bit string information is used to indicate whether a corresponding codebook set belongs to the first codebook set or the one or more second codebook sets, when the codebook set corresponding to each group of bit string information belongs to the first codebook set or the one or more second codebook sets, each group of bit string information is further used to indicate the first codebook or the one or more second codebooks in the corresponding codebook set, and M is quantity of codebook sets included in the first codebook cluster.

It should be understood that, in this embodiment of the present invention, if the logical information segments indicate index values, consistent index relationships between related information, for example, an index relationship between a codebook cluster index value and a codebook cluster, an index relationship between a codebook set index value and a codebook set in each codebook cluster, and an index relationship between a codebook index value and a codebook in each codebook set, need to be pre-established on a network device side and a terminal device side, so that the network device and the terminal device can uniquely determine a corresponding codebook cluster, codebook set, and codebook from the pre-established related index relationships according to the index values indicated by the logical information segments.

It should be further understood that, in this embodiment of the present invention, the network device and the terminal device may pre-store a codebook by using multiple methods. For brevity, details are not described again herein.

Therefore, according to the indication information transmission method in this embodiment of the present invention, a network device determines, in one or more codebooks, a first codebook used to send a first downlink data stream to a terminal device; determines one or more second codebooks used to send a second downlink data stream, where the second downlink data stream is one or more downlink data streams, other than the first downlink data stream, carried on a time-frequency resource used for the first downlink data stream; determines codebook indication information used to indicate the first codebook and the one or more second codebooks; and sends the codebook indication information to the terminal device, so that the terminal device can determine codebooks used for all data streams carried on the same time-frequency resource, and can decode, according to the codebooks, the first data stream sent by the network device to the terminal device. In this way, the network device and the terminal device can perform downlink data transmission based on the codebooks, and a network capacity of a system, including a quantity of users that can access the system, spectral efficiency, and the like, can be effectively improved.

The following describes in detail a method for determining the codebooks according to this embodiment of the present invention with reference to FIG. 18 and FIG. 19.

As shown in FIG. 18, in this embodiment of the present invention, optionally, the codebook indication information includes first mode information and first terminal device rank information, the first mode information is used to indicate a first mode, the first mode is used to indicate a third codebook set to which the first codebook and the one or more second codebooks belong, and information about allocation of codebooks in the third codebook set to multiple terminal devices to which the first data stream and the second data stream belong, and the first terminal device rank information is used to indicate a rank of the terminal device in the multiple terminal devices.

The determining the first codebook and the one or more second codebooks according to the codebook indication information includes the following step:

S323: Determine, according to the first mode information and the first terminal device rank information and in the third codebook set indicated by the first mode, the first codebook corresponding to the first terminal device rank information and the one or more second codebooks, where each codebook set includes at least one codebook, and the codebook set meets a condition that codewords in a same codebook set have a same total quantity of modulation symbols and codebooks in a same codebook set have a same total quantity of codewords.

Specifically, in this embodiment of the present invention, the network device and the terminal device may store pre-designed codebooks. The codebooks may be divided into one or more codebook sets, each codebook set consists of one or more codebooks, and any two codebooks, for example, a codebook a and a codebook b, in a same codebook set have features as follows: A codeword in the codebook a and a codeword in the codebook b have a same total quantity of modulation symbols, that is, a codeword in the codebook a and a codeword in the codebook b have a same length, and quantities of resource units on which data streams are multiplexed are the same. Moreover, a quantity of codewords in the codebook a is the same as a quantity of codewords in the codebook b, that is, codebooks in the codebook set has a same total quantity of codewords. Therefore, in this embodiment of the present invention, codebooks in a codebook set have a same quantity of codewords. A quantity of codewords may be referred to as a modulation order. Certainly, a person skilled in the art may give another name to the modulation order. Therefore, it may be understood that the codebook set in this embodiment of the present invention consists of a codebook having a modulation order. Further, codewords of the codebook have a same length.

In this embodiment of the present invention, the network device and the terminal device may further store various pre-designed modes. In one aspect, each mode indicates a same codebook set used by the network device to send the first downlink data stream and the second downlink data stream to the terminal devices. That is, in this embodiment of the present invention, the first codebook and the one or more second codebooks belong to a same codebook set. In another aspect, each mode further indicates information about allocation of codebooks in the codebook set to the multiple terminal devices. That is, each mode may further indicate information about a codebook respectively used to send a downlink data stream to each terminal device that is arranged according to a rank.

In this embodiment of the present invention, the codebook indication information determined by the network device and used to indicate the first codebook and the one or more second codebooks may include the first mode information and the first terminal device rank information. A logical information segment 1 may carry the first mode information, to indicate the first mode. A logical information segment 2 may carry the first terminal device rank information, to indicate the rank of the terminal device in the multiple terminal devices.

It should be understood that, in this embodiment of the present invention, the logical information segments of the codebook indication information may be continuously or discontinuously carried in any order in an instruction in which the codebook indication information is located, which is not limited in this embodiment of the present invention.

Accordingly, after the terminal device receives the instruction or a message carrying the codebook indication information, for example, the terminal device may learn, according to the logical information segment 1, the network device uses which mode to send the downlink data streams. In this way, the terminal device may learn a codebook set used by the network device to send the downlink data streams and information about allocation of codebooks in the codebook set to the multiple terminal devices. Further, the terminal device may learn rank information of the terminal device according to the logical information segment 2. Therefore, the terminal device can determine the first codebook used by the network device to send the first downlink data stream to the terminal device, and the terminal device can also determine the one or more second codebooks used by the network device to send the second downlink data stream to another terminal device, so that the terminal device can determine codebooks used for all data streams carried on a same time-frequency resource, and can decode, according to the codebooks, the first data stream sent by the network device to the terminal device. In this way, the network device and the terminal device can perform downlink data transmission based on the codebooks, and a network capacity of a system, including a quantity of users that can access the system, spectral efficiency, and the like, can be effectively improved.

It should be further understood that, in this embodiment of the present invention, if the logical information segments indicate index values, consistent index relationships between related information, for example, an index relationship between a mode index value and a mode, an index relationship between a codebook set index value and a codebook set in each codebook cluster, and an index relationship between a codebook index value and a codebook in each codebook set, need to be pre-established on a network device side and a terminal device side, so that the network device and the terminal device can uniquely determine a corresponding mode, codebook set, and codebook from the pre-established related index relationships according to the index values indicated by the logical information segments.

It should be further understood that, in this embodiment of the present invention, the network device and the terminal device may pre-store a codebook by using multiple methods, but the following two conditions need to be met: First, the network device and the terminal device may learn, according to the stored codebook, a quantity of resource units or subcarriers or resource elements included in a coding unit. Second, the network device and the terminal device may learn, according to the stored codebook, the terminal device sends which non-zero-modulation symbols on which resource units or subcarriers or resource elements of a coding unit.

A simple and direct method that meets the foregoing storage conditions is to store a codebook in the foregoing form, including storing all zero-modulation symbols and non-zero-modulation symbols of codewords. For brevity, details are not described again herein.

Therefore, according to the indication information transmission method in this embodiment of the present invention, a terminal device can determine codebooks used for all data streams carried on a same time-frequency resource, and can decode, according to the codebooks, a first data stream sent by a network device to the terminal device. In this way, the network device and the terminal device can perform downlink data transmission based on the codebooks, and a network capacity of a system, including a quantity of users that can access the system, spectral efficiency, and the like, can be effectively improved.

FIG. 19 is still another schematic flowchart of an indication information transmission method according to another embodiment of the present invention. As shown in FIG. 19, in this embodiment of the present invention, optionally, the codebook indication information includes second mode information, second terminal device rank information, and third codebook set information, the second mode information is used to indicate a second mode, the second mode is used to indicate a second feature matrix to which the first codebook and the one or more second codebooks belong, and information about allocation of feature sequences in the second feature matrix to multiple terminal devices to which the first data stream and the second data stream belong, the second terminal device rank information is used to indicate a rank of the terminal device in the multiple terminal devices, and the third codebook set information is used to indicate a codebook set that is respectively used by each of the multiple terminal devices and that corresponds to the second feature matrix.

The determining the first codebook and the one or more second codebooks according to the codebook indication information includes the following step:

S324: Determine, according to the second mode information, the second terminal device rank information, and the third codebook set information and in one or more codebook sets corresponding to the second feature matrix indicated by the second mode, the first codebook corresponding to the second terminal device rank information and the one or more second codebooks, where each feature matrix corresponds to one or more codebook sets, the feature matrix consists of two or more feature sequences, the feature sequence consists of a zero-element and a 1-element, the zero-element means that modulation symbols of all codewords in a corresponding codebook at a location corresponding to the zero-element are all zero-modulation symbols, the 1-element means that modulation symbols of all codewords in a corresponding codebook at a location corresponding to the 1-element are not all zero-modulation symbols or are all non-zero-modulation symbols, each codebook set includes at least one codebook, the codebook set meets a condition that codewords in a same codebook set have a same total quantity of modulation symbols and codebooks in a same codebook set have a same total quantity of codewords, and each codebook in the codebook set respectively corresponds to each feature sequence in the feature matrix.

Specifically, in this embodiment of the present invention, the network device and the terminal device may store pre-designed codebooks. The codebooks may be divided into one or more codebook sets, each codebook set consists of one or more codebooks, and any two codebooks, for example, a codebook a and a codebook b, in a same codebook set have features as follows: A codeword in the codebook a and a codeword in the codebook b have a same total quantity of modulation symbols, that is, a codeword in the codebook a and a codeword in the codebook b have a same length, and quantities of resource units on which data streams are multiplexed are the same. Moreover, a quantity of codewords in the codebook a is the same as a quantity of codewords in the codebook b, that is, codebooks in the codebook set has a same total quantity of codewords. Therefore, in this embodiment of the present invention, a codebook set consists of a codebook having a modulation order, and codewords of the codebook have a same length.

After the codebook set is obtained through division in the foregoing manner, one codebook set may uniquely correspond to one feature matrix. One feature matrix may correspond to one or more codebook sets, and each codebook set may correspond to one modulation order.

In this embodiment of the present invention, the network device and the terminal device may further store various pre-designed modes. In one aspect, each mode indicates a same feature matrix used by the network device to send the first downlink data stream and the second downlink data stream to the multiple terminal devices. That is, in this embodiment of the present invention, the first codebook and the one or more second codebooks correspond to a same feature matrix. Therefore, the first codebook and the one or more second codebooks may have different modulation orders. In another aspect, each mode further indicates information about allocation of feature sequences in the feature matrix to the multiple terminal devices. In this embodiment of the present invention, each codebook in the codebook set respectively corresponds to each feature sequence in the feature matrix. Therefore, the allocation information may be used to indicate information about a codebook used by the terminal device in a corresponding codebook set. In still another aspect, in addition to indicating the information about allocation of the feature sequences to the multiple terminal devices, each mode may further indicate a quantity of the multiple terminal devices.

Therefore, in this embodiment of the present invention, the codebook indication information determined by the network device may include the second mode information, the second terminal device rank information and the third codebook set information. A logical information segment 1 may carry the second mode information, to indicate the second mode. A logical information segment 2 may carry the second terminal device rank information, to indicate the rank of the terminal device in the multiple terminal devices. A logical information segment 3 may carry the third codebook set information, to indicate the codebook set that is used by each terminal device and that corresponds to the second feature matrix.

It should be understood that, in this embodiment of the present invention, the logical information segments of the codebook indication information may be continuously or discontinuously carried in any order in an instruction in which the codebook indication information is located, which is not limited in this embodiment of the present invention.

Accordingly, after the terminal device receives the instruction or a message carrying the codebook indication information, for example, the terminal device may learn, according to the logical information segment 1, the network device uses which mode to send the downlink data streams. In this way, the terminal device may learn the feature matrix used by the network device to send the downlink data streams and the information about allocation of the feature sequences in the feature matrix to the multiple terminal devices. Further, the terminal device may learn, according to the logical information segment 2, the rank of the terminal device in the multiple terminal devices. In this way, the terminal device may learn the terminal device uses which feature sequence or feature sequences in the feature matrix. Further, the terminal device may learn, according to the logical information segment 3, the codebook set that is used by each terminal device and that corresponds to the second feature matrix. If the feature matrix indicated by the mode corresponds to only one codebook set, codebook sets allocated to the terminals are a same codebook set, and the codebook set that is respectively used by each terminal and that corresponds to the second feature matrix does not need to be indicated. Therefore, it should be understood that the logical information segment 3 may be optional.

Therefore, according to the information about allocation of the feature sequences in the feature matrix to the multiple terminal devices and the correspondence between each codebook in the codebook set and each feature sequence in the feature matrix, the terminal device can further determine the first codebook used by the network device to send the first downlink data stream to the terminal device, and the terminal device can also determine the one or more second codebooks used by the network device to send the second downlink data stream to another terminal device, so that the terminal device can determine codebooks used for all data streams carried on a same time-frequency resource, and can decode, according to the codebooks, the first data stream sent by the network device to the terminal device. In this way, the network device and the terminal device can perform downlink data transmission based on the codebooks, and a network capacity of a system, including a quantity of users that can access the system, spectral efficiency, and the like, can be effectively improved.

Therefore, by means of information exchange between a network device and a terminal device, the terminal device can determine codebooks used for all data streams carried on a same time-frequency resource. In this way, the network device and the terminal device can perform downlink data transmission based on the codebooks, and a network capacity of a system, including a quantity of users that can access the system, spectral efficiency, and the like, can be effectively improved.

It should be understood that, in this embodiment of the present invention, "each codebook in the codebook set respectively corresponds to each feature sequence in the feature matrix" may mean that a quantity of codebooks in the codebook set is the same as a quantity of feature sequences in the feature matrix, that is, a total quantity of modulation symbols of a codeword in a codebook is the same as a total quantity of elements of a corresponding feature sequence; and may also mean that for any 1-element in a feature sequence, at least one codeword can be found in a corresponding codebook, so that modulation symbols of the codeword at a location of the 1-element are not zero-modulation symbols, and for any zero-element in the feature sequence, modulation symbols of all codewords in the corresponding codebook at a location of the zero-element are all zero-modulation symbols.

It should be further understood that, in this embodiment of the present invention, if the logical information segments indicate index values, consistent index relationships between related information, for example, an index relationship between a mode index value and a mode, an index relationship between a feature matrix index value and each feature matrix, an index relationship between a codebook set index value and a codebook set in each codebook cluster, and an index relationship between a codebook index value and a codebook in each codebook set, need to be pre-established on a network device side and a terminal device side, so that the network device and the terminal device can uniquely determine a corresponding mode, feature matrix, codebook set, and codebook from the pre-established related index relationships according to the index values indicated by the logical information segments.

It should be further understood that, in this embodiment of the present invention, the network device and the terminal device may pre-store a codebook by using multiple methods. For brevity, details are not described again herein.

In this embodiment of the present invention, preferably, each codebook in a codebook set is in a one-to-one correspondence with each feature sequence in a feature matrix, that is, an $i^{th}$ codebook in the codebook set corresponds to an $i^{th}$ feature sequence in the feature matrix, where i is a natural number and is less than or equal to a quantity of feature sequences.

It should be further understood that, in this embodiment of the present invention, a quantity of codebooks in a codebook set may be the same as or different from a quantity of feature sequences in a feature matrix corresponding to the codebook set. For example, the quantity of the codebooks in the codebook set is less than the quantity of the feature sequences in the feature matrix corresponding to the codebook set. Preferably, the quantity of the codebooks in the codebook set is the same as the quantity of the feature sequences in the feature matrix corresponding to the codebook set.

It should be understood that, exchange between a network device and a terminal device, related features and functions, and the like described from a network device side correspond to related features and functions described from a terminal device side. For brevity, details are not described again herein.

Optionally, in this embodiment of the present invention, the receiving the codebook indication information sent by the network device includes: receiving a downlink scheduling message, dedicated higher layer control signaling, or a system broadcast message that is sent by the network device, where the downlink scheduling message, the dedicated higher layer control signaling, and the system broadcast message include the codebook indication information.

Optionally, in this embodiment of the present invention, the dedicated higher layer control signaling includes a radio resource control (RRC) connection establishment message and an RRC connection reconfiguration message.

In this embodiment of the present invention, the terminal device may receive the codebook indication information that is sent by the network device by using at least one of a bit string or a table. Optionally, the codebook indication information is bit string information.

In this embodiment of the present invention, optionally, the codebook is a sparse code multiple access (SCMA) codebook. Further, optionally, a quantity of zero-modulation symbols of a codeword included in the codebook is greater than or equal to a quantity of non-zero-modulation symbols.

It should be understood that, exchange between a network device and a terminal device, related features and functions, and the like described from a network device side correspond to related features and functions described from a terminal device side. For brevity, details are not described again herein.

It should be further understood that sequence numbers of the foregoing processes do not mean execution sequences in various embodiments of the present invention. The execution sequences of the processes should be determined according to functions and internal logic of the processes, and should not be construed as any limitation on the implementation processes of the embodiments of the present invention.

Therefore, according to the indication information transmission method in this embodiment of the present invention, a terminal device can determine codebooks used for all data streams carried on a same time-frequency resource, and can decode, according to the codebooks, a first data stream sent by a network device to the terminal device. In this way, the network device and the terminal device can perform downlink data transmission based on the codebooks, and a network capacity of a system, including a quantity of users that can access the system, spectral efficiency, and the like, can be effectively improved.

The foregoing describes in detail an indication information transmission method according to an embodiment of the present invention with reference to FIG. 16 to FIG. 19. The following describes an indication information transmission apparatus according to an embodiment of the present invention with reference to FIG. 20 to FIG. 22, FIG. 14, and FIG. 15.

An indication information transmission apparatus 500 shown in FIG. 9 includes: a first determining module 510, a second determining module 520, a third determining module 530, and a sending module 540.

The first determining module 510 is configured to determine, in one or more codebooks, a first codebook used to send a first downlink data stream to a terminal device, where the codebook consists of two or more codewords, the codewords are multidimensional complex vectors, and are used to indicate mapping relationships between data and at least two modulation symbols, the mapping relationships may be direct mapping relationships, and the at least two modulation symbols include at least one zero-modulation symbol and at least one non-zero-modulation symbol.

The second determining module 520 is configured to determine one or more second codebooks used to send a second downlink data stream, where the second downlink data stream is one or more downlink data streams, other than the first downlink data stream, carried on a time-frequency resource used for the first downlink data stream.

The third determining module 530 is configured to determine codebook indication information used to indicate the first codebook determined by the first determining module 510 and the one or more second codebooks determined by the second determining module 520.

The sending module 540 is configured to send the codebook indication information determined by the third determining module 530 to the terminal device.

Therefore, according to the indication information transmission apparatus in this embodiment of the present invention, a network device determines, in one or more codebooks, a first codebook used to send a first downlink data stream to a terminal device; determines one or more second codebooks used to send a second downlink data stream, where the second downlink data stream is one or more downlink data streams, other than the first downlink data stream, carried on a time-frequency resource used for the first downlink data stream; determines codebook indication information used to indicate the first codebook and the one or more second codebooks; and sends the codebook indication information to the terminal device, so that the terminal device can determine codebooks used for all data streams carried on the same time-frequency resource, and can decode, according to the codebooks, the first data stream sent by the network device to the terminal device. In this way, the network device and the terminal device can perform downlink data transmission based on the codebooks, and a network capacity of a system can be effectively improved.

In this embodiment of the present invention, optionally, as shown in FIG. 10, the third determining module 530 includes:

a first determining unit 531, configured to determine a first codebook set to which the first codebook belongs, one or more second codebook sets to which the one or more second codebooks belong, and a first codebook cluster to which the first codebook set and the one or more second codebook sets belong, where each codebook cluster includes at least one codebook set, each codebook set includes at least one codebook, the codebook cluster meets a condition that codewords in a same codebook cluster have a same total quantity of modulation symbols, and the codebook set meets a condition that codewords in a same codebook set have a same total quantity of modulation symbols and codebooks in a same codebook set have a same total quantity of codewords; and a second determining unit 532, configured to determine the codebook indication information, where the codebook indication information includes first codebook cluster information, first codebook set information, and first indication information, the first codebook cluster information is used to indicate the first codebook cluster, the first codebook set information is used to indicate the first codebook set in the first codebook cluster, the first indication information is used to indicate the first codebook in the first codebook set, and the first indication information is further used to indicate the one or more second codebook sets in the first codebook cluster and the one or more second codebooks in the one or more second codebook sets.

In this embodiment of the present invention, optionally, the first indication information determined by the second determining unit 532 includes: first codebook information, second codebook set information, and second codebook information, the first codebook information is used to indicate the first codebook in the first codebook set, the second codebook set information is used to indicate the one or more second codebook sets in the first codebook cluster, and the second codebook information is used to indicate the one or more second codebooks in the one or more second codebook sets.

In this embodiment of the present invention, optionally, the first indication information determined by the second determining unit 532 includes M groups of bit string information in a one-to-one correspondence with all codebook sets in the first codebook cluster, each group of bit string information is used to indicate whether a corresponding codebook set belongs to the first codebook set or the one or more second codebook sets, when the codebook set corresponding to each group of bit string information belongs to the first codebook set or the one or more second codebook sets, each group of bit string information is further used to indicate the first codebook or the one or more second codebooks in the corresponding codebook set, and M is quantity of codebook sets included in the first codebook cluster.

Figure 20:
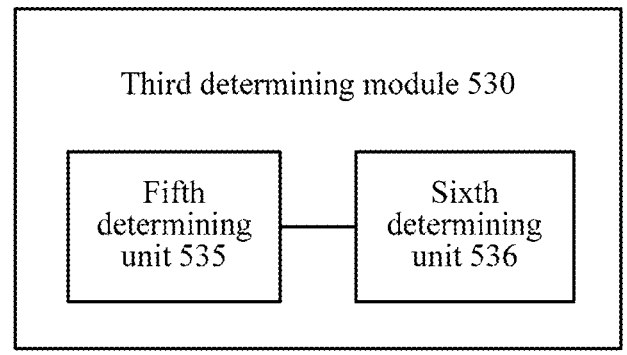
FIG. 20 is still another schematic block diagram of a third determining module of an apparatus according to an embodiment of the present invention.

In this embodiment of the present invention, optionally, as shown in FIG. 20, the second determining module 530 includes:

a fifth determining unit 535, configured to determine a first mode and a rank of the terminal device in multiple terminal devices to which the first data stream and the second data stream belong, where the first mode is used to indicate a third codebook set to which the first codebook and the one or more second codebooks belong, and information about allocation of codebooks in the third codebook set to the multiple terminal devices, each codebook set includes at least one codebook, and the codebook set meets a condition that codewords in a same codebook set have a same total quantity of modulation symbols and codebooks in a same codebook set have a same total quantity of codewords; and a sixth determining unit 536, configured to determine the codebook indication information, where the codebook indication information includes first mode information and first terminal device rank information, the first mode information is used to indicate the first mode, and the first terminal device rank information is used to indicate the rank of the terminal device in the multiple terminal devices.

Figure 21:
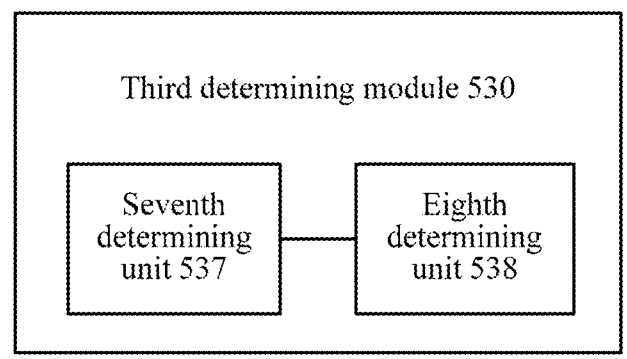
FIG. 21 is still another schematic block diagram of a third determining module of an apparatus according to an embodiment of the present invention.

In this embodiment of the present invention, optionally, as shown in FIG. 21, the third determining module 530 includes:

a seventh determining unit 537, configured to determine a second mode, a rank of the terminal device in multiple terminal devices to which the first data stream and the second data stream belong, and a codebook set used by each of the multiple terminal devices, where the second mode is used to indicate a second feature matrix to which the first codebook and the one or more second codebooks belong, and information about allocation of feature sequences in the second feature matrix to the multiple terminal devices, each feature matrix corresponds to one or more codebook sets, the feature matrix consists of two or more feature sequences, the feature sequence consists of a zero-element and a 1-element, the zero-element means that modulation symbols of all codewords in a corresponding codebook at a location corresponding to the zero-element are all zero-modulation symbols, the 1-element means that modulation symbols of all codewords in a corresponding codebook at a location corresponding to the 1-element are not all zero-modulation symbols or are all non-zero-modulation symbols, each codebook set includes at least one codebook, the codebook set meets a condition that codewords in a same codebook set have a same total quantity of modulation symbols and codebooks in a same codebook set have a same total quantity of codewords, and each codebook in the codebook set respectively corresponds to each feature sequence in the feature matrix; and an eighth determining unit 538, configured to determine the codebook indication information, where the codebook indication information includes second mode information, second terminal device rank information, and third codebook set information, the second mode information is used to indicate the second mode, the second terminal device rank information is used to indicate the rank of the terminal device in the multiple terminal devices, and the third codebook set information is used to indicate the codebook set that is used by each terminal device and that corresponds to the second feature matrix. The third codebook set information may be optional, as explained above.

It should be understood that the indication information transmission apparatus 500 according to this embodiment of the present invention may correspond to the network device in the method embodiment of the present invention, and the foregoing and other operations and/or functions of the modules in the apparatus 500 are separately used to implement corresponding procedures in the methods 200 in FIG. 3 to FIG. 5, FIG. 16, and FIG. 17, and are not described in detail herein for brevity.

Therefore, according to the indication information transmission apparatus in this embodiment of the present invention, a network device determines, in one or more codebooks, a first codebook used to send a first downlink data stream to a terminal device; determines one or more second codebooks used to send a second downlink data stream, where the second downlink data stream is one or more downlink data streams, other than the first downlink data stream, carried on a time-frequency resource used for the first downlink data stream; determines codebook indication information used to indicate the first codebook and the one or more second codebooks; and sends the codebook indication information to the terminal device, so that the terminal device can determine codebooks used for all data streams carried on the same time-frequency resource, and can decode, according to the codebooks, the first data stream sent by the network device to the terminal device. In this way, the network device and the terminal device can perform downlink data transmission based on the codebooks, and a network capacity of a system can be effectively improved.

The foregoing describes in detail an indication information transmission apparatus according to an embodiment of the present invention with reference to FIG. 20 and FIG. 21 from a network device side. The following describes in detail an indication information transmission apparatus according to an embodiment of the present invention with reference to FIG. 22 from a terminal device side.

An indication information transmission apparatus 600 shown in FIG. 12 includes: a receiving module 610, a determining module 620, and a decoding module 630.

The receiving module 610 is configured to receive codebook indication information sent by a network device, where the codebook indication information is used to indicate a first codebook used by the network device to send a first downlink data stream, and one or more second codebooks used by the network device to send a second downlink data stream, the second downlink data stream is one or more downlink data streams, other than the first downlink data stream, carried on a time-frequency resource used for the first downlink data stream, the codebook consists of two or more codewords, the codewords are multidimensional complex vectors, and are used to indicate mapping relationships between data and at least two modulation symbols, the mapping relationships may be direct mapping relationships, and the at least two modulation symbols include at least one zero-modulation symbol and at least one non-zero-modulation symbol.

The determining module 620 is configured to determine the first codebook and the one or more second codebooks according to the codebook indication information received by the receiving module 610.

The decoding module 630 is configured to decode, according to the first codebook and the one or more second codebooks that are determined by the determining module 620, the received first downlink data stream.

Therefore, according to the indication information transmission apparatus in this embodiment of the present invention, a network device determines, in one or more codebooks, a first codebook used to send a first downlink data stream to a terminal device; determines one or more second codebooks used to send a second downlink data stream, where the second downlink data stream is one or more downlink data streams, other than the first downlink data stream, carried on a time-frequency resource used for the first downlink data stream; determines codebook indication information used to indicate the first codebook and the one or more second codebooks; and sends the codebook indication information to the terminal device, so that the terminal device can determine codebooks used for all data streams carried on the same time-frequency resource, and can decode, according to the codebooks, the first data stream sent by the network device to the terminal device. In this way, the network device and the terminal device can perform downlink data transmission based on the codebooks, and a network capacity of a system can be effectively improved.

In this embodiment of the present invention, optionally, as shown in FIG. 13, the codebook indication information received by the receiving module 610 includes first codebook cluster information, first codebook set information, and first indication information, the first codebook cluster information is used to indicate a first codebook cluster, the first codebook set information is used to indicate a first codebook set in the first codebook cluster, the first indication information is used to indicate the first codebook in the first codebook set, and the first indication information is further used to indicate one or more second codebook sets in the first codebook cluster and the one or more second codebooks in the one or more second codebook sets; and the determining module 620 includes: a first determining unit 621, configured to determine, according to the first codebook cluster information, the first codebook set information, and the first indication information, the first codebook in the first codebook set included in the first codebook cluster and the one or more second codebooks in the one or more second codebook sets included in the first codebook cluster, where each codebook cluster includes at least one codebook set, each codebook set includes at least one codebook, the codebook cluster meets a condition that codewords in a same codebook cluster have a same total quantity of modulation symbols, and the codebook set meets a condition that codewords in a same codebook set have a same total quantity of modulation symbols and codebooks in a same codebook set have a same total quantity of codewords.

Optionally, in this embodiment of the present invention, the first indication information received by the receiving module 610 includes: first codebook information, second codebook set information, and second codebook information, the first codebook information is used to indicate the first codebook in the first codebook set, the second codebook set information is used to indicate the one or more second codebook sets in the first codebook cluster, and the second codebook information is used to indicate the one or more second codebooks in the one or more second codebook sets.

Optionally, in this embodiment of the present invention, the first indication information received by the receiving module 610 includes M groups of bit string information in a one-to-one correspondence with all codebook sets in the first codebook cluster, each group of bit string information is used to indicate whether a corresponding codebook set belongs to the first codebook set or the one or more second codebook sets, when the codebook set corresponding to each group of bit string information belongs to the first codebook set or the one or more second codebook sets, each group of bit string information is further used to indicate the first codebook or the one or more second codebooks in the corresponding codebook set, and M is quantity of codebook sets included in the first codebook cluster.

Figure 22:
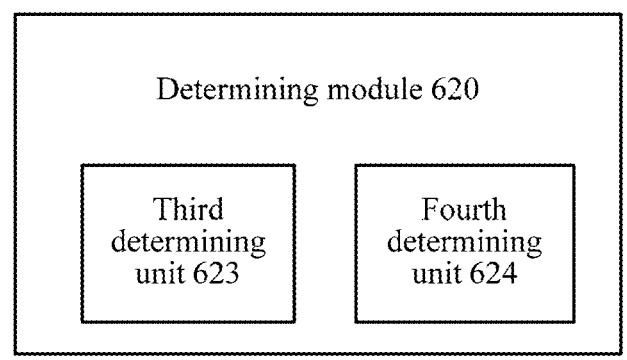
FIG. 22 is schematic block diagram of a determining module of an apparatus according to another embodiment of the present invention.

In this embodiment of the present invention, optionally, as shown in FIG. 22, the codebook indication information received by the receiving module 610 includes first mode information and first terminal device rank information, the first mode information is used to indicate a first mode, the first mode is used to indicate a third codebook set to which the first codebook and the one or more second codebooks belong, and information about allocation of codebooks in the third codebook set to multiple terminal devices to which the first data stream and the second data stream belong, and the first terminal device rank information is used to indicate a rank of the terminal device in the multiple terminal devices; and the determining module 620 includes: a third determining unit 623, configured to determine, according to the first mode information and the first terminal device rank information and in the third codebook set indicated by the first mode, the first codebook corresponding to the first terminal device rank information and the one or more second codebooks, where each codebook set includes at least one codebook, and the codebook set meets a condition that codewords in a same codebook set have a same total quantity of modulation symbols and codebooks in a same codebook set have a same total quantity of codewords.

In this embodiment of the present invention, optionally, as shown in FIG. 22, the codebook indication information received by the receiving module 610 includes second mode information, second terminal device rank information, and third codebook set information, the second mode information is used to indicate a second mode, the second mode is used to indicate a second feature matrix to which the first codebook and the one or more second codebooks belong, and information about allocation of feature sequences in the second feature matrix to multiple terminal devices to which the first data stream and the second data stream belong, the second terminal device rank information is used to indicate a rank of the terminal device in the multiple terminal devices, and the third codebook set information is used to indicate a codebook set that is respectively used by each of the multiple terminal devices and that corresponds to the second feature matrix, where the third codebook set information may be optional, as explained above; and the determining module 620 includes: a fourth determining unit 624, configured to determine, according to the second mode information, the second terminal device rank information, and the third codebook set information and in one or more codebook sets corresponding to the second feature matrix indicated by the second mode, the first codebook corresponding to the second terminal device rank information and the one or more second codebooks, where each feature matrix corresponds to one or more codebook sets, the feature matrix consists of two or more feature sequences, the feature sequence consists of a zero-element and a 1-element, the zero-element means that modulation symbols of all codewords in a corresponding codebook at a location corresponding to the zero-element are all zero-modulation symbols, the 1-element means that modulation symbols of all codewords in a corresponding codebook at a location corresponding to the 1-element are not all zero-modulation symbols or are all non-zero-modulation symbols, each codebook set includes at least one codebook, the codebook set meets a condition that codewords in a same codebook set have a same total quantity of modulation symbols and codebooks in a same codebook set have a same total quantity of codewords, and each codebook in the codebook set respectively corresponds to each feature sequence in the feature matrix. The third codebook set information may be optional, as explained above.

It should be understood that the indication information transmission apparatus 600 according to this embodiment of the present invention may correspond to the terminal device in the method embodiment of the present invention, and the foregoing and other operations and/or functions of the modules in the apparatus 600 are separately used to implement corresponding procedures in the methods 300 in FIG. 6 to FIG. 8, FIG. 18, and FIG. 19, and are not described in detail herein for brevity.

Therefore, according to the indication information transmission apparatus in this embodiment of the present invention, a network device determines, in one or more codebooks, a first codebook used to send a first downlink data stream to a terminal device; determines one or more second codebooks used to send a second downlink data stream, where the second downlink data stream is one or more downlink data streams, other than the first downlink data stream, carried on a time-frequency resource used for the first downlink data stream; determines codebook indication information used to indicate the first codebook and the one or more second codebooks; and sends the codebook indication information to the terminal device, so that the terminal device can determine codebooks used for all data streams carried on the same time-frequency resource, and can decode, according to the codebooks, the first data stream sent by the network device to the terminal device. In this way, the network device and the terminal device can perform downlink data transmission based on the codebooks, and a network capacity of a system can be effectively improved.

In an embodiment of the present invention, an indication information transmission apparatus 800 shown in FIG. 14 includes: a processor 810, a memory 820, a bus system 830, and a transmitter 840.

Optionally, in an embodiment, the determining, by the processor 810, codebook indication information used to indicate the first codebook and the one or more second codebooks includes:

determining a first codebook set to which the first codebook belongs, one or more second codebook sets to which the one or more second codebooks belong, and a first codebook cluster to which the first codebook set and the one or more second codebook sets belong, where each codebook cluster includes at least one codebook set, each codebook set includes at least one codebook, the codebook cluster meets a condition that codewords in a same codebook cluster have a same total quantity of modulation symbols, and the codebook set meets a condition that codewords in a same codebook set have a same total quantity of modulation symbols and codebooks in a same codebook set have a same total quantity of codewords; and determining the codebook indication information, where the codebook indication information includes first codebook cluster information, first codebook set information, and first indication information, the first codebook cluster information is used to indicate the first codebook cluster, the first codebook set information is used to indicate the first codebook set in the first codebook cluster, the first indication information is used to indicate the first codebook in the first codebook set, and the first indication information is further used to indicate the one or more second codebook sets in the first codebook cluster and the one or more second codebooks in the one or more second codebook sets.

Optionally, in an embodiment, the first indication information determined by the processor 810 includes: first codebook information, second codebook set information, and second codebook information, the first codebook information is used to indicate the first codebook in the first codebook set, the second codebook set information is used to indicate the one or more second codebook sets in the first codebook cluster, and the second codebook information is used to indicate the one or more second codebooks in the one or more second codebook sets.

Optionally, in an embodiment, the first indication information determined by the processor 810 includes M groups of bit string information in a one-to-one correspondence with all codebook sets in the first codebook cluster, each group of bit string information is used to indicate whether a corresponding codebook set belongs to the first codebook set or the one or more second codebook sets, when the codebook set corresponding to each group of bit string information belongs to the first codebook set or the one or more second codebook sets, each group of bit string information is further used to indicate the first codebook or the one or more second codebooks in the corresponding codebook set, and M is quantity of codebook sets included in the first codebook cluster.

Optionally, in an embodiment, the determining, by the processor 810, codebook indication information used to indicate the first codebook and the one or more second codebooks includes:

determining a first mode and a rank of the terminal device in multiple terminal devices to which the first data stream and the second data stream belong, where the first mode is used to indicate a third codebook set to which the first codebook and the one or more second codebooks belong, and information about allocation of codebooks in the third codebook set to the multiple terminal devices, each codebook set includes at least one codebook, and the codebook set meets a condition that codewords in a same codebook set have a same total quantity of modulation symbols and codebooks in a same codebook set have a same total quantity of codewords; and determining the codebook indication information, where the codebook indication information includes first mode information and first terminal device rank information, the first mode information is used to indicate the first mode, and the first terminal device rank information is used to indicate the rank of the terminal device in the multiple terminal devices.

Optionally, in an embodiment, the determining, by the processor 810, codebook indication information used to indicate the first codebook and the one or more second codebooks includes:

determining a second mode, a rank of the terminal device in multiple terminal devices to which the first data stream and the second data stream belong, and a codebook set used by each of the multiple terminal devices, where the second mode is used to indicate a second feature matrix to which the first codebook and the one or more second codebooks belong, and information about allocation of feature sequences in the second feature matrix to the multiple terminal devices, each feature matrix corresponds to one or more codebook sets, the feature matrix consists of two or more feature sequences, the feature sequence consists of a zero-element and a 1-element, the zero-element means that modulation symbols of all codewords in a corresponding codebook at a location corresponding to the zero-element are all zero-modulation symbols, the 1-element means that modulation symbols of all codewords in a corresponding codebook at a location corresponding to the 1-element are not all zero-modulation symbols or are all non-zero-modulation symbols, each codebook set includes at least one codebook, the codebook set meets a condition that codewords in a same codebook set have a same total quantity of modulation symbols and codebooks in a same codebook set have a same total quantity of codewords, and each codebook in the codebook set respectively corresponds to each feature sequence in the feature matrix; and determining the codebook indication information, where the codebook indication information includes second mode information, second terminal device rank information, and third codebook set information, the second mode information is used to indicate the second mode, the second terminal device rank information is used to indicate the rank of the terminal device in the multiple terminal devices, and the third codebook set information is used to indicate the codebook set that is used by each terminal device and that corresponds to the second feature matrix. The third codebook set information may be optional, as explained above.

It should be understood that the indication information transmission apparatus 800 according to this embodiment of the present invention may correspond to the network device and the apparatus 500 in the embodiments of the present invention, and may correspond to a corresponding entity for executing the methods according to the embodiments of the present invention, and the foregoing and other operations and/or functions of the modules in the apparatus 800 are separately used to implement corresponding procedures in the methods in FIG. 3 to FIG. 5, FIG. 16, and FIG. 17, and are not described in detail herein for brevity.

Therefore, according to the indication information transmission apparatus in this embodiment of the present invention, a network device determines, in one or more codebooks, a first codebook used to send a first downlink data stream to a terminal device; determines one or more second codebooks used to send a second downlink data stream, where the second downlink data stream is one or more downlink data streams, other than the first downlink data stream, carried on a time-frequency resource used for the first downlink data stream; determines codebook indication information used to indicate the first codebook and the one or more second codebooks; and sends the codebook indication information to the terminal device, so that the terminal device can determine codebooks used for all data streams carried on the same time-frequency resource, and can decode, according to the codebooks, the first data stream sent by the network device to the terminal device. In this way, the network device and the terminal device can perform downlink data transmission based on the codebooks, and a network capacity of a system can be effectively improved.

In an embodiment of the present invention, an indication information transmission apparatus 900 shown in FIG. 15 includes: a processor 910, a memory 920, a bus system 930, and a receiver 940.

Optionally, in an embodiment, the codebook indication information received by the receiver 940 includes first codebook cluster information, first codebook set information, and first indication information, the first codebook cluster information is used to indicate a first codebook cluster, the first codebook set information is used to indicate a first codebook set in the first codebook cluster, the first indication information is used to indicate the first codebook in the first codebook set, and the first indication information is further used to indicate one or more second codebook sets in the first codebook cluster and the one or more second codebooks in the one or more second codebook sets; and the determining, by the processor 910, the first codebook and the one or more second codebooks according to the codebook indication information includes:

determining, according to the first codebook cluster information, the first codebook set information, and the first indication information, the first codebook in the first codebook set included in the first codebook cluster and the one or more second codebooks in the one or more second codebook sets included in the first codebook cluster, where each codebook cluster includes at least one codebook set, each codebook set includes at least one codebook, the codebook cluster meets a condition that codewords in a same codebook cluster have a same total quantity of modulation symbols, and the codebook set meets a condition that for any two codebooks in a same codebook set, a location at which modulation symbols of all codewords in one codebook are zero-modulation symbols is the same as a location at which modulation symbols of all codewords in the other codebook are zero-modulation symbols, or the codebook set meets a condition that codewords in a same codebook set have a same total quantity of modulation symbols and codebooks in a same codebook set have a same total quantity of codewords.

Optionally, in an embodiment, the first indication information received by the receiver 940 includes: first codebook information, second codebook set information, and second codebook information, the first codebook information is used to indicate the first codebook in the first codebook set, the second codebook set information is used to indicate the one or more second codebook sets in the first codebook cluster, and the second codebook information is used to indicate the one or more second codebooks in the one or more second codebook sets.

Optionally, in an embodiment, the first indication information received by the receiver 940 includes M groups of bit string information in a one-to-one correspondence with all codebook sets in the first codebook cluster, each group of bit string information is used to indicate whether a corresponding codebook set belongs to the first codebook set or the one or more second codebook sets, when the codebook set corresponding to each group of bit string information belongs to the first codebook set or the one or more second codebook sets, each group of bit string information is further used to indicate the first codebook or the one or more second codebooks in the corresponding codebook set, and M is quantity of codebook sets included in the first codebook cluster.

Optionally, in an embodiment, the codebook indication information received by the receiver 940 includes first mode information and first terminal device rank information, the first mode information is used to indicate a first mode, the first mode is used to indicate a third codebook set to which the first codebook and the one or more second codebooks belong, and information about allocation of codebooks in the third codebook set to multiple terminal devices to which the first data stream and the second data stream belong, and the first terminal device rank information is used to indicate a rank of the terminal device in the multiple terminal devices; and the determining, by the processor 910, the first codebook and the one or more second codebooks according to the codebook indication information includes:

determining, according to the first mode information and the first terminal device rank information and in the third codebook set indicated by the first mode, the first codebook corresponding to the first terminal device rank information and the one or more second codebooks, where each codebook set includes at least one codebook, and the codebook set meets a condition that codewords in a same codebook set have a same total quantity of modulation symbols and codebooks in a same codebook set have a same total quantity of codewords.

Optionally, in an embodiment, the codebook indication information received by the receiver 940 includes second mode information, second terminal device rank information, and third codebook set information, the second mode information is used to indicate a second mode, the second mode is used to indicate a second feature matrix to which the first codebook and the one or more second codebooks belong, and information about allocation of feature sequences in the second feature matrix to multiple terminal devices to which the first data stream and the second data stream belong, the second terminal device rank information is used to indicate a rank of the terminal device in the multiple terminal devices, and the third codebook set information is used to indicate a codebook set that is respectively used by each of the multiple terminal devices and that corresponds to the second feature matrix, where the third codebook set information may be optional, as explained above; and the determining, by the processor 910, the first codebook and the one or more second codebooks according to the codebook indication information includes:

determining, according to the second mode information, the second terminal device rank information, and the third codebook set information and in one or more codebook sets corresponding to the second feature matrix indicated by the second mode, the first codebook corresponding to the second terminal device rank information and the one or more second codebooks, where each feature matrix corresponds to one or more codebook sets, the feature matrix consists of two or more feature sequences, the feature sequence consists of a zero-element and a 1-element, the zero-element means that modulation symbols of all codewords in a corresponding codebook at a location corresponding to the zero-element are all zero-modulation symbols, the 1-element means that modulation symbols of all codewords in a corresponding codebook at a location corresponding to the 1-element are not all zero-modulation symbols or are all non-zero-modulation symbols, each codebook set includes at least one codebook, the codebook set meets a condition that codewords in a same codebook set have a same total quantity of modulation symbols and codebooks in a same codebook set have a same total quantity of codewords, and each codebook in the codebook set respectively corresponds to each feature sequence in the feature matrix. The third codebook set information may be optional, as explained above.

It should be understood that the indication information transmission apparatus 900 according to this embodiment of the present invention may correspond to the terminal device and the apparatus 600 in the embodiments of the present invention, and may correspond to a corresponding entity for executing the methods according to the embodiments of the present invention, and the foregoing and other operations and/or functions of the modules in the apparatus 900 are separately used to implement corresponding procedures in the methods in FIG. 6 to FIG. 8, FIG. 18, and FIG. 19, and are not described in detail herein for brevity.

Therefore, according to the indication information transmission apparatus in this embodiment of the present invention, a network device determines, in one or more codebooks, a first codebook used to send a first downlink data stream to a terminal device; determines one or more second codebooks used to send a second downlink data stream, where the second downlink data stream is one or more downlink data streams, other than the first downlink data stream, carried on a time-frequency resource used for the first downlink data stream; determines codebook indication information used to indicate the first codebook and the one or more second codebooks; and sends the codebook indication information to the terminal device, so that the terminal device can determine codebooks used for all data streams carried on the same time-frequency resource, and can decode, according to the codebooks, the first data stream sent by the network device to the terminal device. In this way, the network device and the terminal device can perform downlink data transmission based on the codebooks, and a network capacity of a system can be effectively improved.

It should be understood that the terms "system" and "network" may be used interchangeably in this specification. The term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

It should be understood that in the embodiments of the present invention, "B corresponding to A" indicates that B is associated with A, and B may be determined according to A. However, it should further be understood that determining B according to A does not mean that B is determined according to A only; that is, B may also be determined according to A and/or other information.

Terminologies such as "component", "module", and "system" used in this specification are used to indicate computer-related entities, hardware, firmware, combinations of hardware and software, software, or software being executed. For example, a component may be, but is not limited to, a process that runs on a processor, a processor, an object, an executable file, a thread of execution, a program, and/or a computer. As shown in figures, both a computing device and an application that runs on a computing device may be components. One or more components may reside within a process and/or a thread of execution, and a component may be located on one computer and/or distributed between two or more computers. In addition, these components may be executed from various computer-readable media that store various data structures. For example, the components may communicate by using a local and/or remote process and according to, for example, a signal having one or more data packets (for example, data from one component interacting with another component in a local system, a distributed system, and/or across a network such as the Internet interacting with other systems by using the signal).

In addition, aspects or features of the present invention may be implemented as a method, an apparatus or a product that uses standard programming and/or engineering technologies. The term "product" used in this application covers a computer program that can be accessed from any computer readable component, carrier or medium. For example, the computer-readable medium may include but is not limited to: a magnetic storage component (for example, a hard disk, a floppy disk or a magnetic tape), an optical disc (for example, a CD (Compact Disk), a DVD (Digital Versatile Disk), a smart card and a flash memory component (for example, EPROM (Erasable Programmable Read-Only Memory), a card, a stick, or a key drive). In addition, various storage media described in this specification may indicate one or more devices and/or other machine-readable media that is used to store information. The term "machine readable media" may include but is not limited to a radio channel, and various other media that can store, contain and/or carry an instruction and/or data.

A person of ordinary skill in the art may be aware that, the units and steps in the examples described with reference to the embodiments disclosed herein may be implemented by electronic hardware, computer software, or a combination thereof. To clearly describe the interchangeability between the hardware and the software, the foregoing has generally described compositions and steps of each example according to functions. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces, indirect couplings or communication connections between the apparatuses or units, or electrical connections, mechanical connections, or connections in other forms.

The units described as separate parts may or may not be physically separate, and parts displayed as units may or may not be physical units, may be located in one position, or may be distributed on a plurality of network units. A part or all of the units may be selected according to actual needs to achieve the objectives of the solutions of the embodiments of the present invention.

In addition, functional units in the embodiments of the present invention may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present invention essentially, or the part contributing to the prior art, or all or a part of the technical solutions may be implemented in the form of a software product. The software product is stored in a storage medium and includes several instructions for instructing a computer device (which may be a personal computer, a server, or a network device) to perform all or a part of the steps of the methods described in the embodiments of the present invention. The foregoing storage medium includes: any medium that can store program code, such as a USB flash drive, a removable hard disk, a read-only memory (ROM), a random access memory (RAM), a magnetic disk, or an optical disc.

The foregoing descriptions are merely specific embodiments of the present invention, but are not intended to limit the protection scope of the present invention. Any modification or replacement readily figured out by a person skilled in the art within the technical scope disclosed in the present invention shall fall within the protection scope of the present invention. Therefore, the protection scope of the present invention shall be subject to the protection scope of the claims.

The disclosure of the present application also includes the following Examples.

Example 1

An indication information transmission method, comprising:

determining, in one or more codebooks, a first codebook used to send a first downlink data stream to a terminal device, wherein the codebook consists of two or more codewords, the codewords are multidimensional complex vectors, and are used to indicate mapping relationships between data and at least two modulation symbols, and the at least two modulation symbols comprise at least one zero-modulation symbol and at least one non-zero-modulation symbol;

determining one or more second codebooks used to send a second downlink data stream, wherein the second downlink data stream is one or more downlink data streams, other than the first downlink data stream, carried on a time-frequency resource used for the first downlink data stream;

determining codebook indication information used to indicate the first codebook and the one or more second codebooks; and sending the codebook indication information to the terminal device.

Example 2

The method according to example 1, wherein the determining codebook indication information used to indicate the first codebook and the one or more second codebooks comprises:

determining a first codebook set to which the first codebook belongs, one or more second codebook sets to which the one or more second codebooks belong, and a first codebook cluster to which the first codebook set and the one or more second codebook sets belong, wherein each codebook cluster comprises at least one codebook set, each codebook set comprises at least one codebook, the codebook cluster meets a condition that codewords in a same codebook cluster have a same total quantity of modulation symbols, and the codebook set meets a condition that for any two codebooks in a same codebook set, a location at which modulation symbols of all codewords in one codebook are zero-modulation symbols is the same as a location at which modulation symbols of all codewords in the other codebook are zero-modulation symbols, or the codebook set meets a condition that codewords in a same codebook set have a same total quantity of modulation symbols and codebooks in a same codebook set have a same total quantity of codewords; and determining the codebook indication information, wherein the codebook indication information comprises first codebook cluster information, first codebook set information, and first indication information, the first codebook cluster information is used to indicate the first codebook cluster, the first codebook set information is used to indicate the first codebook set in the first codebook cluster, the first indication information is used to indicate the first codebook in the first codebook set, and the first indication information is further used to indicate the one or more second codebook sets in the first codebook cluster and the one or more second codebooks in the one or more second codebook sets.

Example 3

The method according to example 2, wherein the first indication information comprises: first codebook information, second codebook set information, and second codebook information, the first codebook information is used to indicate the first codebook in the first codebook set, the second codebook set information is used to indicate the one or more second codebook sets in the first codebook cluster, and the second codebook information is used to indicate the one or more second codebooks in the one or more second codebook sets.

Example 4

The method according to example 2, wherein the first indication information comprises M groups of bit string information in a one-to-one correspondence with all codebook sets in the first codebook cluster, each group of bit string information is used to indicate whether a corresponding codebook set belongs to the first codebook set or the one or more second codebook sets, when the codebook set corresponding to each group of bit string information belongs to the first codebook set or the one or more second codebook sets, each group of bit string information is further used to indicate the first codebook or the one or more second codebooks in the corresponding codebook set, and M is quantity of codebook sets comprised in the first codebook cluster.

Example 5

The method according to example 3 or 4, wherein the first indication information comprises modulation order information of the first codebook and the one or more second codebooks, and each codebook in each codebook set has a different modulation order.

6. The method according to example 1, wherein the determining codebook indication information used to indicate the first codebook and the one or more second codebooks comprises:

determining a first feature sequence to which the first codebook belongs, one or more second feature sequences to which the one or more second codebooks belong, and a first feature matrix to which the first feature sequence and the one or more second feature sequences belong, wherein each feature matrix consists of two or more feature sequences, each feature sequence corresponds to one or more codebooks, the feature sequence consists of a zero-element and a 1-element, the zero-element means that modulation symbols of all codewords in a corresponding codebook at a location corresponding to the zero-element are all zero-modulation symbols, and the 1-element means that modulation symbols of all codewords in a corresponding codebook at a location corresponding to the 1-element are not all zero-modulation symbols or are all non-zero-modulation symbols; and determining the codebook indication information, wherein the codebook indication information comprises first feature matrix information, first feature sequence information, and second indication information, the first feature matrix information is used to indicate the first feature matrix, the first feature sequence information is used to indicate the first feature sequence in the first feature matrix, the second indication information is used to indicate the first codebook in one or more codebooks corresponding to the first feature sequence, and the second indication information is further used to indicate the one or more second feature sequences in the first feature matrix, and the one or more second codebooks in one or more codebooks corresponding to the one or more second feature sequences.

Example 7

The method according to example 6, wherein the second indication information comprises: third codebook information, second feature sequence information, and fourth codebook information, the third codebook information is used to indicate the first codebook in the one or more codebooks corresponding to the first feature sequence, the second feature sequence information is used to indicate the one or more second feature sequences in the first feature matrix, and the fourth codebook information is used to indicate the one or more second codebooks in the one or more codebooks corresponding to the one or more second feature sequences.

Example 8

The method according to example 6, wherein the second indication information comprises M groups of bit string information in a one-to-one correspondence with all feature sequences in the first feature matrix, each group of bit string information is used to indicate whether a corresponding feature sequence belongs to the first feature sequence or the one or more second feature sequences, when the feature sequence corresponding to each group of bit string information belongs to the first feature sequence or the one or more second feature sequences, each group of bit string information is further used to indicate the first codebook or the one or more second codebooks in one or more codebooks corresponding to the corresponding feature sequence, and M is quantity of feature sequences comprised in the first feature matrix.

Example 9

The method according to example 7 or 8, wherein the second indication information comprises modulation order information of the first codebook and the one or more second codebooks, and each of the one or more codebooks corresponding to each feature sequence has a different modulation order.

Example 10

The method according to example 1, wherein the determining codebook indication information used to indicate the first codebook and the one or more second codebooks comprises:
determining a first mode and a rank of the terminal device in multiple terminal devices to which the first data stream and the second data stream belong, wherein the first mode is used to indicate a third codebook set to which the first codebook and the one or more second codebooks belong, and information about allocation of codebooks in the third codebook set to the multiple terminal devices, each codebook set comprises at least one codebook, and the codebook set meets a condition that codewords in a same codebook set have a same total quantity of modulation symbols and codebooks in a same codebook set have a same total quantity of codewords; and
determining the codebook indication information, wherein the codebook indication information comprises first mode information and first terminal device rank information, the first mode information is used to indicate the first mode, and the first terminal device rank information is used to indicate the rank of the terminal device in the multiple terminal devices.

Example 11

The method according to example 1, wherein the determining codebook indication information used to indicate the first codebook and the one or more second codebooks comprises:
determining a second mode, a rank of the terminal device in multiple terminal devices to which the first data stream and the second data stream belong, and a codebook set used by each of the multiple terminal devices, wherein the second mode is used to indicate a second feature matrix to which the first codebook and the one or more second codebooks belong, and information about allocation of feature sequences in the second feature matrix to the multiple terminal devices, each feature matrix corresponds to one or more codebook sets, the feature matrix consists of two or more feature sequences, the feature sequence consists of a zero-element and a 1-element, the zero-element means that modulation symbols of all codewords in a corresponding codebook at a location corresponding to the zero-element are all zero-modulation symbols, the 1-element means that modulation symbols of all codewords in a corresponding codebook at a location corresponding to the 1-element are not all zero-modulation symbols or are all non-zero-modulation symbols, each codebook set comprises at least one codebook, the codebook set meets a condition that codewords in a same codebook set have a same total quantity of modulation symbols and codebooks in a same codebook set have a same total quantity of codewords, and each codebook in the codebook set respectively corresponds to each feature sequence in the feature matrix; and
determining the codebook indication information, wherein the codebook indication information comprises second mode information, second terminal device rank information, and third codebook set information, the second mode information is used to indicate the second mode, the second terminal device rank information is used to indicate the rank of the terminal device in the multiple terminal devices, and the third codebook set information is used to indicate the codebook set that is used by each terminal device and that corresponds to the second feature matrix.

Example 12

The method according to any one of examples 1 to 11, wherein the sending the codebook indication information to the terminal device comprises:
sending a downlink scheduling message, dedicated higher layer control signaling, or a system broadcast message to the terminal device, wherein the downlink scheduling message, the dedicated higher layer control signaling, and the system broadcast message comprise the codebook indication information.

Example 13

The method according to example 12, wherein the dedicated higher layer control signaling comprises a radio resource control, RRC, connection establishment message and an RRC connection reconfiguration message.

Example 14

The method according to any one of examples 1 to 13, wherein the codebook indication information is bit string information.

Example 15

The method according to any one of examples 1 to 14, wherein the codebook is a sparse code multiple access SCMA codebook.

Example 16

The method according to example 15, wherein a quantity of zero-modulation symbols of a codeword comprised in the codebook is greater than or equal to a quantity of non-zero-modulation symbols.

Example 17

An indication information transmission method, comprising:

receiving codebook indication information sent by a network device, wherein the codebook indication information is used to indicate a first codebook used by the network device to send a first downlink data stream, and one or more second codebooks used by the network device to send a second downlink data stream, the second downlink data stream is one or more downlink data streams, other than the first downlink data stream, carried on a time-frequency resource used for the first downlink data stream, the codebook consists of two or more codewords, the codewords are multidimensional complex vectors, and are used to indicate mapping relationships between data and at least two modulation symbols, and the at least two modulation symbols comprise at least one zero-modulation symbol and at least one non-zero-modulation symbol;

determining the first codebook and the one or more second codebooks according to the codebook indication information; and decoding, according to the first codebook and the one or more second codebooks, the first downlink data stream sent by the network device.

Example 18

The method according to example 17, wherein the codebook indication information comprises first codebook cluster information, first codebook set information, and first indication information, the first codebook cluster information is used to indicate a first codebook cluster, the first codebook set information is used to indicate a first codebook set in the first codebook cluster, the first indication information is used to indicate the first codebook in the first codebook set, and the first indication information is further used to indicate one or more second codebook sets in the first codebook cluster and the one or more second codebooks in the one or more second codebook sets; and the determining the first codebook and the one or more second codebooks according to the codebook indication information comprises:

determining, according to the first codebook cluster information, the first codebook set information, and the first indication information, the first codebook in the first codebook set comprised in the first codebook cluster and the one or more second codebooks in the one or more second codebook sets comprised in the first codebook cluster, wherein each codebook cluster comprises at least one codebook set, each codebook set comprises at least one codebook, the codebook cluster meets a condition that codewords in a same codebook cluster have a same total quantity of modulation symbols, and the codebook set meets a condition that for any two codebooks in a same codebook set, a location at which modulation symbols of all codewords in one codebook are zero-modulation symbols is the same as a location at which modulation symbols of all codewords in the other codebook are zero-modulation symbols, or the codebook set meets a condition that codewords in a same codebook set have a same total quantity of modulation symbols and codebooks in a same codebook set have a same total quantity of codewords.

Example 19

The method according to example 18, wherein the first indication information comprises: first codebook information, second codebook set information, and second codebook information, the first codebook information is used to indicate the first codebook in the first codebook set, the second codebook set information is used to indicate the one or more second codebook sets in the first codebook cluster, and the second codebook information is used to indicate the one or more second codebooks in the one or more second codebook sets.

Example 20

The method according to example 18, wherein the first indication information comprises M groups of bit string information in a one-to-one correspondence with all codebook sets in the first codebook cluster, each group of bit string information is used to indicate whether a corresponding codebook set belongs to the first codebook set or the one or more second codebook sets, when the codebook set corresponding to each group of bit string information belongs to the first codebook set or the one or more second codebook sets, each group of bit string information is further used to indicate the first codebook or the one or more second codebooks in the corresponding codebook set, and M is quantity of codebook sets comprised in the first codebook cluster.

Example 21

The method according to example 19 or 20, wherein the first indication information comprises modulation order information of the first codebook and the one or more second codebooks, and each codebook in each codebook set has a different modulation order.

Example 22

The method according to example 17, wherein the codebook indication information comprises first feature matrix information, first feature sequence information, and second indication information, the first feature matrix information is used to indicate a first feature matrix, the first feature sequence information is used to indicate a first feature sequence in the first feature matrix, the second indication information is used to indicate the first codebook in one or more codebooks corresponding to the first feature sequence, and the second indication information is further used to indicate one or more second feature sequences in the first feature matrix, and the one or more second codebooks in one or more codebooks corresponding to the one or more second feature sequences; and the determining the first codebook and the one or more second codebooks according to the codebook indication information comprises:

determining, according to the first feature matrix information, the first feature sequence information, and the second indication information, the first codebook in the one or more codebooks corresponding to the first feature sequence comprised in the first feature matrix, and the one or more second codebooks in the one or more codebooks corresponding to the one or more second feature sequences comprised in the first feature matrix, wherein each feature matrix consists of two or more feature sequences, each feature sequence corresponds to one or more codebooks, the feature sequence consists of a zero-element and a 1-element, the zero-element means that modulation symbols of all codewords in a corresponding codebook at a location corresponding to the zero-element are all zero-modulation symbols, and the 1-element means that modulation symbols of all codewords in a corresponding codebook at a location corresponding to the 1-element are not all zero-modulation symbols or are all non-zero-modulation symbols.

Example 23

The method according to example 22, wherein the second indication information comprises: third codebook information, second feature sequence information, and fourth codebook information, the third codebook information is used to indicate the first codebook in the one or more codebooks corresponding to the first feature sequence, the second feature sequence information is used to indicate the one or more second feature sequences in the first feature matrix, and the fourth codebook information is used to indicate the one or more second codebooks in the one or more codebooks corresponding to the one or more second feature sequences.

Example 24

The method according to example 22, wherein the second indication information comprises M groups of bit string information in a one-to-one correspondence with all feature sequences in the first feature matrix, each group of bit string information is used to indicate whether a corresponding feature sequence belongs to the first feature sequence or the one or more second feature sequences, when the feature sequence corresponding to each group of bit string information belongs to the first feature sequence or the one or more second feature sequences, each group of bit string information is further used to indicate the first codebook or the one or more second codebooks in one or more codebooks corresponding to the corresponding feature sequence, and M is quantity of feature sequences comprised in the first feature matrix.

Example 25

The method according to example 23 or 24, wherein the second indication information comprises modulation order information of the first codebook and the one or more second codebooks, and each of the one or more codebooks corresponding to each feature sequence has a different modulation order.

Example 26

The method according to example 17, wherein the codebook indication information comprises first mode information and first terminal device rank information, the first mode information is used to indicate a first mode, the first mode is used to indicate a third codebook set to which the first codebook and the one or more second codebooks belong, and information about allocation of codebooks in the third codebook set to multiple terminal devices to which the first data stream and the second data stream belong, and the first terminal device rank information is used to indicate a rank of a terminal device in the multiple terminal devices; and the determining the first codebook and the one or more second codebooks according to the codebook indication information comprises:

determining, according to the first mode information and the first terminal device rank information and in the third codebook set indicated by the first mode, the first codebook corresponding to the first terminal device rank information and the one or more second codebooks, wherein each codebook set comprises at least one codebook, and the codebook set meets a condition that codewords in a same codebook set have a same total quantity of modulation symbols and codebooks in a same codebook set have a same total quantity of codewords.

Example 27

The method according to example 17, wherein the codebook indication information comprises second mode information, second terminal device rank information, and third codebook set information, the second mode information is used to indicate a second mode, the second mode is used to indicate a second feature matrix to which the first codebook and the one or more second codebooks belong, and information about allocation of feature sequences in the second feature matrix to multiple terminal devices to which the first data stream and the second data stream belong, the second terminal device rank information is used to indicate a rank of the terminal device in the multiple terminal devices, and the third codebook set information is used to indicate a codebook set that is respectively used by each of the multiple terminal devices and that corresponds to the second feature matrix; and the determining the first codebook and the one or more second codebooks according to the codebook indication information comprises:

determining, according to the second mode information, the second terminal device rank information, and the third codebook set information and in one or more codebook sets corresponding to the second feature matrix indicated by the second mode, the first codebook corresponding to the second terminal device rank information and the one or more second codebooks, wherein each feature matrix corresponds to one or more codebook sets, the feature matrix consists of two or more feature sequences, the feature sequence consists of a zero-element and a 1-element, the zero-element means that modulation symbols of all codewords in a corresponding codebook at a location corresponding to the zero-element are all zero-modulation symbols, the 1-element means that modulation symbols of all codewords in a corresponding codebook at a location corresponding to the 1-element are not all zero-modulation symbols or are all non-zero-modulation symbols, each codebook set comprises at least one codebook, the codebook set meets a condition that codewords in a same codebook set have a same total quantity of modulation symbols and codebooks in a same codebook set have a same total quantity of codewords, and each codebook in the codebook set respectively corresponds to each feature sequence in the feature matrix.

Example 28

The method according to any one of examples 17 to 27, wherein the receiving codebook indication information sent by a network device comprises:

receiving a downlink scheduling message, dedicated higher layer control signaling, or a system broadcast message that is sent by the network device, wherein the downlink scheduling message, the dedicated higher layer control signaling, and the system broadcast message comprise the codebook indication information.

Example 29

The method according to example 28, wherein the dedicated higher layer control signaling comprises a radio resource control RRC connection establishment message and an RRC connection reconfiguration message.

Example 30

The method according to any one of examples 17 to 29, wherein the codebook indication information is bit string information.

Example 31

The method according to any one of examples 17 to 30, wherein the codebook is a sparse code multiple access SCMA codebook.

Example 32

The method according to example 31, wherein a quantity of zero-modulation symbols of a codeword comprised in the codebook is greater than or equal to a quantity of non-zero-modulation symbols.

Example 33

An indication information transmission apparatus, comprising:
a first determining module, configured to determine, in one or more codebooks, a first codebook used to send a first downlink data stream to a terminal device, wherein the codebook consists of two or more codewords, the codewords are multidimensional complex vectors, and are used to indicate mapping relationships between data and at least two modulation symbols, and the at least two modulation symbols comprise at least one zero-modulation symbol and at least one non-zero-modulation symbol;
a second determining module, configured to determine one or more second codebooks used to send a second downlink data stream, wherein the second downlink data stream is one or more downlink data streams, other than the first downlink data stream, carried on a time-frequency resource used for the first downlink data stream;
a third determining module, configured to determine codebook indication information used to indicate the first codebook determined by the first determining module and the one or more second codebooks determined by the second determining module; and
a sending module, configured to send the codebook indication information determined by the third determining module to the terminal device.

Example 34

The apparatus according to example 33, wherein the third determining module comprises:
a first determining unit, configured to determine a first codebook set to which the first codebook belongs, one or more second codebook sets to which the one or more second codebooks belong, and a first codebook cluster to which the first codebook set and the one or more second codebook sets belong, wherein each codebook cluster comprises at least one codebook set, each codebook set comprises at least one codebook, the codebook cluster meets a condition that codewords in a same codebook cluster have a same total quantity of modulation symbols, and the codebook set meets a condition that for any two codebooks in a same codebook set, a location at which modulation symbols of all codewords in one codebook are zero-modulation symbols is the same as a location at which modulation symbols of all codewords in the other codebook are zero-modulation symbols, or the codebook set meets a condition that codewords in a same codebook set have a same total quantity of modulation symbols and codebooks in a same codebook set have a same total quantity of codewords; and
a second determining unit, configured to determine the codebook indication information, wherein the codebook indication information comprises first codebook cluster information, first codebook set information, and first indication information, the first codebook cluster information is used to indicate the first codebook cluster, the first codebook set information is used to indicate the first codebook set in the first codebook cluster, the first indication information is used to indicate the first codebook in the first codebook set, and the first indication information is further used to indicate the one or more second codebook sets in the first codebook cluster and the one or more second codebooks in the one or more second codebook sets.

Example 35

The apparatus according to example 34, wherein the first indication information determined by the second determining unit comprises: first codebook information, second codebook set information, and second codebook information, the first codebook information is used to indicate the first codebook in the first codebook set, the second codebook set information is used to indicate the one or more second codebook sets in the first codebook cluster, and the second codebook information is used to indicate the one or more second codebooks in the one or more second codebook sets.

Example 36

The apparatus according to example 34, wherein the first indication information determined by the second determining unit comprises M groups of bit string information in a one-to-one correspondence with all codebook sets in the first codebook cluster, each group of bit string information is used to indicate whether a corresponding codebook set belongs to the first codebook set or the one or more second codebook sets, when the codebook set corresponding to each group of bit string information belongs to the first codebook set or the one or more second codebook sets, each group of bit string information is further used to indicate the first codebook or the one or more second codebooks in the corresponding codebook set, and M is quantity of codebook sets comprised in the first codebook cluster.

Example 37

The apparatus according to example 35 or 36, wherein the first indication information determined by the second determining unit comprises modulation order information of the first codebook and the one or more second codebooks, and each codebook in each codebook set has a different modulation order.

Example 38

The apparatus according to example 33, wherein the third determining module comprises:
a third determining unit, configured to determine a first feature sequence to which the first codebook belongs, one or more second feature sequences to which the one or more second codebooks belong, and a first feature matrix to which the first feature sequence and the one or more second feature sequences belong, wherein each feature matrix consists of two or more feature sequences, each feature sequence corresponds to one or more codebooks, the feature sequence consists of a zero-element and a 1-element, the zero-element means that modulation symbols of all codewords in a corresponding codebook at a location corresponding to the zero-element are all zero-modulation symbols, and the 1-element means that modulation symbols of all codewords in a corresponding codebook at a location corresponding to the 1-element are not all zero-modulation symbols or are all non-zero-modulation symbols; and a fourth determining unit, configured to determine the codebook indication information, wherein the codebook indication information comprises first feature matrix information, first feature sequence information, and second indication information, the first feature matrix information is used to indicate the first feature matrix, the first feature sequence information is used to indicate the first feature sequence in the first feature matrix, the second indication information is used to indicate the first codebook in one or more codebooks corresponding to the first feature sequence, and the second indication information is further used to indicate the one or more second feature sequences in the first feature matrix, and the one or more second codebooks in one or more codebooks corresponding to the one or more second feature sequences.

Example 39

The apparatus according to example 38, wherein the second indication information determined by the fourth determining unit comprises: third codebook information, second feature sequence information, and fourth codebook information, the third codebook information is used to indicate the first codebook in the one or more codebooks corresponding to the first feature sequence, the second feature sequence information is used to indicate the one or more second feature sequences in the first feature matrix, and the fourth codebook information is used to indicate the one or more second codebooks in the one or more codebooks corresponding to the one or more second feature sequences.

Example 40

The apparatus according to example 38, wherein the second indication information determined by the fourth determining unit comprises M groups of bit string information in a one-to-one correspondence with all feature sequences in the first feature matrix, each group of bit string information is used to indicate whether a corresponding feature sequence belongs to the first feature sequence or the one or more second feature sequences, when the feature sequence corresponding to each group of bit string information belongs to the first feature sequence or the one or more second feature sequences, each group of bit string information is further used to indicate the first codebook or the one or more second codebooks in one or more codebooks corresponding to the corresponding feature sequence, and M is quantity of feature sequences comprised in the first feature matrix.

Example 41

The apparatus according to example 39 or 40, wherein the second indication information determined by the fourth determining unit comprises modulation order information of the first codebook and the one or more second codebooks, and each of the one or more codebooks corresponding to each feature sequence has a different modulation order.

Example 42

The apparatus according to example 33, wherein the third determining module comprises:

a fifth determining unit, configured to determine a first mode and a rank of the terminal device in multiple terminal devices to which the first data stream and the second data stream belong, wherein the first mode is used to indicate a third codebook set to which the first codebook and the one or more second codebooks belong, and information about allocation of codebooks in the third codebook set to the multiple terminal devices, each codebook set comprises at least one codebook, and the codebook set meets a condition that codewords in a same codebook set have a same total quantity of modulation symbols and codebooks in a same codebook set have a same total quantity of codewords; and a sixth determining unit, configured to determine the codebook indication information, wherein the codebook indication information comprises first mode information and first terminal device rank information, the first mode information is used to indicate the first mode, and the first terminal device rank information is used to indicate the rank of the terminal device in the multiple terminal devices.

Example 43

The apparatus according to example 33, wherein the third determining module comprises:

a seventh determining unit, configured to determine a second mode, a rank of the terminal device in multiple terminal devices to which the first data stream and the second data stream belong, and a codebook set used by each of the multiple terminal devices, wherein the second mode is used to indicate a second feature matrix to which the first codebook and the one or more second codebooks belong, and information about allocation of feature sequences in the second feature matrix to the multiple terminal devices, each feature matrix corresponds to one or more codebook sets, the feature matrix consists of two or more feature sequences, the feature sequence consists of a zero-element and a 1-element, the zero-element means that modulation symbols of all codewords in a corresponding codebook at a location corresponding to the zero-element are all zero-modulation symbols, the 1-element means that modulation symbols of all codewords in a corresponding codebook at a location corresponding to the 1-element are not all zero-modulation symbols or are all non-zero-modulation symbols, each codebook set comprises at least one codebook, the codebook set meets a condition that codewords in a same codebook set have a same total quantity of modulation symbols and codebooks in a same codebook set have a same total quantity of codewords, and each codebook in the codebook set respectively corresponds to each feature sequence in the feature matrix; and an eighth determining unit, configured to determine the codebook indication information, wherein the codebook indication information comprises second mode information, second terminal device rank information, and third codebook set information, the second mode information is used to indicate the second mode, the second terminal device rank information is used to indicate the rank of the terminal device in the multiple terminal devices, and the third codebook set information is used to indicate the codebook set that is used by each terminal device and that corresponds to the second feature matrix.

Example 44

The apparatus according to any one of examples 33 to 43, wherein the sending module is specifically configured to send a downlink scheduling message, dedicated higher layer control signaling, or a system broadcast message to the terminal device, wherein the downlink scheduling message, the dedicated higher layer control signaling, and the system broadcast message comprise the codebook indication information.

Example 45

The apparatus according to example 44, wherein the dedicated higher layer control signaling comprises a radio resource control RRC connection establishment message and an RRC connection reconfiguration message.

Example 46

The apparatus according to any one of examples 33 to 45, wherein the codebook indication information determined by the third determining module is bit string information.

Example 47

The apparatus according to any one of examples 33 to 46, wherein the codebook is a sparse code multiple access SCMA codebook.

Example 48

The apparatus according to example 47, wherein a quantity of zero-modulation symbols of a codeword comprised in the codebook is greater than or equal to a quantity of non-zero-modulation symbols.

Example 49

The apparatus according to any one of examples 33 to 48, wherein the apparatus is a network device.

Example 50

An indication information transmission apparatus, comprising:
a receiving module, configured to receive codebook indication information sent by a network device, wherein the codebook indication information is used to indicate a first codebook used by the network device to send a first downlink data stream, and one or more second codebooks used by the network device to send a second downlink data stream, the second downlink data stream is one or more downlink data streams, other than the first downlink data stream, carried on a time-frequency resource used for the first downlink data stream, the codebook consists of two or more codewords, the codewords are multidimensional complex vectors, and are used to indicate mapping relationships between data and at least two modulation symbols, and the at least two modulation symbols comprise at least one zero-modulation symbol and at least one non-zero-modulation symbol;
a determining module, configured to determine the first codebook and the one or more second codebooks according to the codebook indication information received by the receiving module; and
a decoding module, configured to decode, according to the first codebook and the one or more second codebooks that are determined by the determining module, the first downlink data stream sent by the network device.

Example 51

The apparatus according to example 50, wherein the codebook indication information received by the receiving module comprises first codebook cluster information, first codebook set information, and first indication information, the first codebook cluster information is used to indicate a first codebook cluster, the first codebook set information is used to indicate a first codebook set in the first codebook cluster, the first indication information is used to indicate the first codebook in the first codebook set, and the first indication information is further used to indicate one or more second codebook sets in the first codebook cluster and the one or more second codebooks in the one or more second codebook sets; and
the determining module comprises: a first determining unit, configured to determine, according to the first codebook cluster information, the first codebook set information, and the first indication information, the first codebook in the first codebook set comprised in the first codebook cluster and the one or more second codebooks in the one or more second codebook sets comprised in the first codebook cluster, wherein each codebook cluster comprises at least one codebook set, each codebook set comprises at least one codebook, the codebook cluster meets a condition that codewords in a same codebook cluster have a same total quantity of modulation symbols, and the codebook set meets a condition that for any two codebooks in a same codebook set, a location at which modulation symbols of all codewords in one codebook are zero-modulation symbols is the same as a location at which modulation symbols of all codewords in the other codebook are zero-modulation symbols, or the codebook set meets a condition that codewords in a same codebook set have a same total quantity of modulation symbols and codebooks in a same codebook set have a same total quantity of codewords.

Example 52

The apparatus according to example 51, wherein the first indication information received by the receiving module comprises: first codebook information, second codebook set information, and second codebook information, the first codebook information is used to indicate the first codebook in the first codebook set, the second codebook set information is used to indicate the one or more second codebook sets in the first codebook cluster, and the second codebook information is used to indicate the one or more second codebooks in the one or more second codebook sets.

Example 53

The apparatus according to example 51, wherein the first indication information received by the receiving module comprises M groups of bit string information in a one-to-one correspondence with all codebook sets in the first codebook cluster, each group of bit string information is used to indicate whether a corresponding codebook set belongs to the first codebook set or the one or more second codebook sets, when the codebook set corresponding to each group of bit string information belongs to the first codebook set or the one or more second codebook sets, each group of bit string information is further used to indicate the first codebook or the one or more second codebooks in the corresponding codebook set, and M is quantity of codebook sets comprised in the first codebook cluster.

Example 54

The apparatus according to example 52 or 53, wherein the first indication information received by the receiving module comprises modulation order information of the first codebook and the one or more second codebooks, and each codebook in each codebook set has a different modulation order.

Example 55

The apparatus according to example 50, wherein the codebook indication information received by the receiving module comprises first feature matrix information, first feature sequence information, and second indication information, the first feature matrix information is used to indicate a first feature matrix, the first feature sequence information is used to indicate a first feature sequence in the first feature matrix, the second indication information is used to indicate the first codebook in one or more codebooks corresponding to the first feature sequence, and the second indication information is further used to indicate one or more second feature sequences in the first feature matrix, and the one or more second codebooks in one or more codebooks corresponding to the one or more second feature sequences; and the determining module comprises: a second determining unit, configured to determine, according to the first feature matrix information, the first feature sequence information, and the second indication information, the first codebook in the one or more codebooks corresponding to the first feature sequence comprised in the first feature matrix, and the one or more second codebooks in the one or more codebooks corresponding to the one or more second feature sequences comprised in the first feature matrix, wherein each feature matrix consists of two or more feature sequences, each feature sequence corresponds to one or more codebooks, the feature sequence consists of a zero-element and a 1-element, the zero-element means that modulation symbols of all codewords in a corresponding codebook at a location corresponding to the zero-element are all zero-modulation symbols, and the 1-element means that modulation symbols of all codewords in a corresponding codebook at a location corresponding to the 1-element are not all zero-modulation symbols or are all non-zero-modulation symbols.

Example 56

The apparatus according to example 55, wherein the second indication information received by the receiving module comprises: third codebook information, second feature sequence information, and fourth codebook information, the third codebook information is used to indicate the first codebook in the one or more codebooks corresponding to the first feature sequence, the second feature sequence information is used to indicate the one or more second feature sequences in the first feature matrix, and the fourth codebook information is used to indicate the one or more second codebooks in the one or more codebooks corresponding to the one or more second feature sequences.

Example 57

The apparatus according to example 55, wherein the second indication information received by the receiving module comprises M groups of bit string information in a one-to-one correspondence with all feature sequences in the first feature matrix, each group of bit string information is used to indicate whether a corresponding feature sequence belongs to the first feature sequence or the one or more second feature sequences, when the feature sequence corresponding to each group of bit string information belongs to the first feature sequence or the one or more second feature sequences, each group of bit string information is further used to indicate the first codebook or the one or more second codebooks in one or more codebooks corresponding to the corresponding feature sequence, and M is quantity of feature sequences comprised in the first feature matrix.

Example 58

The apparatus according to example 56 or 57, wherein the second indication information received by the receiving module comprises modulation order information of the first codebook and the one or more second codebooks, and each of the one or more codebooks corresponding to each feature sequence has a different modulation order.

Example 59

The apparatus according to example 50, wherein the codebook indication information received by the receiving module comprises first mode information and first terminal device rank information, the first mode information is used to indicate a first mode, the first mode is used to indicate a third codebook set to which the first codebook and the one or more second codebooks belong, and information about allocation of codebooks in the third codebook set to multiple terminal devices to which the first data stream and the second data stream belong, and the first terminal device rank information is used to indicate a rank of the terminal device in the multiple terminal devices; and the determining module comprises: a third determining unit, configured to determine, according to the first mode information and the first terminal device rank information and in the third codebook set indicated by the first mode, the first codebook corresponding to the first terminal device rank information and the one or more second codebooks, wherein each codebook set comprises at least one codebook, and the codebook set meets a condition that codewords in a same codebook set have a same total quantity of modulation symbols and codebooks in a same codebook set have a same total quantity of codewords.

Example 60

The apparatus according to example 50, wherein the codebook indication information received by the receiving module comprises second mode information, second terminal device rank information, and third codebook set information, the second mode information is used to indicate a second mode, the second mode is used to indicate a second feature matrix to which the first codebook and the one or more second codebooks belong, and information about allocation of feature sequences in the second feature matrix to multiple terminal devices to which the first data stream and the second data stream belong, the second terminal device rank information is used to indicate a rank of the terminal device in the multiple terminal devices, and the third codebook set information is used to indicate a codebook set that is respectively used by each of the multiple terminal devices and that corresponds to the second feature matrix; and the determining module comprises: a fourth determining unit, configured to determine, according to the second mode information, the second terminal device rank information, and the third codebook set information and in one or more codebook sets corresponding to the second feature matrix indicated by the second mode, the first codebook corresponding to the second terminal device rank information and the one or more second codebooks, wherein each feature matrix corresponds to one or more codebook sets, the feature matrix consists of two or more feature sequences, the feature sequence consists of a zero-element and a 1-element, the zero-element means that modulation symbols of all codewords in a corresponding codebook at a location corresponding to the zero-element are all zero-modulation symbols, the 1-element means that modulation symbols of all codewords in a corresponding codebook at a location corresponding to the 1-element are not all zero-modulation symbols or are all non-zero-modulation symbols, each codebook set comprises at least one codebook, the codebook set meets a condition that codewords in a same codebook set have a same total quantity of modulation symbols and codebooks in a same codebook set have a same total quantity of codewords, and each codebook in the codebook set respectively corresponds to each feature sequence in the feature matrix.

Example 61

The apparatus according to any one of examples 50 to 60, wherein the receiving module is specifically configured to receive a downlink scheduling message, dedicated higher layer control signaling, or a system broadcast message that is sent by the network device, wherein the downlink scheduling message, the dedicated higher layer control signaling, and the system broadcast message comprise the codebook indication information.

Example 62

The apparatus according to example 61, wherein the dedicated higher layer control signaling comprises a radio resource control RRC connection establishment message and an RRC connection reconfiguration message.

Example 63

The apparatus according to any one of examples 50 to 62, wherein the codebook indication information received by the receiving module is bit string information.

Example 64

The apparatus according to any one of examples 50 to 63, wherein the codebook is a sparse code multiple access SCMA codebook.

Example 65

The apparatus according to example 64, wherein a quantity of zero-modulation symbols of a codeword comprised in the codebook is greater than or equal to a quantity of non-zero-modulation symbols.

Example 66

The apparatus according to any one of examples 50 to 65, wherein the apparatus is the terminal device.

Example 67

An indication information transmission apparatus, comprising: a processor, a memory, a bus system, and a transmitter, wherein the processor, the memory, and the transmitter are connected by using the bus system, the memory is configured to store an instruction, and the processor is configured to execute the instruction stored in the memory, to control the transmitter to send a signal;

the processor is configured to:

determine, in one or more codebooks, a first codebook used to send a first downlink data stream to a terminal device, wherein the codebook consists of two or more codewords, the codewords are multidimensional complex vectors, and are used to indicate mapping relationships between data and at least two modulation symbols, and the at least two modulation symbols comprise at least one zero-modulation symbol and at least one non-zero-modulation symbol;

determine one or more second codebooks used to send a second downlink data stream, wherein the second downlink data stream is one or more downlink data streams, other than the first downlink data stream, carried on a time-frequency resource used for the first downlink data stream; and determine codebook indication information used to indicate the first codebook and the one or more second codebooks; and the transmitter is configured to send the codebook indication information to the terminal device.

Example 68

The apparatus according to example 67, wherein the determining, by the processor, codebook indication information used to indicate the first codebook and the one or more second codebooks comprises:

determining a first codebook set to which the first codebook belongs, one or more second codebook sets to which the one or more second codebooks belong, and a first codebook cluster to which the first codebook set and the one or more second codebook sets belong, wherein each codebook cluster comprises at least one codebook set, each codebook set comprises at least one codebook, the codebook cluster meets a condition that codewords in a same codebook cluster have a same total quantity of modulation symbols, and the codebook set meets a condition that for any two codebooks in a same codebook set, a location at which modulation symbols of all codewords in one codebook are zero-modulation symbols is the same as a location at which modulation symbols of all codewords in the other codebook are zero-modulation symbols, or the codebook set meets a condition that codewords in a same codebook set have a same total quantity of modulation symbols and codebooks in a same codebook set have a same total quantity of codewords; and determining the codebook indication information, wherein the codebook indication information comprises first codebook cluster information, first codebook set information, and first indication information, the first codebook cluster information is used to indicate the first codebook cluster, the first codebook set information is used to indicate the first codebook set in the first codebook cluster, the first indication information is used to indicate the first codebook in the first codebook set, and the first indication information is further used to indicate the one or more second codebook sets in the first codebook cluster and the one or more second codebooks in the one or more second codebook sets.

Example 69

The apparatus according to example 68, wherein the first indication information determined by the processor comprises: first codebook information, second codebook set information, and second codebook information, the first codebook information is used to indicate the first codebook in the first codebook set, the second codebook set information is used to indicate the one or more second codebook sets in the first codebook cluster, and the second codebook information is used to indicate the one or more second codebooks in the one or more second codebook sets.

Example 70

The apparatus according to example 68, wherein the first indication information determined by the processor comprises M groups of bit string information in a one-to-one correspondence with all codebook sets in the first codebook cluster, each group of bit string information is used to indicate whether a corresponding codebook set belongs to the first codebook set or the one or more second codebook sets, when the codebook set corresponding to each group of bit string information belongs to the first codebook set or the one or more second codebook sets, each group of bit string information is further used to indicate the first codebook or the one or more second codebooks in the corresponding codebook set, and M is quantity of codebook sets comprised in the first codebook cluster.

Example 71

The apparatus according to example 69 or 70, wherein the first indication information determined by the processor comprises modulation order information of the first codebook and the one or more second codebooks, and each codebook in each codebook set has a different modulation order.

Example 72

The apparatus according to example 67, wherein the determining, by the processor, codebook indication information used to indicate the first codebook and the one or more second codebooks comprises:

determining a first feature sequence to which the first codebook belongs, one or more second feature sequences to which the one or more second codebooks belong, and a first feature matrix to which the first feature sequence and the one or more second feature sequences belong, wherein each feature matrix consists of two or more feature sequences, each feature sequence corresponds to one or more codebooks, the feature sequence consists of a zero-element and a 1-element, the zero-element means that modulation symbols of all codewords in a corresponding codebook at a location corresponding to the zero-element are all zero-modulation symbols, and the 1-element means that modulation symbols of all codewords in a corresponding codebook at a location corresponding to the 1-element are not all zero-modulation symbols or are all non-zero-modulation symbols; and determining the codebook indication information, wherein the codebook indication information comprises first feature matrix information, first feature sequence information, and second indication information, the first feature matrix information is used to indicate the first feature matrix, the first feature sequence information is used to indicate the first feature sequence in the first feature matrix, the second indication information is used to indicate the first codebook in one or more codebooks corresponding to the first feature sequence, and the second indication information is further used to indicate the one or more second feature sequences in the first feature matrix, and the one or more second codebooks in one or more codebooks corresponding to the one or more second feature sequences.

Example 73

The apparatus according to example 72, wherein the second indication information determined by the processor comprises: third codebook information, second feature sequence information, and fourth codebook information, the third codebook information is used to indicate the first codebook in the one or more codebooks corresponding to the first feature sequence, the second feature sequence information is used to indicate the one or more second feature sequences in the first feature matrix, and the fourth codebook information is used to indicate the one or more second codebooks in the one or more codebooks corresponding to the one or more second feature sequences.

Example 74

The apparatus according to example 72, wherein the second indication information determined by the processor comprises M groups of bit string information in a one-to-one correspondence with all feature sequences in the first feature matrix, each group of bit string information is used to indicate whether a corresponding feature sequence belongs to the first feature sequence or the one or more second feature sequences, when the feature sequence corresponding to each group of bit string information belongs to the first feature sequence or the one or more second feature sequences, each group of bit string information is further used to indicate the first codebook or the one or more second codebooks in one or more codebooks corresponding to the corresponding feature sequence, and M is quantity of feature sequences comprised in the first feature matrix.

Example 75

The apparatus according to example 73 or 74, wherein the second indication information determined by the processor comprises modulation order information of the first codebook and the one or more second codebooks, and each of the one or more codebooks corresponding to each feature sequence has a different modulation order.

Example 76

The apparatus according to example 67, wherein the determining, by the processor, codebook indication information used to indicate the first codebook and the one or more second codebooks comprises:

determining a first mode and a rank of the terminal device in multiple terminal devices to which the first data stream and the second data stream belong, wherein the first mode is used to indicate a third codebook set to which the first codebook and the one or more second codebooks belong, and information about allocation of codebooks in the third codebook set to the multiple terminal devices, each codebook set comprises at least one codebook, and the codebook set meets a condition that codewords in a same codebook set have a same total quantity of modulation symbols and codebooks in a same codebook set have a same total quantity of codewords; and determining the codebook indication information, wherein the codebook indication information comprises first mode information and first terminal device rank information, the first mode information is used to indicate the first mode, and the first terminal device rank information is used to indicate the rank of the terminal device in the multiple terminal devices.

Example 77

The apparatus according to example 67, wherein the determining, by the processor, codebook indication information used to indicate the first codebook and the one or more second codebooks comprises:

determining a second mode, a rank of the terminal device in multiple terminal devices to which the first data stream and the second data stream belong, and a codebook set used by each of the multiple terminal devices, wherein the second mode is used to indicate a second feature matrix to which the first codebook and the one or more second codebooks belong, and information about allocation of feature sequences in the second feature matrix to the multiple terminal devices, each feature matrix corresponds to one or more codebook sets, the feature matrix consists of two or more feature sequences, the feature sequence consists of a zero-element and a 1-element, the zero-element means that modulation symbols of all codewords in a corresponding codebook at a location corresponding to the zero-element are all zero-modulation symbols, the 1-element means that modulation symbols of all codewords in a corresponding codebook at a location corresponding to the 1-element are not all zero-modulation symbols or are all non-zero-modulation symbols, each codebook set comprises at least one codebook, the codebook set meets a condition that codewords in a same codebook set have a same total quantity of modulation symbols and codebooks in a same codebook set have a same total quantity of codewords, and each codebook in the codebook set respectively corresponds to each feature sequence in the feature matrix; and determining the codebook indication information, wherein the codebook indication information comprises second mode information, second terminal device rank information, and third codebook set information, the second mode information is used to indicate the second mode, the second terminal device rank information is used to indicate the rank of the terminal device in the multiple terminal devices, and the third codebook set information is used to indicate the codebook set that is used by each terminal device and that corresponds to the second feature matrix.

Example 78

The apparatus according to any one of examples 67 to 77, wherein the sending, by the transmitter, the codebook indication information to the terminal device comprises:

sending a downlink scheduling message, dedicated higher layer control signaling, or a system broadcast message to the terminal device, wherein the downlink scheduling message, the dedicated higher layer control signaling, and the system broadcast message comprise the codebook indication information.

Example 79

The apparatus according to example 78, wherein the dedicated higher layer control signaling comprises a radio resource control RRC connection establishment message and an RRC connection reconfiguration message.

Example 80

The apparatus according to any one of examples 67 to 79, wherein the codebook indication information determined by the processor is bit string information.

Example 81

The apparatus according to any one of examples 67 to 80, wherein the codebook is a sparse code multiple access SCMA codebook.

Example 82

The apparatus according to example 81, wherein a quantity of zero-modulation symbols of a codeword comprised in the codebook is greater than or equal to a quantity of non-zero-modulation symbols.

Example 83

The apparatus according to any one of examples 67 to 82, wherein the apparatus is a network device.

Example 84

An indication information transmission apparatus, comprising: a processor, a memory, a bus system, and a receiver, wherein the processor, the memory, and the receiver are connected by using the bus system, the memory is configured to store an instruction, and the processor is configured to execute the instruction stored in the memory, to control the receiver to receive a signal;

the receiver is configured to receive codebook indication information sent by a network device, wherein the codebook indication information is used to indicate a first codebook used by the network device to send a first downlink data stream, and one or more second codebooks used by the network device to send a second downlink data stream, the second downlink data stream is one or more downlink data streams, other than the first downlink data stream, carried on a time-frequency resource used for the first downlink data stream, the codebook consists of two or more codewords, the codewords are multidimensional complex vectors, and are used to indicate mapping relationships between data and at least two modulation symbols, and the at least two modulation symbols comprise at least one zero-modulation symbol and at least one non-zero-modulation symbol; and the processor is configured to: determine the first codebook and the one or more second codebooks according to the codebook indication information; and decode, according to the first codebook and the one or more second codebooks, the first downlink data stream sent by the network device.

Example 85

The apparatus according to example 84, wherein the codebook indication information received by the receiver comprises first codebook cluster information, first codebook set information, and first indication information, the first codebook cluster information is used to indicate a first codebook cluster, the first codebook set information is used to indicate a first codebook set in the first codebook cluster, the first indication information is used to indicate the first codebook in the first codebook set, and the first indication information is further used to indicate one or more second codebook sets in the first codebook cluster and the one or more second codebooks in the one or more second codebook sets; and the determining, by the processor, the first codebook and the one or more second codebooks according to the codebook indication information comprises:

determining, according to the first codebook cluster information, the first codebook set information, and the first indication information, the first codebook in the first codebook set comprised in the first codebook cluster and the one or more second codebooks in the one or more second codebook sets comprised in the first codebook cluster, wherein each codebook cluster comprises at least one codebook set, each codebook set comprises at least one codebook, the codebook cluster meets a condition that codewords in a same codebook cluster have a same total quantity of modulation symbols, and the codebook set meets a condition that for any two codebooks in a same codebook set, a location at which modulation symbols of all codewords in one codebook are zero-modulation symbols is the same as a location at which modulation symbols of all codewords in the other codebook are zero-modulation symbols, or the codebook set meets a condition that codewords in a same codebook set have a same total quantity of modulation symbols and codebooks in a same codebook set have a same total quantity of codewords.

Example 86

The apparatus according to example 85, wherein the first indication information received by the receiver comprises: first codebook information, second codebook set information, and second codebook information, the first codebook information is used to indicate the first codebook in the first codebook set, the second codebook set information is used to indicate the one or more second codebook sets in the first codebook cluster, and the second codebook information is used to indicate the one or more second codebooks in the one or more second codebook sets.

Example 87

The apparatus according to example 85, wherein the first indication information received by the receiver comprises M groups of bit string information in a one-to-one correspondence with all codebook sets in the first codebook cluster, each group of bit string information is used to indicate whether a corresponding codebook set belongs to the first codebook set or the one or more second codebook sets, when the codebook set corresponding to each group of bit string information belongs to the first codebook set or the one or more second codebook sets, each group of bit string information is further used to indicate the first codebook or the one or more second codebooks in the corresponding codebook set, and M is quantity of codebook sets comprised in the first codebook cluster.

Example 88

The apparatus according to example 86 or 87, wherein the first indication information received by the receiver comprises modulation order information of the first codebook and the one or more second codebooks, and each codebook in each codebook set has a different modulation order.

Example 89

The apparatus according to example 84, wherein the codebook indication information received by the receiver comprises first feature matrix information, first feature sequence information, and second indication information, the first feature matrix information is used to indicate a first feature matrix, the first feature sequence information is used to indicate a first feature sequence in the first feature matrix, the second indication information is used to indicate the first codebook in one or more codebooks corresponding to the first feature sequence, and the second indication information is further used to indicate one or more second feature sequences in the first feature matrix, and the one or more second codebooks in one or more codebooks corresponding to the one or more second feature sequences; and the determining, by the processor, the first codebook and the one or more second codebooks according to the codebook indication information comprises:

determining, according to the first feature matrix information, the first feature sequence information, and the second indication information, the first codebook in the one or more codebooks corresponding to the first feature sequence comprised in the first feature matrix, and the one or more second codebooks in the one or more codebooks corresponding to the one or more second feature sequences comprised in the first feature matrix, wherein each feature matrix consists of two or more feature sequences, each feature sequence corresponds to one or more codebooks, the feature sequence consists of a zero-element and a 1-element, the zero-element means that modulation symbols of all codewords in a corresponding codebook at a location corresponding to the zero-element are all zero-modulation symbols, and the 1-element means that modulation symbols of all codewords in a corresponding codebook at a location corresponding to the 1-element are not all zero-modulation symbols or are all non-zero-modulation symbols.

Example 90

The apparatus according to example 89, wherein the second indication information received by the receiver comprises: third codebook information, second feature sequence information, and fourth codebook information, the third codebook information is used to indicate the first codebook in the one or more codebooks corresponding to the first feature sequence, the second feature sequence information is used to indicate the one or more second feature sequences in the first feature matrix, and the fourth codebook information is used to indicate the one or more second codebooks in the one or more codebooks corresponding to the one or more second feature sequences.

Example 91

The apparatus according to example 89, wherein the second indication information received by the receiver comprises M groups of bit string information in a one-to-one correspondence with all feature sequences in the first feature matrix, each group of bit string information is used to indicate whether a corresponding feature sequence belongs to the first feature sequence or the one or more second feature sequences, when the feature sequence corresponding to each group of bit string information belongs to the first feature sequence or the one or more second feature sequences, each group of bit string information is further used to indicate the first codebook or the one or more second codebooks in one or more codebooks corresponding to the corresponding feature sequence, and M is quantity of feature sequences comprised in the first feature matrix.

Example 92

The apparatus according to example 90 or 91, wherein the second indication information received by the receiver comprises modulation order information of the first codebook and the one or more second codebooks, and each of the one or more codebooks corresponding to each feature sequence has a different modulation order.

Example 93

The apparatus according to example 84, wherein the codebook indication information received by the receiver comprises first mode information and first terminal device rank information, the first mode information is used to indicate a first mode, the first mode is used to indicate a third codebook set to which the first codebook and the one or more second codebooks belong, and information about allocation of codebooks in the third codebook set to multiple terminal devices to which the first data stream and the second data stream belong, and the first terminal device rank information is used to indicate a rank of the terminal device in the multiple terminal devices; and the determining, by the processor, the first codebook and the one or more second codebooks according to the codebook indication information comprises:

determining, according to the first mode information and the first terminal device rank information and in the third codebook set indicated by the first mode, the first codebook corresponding to the first terminal device rank information and the one or more second codebooks, wherein each codebook set comprises at least one codebook, and the codebook set meets a condition that codewords in a same codebook set have a same total quantity of modulation symbols and codebooks in a same codebook set have a same total quantity of codewords.

Example 94

The apparatus according to example 84, wherein the codebook indication information received by the receiver comprises second mode information, second terminal device rank information, and third codebook set information, the second mode information is used to indicate a second mode, the second mode is used to indicate a second feature matrix to which the first codebook and the one or more second codebooks belong, and information about allocation of feature sequences in the second feature matrix to multiple terminal devices to which the first data stream and the second data stream belong, the second terminal device rank information is used to indicate a rank of the terminal device in the multiple terminal devices, and the third codebook set information is used to indicate a codebook set that is respectively used by each of the multiple terminal devices and that corresponds to the second feature matrix; and the determining, by the processor, the first codebook and the one or more second codebooks according to the codebook indication information comprises:

determining, according to the second mode information, the second terminal device rank information, and the third codebook set information and in one or more codebook sets corresponding to the second feature matrix indicated by the second mode, the first codebook corresponding to the second terminal device rank information and the one or more second codebooks, wherein each feature matrix corresponds to one or more codebook sets, the feature matrix consists of two or more feature sequences, the feature sequence consists of a zero-element and a 1-element, the zero-element means that modulation symbols of all codewords in a corresponding codebook at a location corresponding to the zero-element are all zero-modulation symbols, the 1-element means that modulation symbols of all codewords in a corresponding codebook at a location corresponding to the 1-element are not all zero-modulation symbols or are all non-zero-modulation symbols, each codebook set comprises at least one codebook, the codebook set meets a condition that codewords in a same codebook set have a same total quantity of modulation symbols and codebooks in a same codebook set have a same total quantity of codewords, and each codebook in the codebook set respectively corresponds to each feature sequence in the feature matrix.

Example 95

The apparatus according to any one of examples 84 to 94, wherein the receiving, by the receiver, codebook indication information sent by a network device comprises:

receiving a downlink scheduling message, dedicated higher layer control signaling, or a system broadcast message that is sent by the network device, wherein the downlink scheduling message, the dedicated higher layer control signaling, and the system broadcast message comprise the codebook indication information.

Example 96

The apparatus according to example 95, wherein the dedicated higher layer control signaling comprises a radio resource control RRC connection establishment message and an RRC connection reconfiguration message.

Example 97

The apparatus according to any one of examples 84 to 96, wherein the codebook indication information received by the receiver is bit string information.

Example 98

The apparatus according to any one of examples 84 to 97, wherein the codebook is a sparse code multiple access SCMA codebook.

Example 99

The apparatus according to example 98, wherein a quantity of zero-modulation symbols of a codeword comprised in the codebook is greater than or equal to a quantity of non-zero-modulation symbols.

Example 100

The apparatus according to any one of examples 84 to 99, wherein the apparatus is the terminal device.

What is claimed is:

1. An indication information transmission apparatus comprising:
a processor, a memory, a bus system, and a transmitter, wherein the processor, the memory, and the transmitter are connected through the bus system, the memory is configured to store an instruction, and the processor is configured to execute the instruction stored in the memory to control the transmitter to send a signal;
the processor is further configured to:
determine, in one or more codebooks, a first codebook used to send a first downlink data stream to a terminal device,
wherein each of the one or more codebooks consists of two or more codewords, the codewords are multidimensional complex vectors, and are used to indicate mapping relationships between data and at least two modulation symbols, and the at least two modulation symbols comprise at least one zero-modulation symbol and at least one non-zero-modulation symbol;
determine one or more second codebooks used to send a second downlink data stream, wherein the second downlink data stream is one or more downlink data streams, other than the first downlink data stream, carried on a time-frequency resource used for the first downlink data stream;
determine (a) a first codebook set to which the first codebook belongs, (b) one or more second codebook sets to which the one or more second codebooks belong, and (c) a codebook cluster to which the first codebook set and the one or more second codebook sets belong,
wherein each of the first and one or more second codebook sets comprises at least one codebook,
wherein the codebook cluster meets a condition that codewords in a same codebook cluster have a same total quantity of modulation symbols, and
wherein codebook sets of the codebook cluster meet one of the following conditions:
a) for any two codebooks in a same codebook set, a location at which modulation symbols of all codewords in one codebook are zero-modulation symbols is the same as a location at which modulation symbols of all codewords in the other codebook are zero-modulation symbols, and
b) the codebook sets meet a condition that codewords in a same codebook set have a same total quantity of modulation symbols and codebooks in a same codebook set have a same total quantity of codewords; and
determine codebook indication information used to indicate the first codebook and the one or more second codebooks,
wherein the codebook indication information comprises codebook cluster information, first codebook set information, and first indication information,
wherein the codebook cluster information indicates the codebook cluster,
wherein the first codebook set information indicates the first codebook set in the codebook cluster,
wherein the first indication information indicates the first codebook in the first codebook set and also further indicated the one or more second codebook sets in the codebook cluster and the one or more second codebooks in the one or more second codebook sets; and
the transmitter is further configured to send the codebook indication information to the terminal device.

2. The apparatus according to claim 1, wherein the first indication information determined by the processor comprises:
first codebook information,
second codebook set information, and
second codebook information,
wherein the first codebook information is used to indicate the first codebook in the first codebook set, the second codebook set information is used to indicate the one or more second codebook sets in the codebook cluster, and the second codebook information is used to indicate the one or more second codebooks in the one or more second codebook sets.

3. The apparatus according to claim 1, wherein the first indication information determined by the processor comprises:
M groups of bit string information in a one-to-one correspondence with all codebook sets in the codebook cluster, wherein
each group of bit string information is used to indicate whether a codebook set belongs to the first codebook set or the one or more second codebook sets, when the codebook set associated with each group of bit string information belongs to the first codebook set or the one or more second codebook sets,
each group of bit string information is further used to indicate the first codebook or the one or more second codebooks in the codebook set, and
M is a quantity number of codebook sets comprised in the codebook cluster, M is a positive integer.

4. The apparatus according to claim 2, wherein the first indication information determined by the processor comprises:
modulation order information of the first codebook and the one or more second codebooks, and each codebook in each codebook set has a different modulation order.

5. The apparatus according to claim 1, wherein when determining the codebook indication information, the processor is configured to:
determine a first feature sequence to which the first codebook belongs, one or more second feature sequences to which the one or more second codebooks belong, and a first feature matrix to which the first feature sequence and the one or more second feature sequences belong, wherein
the first feature matrix consists of two or more feature sequences,
each feature sequence is associated with one or more codebooks,
the feature sequence consists of a zero-element and a 1-element,
the zero-element indicates that modulation symbols of all codewords in a codebook at a location associated with the zero-element are all zero-modulation symbols, and
the 1-element indicates that modulation symbols of all codewords in a codebook at a location associated with the 1-element are not all zero-modulation symbols or are all non-zero-modulation symbols; and determine the codebook indication information, wherein the codebook indication information comprises first feature matrix information, first feature sequence information, and second indication information,
the first feature matrix information is used to indicate the first feature matrix,
the first feature sequence information is used to indicate the first feature sequence in the first feature matrix,
the second indication information is used to indicate the first codebook in one or more codebooks associated with the first feature sequence, and
the second indication information is further used to indicate the one or more second feature sequences in the first feature matrix, and the one or more second codebooks in one or more codebooks associated with the one or more second feature sequences.

6. The apparatus according to claim 5, wherein the second indication information determined by the processor comprises:
third codebook information, second feature sequence information, and fourth codebook information, wherein the third codebook information is used to indicate the first codebook in the one or more codebooks associated with the first feature sequence,
the second feature sequence information is used to indicate the one or more second feature sequences in the first feature matrix, and
the fourth codebook information is used to indicate the one or more second codebooks in the one or more codebooks associated with the one or more second feature sequences.

7. The apparatus according to claim 5, wherein the second indication information determined by the processor comprises:
M groups of bit string information in a one-to-one correspondence with all feature sequences in the first feature matrix, wherein
each group of bit string information is used to indicate whether a feature sequence belongs to the first feature sequence or the one or more second feature sequences, when the feature sequence associated with each group of bit string information belongs to the first feature sequence or the one or more second feature sequences,
each group of bit string information is further used to indicate the first codebook or the one or more second codebooks in one or more codebooks associated with the feature sequence, and
M is a quantity number of feature sequences comprised in the first feature matrix, M is a positive integer.

8. The apparatus according to claim 6, wherein the second indication information determined by the processor comprises:
modulation order information of the first codebook and the one or more second codebooks, and each of the one or more codebooks associated with each feature sequence has a different modulation order.

9. The apparatus according to claim 1, wherein when determining the codebook indication information, the processor is further configured to:
determine a first mode and a rank of the terminal device in multiple terminal devices to which the first data stream and the second data stream belong, wherein
the first mode is used to indicate a third codebook set to which the first codebook and the one or more second codebooks belong, and information about allocation of codebooks in the third codebook set to the multiple terminal devices,
each codebook set comprises at least one codebook, and
the codebook set meets a condition that codewords in a same codebook set have a same total quantity of modulation symbols and codebooks in a same codebook set have a same total quantity of codewords; and
determine the codebook indication information,
wherein the codebook indication information comprises first mode information and first terminal device rank information,
the first mode information is used to indicate the first mode, and
the first terminal device rank information is used to indicate a rank of the terminal device in multiple terminal devices.

10. The apparatus according to claim 1, wherein when determining the codebook indication information, the processor is further configured:
determine a second mode, a rank of the terminal device in multiple terminal devices to which the first data stream and the second data stream belong, and a codebook set used by each of the multiple terminal devices,
wherein the second mode is used to indicate a second feature matrix to which the first codebook and the one or more second codebooks belong, and information about allocation of feature sequences in the second feature matrix to the multiple terminal devices,
each feature matrix is associated with one or more codebook sets,
the feature matrix consists of two or more feature sequences,
the feature sequence consists of a zero-element and a 1-element,
the zero-element indicates that modulation symbols of all codewords in a codebook at a location associated with the zero-element are all zero-modulation symbols,
the 1-element indicates that modulation symbols of all codewords in a codebook at a location associated with the 1-element are not all zero-modulation symbols or are all non-zero-modulation symbols,
each codebook set comprises at least one codebook,
the codebook set meets a condition that codewords in a same codebook set have a same total quantity of modulation symbols and codebooks in a same codebook set have a same total quantity of codewords, and
each codebook in the codebook set is respectively associated with each feature sequence in the feature matrix; and
determining the codebook indication information, wherein the codebook indication information comprises second mode information, second terminal device rank information, and third codebook set information, wherein
the second mode information is used to indicate the second mode,
the second terminal device rank information is used to indicate the rank of the terminal device in the multiple terminal devices, and
the third codebook set information is used to indicate the codebook set that is used by each terminal device and that is associated with the second feature matrix.

11. The apparatus according to claim 1, wherein when sending the codebook indication information to the terminal device, the transmitter is further configured to cooperate with the processor to:
send a downlink scheduling message, dedicated higher layer control signaling, or a system broadcast message to the terminal device, wherein the downlink scheduling message, the dedicated higher layer control signaling, and the system broadcast message comprise the codebook indication information.

12. The apparatus according to claim 11, wherein the dedicated higher layer control signaling comprises a radio resource control (RRC) connection establishment message and an RRC connection reconfiguration message.

13. The apparatus according to claim 1, wherein the codebook indication information determined by the processor is bit string information.

14. An indication information transmission apparatus comprising:
a processor, a memory, a bus system, and a receiver, wherein the processor, the memory, and the receiver are connected through the bus system, the memory is configured to store an instruction, and the processor is configured to execute the instruction stored in the memory, to control the receiver to receive a signal;
the receiver is further configured to receive codebook indication information sent by a network device, wherein the codebook indication information comprises codebook cluster information, first codebook set information, and first indication information and wherein
the codebook indication information is used to indicate a first codebook used by the network device to send a first downlink data stream, and one or more second codebooks used by the network device to send a second downlink data stream,
the second downlink data stream is one or more downlink data streams, other than the first downlink data stream, carried on a time-frequency resource used for the first downlink data stream,
the codebook consists of two or more codewords, the codewords are multidimensional complex vectors, and are used to indicate mapping relationships between data and at least two modulation symbols,
the at least two modulation symbols comprise at least one zero-modulation symbol and at least one non-zero-modulation symbol,
the codebook cluster information is used to indicate a codebook cluster,
the first codebook set information is used to indicate a first codebook set in the codebook cluster,
the first indication information is used to indicate the first codebook in the first codebook set, and
the first indication information is further used to indicate one or more second codebook sets in the codebook cluster and the one or more second codebooks in the one or more second codebook sets; and
the processor is configured to:
determine the first codebook and the one or more second codebooks according to the codebook indication information, including determining, according to the codebook cluster information, the first codebook set information, and the first indication information, the first codebook in the first codebook set comprised in the codebook cluster and the one or more second codebooks in the one or more second codebook sets comprised in the codebook cluster,
wherein the codebook cluster comprises at least one codebook set,
each codebook set comprises at least one codebook,
the codebook cluster meets a condition that codewords in a same codebook cluster have a same total quantity of modulation symbols, and
the codebook set meets a condition that (a) for any two codebooks in a same codebook set, a location at which modulation symbols of all codewords in one codebook are zero-modulation symbols is the same as a location at which modulation symbols of all codewords in the other codebook are zero-modulation symbols, or (b) codewords in a same codebook set have a same total quantity of modulation symbols and codebooks in a same codebook set have a same total quantity of codewords; and
decode, according to the first codebook and the one or more second codebooks, the first downlink data stream sent by the network device.

15. The apparatus according to claim 14, wherein the first indication information received by the receiver comprises: first codebook information, second codebook set information, and second codebook information, wherein
the first codebook information is used to indicate the first codebook in the first codebook set,
the second codebook set information is used to indicate the one or more second codebook sets in the codebook cluster, and
the second codebook information is used to indicate the one or more second codebooks in the one or more second codebook sets.

16. The apparatus according to claim 14, wherein the first indication information received by the receiver comprises: M groups of bit string information in a one-to-one correspondence with all codebook sets in the codebook cluster, wherein
each group of bit string information is used to indicate whether a codebook set belongs to the first codebook set or the one or more second codebook sets, when the codebook set associated with each group of bit string information belongs to the first codebook set or the one or more second codebook sets,
each group of bit string information is further used to indicate the first codebook or the one or more second codebooks in the codebook set, and
M is a quantity number of codebook sets comprised in the first codebook cluster, M is a positive integer.

17. The apparatus according to claim 15, wherein the first indication information received by the receiver comprises:
modulation order information of the first codebook and the one or more second codebooks, and each codebook in each codebook set has a different modulation order.

18. The apparatus according to claim 14, wherein the codebook indication information received by the receiver comprises: first feature matrix information, first feature sequence information, and second indication information, wherein
the first feature matrix information is used to indicate a first feature matrix,
the first feature sequence information is used to indicate a first feature sequence in the first feature matrix,
the second indication information is used to indicate the first codebook in one or more codebooks associated with the first feature sequence, and
the second indication information is further used to indicate one or more second feature sequences in the first feature matrix, and the one or more second codebooks in one or more codebooks associated with the one or more second feature sequences; and wherein when determining the first codebook and the one or more second codebooks, the processor is further configured to:

determine, according to the first feature matrix information, the first feature sequence information, and the second indication information, wherein the first codebook in the one or more codebooks associated with the first feature sequence comprised in the first feature matrix, and the one or more second codebooks in the one or more codebooks associated with the one or more second feature sequences comprised in the first feature matrix, wherein each feature matrix consists of two or more feature sequences, each feature sequence is associated with one or more codebooks, the feature sequence consists of a zero-element and a 1-element, the zero-element indicates that modulation symbols of all codewords in a codebook at a location associated with the zero-element are all zero-modulation symbols, and the 1-element means that modulation symbols of all codewords in a codebook at a location associated with the 1-element are not all zero-modulation symbols or are all non-zero-modulation symbols.

19. A method for transmitting indication information, the method comprising:

receive codebook indication information sent by a network device, wherein the codebook indication information comprises codebook cluster information, first codebook set information, and first indication information and wherein, a) the codebook indication information is used to indicate a first codebook used by the network device to send a first downlink data stream, and one or more second codebooks used by the network device to send a second downlink data stream, b) the second downlink data stream is one or more downlink data streams, other than the first downlink data stream, carried on a time-frequency resource used for the first downlink data stream, c) the codebook consists of two or more codewords, d) the codewords are multidimensional complex vectors, and are used to indicate mapping relationships between data and at least two modulation symbols, e) the at least two modulation symbols comprise at least one zero-modulation symbol and at least one non-zero-modulation symbol, and f) the codebook cluster information is used to indicate a codebook cluster, g) the first codebook set information is used to indicate a first codebook set in the codebook cluster, h) the first indication information is used to indicate the first codebook in the first codebook set, and i) the first indication information is further used to indicate one or more second codebook sets in the codebook cluster and the one or more second codebooks in the one or more second codebook sets; and determine the first codebook and the one or more second codebooks according to the codebook indication information, including determining, according to the codebook cluster information, the first codebook set information, and the first indication information, the first codebook in the first codebook set comprised in the codebook cluster and the one or more second codebooks in the one or more second codebook sets comprised in the codebook cluster, wherein a) the codebook cluster comprises at least one codebook set, b) each codebook set comprises at least one codebook, c) the codebook cluster meets a condition that codewords in a same codebook cluster have a same total quantity of modulation symbols, and d) the codebook set meets a condition that (i) for any two codebooks in a same codebook set, a location at which modulation symbols of all codewords in one codebook are zero-modulation symbols is the same as a location at which modulation symbols of all codewords in the other codebook are zero-modulation symbols, or (ii) codewords in a same codebook set have a same total quantity of modulation symbols and codebooks in a same codebook set have a same total quantity of codewords; and decode the first downlink data stream sent by the network device according to the first codebook and the one or more second codebooks.

20. The method according to claim 19, wherein the first indication information received by the receiver comprises first codebook information, second codebook set information, and second codebook information, wherein the first codebook information is used to indicate the first codebook in the first codebook set, the second codebook set information is used to indicate the one or more second codebook sets in the codebook cluster, and the second codebook information is used to indicate the one or more second codebooks in the one or more second codebook sets.

* * * * *

UNITED STATES PATENT AND TRADEMARK OFFICE
CERTIFICATE OF CORRECTION

PATENT NO. : 10,470,188 B2
APPLICATION NO. : 15/630706
DATED : November 5, 2019
INVENTOR(S) : Xu et al.

Page 1 of 1

It is certified that error appears in the above-identified patent and that said Letters Patent is hereby corrected as shown below:

In the Claims

Claim 16: Column 166, Line 47: "first codebook cluster, M is a positive integer." should read -- codebook cluster, M is a positive integer. --.

Signed and Sealed this
Nineteenth Day of April, 2022

Katherine Kelly Vidal
*Director of the United States Patent and Trademark Office*